(12) United States Patent
Cullen, III et al.

(10) Patent No.: US 8,204,820 B2
(45) Date of Patent: *Jun. 19, 2012

(54) COMPUTER SYSTEM AND METHOD FOR PRODUCING ANALYTICAL DATA RELATED TO THE PROJECT BID AND REQUISITION PROCESS

(75) Inventors: Andrew A. Cullen, III, Succasunna, NJ (US); Ivan Danilov, Staten Island, NY (US); Leonid Zilberman, Brooklyn, NY (US)

(73) Assignee: Volt Information Sciences, Inc., Orange, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/017,760

(22) Filed: Jan. 31, 2011

(65) Prior Publication Data

US 2011/0282714 A1   Nov. 17, 2011

Related U.S. Application Data

(63) Continuation of application No. 10/412,096, filed on Apr. 10, 2003, now Pat. No. 7,925,568, which is a continuation-in-part of application No. 10/262,487, filed on Sep. 30, 2002.

(60) Provisional application No. 60/371,488, filed on Apr. 10, 2002.

(51) Int. Cl.
*G06Q 40/00* (2012.01)
(52) U.S. Cl. .......................................................... 705/37
(58) Field of Classification Search ...................... 705/37
See application file for complete search history.

(56) References Cited

U.S. PATENT DOCUMENTS

| | | | |
|---|---|---|---|
| 4,799,156 A | 1/1989 | Shavit et al. |
| 4,937,743 A | 6/1990 | Rassman et al. |
| 4,992,940 A | 2/1991 | Dworkin |
| 5,117,353 A | 5/1992 | Stipanovich et al. |
| 5,164,897 A | 11/1992 | Clark et al. |
| 5,291,397 A | 3/1994 | Powell |
| 5,381,332 A | 1/1995 | Wood |
| 5,416,694 A | 5/1995 | Parrish et al. |
| 5,493,490 A | 2/1996 | Johnson |
| 5,592,375 A | 1/1997 | Salmon et al. |
| 5,600,554 A | 2/1997 | Williams |
| 5,664,115 A | 9/1997 | Fraser |
| 5,715,402 A | 2/1998 | Popolo |

(Continued)

FOREIGN PATENT DOCUMENTS

EP   1195676 A2   4/2002

(Continued)

OTHER PUBLICATIONS

U.S. Appl. No. 11/351,835, Cullen et al.

(Continued)

*Primary Examiner* — Jessica Lemieux
(74) *Attorney, Agent, or Firm* — Winstead PC

(57) ABSTRACT

A comprehensive, web-enabled computer system and method is provided for producing analytical data related a project bid management system. Transactional data related to the bid and project are entered into the computer system through an on-line bid, project requisition and payment process. Using the transactional data stored within the system, virtually any type of analytical data related to single or multiple projects performed by one or more vendors for one or more buyers can be generated.

38 Claims, 94 Drawing Sheets

U.S. PATENT DOCUMENTS

| | | | |
|---|---|---|---|
| 5,740,421 A | 4/1998 | Palmon | |
| 5,758,328 A | 5/1998 | Giovannoli | |
| 5,794,212 A | 8/1998 | Mistr, Jr. | |
| 5,802,493 A | 9/1998 | Sheflott et al. | |
| 5,842,178 A | 11/1998 | Giovannoli | |
| 5,862,223 A | 1/1999 | Walker et al. | |
| 5,907,490 A | 5/1999 | Oliver | |
| 5,913,202 A | 6/1999 | Motoyama | |
| 5,915,086 A | 6/1999 | Buzsaki et al. | |
| 5,960,407 A | 9/1999 | Vivona | |
| 5,970,475 A | 10/1999 | Barnes et al. | |
| 5,978,768 A | 11/1999 | McGovern et al. | |
| 5,987,464 A | 11/1999 | Schneider | |
| 5,991,735 A * | 11/1999 | Gerace | 705/7.33 |
| 5,995,951 A | 11/1999 | Ferguson | |
| 6,014,644 A | 1/2000 | Erickson | |
| 6,038,547 A | 3/2000 | Casto | |
| 6,041,303 A | 3/2000 | Mathews | |
| 6,049,776 A | 4/2000 | Donnelly et al. | |
| 6,058,373 A | 5/2000 | Blinn et al. | |
| 6,058,379 A | 5/2000 | Odom et al. | |
| 6,070,143 A | 5/2000 | Barney et al. | |
| 6,088,678 A | 7/2000 | Shannon | |
| 6,092,050 A | 7/2000 | Lungren et al. | |
| 6,092,197 A | 7/2000 | Coueignoux | |
| 6,112,189 A | 8/2000 | Rickard et al. | |
| 6,115,642 A | 9/2000 | Brown et al. | |
| 6,131,087 A | 10/2000 | Luke et al. | |
| 6,141,653 A | 10/2000 | Conklin et al. | |
| 6,157,808 A | 12/2000 | Hollingsworth | |
| 6,158,044 A | 12/2000 | Tibbetts | |
| 6,161,099 A | 12/2000 | Harrington et al. | |
| 6,167,385 A | 12/2000 | Hartley-Urquhart | |
| 6,189,003 B1 | 2/2001 | Leal | |
| 6,199,050 B1 | 3/2001 | Alaia et al. | |
| 6,213,780 B1 | 4/2001 | Ho et al. | |
| 6,266,659 B1 | 7/2001 | Nadkarni | |
| 6,272,467 B1 | 8/2001 | Durand et al. | |
| 6,275,812 B1 | 8/2001 | Haq et al. | |
| 6,289,340 B1 | 9/2001 | Puram et al. | |
| 6,302,695 B1 | 10/2001 | Rtischev et al. | |
| 6,324,522 B2 | 11/2001 | Peterson et al. | |
| 6,349,238 B1 | 2/2002 | Gabbita et al. | |
| 6,356,909 B1 | 3/2002 | Spencer | |
| 6,370,510 B1 | 4/2002 | McGovern et al. | |
| 6,385,620 B1 | 5/2002 | Kurzius et al. | |
| 6,408,337 B1 | 6/2002 | Dietz et al. | |
| 6,442,528 B1 | 8/2002 | Notani et al. | |
| 6,480,857 B1 | 11/2002 | Chandler | |
| 6,529,909 B1 | 3/2003 | Bowman-Amuah | |
| 6,556,976 B1 | 4/2003 | Callen | |
| 6,647,300 B1 | 11/2003 | Balasubramanian et al. | |
| 6,658,400 B2 | 12/2003 | Perell et al. | |
| 6,662,194 B1 | 12/2003 | Joao | |
| 7,054,821 B1 | 5/2006 | Rosenthal et al. | |
| 7,089,203 B1 | 8/2006 | Crookshanks | |
| 7,103,567 B2 | 9/2006 | Smukowski | |
| 7,107,268 B1 | 9/2006 | Zawadzki et al. | |
| 7,275,039 B2 | 9/2007 | Setteducati | |
| 7,305,392 B1 | 12/2007 | Abrams et al. | |
| 7,386,475 B2 | 6/2008 | Parasnis et al. | |
| 7,430,523 B1 | 9/2008 | Khalidi | |
| 7,437,304 B2 | 10/2008 | Barnard et al. | |
| 7,451,106 B1 | 11/2008 | Gindlesperger | |
| 7,457,764 B1 | 11/2008 | Bullock et al. | |
| 7,523,045 B1 | 4/2009 | Walker et al. | |
| 7,533,033 B1 | 5/2009 | Unite et al. | |
| 7,653,583 B1 | 1/2010 | Leeb et al. | |
| 7,805,382 B2 | 9/2010 | Rosen et al. | |
| 2001/0044768 A1 | 11/2001 | Wares | |
| 2001/0051913 A1 | 12/2001 | Vashistha et al. | |
| 2002/0002479 A1 | 1/2002 | Almog et al. | |
| 2002/0046147 A1 * | 4/2002 | Livesay et al. | 705/37 |
| 2002/0055870 A1 | 5/2002 | Thomas | |
| 2002/0072946 A1 | 6/2002 | Richardson | |
| 2002/0073082 A1 | 6/2002 | Duvillier et al. | |
| 2002/0087382 A1 | 7/2002 | Tiburcio | |
| 2002/0103687 A1 | 8/2002 | Kipling | |
| 2002/0152133 A1 | 10/2002 | King et al. | |
| 2002/0156668 A1 | 10/2002 | Morrow et al. | |
| 2002/0161619 A1 | 10/2002 | Ham et al. | |
| 2002/0198766 A1 | 12/2002 | Magrino et al. | |
| 2002/0198818 A1 | 12/2002 | Scott et al. | |
| 2003/0004850 A1 | 1/2003 | Li et al. | |
| 2003/0018481 A1 | 1/2003 | Zhou et al. | |
| 2003/0037032 A1 | 2/2003 | Neece et al. | |
| 2003/0055694 A1 | 3/2003 | Menninger | |
| 2003/0055754 A1 | 3/2003 | Sullivan | |
| 2003/0083910 A1 | 5/2003 | Sayal et al. | |
| 2003/0101114 A1 | 5/2003 | Delapass et al. | |
| 2003/0101127 A1 | 5/2003 | Cornelius | |
| 2003/0135401 A1 | 7/2003 | Parr | |
| 2003/0145006 A1 | 7/2003 | Dalfsen et al. | |
| 2003/0177051 A1 | 9/2003 | Driscoll et al. | |
| 2003/0200150 A1 | 10/2003 | Westcott et al. | |
| 2003/0200168 A1 | 10/2003 | Cullen, III et al. | |
| 2003/0204439 A1 | 10/2003 | Cullen, III | |
| 2003/0208434 A1 | 11/2003 | Posner | |
| 2003/0212604 A1 | 11/2003 | Cullen, III | |
| 2003/0216986 A1 | 11/2003 | Hassan | |
| 2004/0030566 A1 | 2/2004 | Brooks Rix | |
| 2004/0030590 A1 | 2/2004 | Swan et al. | |
| 2004/0039681 A1 | 2/2004 | Cullen, III et al. | |
| 2004/0068728 A1 | 4/2004 | Blevins | |
| 2004/0093583 A1 | 5/2004 | McAnaney et al. | |
| 2004/0107125 A1 | 6/2004 | Guheen et al. | |
| 2004/0107405 A1 | 6/2004 | Schein | |
| 2004/0158513 A1 | 8/2004 | Musacchio | |
| 2004/0186852 A1 | 9/2004 | Rosen | |
| 2004/0205519 A1 | 10/2004 | Chapel et al. | |
| 2004/0210490 A1 | 10/2004 | Almstead et al. | |
| 2004/0210510 A1 | 10/2004 | Cullen, III et al. | |
| 2004/0215467 A1 | 10/2004 | Coffman et al. | |
| 2004/0236598 A1 | 11/2004 | Thomsen | |
| 2004/0260601 A1 | 12/2004 | Brief | |
| 2004/0267606 A1 | 12/2004 | Brishke et al. | |
| 2005/0114829 A1 | 5/2005 | Robin | |
| 2005/0120039 A1 | 6/2005 | Amys et al. | |
| 2005/0144129 A1 | 6/2005 | Coolman et al. | |
| 2005/0262008 A1 | 11/2005 | Cullen, III et al. | |
| 2005/0288993 A1 | 12/2005 | Weng et al. | |
| 2006/0173775 A1 | 8/2006 | Cullen et al. | |
| 2006/0190391 A1 | 8/2006 | Cullen et al. | |
| 2006/0259476 A1 | 11/2006 | Kadayam et al. | |
| 2007/0124196 A1 | 5/2007 | Brief et al. | |
| 2008/0004890 A1 | 1/2008 | Hargroder | |
| 2009/0248482 A1 | 10/2009 | Knyphausen et al. | |
| 2010/0241482 A1 | 9/2010 | Knyphausen et al. | |

FOREIGN PATENT DOCUMENTS

| | | |
|---|---|---|
| JP | 2002-041835 A | 2/2002 |
| JP | 2004-086757 A | 3/2004 |
| RU | 2165679 C1 | 4/2001 |
| WO | WO-00/33187 A1 | 6/2000 |
| WO | WO-/00/50970 | 8/2000 |
| WO | WO-01/14962 A1 | 3/2001 |
| WO | WO-01/48656 | 7/2001 |
| WO | WO-02/08868 | 1/2002 |
| WO | WO-02/25544 | 3/2002 |
| WO | WO-02/41270 A1 | 5/2002 |

OTHER PUBLICATIONS

U.S. Appl. No. 11/354,367, Cullen, III et al.
U.S. Appl. No. 11/885,090, Cullen et al.
U.S. Appl. No. 12/342,116, filed Dec. 23, 2008, Cullen.
U.S. Appl. No. 12/492,438, Cullen.
U.S. Appl. No. 12/692,937, Cullen.
U.S. Appl. No. 12/773,130, Cullen.
U.S. Appl. No. 12/855,532, Wasicek.
U.S. Appl. No. 12/871,725, Shaw.
www.marketing.ebreviate.com; "Overview"; Company Information of eBreviate; Feb. 11, 2002; pp. 1-16.
www.chimes.net; "Chimes Streamlines & Digitizes RFP Administration and Project Management with Launch of Chimes PM"; Press Release from Chimes, Inc.; Feb. 25, 2002; pp. 1-4.

www.chimes.net; "Chimes, Inc. Extends Human Capital Management Solution Beyond Contingent Workforce with Launch of Centralized Applicant Management—CAM—Program"; News Room from Chimes, Inc.; Jun. 28, 2001; pp. 1-2.
www.emptoris.com; "Overview"; Company Overview of Emptoris; Apr. 15, 2002; pp. 1-18.
Screenshots of Volt Information Sciences, www.volt.com, Feb. 21, 1999, pp. 1-24, retrieved from: Google.com and archive.org.
Torres, Giselle; "High-Voltage Staffing Service Arrives in Puerto Rico"; Caribbean Business; Oct. 23, 1997, p. 1 (retrived from: Dialog, file 16).
"Volt Information Sciences-Facilities & Equipment", Annual Report, 1989, p. 1 (retrieved from : Dialog, file 160.
"Volt Information Sciences to Purchase Portions of Two Lucent Technologies Subsidiaries", PR Newswire, Nov. 17, 1999, pp. 1-3, (retrieved from: Dialog, file 16.
Consol (www, procurestaff.com via http://web.archive.org, copyright 2003) pp. (1-31).
Cullen, Andrew A. III, "Declaration of Andrew A. Cullen III", 41 pages, Jun. 18, 2008.
Leipold et al., "The World Bank e-Procurement for the Selection of Consultants: Challenges and Lessons Learned" Journal of Public Procurement, 2004, vol. 4, Issue 3, pp. 319-339.
Dysart, J., "The Data Exchange,"DG Review, vol. 11, No. 9, p. 37, Mar. 11, 1991.
Anon., "Primavera Systems; Primavera, PurchasePro.Com Create E-Commerce Marketplace for Construction Industry," M2 Presswire, Sep. 22, 1999.
Rawdon, S., "Online Bidding Options May Be Web's Best Secret," Business First-Columbus, vol. 18, No. 33, p. B11, Apr. 5, 2002.
"nextSource Announces Launch of its Multiple Listing Staffing Association. "Business Wire, p. 2196, Apr. 16, 2002.
Definition of prose from Dictionary.com, retrieved from [http://dictionary.reference.com/browse/prose] on Aug. 7, 2008.
Herman, Susan J., Hiring Right: A Practical Guide. SAGE. 1994. pp. 23-25.
Cullen, A., Suppliers of Technical Nonpayroll Workers, (2 pages), Dec. 31, 1997.
Cullen, A., Skills Questionnaire, (5 pages), May 21, 1998.
Cullen, A., Skills Environment, (1 page), Jul. 2, 1998.
Cullen, A., Jobs Listing, (31 pages), Feb. 24, 1999.
Brief, V., Overview of Volt's HRP Application, (3 pages), Feb. 1999.
Bajari et al. (Bajari), "Incentives versus transaction cost: a theory of procurement contracts", RAND Journal of Economics, vol. 32, No. 3, Autumn 2001, pp. 387-407.
Copenheaver, Blaine R., "International Search Report" for PCT/US2010/045349 as mailed Oct. 6, 2010 (4 pages).
Young, Lee W., "International Search Report" for PCT/US10/47176 as mailed Oct. 14, 2010, 3 pages.
Web Archive of "nextSource" web page, "People Blue Book™, Introducing the nextSource People Blue Book" retrieved from [URL: http://web.archive.org/web/20020206061453/http://nextsource.com/services/people_blue...], archived on Feb. 6, 2002, 1 page.
U.S. Bureau of Labor Statistics, "2000 Standard Occupational Classification (SOC) User Guide", retrieved from [URL: http://data.bls.gov/cgi-bin/print.pl/soc/socguide.htm] on Dec. 27, 2011, 5 pages.

* cited by examiner

RFP/RFQ CREATION

BID REQUEST ID : XYZ BID   BID TRACKING # : 10001

ORIGINATOR : John Doe   BID TEMPLATE # : PROJECT X

| SECTION NAME | # BID ITEMS IN SECTION TO COMPLETE | # BID ITEMS COMPLETED | # BID ITEMS DISABLED |
|---|---|---|---|
| Introduction | 2 | 0 | 0 |
| Project Overview | 16 | 0 | 0 |
| General Information | 14 | 0 | 0 |
| Information Requests | 42 | 0 | 0 |
| Additional Notes | 2 | 0 | 0 |

BACK   View Bid In On-Line Format   Submit Completed Bid Request

SAP Functional Lead Developer Details

Profile Details:

Business Sector: Technical
Business Arena: Enterprise Resource Applications
Business Family: SAP
General Functions: Functional Lead, SAP Functional Configuration

Skill Set:

| | |
|---|---|
| Education Level: | Post Graduate Work |
| Enterprise Software Module: | Production Planning<br>Sales Distribution |
| Functional Development Specialties: | As is to be Modeling<br>Configuration<br>GAP Analysis<br>Process Design<br>Work Flow |
| Industry Background: | Manufacturing<br>Retail<br>Transportation |
| Required Industry Experience: | Greater than 10 years |

BID ID: XYZ BID

BID TRACKING #: 10001

BID RESPONSE GRADING CRITERIA

| Select | Bid Item Selections — 235 | Weighting Percentage (%) — 850<br>Enter Whole Number |
|---|---|---|
| • | Proposal_Narrative — 236 | 10% |
| ☐ | Project_Planning/Strategy | |
| ☐ | Project_Phasing | |
| • | Resource_Model | 15% |
| ☐ | Knowledge_Transfer_Plan | |
| ☐ | Deployment_Plan | |
| ☐ | Customer_Acceptance_Model | |
| ☐ | Anticpated_Margin | |
| • | Resource_Labor_Pricing_Amount | 25% |
| • | Material_Cost | 20% |
| ☐ | Equipment/Tooling_Pricing_Amount | |
| ☐ | Physical_Site_Pricing_Amount | |
| ☐ | Project_Management_Premium_Amount | |
| ☐ | Intelectual_Property_Premium_Amount | |
| • | Miscellaneous_Project_Expenses_Amount | 5% |
| • | Total_Bid_Price | 25% |

Total: 100%

0%
1%
:
100%

Accept Selections

Bid Summary

| | |
|---|---|
| Bid Tracking: | 10001 |
| Bid Template: | PROJECT X |
| Bid ID: | XYZ BID |
| Accepted Bid Vendor: | VENDOR A |

Requisition Summary

| Req Create Date | Requisition Amount | Project Start Date |
|---|---|---|
| Requisition Status | Requisition Currency | Project End Date |

Project Terms & Conditions

| Statement of Work(SOW) | Contract | Project Phasing Schedule |
|---|---|---|
| Project Goods Deliverables | Project Materials | Phased Resources Billable Rates and Expenses |
| Project Service Unit Completion Deliverables | Project Resources | |
| | Project Expenses (Miscellaneous) | |

User Role Management
Search for authorized users by linking on the Position Role Name

| | | |
|---|---|---|
| Financial_Approvers | MA_Financial_Approval_Level | NULL |
| Non-Financial_Approvers | Non-Financial_Approver_1 | NULL |

Project Finance/Accounting

| Account Assignments | Cost Centers/Department Codes | Tax Codes |
|---|---|---|
| Ledger Codes | Project Codes/IDs | Accounting Plants |

| Temporarily Save | Submit for Processing | Route for Approval | Back |
|---|---|---|---|

PR Summary

- Bid Tracking: [                    ]
- Vendor Project #: [10001]
- Project Version #: [ZA240]
- Version Effect Date: [1]
  [dd/mm/yyyy]

- Project Status: [Not Yet Begun]
- Project Start Date: [dd/mm/yyyy]
- Project End Date: [dd/mm/yyyy]
- Max Expenditure: [$50,000]

} 870

Project Terms & Conditions

- Statement of Work (SOW)
- Contract
- Project Phasing Schedule
- Project Goods Deliverables
- Project Materials
- Phase Payment Release Schedule
- Project Service Unit Completion Deliverables
- Project Resources
- Phased Resources Billable Rates and Expenses
- Project Expenses (Miscellaneous)

[Back]

PO Requisition Summary

PO Req ID:
PO Req Status:
PO Effective Start Date:
PO Effective End Date:
PO Change Version:
PO $ Spend Limit:

| PO Line # | Activity Type | Billable | Applicable Contractor Name | Description | PO Quantity | Unit Price $ | Extended Price $ | Extended Taxes $ | Total Price $ | Approved Voucher Quantity | Approved Voucher Amount $ | Open Amount $ |
|---|---|---|---|---|---|---|---|---|---|---|---|---|
| 1 | Materials | Yes | N/A | Router | 2 | 14,000.00 | 28,000.00 | 1,680.00 | 29,680.00 | N/A | 0.00 | 29,680.00 |
| 2 | Materials | Yes | N/A | Switch | 1 | 26,000.00 | 26,000.00 | 1,560.00 | 27,560.00 | N/A | 0.00 | 27,560.00 |
| 3 | Materials | Yes | N/A | Hub | 4 | 37,000.00 | 148,000.00 | 8,880.00 | 156,880.00 | N/A | 0.00 | 156,880.00 |
| 4 | Materials | Yes | N/A | CC-48 Cable | 3000 | 6.75 | 20,250.00 | 1,215.00 | 21,465.00 | N/A | 0.00 | 21,465.00 |
| 5 | Deliverables | No | N/A | Description | N/A | N/A | 0.00 | 0.00 | 0.00 | N/A | 0.00 | 0.00 |
| 6 | Deliverables | No | N/A | Description | N/A | N/A | 0.00 | 0.00 | 0.00 | N/A | 0.00 | 0.00 |
| 9 | Deliverables | Yes | N/A | Description | N/A | N/A | 100,000.00 | 0.00 | 100,000.00 | N/A | 0.00 | 100,000.00 |
| 10 | Contractor Labor | | Pete, Rose | Straight Time... | N/A | 110.00 | 55,000.00 | 3,300.00 | 58,300.00 | N/A | 0.00 | 58,300.00 |
| 11 | Contractor Labor | N/A | Lenny2, Dykstra | Straight Time... | N/A | 45.00 | 31,500.00 | 1,890.00 | 33,390.00 | N/A | 0.00 | 33,390.00 |
| | | | | Grand Total | | | 408,750.00 | 18,525.00 | 427,275.00 | | 0.00 | 427,275.00 |

Route For Internal PO Approve.  
Back To Requisition Main Page

FIG. 40B

Time Card

TIMEKEEPER ID: 2979

Week Ending Work Date: dd/mm/yyyy

Project Code: XYZ

Cost Center/Dept Code: Tax Dept — 1150

1100

| | Monday | Tuesday | Wednesday | Thursday | Friday | Saturday | Sunday |
|---|---|---|---|---|---|---|---|
| Labor Rate Type | | | | | | | |
| Straight Time | 8 | 8 | 8 | 8 | 8 | 0 | 0 |
| Over Time @ Time and a half | 2 | 2 | | | | | |
| Over Time @ Double Pay | | 2 | | | | | |

Save Entry without Submitting for Processing

Submit for Processing/Review

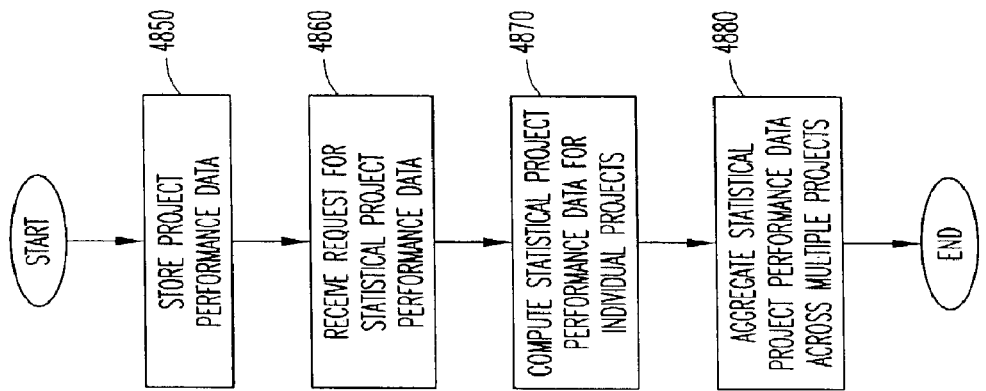
FIG. 63
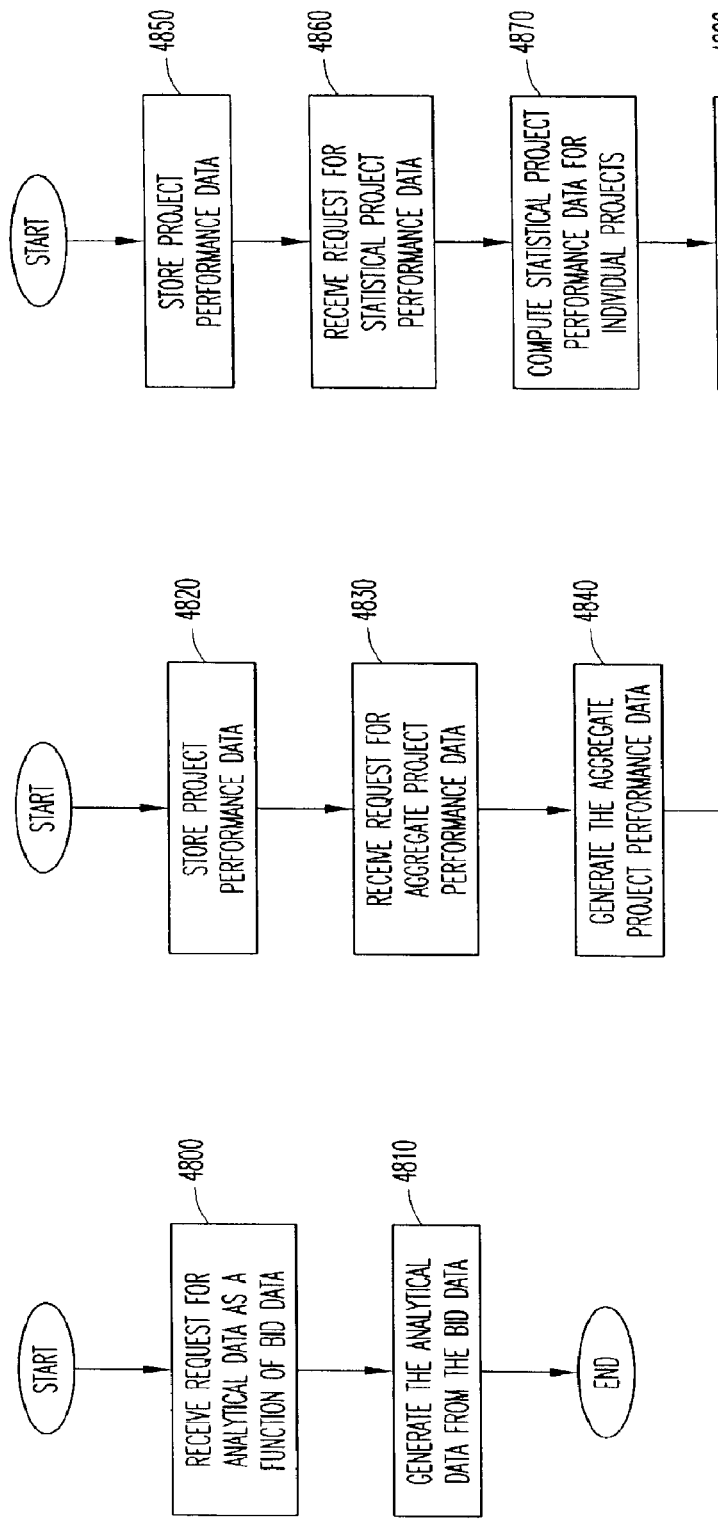
FIG. 62
FIG. 61

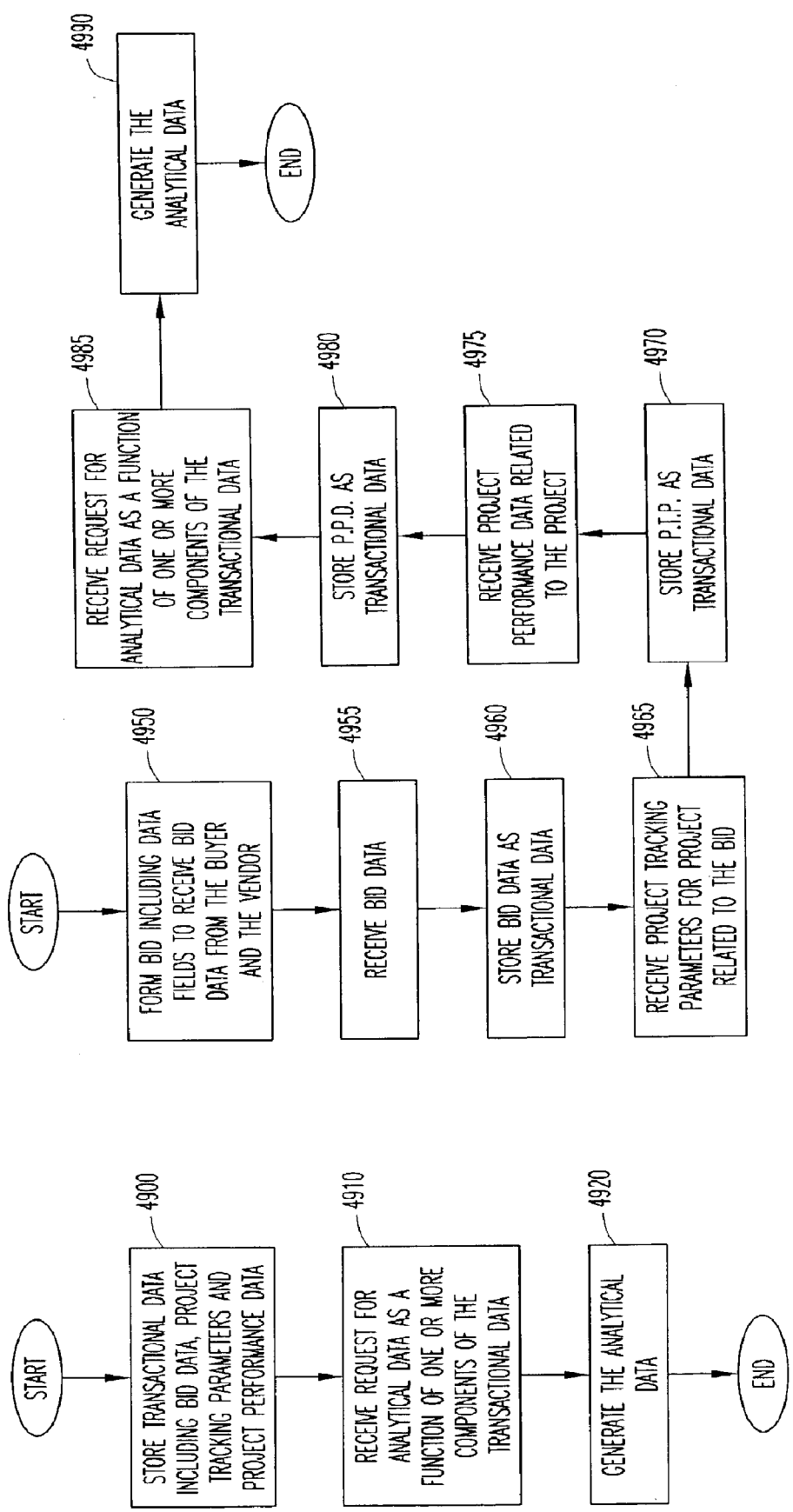

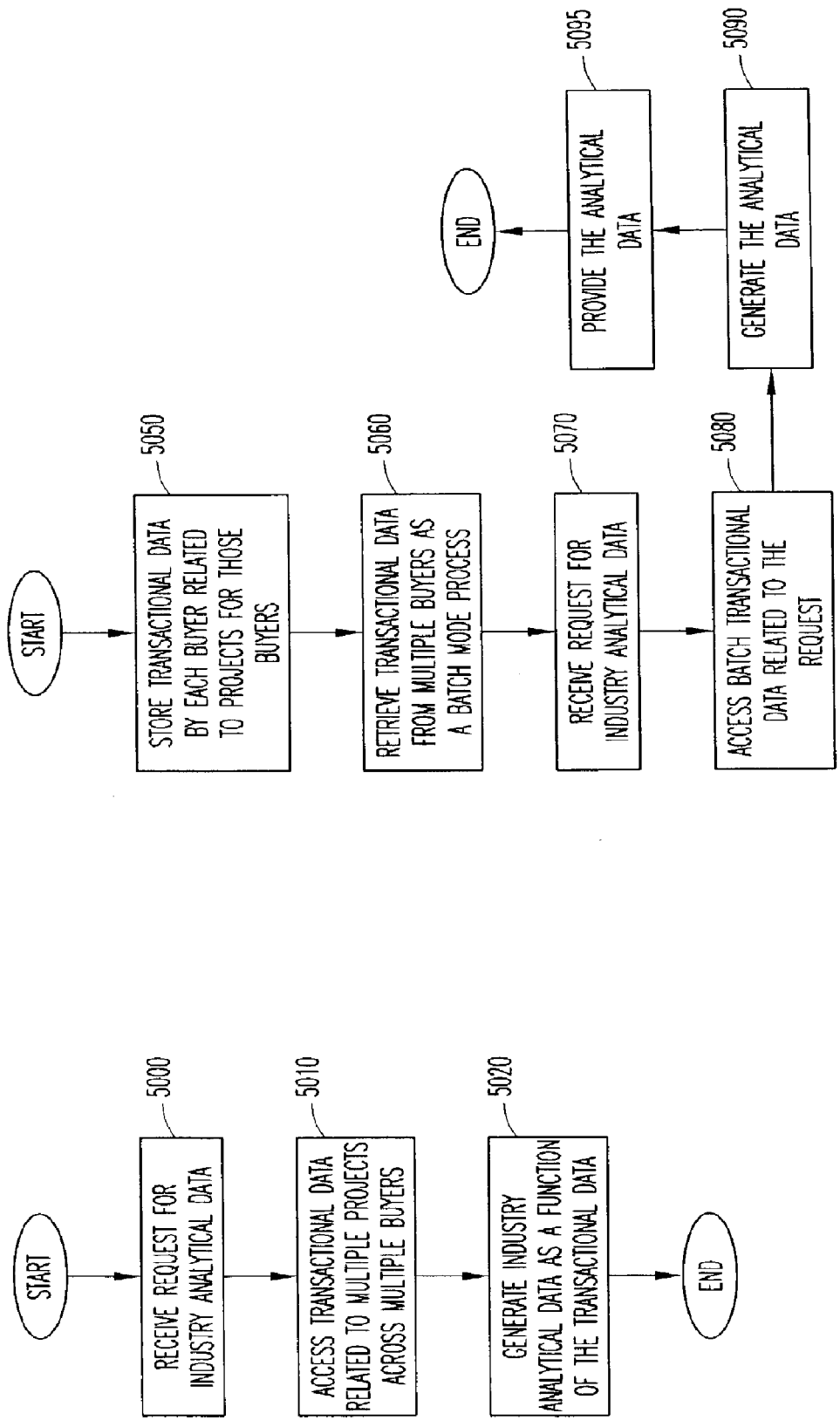

FIG. 73

Project Costing Summary Report

| Project Ownership Type | Project Count | % of Total Project Count | Count of Phases Due For Completion | Count of Phases Completed In Scope | Phase Completion % Rate | Count of Deliverables Due For Completion | Count of Deliverable Completed In Scope | Deliverable Completion % Rate | Phase Success Rank | Deliverable Success Rank |
|---|---|---|---|---|---|---|---|---|---|---|
| Buyer Owned | | | | | | | | | | |
| Vendor Owned | | | | | | | | | | |
| Joint Ownership - Buyer PM | | | | | | | | | | |
| Joint Ownership - Vendor PM | | | | | | | | | | |
| 3rd Party Consultant PM | | | | | | | | | | |
| All PW Configurations | | | | | | | | | | |

COMPUTER SYSTEM AND METHOD FOR PRODUCING ANALYTICAL DATA RELATED TO THE PROJECT BID AND REQUISITION PROCESS

CROSS-REFERENCE TO RELATED APPLICATIONS

This patent application is a continuation of U.S. patent application Ser. No. 10/412,096, filed on Apr. 10, 2003 now U.S. Pat. No. 7,925,568. U.S. patent application Ser. No. 10/412,096 is a Continuation-in-Part of U.S. patent application Ser. No. 10/262,487, filed on Sep. 30, 2002, which claims priority from U.S. Provisional Application No. 60/371,488, filed on Apr. 10, 2002. U.S. patent application Ser. No. 10/412,096 claims priority from U.S. Provisional Application No. 60/371,488. U.S. Provisional Application No. 60/371,488, U.S. patent application Ser. No. 10/262,487, and U.S. patent application Ser. No. 10/412,096 are hereby incorporated by reference in their entirety herein.

BACKGROUND OF THE INVENTION

1. Technical Field of the Invention

The present invention relates to a computer system and method for electronically facilitating all aspects of projects, including the project bid process, requisition process, spend process and performance management process, and specifically to electronically managing and analyzing all aspects of the projects.

2. Description of Related Art

Corporations, businesses and other types of enterprises regularly utilize third party providers (vendors) to handle various business functions, such as providing a good or service. Typically, these outsourced business functions are performed under a "project," "staff supplementation" or "consulting" (hereinafter collectively referred to as "project work") agreement between the buyer and the vendor. The various tasks involved in project work, such as vendor engagement, project administration, resource management and project accounting, can be extremely complex, entailing the convergence of numerous buyer organizational departments, such as purchasing, finance, operations, legal, human resources, security and the project management organization.

Due to the complexity of project work, it has become standard in today's business environment to employ multiple systems and processes to facilitate the management of project work. For example, typically, separate systems and processes are used for one or more aspects of project work, such as vendor qualification, bid solicitation, bid response, bid evaluation, contract administration, milestone/deliverable administration, payment vouchering and quality control. Currently, there exists on-line "bid" and "auction" systems for handling the bid solicitation and bid response processes, project management tracking systems for providing the milestone/deliverable administration process and financial processing systems for administering the payment vouchering process. However, there does not exist a single system for managing all aspects of project work.

SUMMARY OF THE INVENTION

To overcome the deficiencies of the prior art, embodiments of the present invention provide a comprehensive, web-enabled computer system and method for facilitating and managing all aspects of project work in a project bid management system. In embodiments of the present invention, the computer system and method is capable of producing analytical data related the project bid management system. Transactional data related to the bid and project are entered into the computer system through an on-line bid and project requisition process. Using the transactional data stored within the system, virtually any type of analytical data related to single or multiple projects performed by one or more vendors for one or more buyers can be generated.

In one embodiment, the analytical data can include aggregate transactional data associated with multiple projects, multiple vendors and/or multiple buyers. In other embodiments, the analytical data can include statistical data computed as a function of the transactional data. If the analytical data is generated from transactional data related to multiple buyers, the transactional data is stored in a central database that is configured to receive at least a portion of individual transactional data stored within database systems of buyers, vendors or administrators.

In exemplary embodiments, the transactional data includes at least bid data that is entered into data fields of a bid during the on-line bid process. The transactional data can further include project tracking parameters identifying one or more contractual terms of a project associated with the bid and project performance data related to the performance of the project by the vendor. The project tracking parameters can further include taxation information identifying taxable components of the project and taxation amounts associated with each of the taxable components. In other embodiments, the transactional data can further include voucher information entered into data fields associated with the bid and the project by the buyer and the vendor during the performance of the project.

In further exemplary embodiments, the analytical data can be generated from the transactional data based on the type of request and information included as part of the request. For example, the request can include one or more filters related to vendor profile properties, buyer profile properties, project profile properties and/or commodity profile properties. The transactional data can be filtered using the included filters, and the filtered transactional data can be used to generate the analytical data. The analytical data can be presented to an authorized user in a project reporting view on a web page.

BRIEF DESCRIPTION OF THE DRAWINGS

The disclosed invention will be described with reference to the accompanying drawings, which show important sample embodiments of the invention and which are incorporated in the specification hereof by reference, wherein:

FIGS. 21-22 are screen shots illustrating various types of bid items associated with the particular bid template that can be selected from to include in a bid of the bid template type;

FIG. 24 is a screen shot illustrating the selection of qualified vendors to receive the bid request;

FIGS. 26-28 are screen shots illustrating the vendor bid response process;

FIGS. 34A-34E are screen shots illustrating a sample bid response grading process;

FIG. 39A is a screen shot illustrating exemplary buyer project administration features;

FIG. 39B is a screen shot illustrating exemplary vendor project administration features;

FIG. 40A is a screen shot illustrating an interface for entering exemplary project taxation information;

FIG. 40B is a screen shot illustrating exemplary requisition information including entered project taxation information;

FIGS. 44-46 are screen shots illustrating a sample time keeping process;

FIG. 51 is a screen shot illustrating project financial data;

FIGS. 61-67 are flow charts illustrating exemplary steps for analyzing the transactional data and providing analytical data, in accordance with embodiments of the present invention;

FIGS. 71-88 are screen shots illustrating exemplary project reporting views, each containing analytical data.

DETAILED DESCRIPTION OF EXEMPLARY EMBODIMENTS

The numerous innovative teachings of the present application will be described with particular reference to exemplary embodiments. However, it should be understood that these embodiments provide only a few examples of the many advantageous uses of the innovative teachings herein. In general, statements made in the specification of the present application do not necessarily delimit any of the various claimed inventions. Moreover, some statements may apply to some inventive features, but not to others.

In accordance with embodiments of the present invention, a vendor is any provider of goods and/or services, a buyer is any purchaser of goods and/or services, a contractor is a resource employed by a vendor for project work and an administrator is a third-party system administrator or buyer-employed project administrator. Buyers can solicit bids from vendors for a particular good and/or service (hereinafter referred to as a project) in a form specified by the buyer using a bid request generated from a pre-established list of bid items related to the project type. Therefore, the bid responses submitted from vendors all have the same form, enabling efficient and effective evaluation of the bid responses. Embodiments of the present invention further combine the bid process with project management to enable the buyer, vendor, contractor and administrator to track the performance of the project after the bid is awarded.

Figure 1:
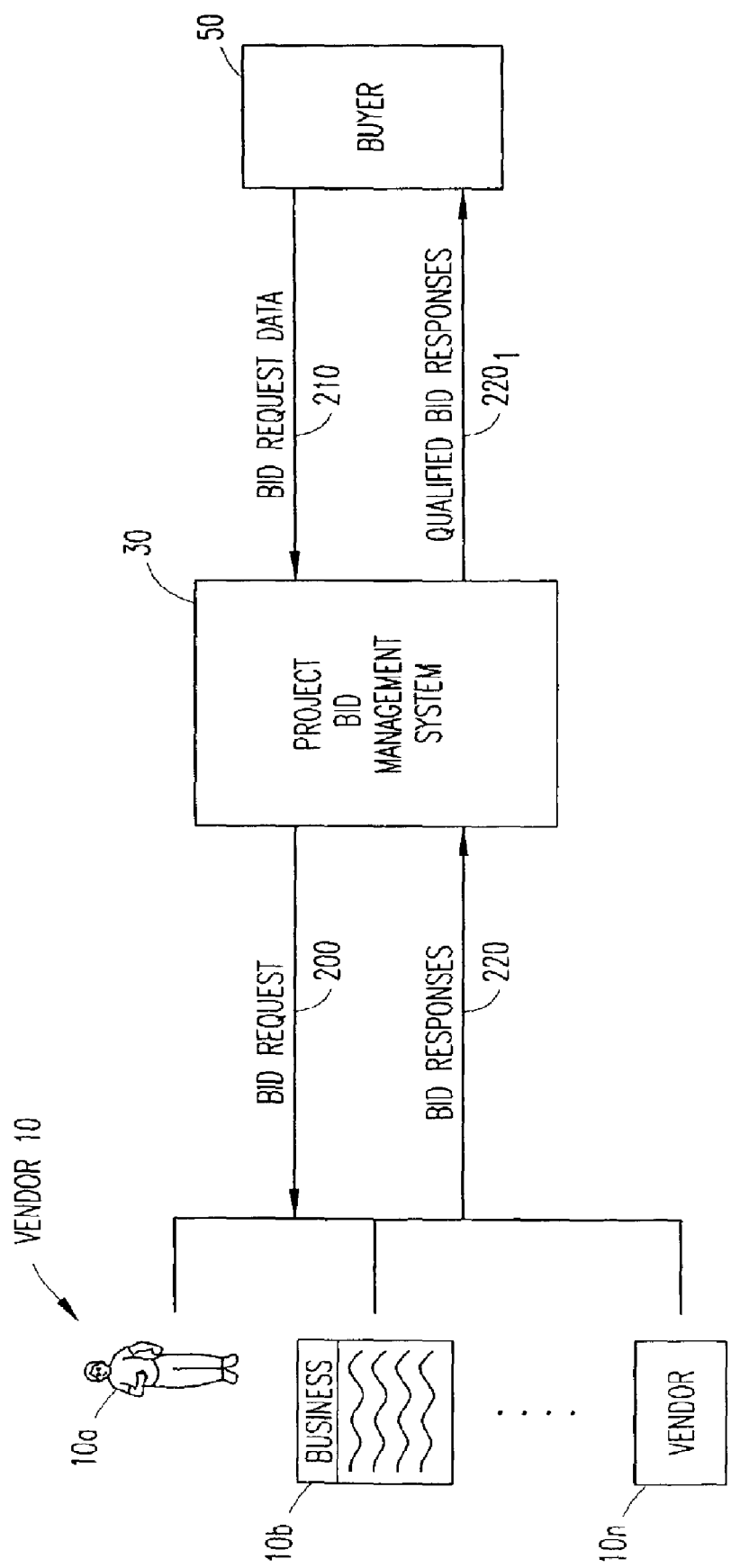
FIG. 1 is a high-level functional view of the project work bid process involved in the present invention.

FIG. 1 is a high-level functional view of the bid process involved in the present invention. Bid request data 210 associated with a particular bid request 200 is provided from a buyer 50 to a project bid management system 30. The buyer 50 can be an individual, business entity or any other type of buyer 50 that requires performance of a project. The bid request data 210 received at the project bid management system 30 is in a form pre-designated by the buyer 50. For example, the form can include one or more bid items selected from a configurable pre-established list of bid items for the particular project type, and the bid request data 210 can be related to one or more of these selected bid items.

The bid request data 210 is formatted by the project bid management system 30 and transmitted as a bid request 200 to one or more vendors 10a . . . 10n for solicitation of respective bid responses 220. For example, the vendor 10 can be an individual 10a, business entity 10b or any other vendor 10n that is capable of performing the requested project. Bid responses 220 are submitted from the vendors 10 to the project bid management system 30 for review prior to forwarding qualified bid responses $220_1$ to the buyer 50. For example, the project bid management system 30 may be pre-configured to force vendor completion of required bid response items in a specific data format to enable the system 30 to perform some filtering of vendor bid responses 220. In this way, the system 30 can ensure that the buyer 50 only receives the bid responses 220 that have the necessary data for bid evaluation.

Figure 2A:
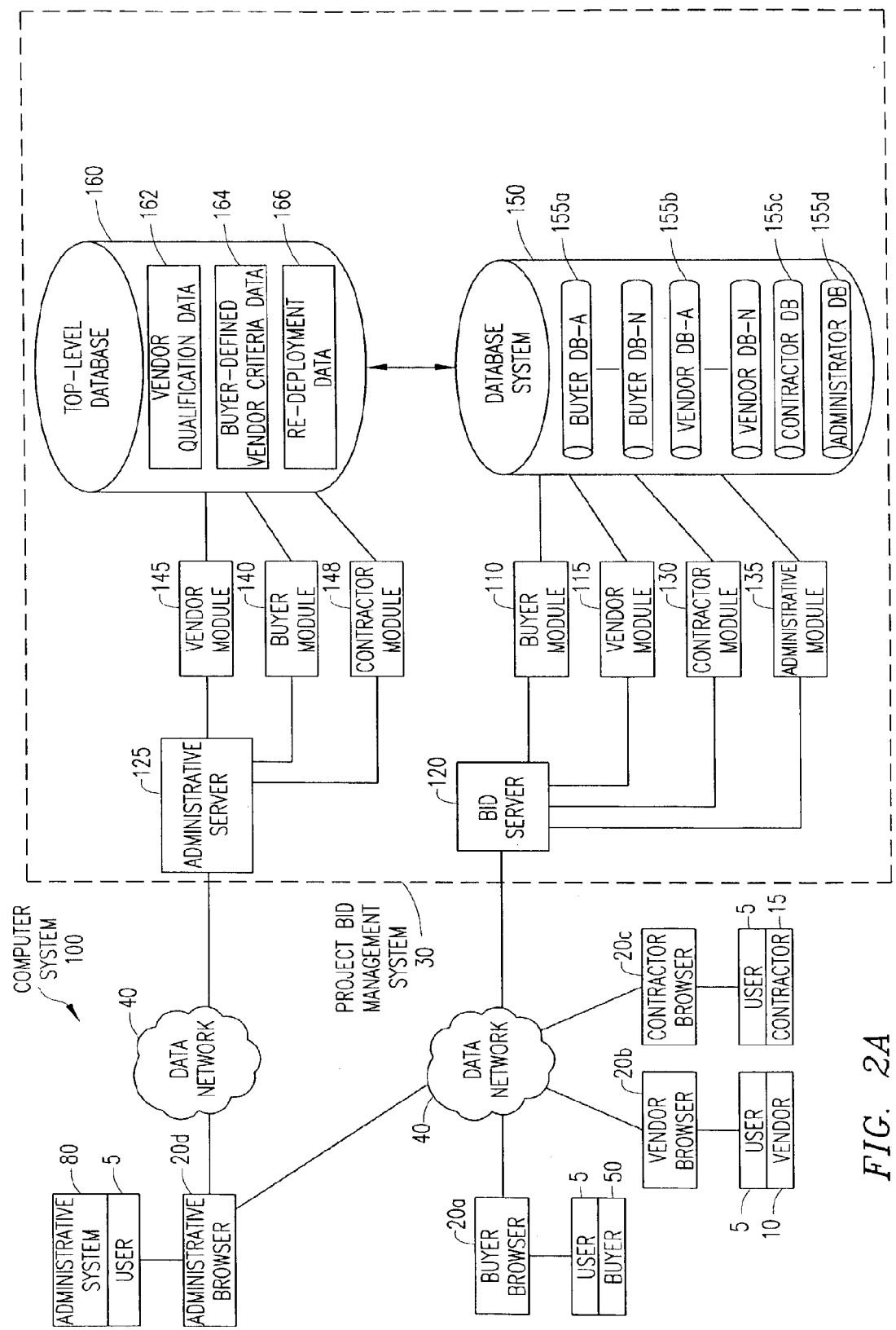
FIG. 2A is a network diagram of the computer system of the present invention.

In accordance with embodiments of the present invention, the project bid management system 30 can be implemented within a computer system 100, as is shown in FIG. 2A. A user 5 enters the computer system 100 through a data network 40 via a web browser 20. A user 5 includes any person associated with a vendor 10, buyer 50, administrator 80 (e.g., a third-party or buyer-employed administrator) or contractor 15 assigned to a project. By way of example, but not limitation, the data network 40 can be the Internet or an Intranet and the web browser 20 can be any available web browser or any type of Internet Service Provider (ISP) connection that provides access to the data network 40. Vendor users 5 access the computer system through a vendor browser 20b, buyer users 5 access the computer system via a buyer browser 20a, contractor users 5 access the computer system via a contractor browser 20c and administrative users 5 access the computer system through an administrative browser 20d. The users 5 access the computer system 100 through a web server 120 or 125 capable of pushing web pages to the vendor browser 20a, buyer browser 20b, contractor browser 20c and administrative browser 20d, respectively.

A bid web server 120 enables vendors 10, buyers 50, contractors 15 and administrators 80 to interface to a database system 150 maintaining data related to the vendors 10, buyers 50, contractors 15 and administrators 80. The data related to each of the vendors 10, buyers 50, contractors 15 and administrators 80 can be stored in a single database 155, in multiple shared databases 155 or in separate databases 155 within the database server 150 for security and convenience purposes, the latter being illustrated. For example, the database system 150 can be distributed throughout one or more locations, depending on the location and preference of the buyers 50, vendors 10, administrators 80 and contractors 15.

The user interface to the vendor users 5 is provided by the bid web server 120 through a vendor module 115. For example, the vendor module 115 can populate web pages pushed to the vendor browser 20b using the data stored in the particular vendor database 155b. The user interface to the buyer users 5 is provided by the bid web server 120 through a buyer module 110. For example, the buyer module 110 can populate web pages pushed to the buyer browser 20a using the data stored in the particular buyer database 155a. The user interface to the contractor users 5 is provided by the web server 120 through a contractor module 130. For example, the contractor module 130 can populate web pages pushed to the contractor browser 20c using the data stored in the contractor database 155c. The user interface to the administrative users 5 is provided by the bid web server 120 through an administrative module 135. For example, the administrative module 135 can populate web pages pushed to the administrative browser 20d using the data stored in the administrator database 155d. It should be noted that the vendor module 115, buyer module 110, contractor module 130 and administrative module 135 can each include any hardware, software and/or firmware required to perform the functions of the vendor module 115, buyer module 110, contractor module 130 and administrative module 135, and can be implemented as part of the bid web server 120, or within an additional server (not shown).

The computer system 100 further provides an additional user interface to administrative users 5 through an administrative web server 125. The administrative web server 125 enables administrators 80 to interface to a top-level database 160 maintaining data related to the vendors 10, buyers 50 and contractors 15 registered with the computer system 100. For example, the top-level database 160 can maintain vendor qualification data 162, buyer-defined vendor criteria data 164 and contractor re-deployment data 166.

To access information related to vendors 10, the administrative web server 125 uses a vendor module 145 to push web pages to the administrative browser 20d related to vendors 10. For example, the vendor module 145 can access vendor qualification information 162 to qualify vendors 10 for a particular buyer 50 or for a particular industry. Likewise, the administrative web server 125 can push web pages to the administrative browser 20d related to the buyer-defined vendor criteria information 164 through a buyer module 140 in order to qualify vendors 10 for a particular buyer 50. A contractor module 148 enables administrators 80 to access contractor re-deployment data 166 entered by contractors 15 through the bid server 120 and retrieved into the top-level database 160 from a contractor database 155. The re-deployment data 166 can include, for example; an indication of the mobility of the contractor, desired geographical areas, contractor skills, desired pay and other contractor information that can be used to assist administrators 80 in qualifying vendors 10 for buyers 50.

Figure 2B:
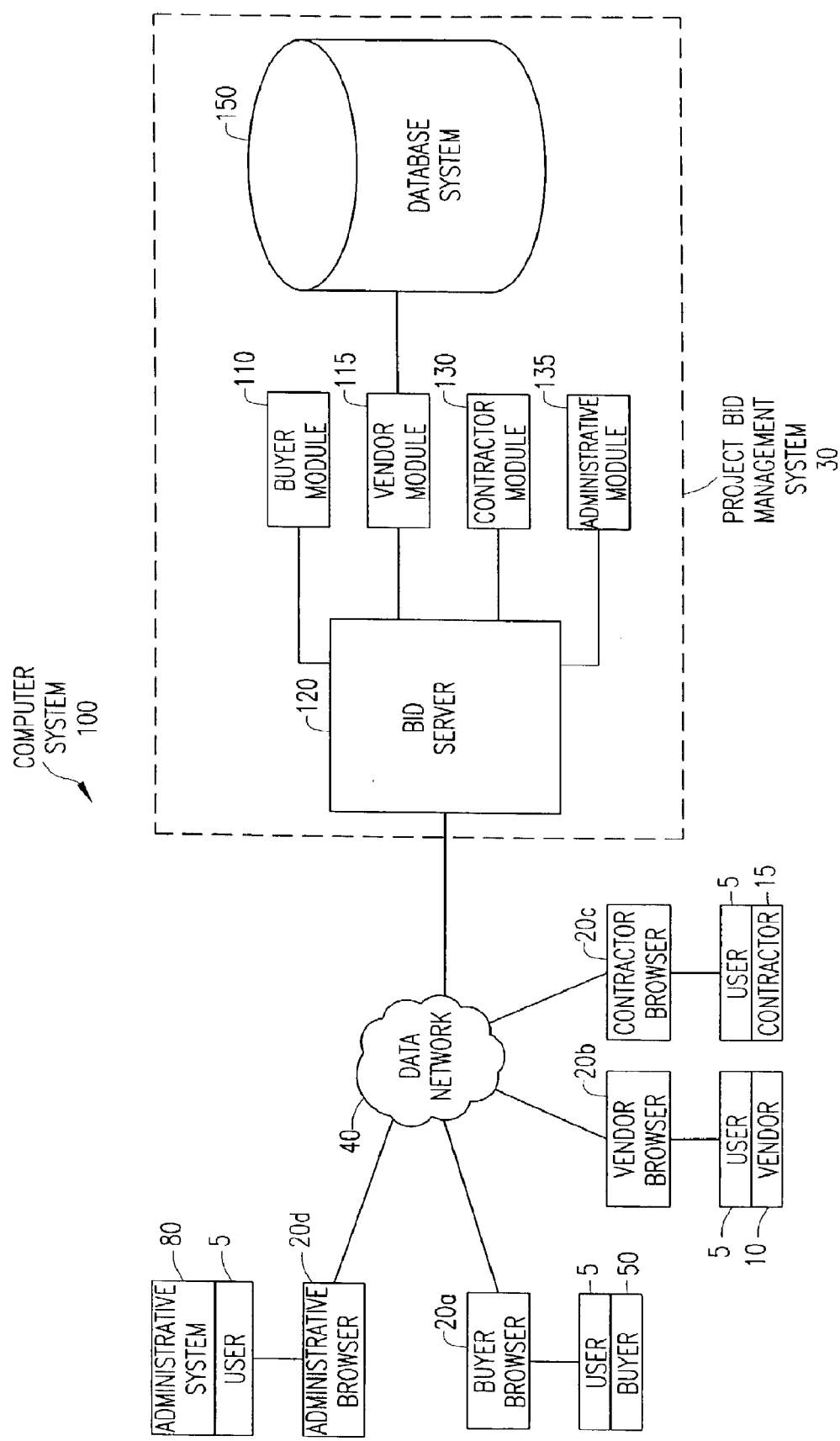
FIG. 2B is an alternate network diagram of the computer system of the present invention implemented at the buyer network.

In another embodiment, as shown in FIG. 2B, the computer system 100 can be implemented solely at the buyer network. In FIG. 2B, vendor users 5 enter the computer system 100 via a data network 40 through a vendor browser 20b, as in FIG. 2A. However, the web server 120 in FIG. 2B is a buyer web server controlled and operated by a single buyer. The database system 150 stores only the buyer data related to that particular buyer and only the vendor, contractor and administrator data pertinent to that particular buyer. For example, the vendor qualification data for only those vendors that are qualified by the buyer is stored in the database system 150.

Figure 3A:
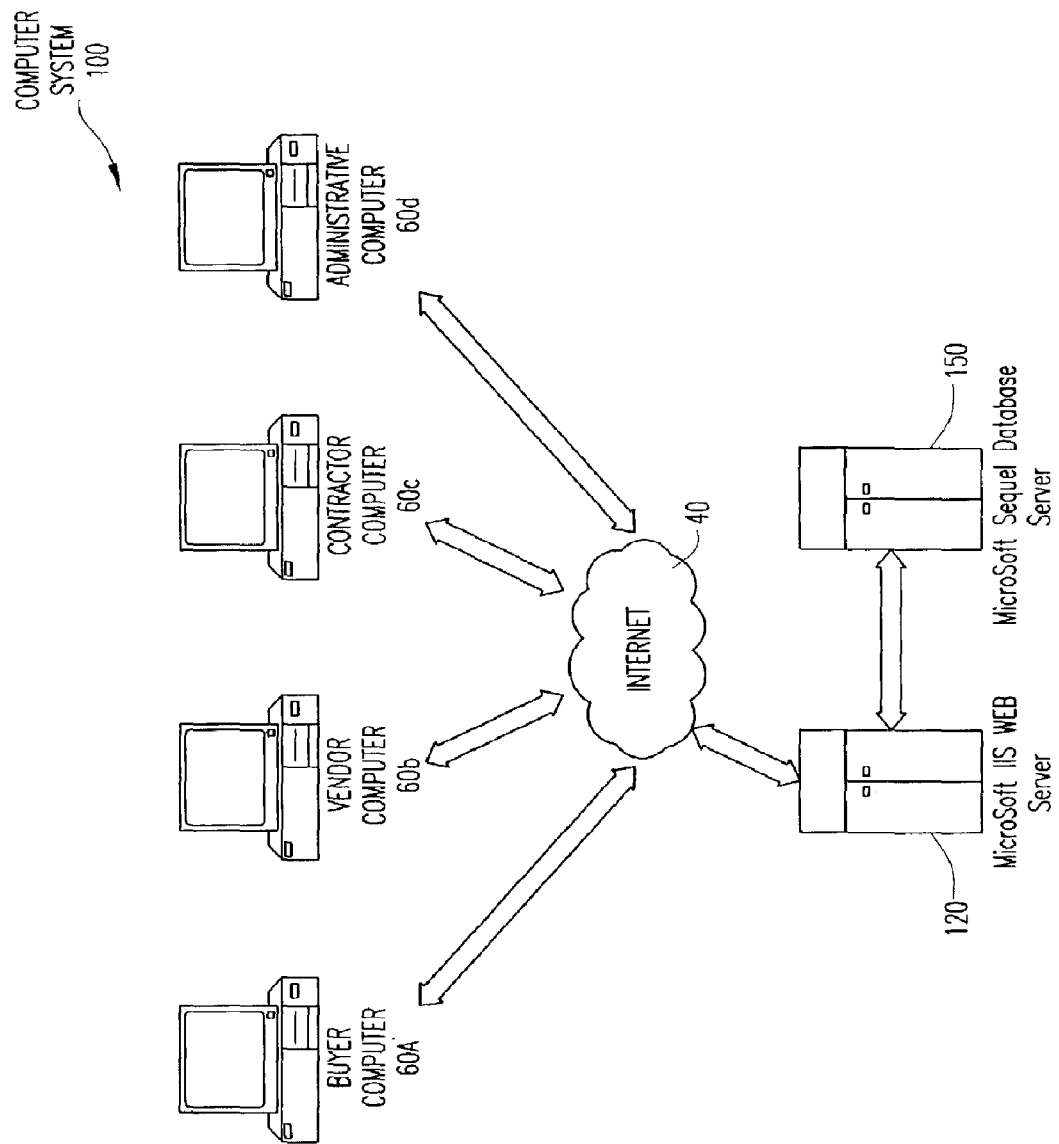
FIGS. 3A and 3B illustrate the physical network architecture of the computer system of the present invention.

Referring now to FIG. 3A, exemplary physical network equipment for implementing the computer system 100 is shown. A vendor user, a buyer user, contractor user or an administrative user accesses the web server 120 of the computer system 100 by connecting a computer 60a, 60b, 60c or 60d, respectively, to a data network 40. Each computer 60a-60d can be, for example, a personal computer, a laptop computer, a computer connected to a wireless device for remote access to the data network, a handheld wireless device providing a web browser capable of accessing the data network or other type of machine implementing a web browser. The web server 120 can be, for example, a Microsoft Internet Information Services (IIS) server. The web server 120 connects to an appropriate database system 150, depending on the type of user. The database system 150 can be implemented in, for example, one or more SQL servers.

Figure 3B:
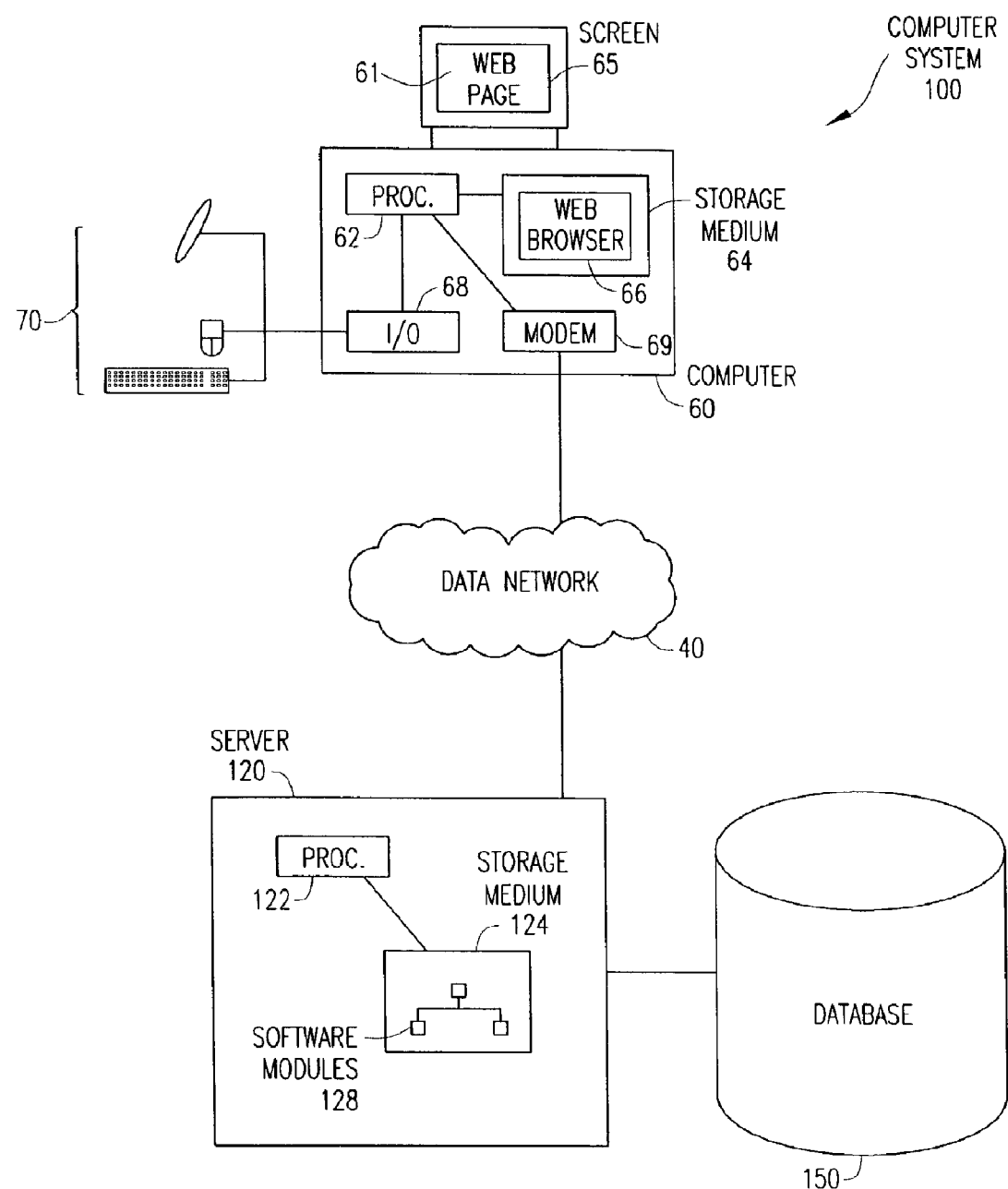

Turning now to FIG. 3B, exemplary functionality implemented in the physical network equipment of the computer system 100 is shown. A user computer 60 can access the data network 40 using a web browser 66 resident within a storage medium 64 of the computer. For example, the storage medium can be a disk drive, random access memory (RAM), read-only memory (ROM), compact disk, floppy disk, tape drive or any other type of storage medium. A processor 62 (e.g., a microprocessor or microcontroller) within the computer 60 loads and runs the web browser 66 to access the data network 40.

Upon entering the Uniform Resource Locator (URL) of the web server 120 into a computer, a connection between the computer 60 and the web server 120 is created. The web server 120 pushes web pages 61 to the computer 60 for viewing by the user on a user interface device 65. In one embodiment, the user interface device 65 is a computer screen 15 connected to the computer 60. For example, once a user has been validated (e.g., by entering a user name and password), the user can view one or more web pages 61 on the computer screen 65, each containing prompts for the user to enter various information into the computer system 100. The user can enter the information into the computer 60 for transmission via the data network 40 to the web server 120 via an I/O interface 68 and any type of input device 70, such as, for example, a mouse, keyboard, light pen, touch screen (not shown) or voice recognition software (not shown).

At the web server 120, a processor (e.g., a microprocessor or microcontroller) loads and executes computer instructions resident in software modules 128 stored within a storage medium 124, which can be any type of storage medium, as discussed above in connection with storage medium 64. The computer instructions can be created using any type of programming technique, including object-oriented programming techniques. For example, the software modules 128 may contain the computer instructions for the vendor modules, buyer modules, contractor modules and administrative modules (shown in FIGS. 2A and 2B) for populating web pages 61 for vendor users, buyer users, contractor users and administrative users, respectively. Based on the computer user log-in to the web server 120, the processor 122 accesses the appropriate software module 128 to determine the database system 150 associated with the computer user and retrieves the data related to the computer user for population in web pages 61 for display on the computer screen 65 of the computer 60. In addition, the software modules 128 may further be configured to store data received from the computer user within the database system 150.

Figure 4A:
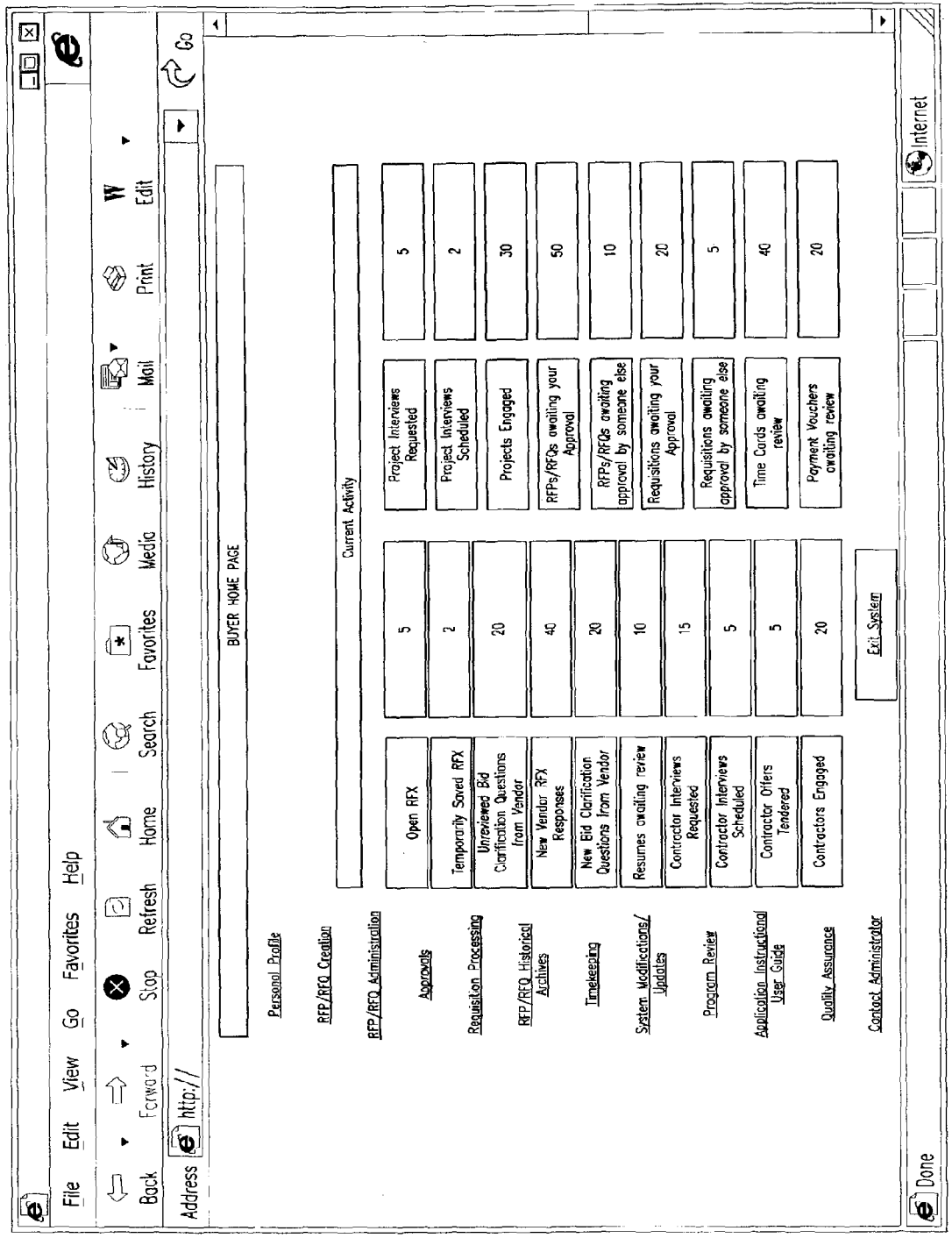
FIGS. 4A-4D are exemplary home web pages associated with each of the user modules shown in FIGS. 2A and 2B.

Examples of web pages 61 displayed to buyer users, vendor users, contractor users and administrative users are shown in FIGS. 4A-4D, respectively. FIG. 4A illustrates a sample buyer home page 61a displayed to a buyer user upon log-in and authentication (e.g., a challenge and response authentication) of the buyer user. As can be seen in FIG. 4A, there are a number of system features available to the buyer user at the buyer home page 61a. For example, the buyer user can be provided links to update their personal profile in the system, create an RFP/RFQ (referred to herein as a bid request), administer current bid requests, approve a vendor bid response to award the bid (project) to a particular vendor, process a current project, view historical bid requests or access a voucher processing system to view various project related event tracking requests, such as contractor time cards. The buyer user can further remain updated as to system modifications, receive instructions on how to maneuver through the system and contact a system administrator (e.g., a third-party administrator or buyer-employed administrator) for assistance through the buyer home page 61*a*.

In FIG. 4A, the buyer user is further provided with the current status of pending bids and projects at the home page 61*a*. However, it should be understood that the current activities can be displayed in subsequent web pages, instead of at the home page 61*a*. For example, the buyer user can be provided with the number of open bid requests (submitted bid requests) and the number of temporarily saved bid requests (created but not yet submitted bid requests). By clicking on the open bid request button, the buyer user can be linked to another web page displaying a list of the open bid requests with subsequent links to web pages that contain the actual open bid requests. Therefore, from the buyer home page 61*a*, the buyer user can link to any information pertaining to bids or projects that the buyer user has access to.

Figure 4B:
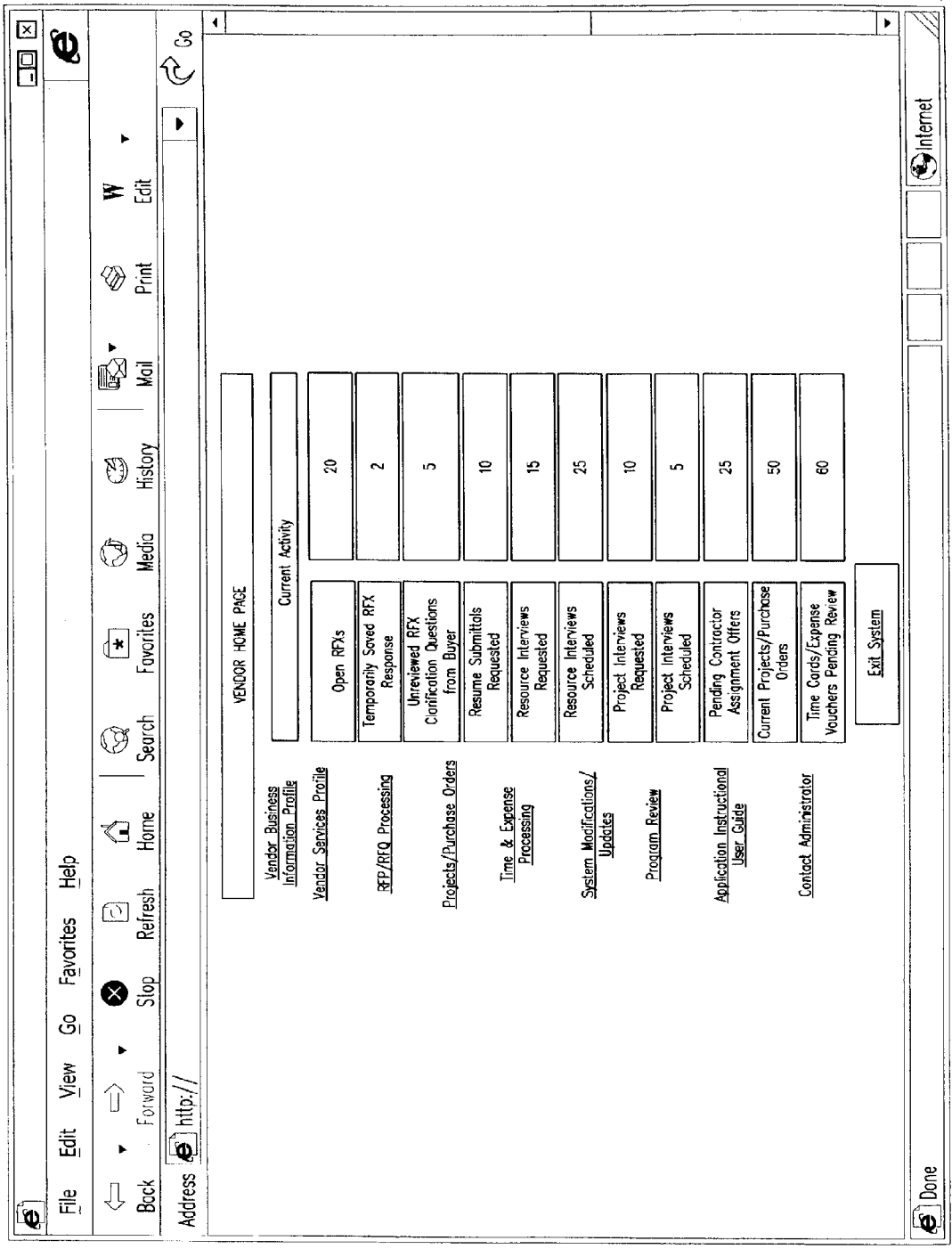

FIG. 4B illustrates a sample vendor home page 61*b* containing a number of system features available to the vendor user. For example, the vendor home page 61*b* can provide links to update the vendor profile (e.g., the types of goods and/or services the vendor provides), respond to received bid requests, process current projects or access a voucher processing system to view existing project event completion requests or process new project event completion requests. In FIG. 4B, the vendor user is also provided with the current status of pending bids and projects. For example, the vendor user can determine the number of bid requests that the vendor needs to respond to and the number of temporarily saved bid responses that the vendor has not yet completed. From the vendor home page 61*b*, the vendor user can link to additional web pages to complete vendor bid responses or access a newly received bid request to begin the vendor bid response.

Figure 4C:
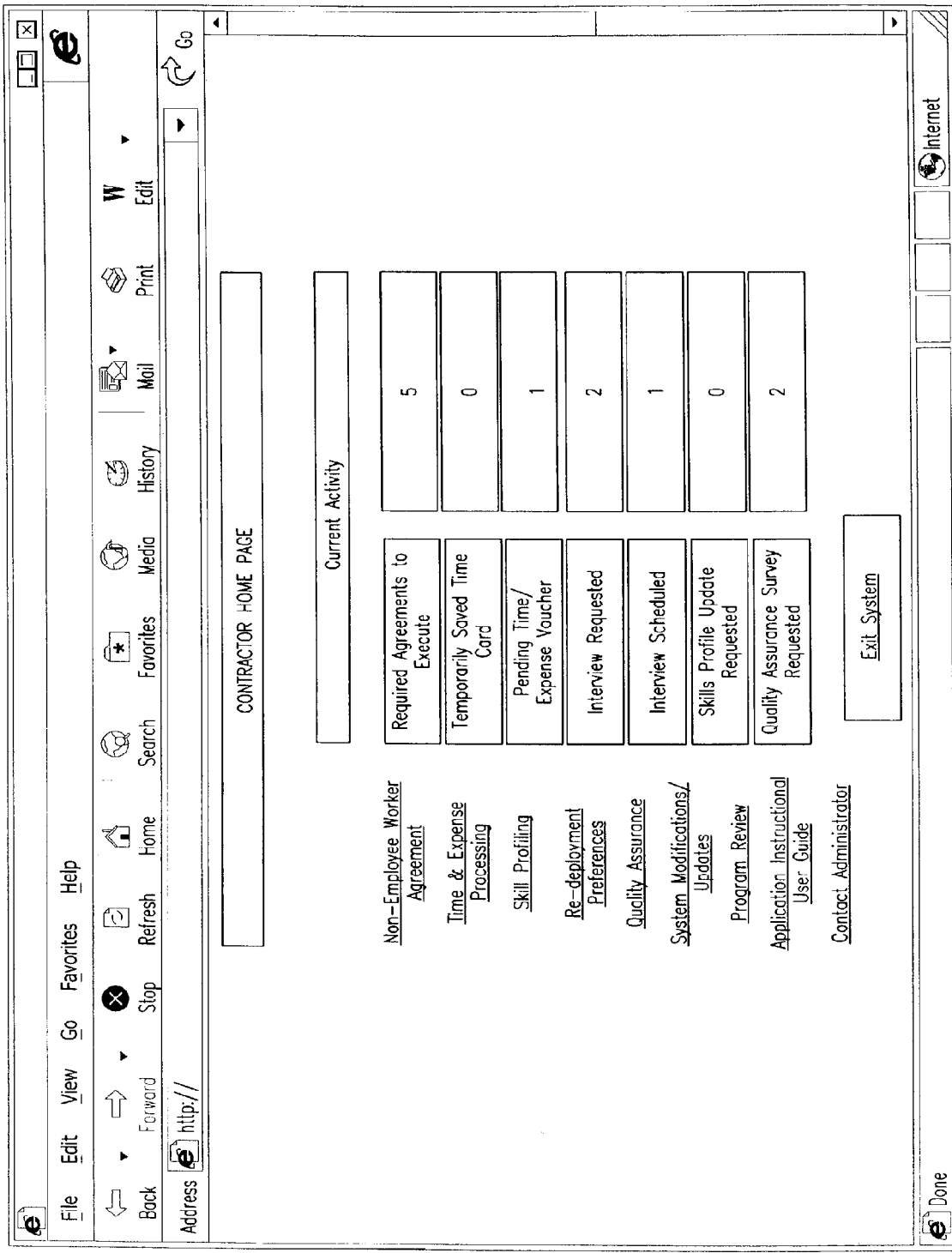

FIG. 4C illustrates a sample contractor home page 61*c* containing a number of system features available to the contractor. For example, the first time a contractor user enters the contractor home page 61*c*, the contractor user may be directed to agree to various non-employee worker agreements before accessing any other information in the system. Each of the non-employee worker agreements can be displayed to the contractor user, and the contractor user can be prompted to agree to or otherwise accept the terms of the agreements before continuing. Once the contractor user has completed all of the agreements, the contractor user can access the time keeping system to enter contractor time, update their skills profile or provide re-deployment preferences. In addition, current activities associated with the contractor user may also be displayed to the contractor user at the contractor home page 61*c*, such as the number of interviews requested or interviews scheduled for additional projects.

Figure 4D:
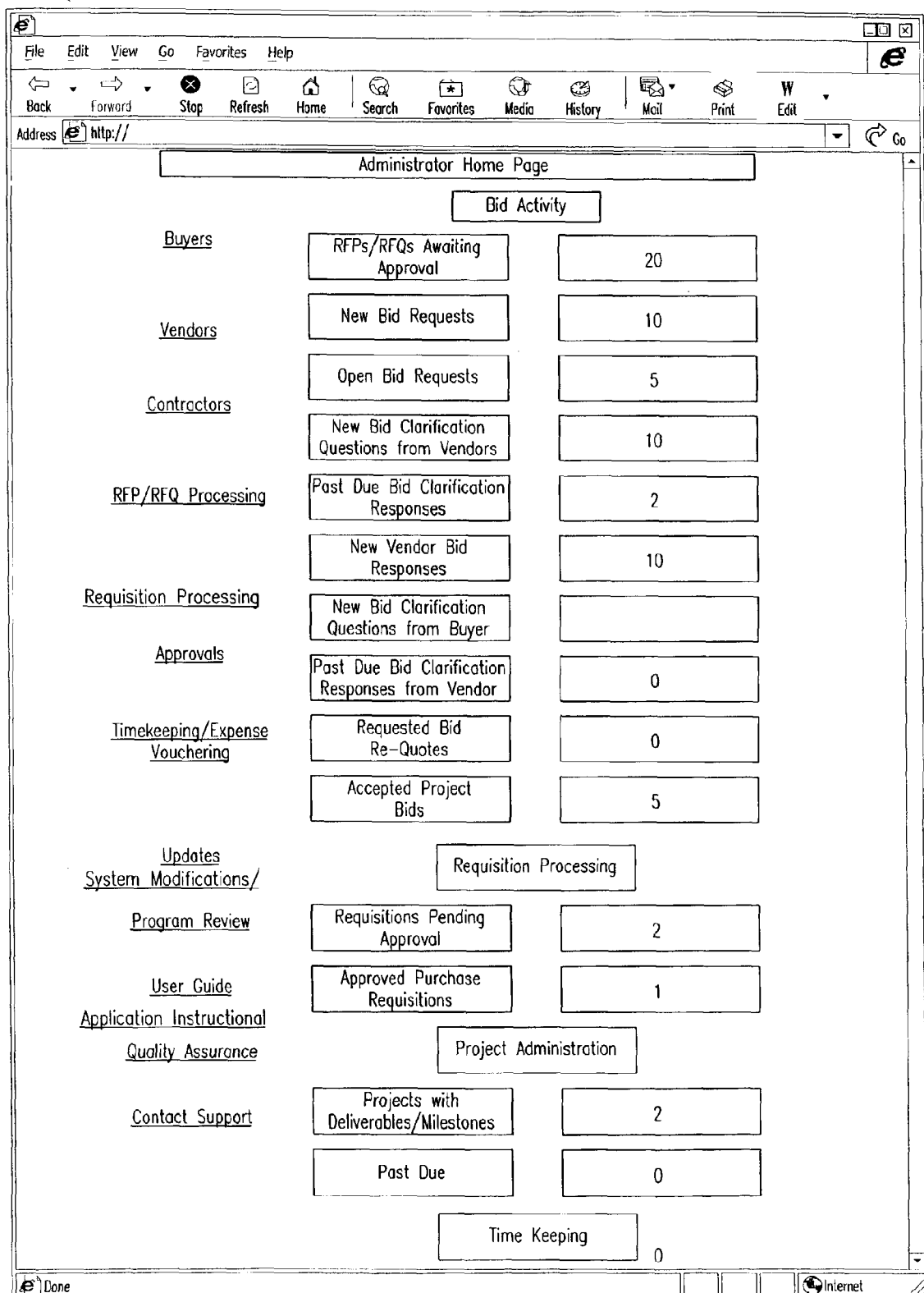

FIG. 4D illustrates a sample administrator home page 61*d* containing a number of features available to an administrative user. For example, the administrative user can access information on buyers, vendors or contractors, link to web pages containing bid requests that need to be approved, approve a bid response to award the bid to a particular vendor, process a current project or access a voucher processing system to view existing vendor/contractor requests for project activity approval, such as contractor time cards. In addition, the current activities of the administrative user can also be displayed on the administrator home page 61*d*. For example, the number of bid requests awaiting approval, the number of new bid requests and the number of new vendor responses can be displayed to the administrative user. From the administrator home page 61*d*, the administrative user can link to any information pertaining to the bid process or project management that the administrative user has access to. For example, if the administrative user is a third-party administrator, the administrative user may have access to the bids and projects of all buyers and vendors registered with the system. However, if the administrative user is a buyer-employed administrator, the administrative user may only have access to bids and projects associated with the particular buyer.

Figure 5:
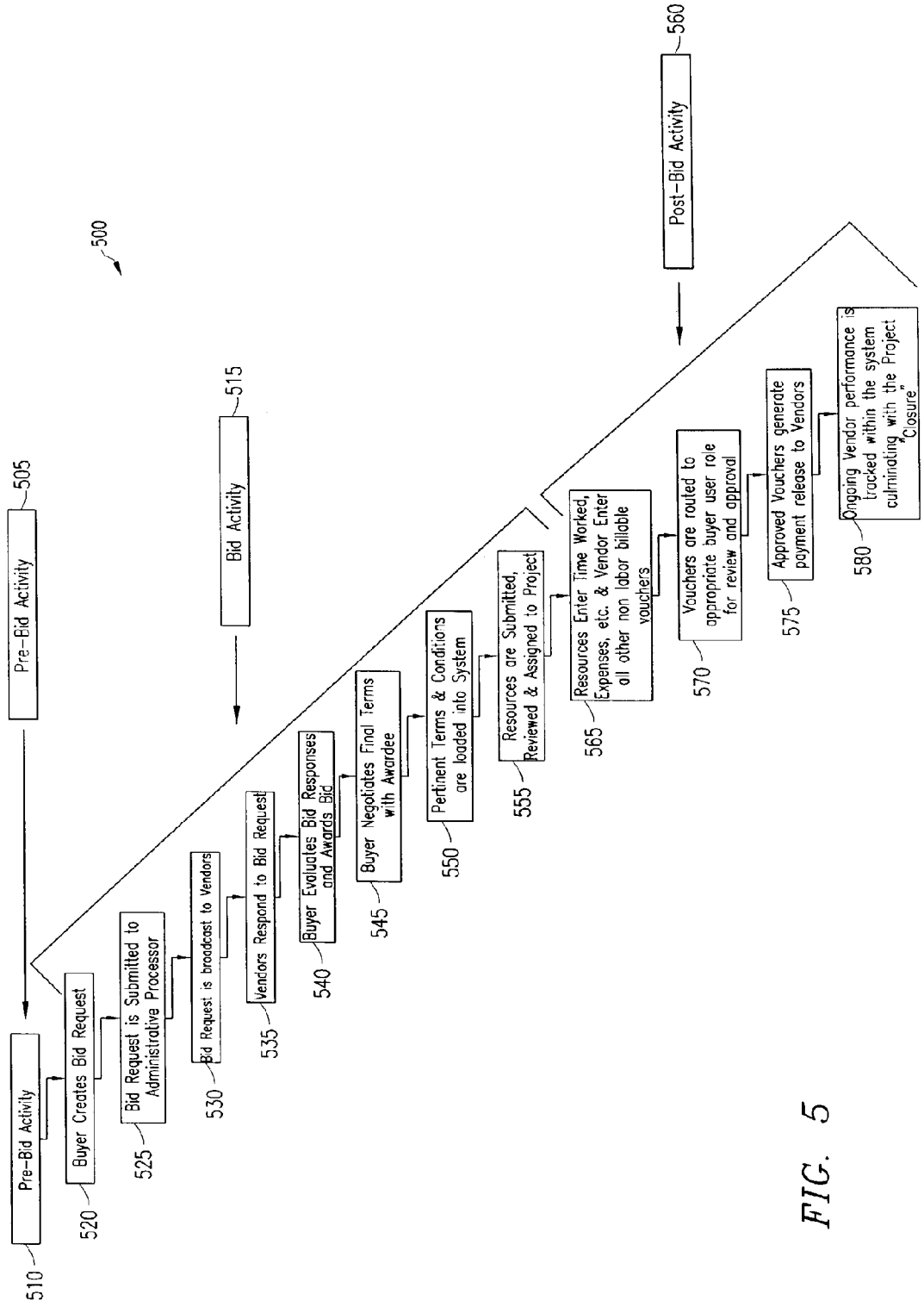
FIG. 5 is a flowchart illustrating exemplary steps for engaging in a project work bid process, in accordance with embodiments of the present invention.

Exemplary steps in the bid/project process 500 handled by the project bid management system of the present invention are shown in FIG. 5. There are several aspects of the bid/project process that are handled prior to any bid requests being submitted (step 505). For example, a buyer may want to create a list of qualified vendors for particular bid requests types to reduce processing time during bid solicitation, as will be described in more detail below in connection with FIGS. 6 and 7. As another example, buyers, vendors and administrators may want to designate particular personnel to handle different components of the bid/project process for efficient routing of messages and information during the bid/project process, as will be described in more detail below in connection with FIGS. 8-14.

Once all of the pre-bid activity is completed (step 510), a buyer can create a bid request for a project (step 520), as will be described in more detail below in connection with FIGS. 15-29, and submit the bid request to an administrator for approval (step 525), if necessary, as will be described in more detail below in connection with FIG. 20. Most companies require approval of bid requests for budgetary purposes. However, if the buyer is an individual or small business, the buyer user creating the bid request may not need approval from any other party to submit the bid request.

Once the bid request has been approved, the bid request is broadcast (e.g., made available to vendors via the system with optional notification via electronic mail) to qualified vendors (step 530), as will be described in more detail below in connection with FIG. 23, to solicit a bid response from the vendors (step 535). Each of the bid responses is evaluated by the buyer, as will be described in more detail below in connection with FIGS. 32 and 33, to determine which vendor bid response is the most qualified (step 540). After the buyer selects a particular vendor for the project, the buyer and vendor negotiate the final terms and conditions of the contract (step 545) and these terms and conditions can be loaded into the system for project tracking purposes (step 550), as will be described in more detail below in connection with FIG. 37. Thereafter, the vendor selects the specific resources (contractors) for the project, and if the terms of the project require buyer approval of resources, the buyer approves all of the assigned resources before the project ensues (step 555), as will be described in more detail below in connection with FIG. 38.

Once all of the bid activity is completed (step 515), the system is further capable of handling post-bid activity (step 560) to track the performance of the project and payment of vouchers during the course of the project. For example, the vendor and contractors assigned to the project can enter time worked and expenses into the system (step 565) for the generation of payable vouchers to be submitted to the buyer through the system, as will be described in more detail below in connection with FIG. 43. Upon receipt of the vouchers, the buyer and/or administrator can review and approve the vouchers for payment to the vendor (steps 570 and 575), as will be described in more detail below in connection with FIG. 49. Other project tracking parameters can also be entered into the system to track the performance of the vendor through project closure (step 580), as will be described in more detail below in connection with FIGS. 39 and 40. Each of the main components of the bid/project process (pre-bid activity, bid activity and post-bid activity) will now be discussed separately hereinbelow. Additionally, analysis and reporting of the data collected during the bid/project process will be discussed separately hereinbelow.

Pre-Bid Activity

Figure 6:
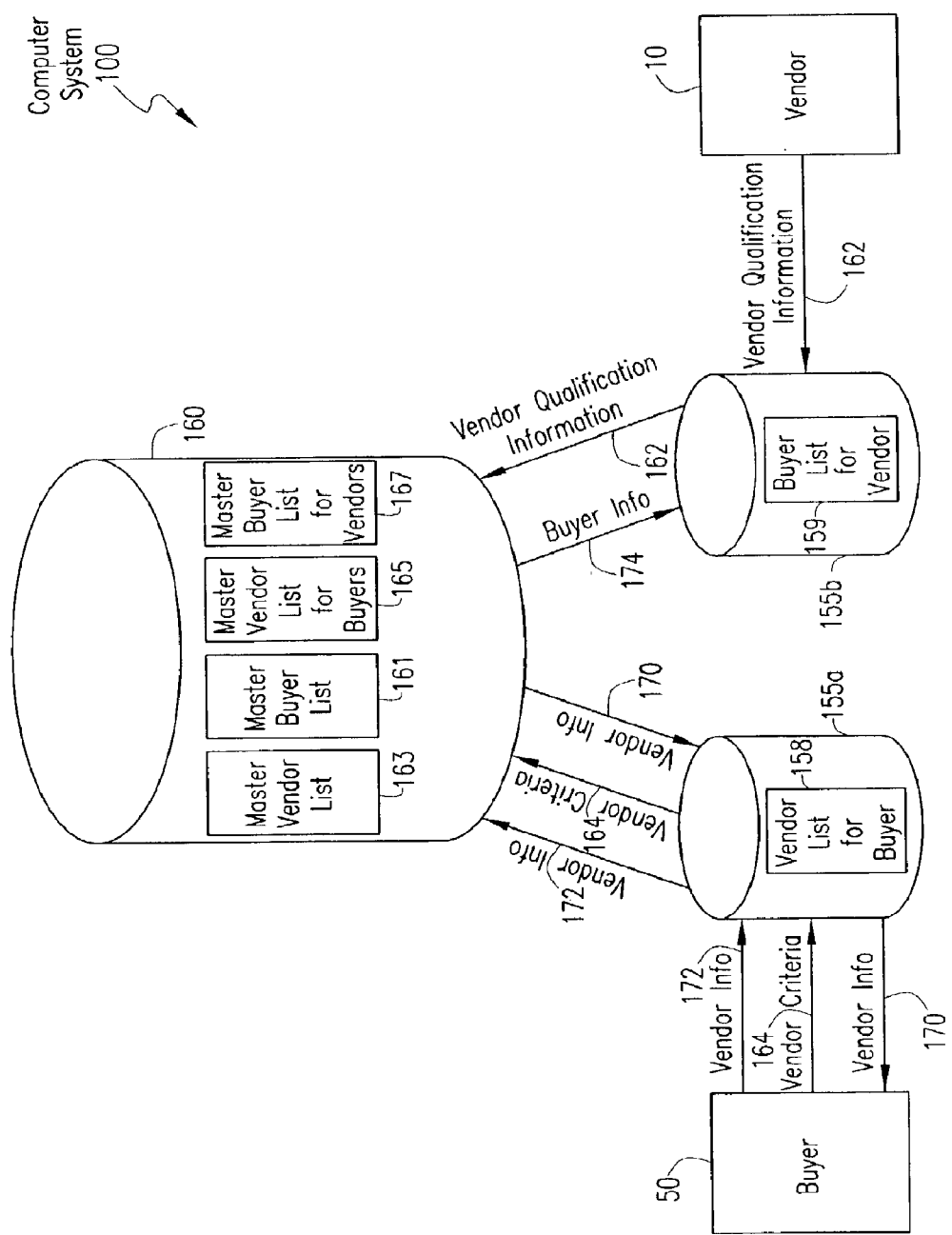
FIG. 6 illustrates the electronic facilitation of a vendor qualification process for defining the type of project work a vendor provides and/or a buyer requires and qualifying vendors for buyers, in accordance with embodiments of the present invention.

As discussed above, a buyer 50 may want to pre-qualify vendors 10 for particular project types to reduce the amount of processing required for each bid request submitted. Referring now to FIG. 6, to facilitate vendor qualification for buyers, the computer system 100 can enable buyers 50 to establish buyer-defined vendor criteria data 164 for vendors and store the buyer-defined vendor criteria data 164 within the top-level database 160 in a master buyer list 161. The computer system 100 can further acquire pertinent vendor qualification data 162 from vendors 10 and store the vendor qualification data 162 in the top-level database 160 in a master vendor list 163.

For example, the vendor qualification data 162 can identify the specific goods and/or services that the vendor 10 provides and the specific geographical areas that the vendor 10 is capable of supplying these goods and/or services, along with other vendor information, such as the size of the vendor, whether the vendor has insurance, whether the vendor is certified in certain industries, etc. The buyer-defined vendor criteria data 164 can identify the specific goods and/or services that the buyer 50 desires, the specific geographical areas that the buyer 50 wants the goods and/or services and other buyer constraints, such as the preferred size of the vendor, requisite vendor insurance needs, requisite vendor certifications, etc.

Based on the vendor qualification data 162 and buyer-defined vendor criteria data 164, the computer system 100 can determine which vendors 10 have the requisite qualifications for buyers 50 and provide qualified vendor information 170 (e.g., name, address, and any other vendor information that the buyer needs) to the buyer 50 for review. If the buyer 50 or optionally the administrator 80 approves of the vendor 10, the buyer 50 can add the vendor information 170 to a vendor list 158, which is stored in the buyer database 155*a*. In addition, vendor information 172 for those vendors 10 that the buyer 50 previously qualified can also be stored in the vendor list 158. Furthermore, a master copy of the vendor list 158 (i.e., Master Vendor List for Buyers 165) can be stored in the top-level database 160 for redundancy and updating purposes.

Buyer information 174 (e.g., name, address and other information that the buyer agrees to provide) can also be downloaded to the vendor database 155*b* for storage in a buyer list 159 therein. In addition, a master copy of the buyer list 159 (i.e., Master Buyer List for Vendors 167) can be stored in the top-level database 160 for redundancy and updating purposes. However, it should be understood that if the computer system 100 is implemented solely at the buyer network, the top-level database 160 would not store master copies 165 and 167, and the buyer 50 would perform vendor qualification using only the vendor information 172 known to the buyer 50 or provided directly to the buyer 50 by the vendor 10. For a complete discussion of qualifying vendors 10 for buyers 50 based on vendor qualification data 162 and buyer-defined vendor criteria data 164, reference is made to co-pending and commonly-assigned U.S. patent application Ser. No. 10/141, 801, which is hereby incorporated by reference in its entirety herein.

Figure 7:
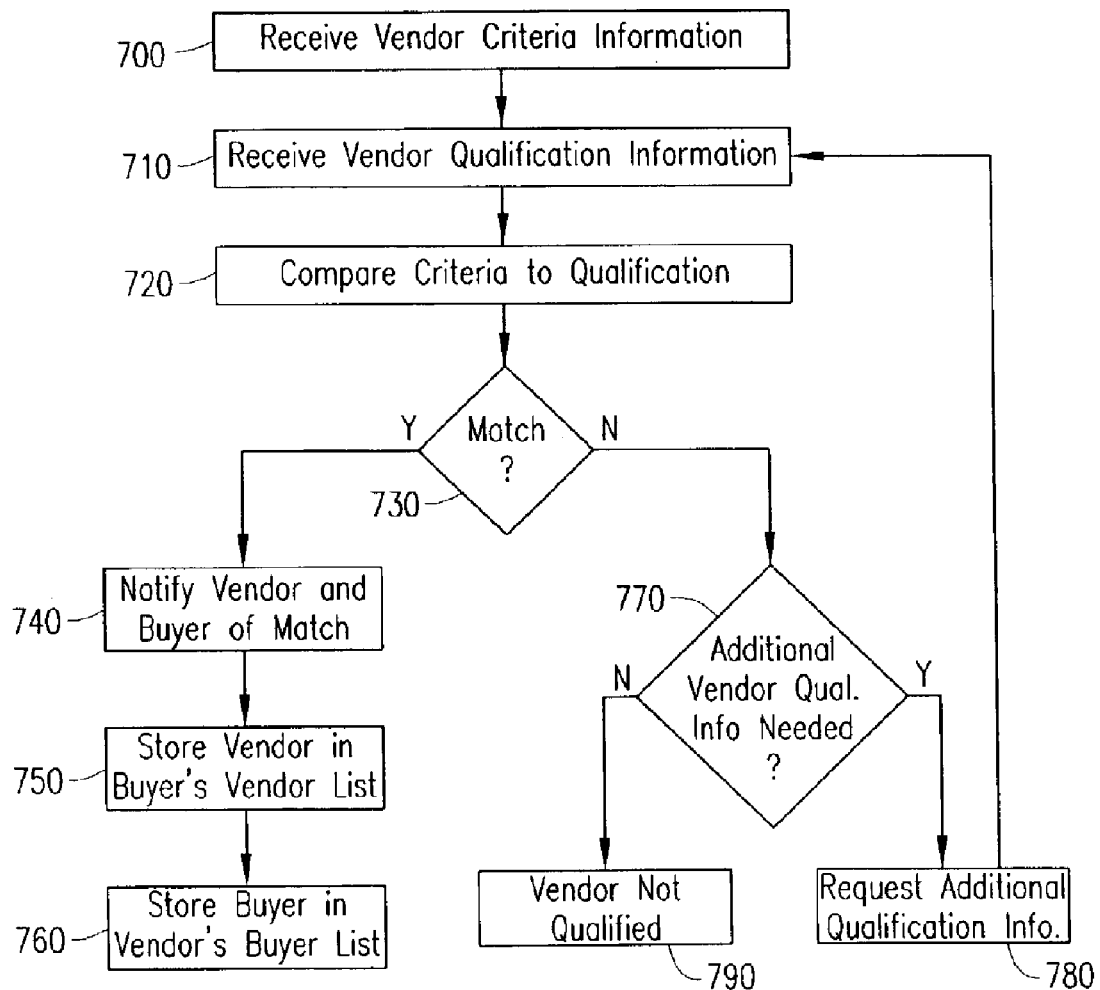
FIG. 7 is a flow chart illustrating exemplary steps for qualifying a vendor for a buyer, in accordance with embodiments of the present invention.
Figure 8:
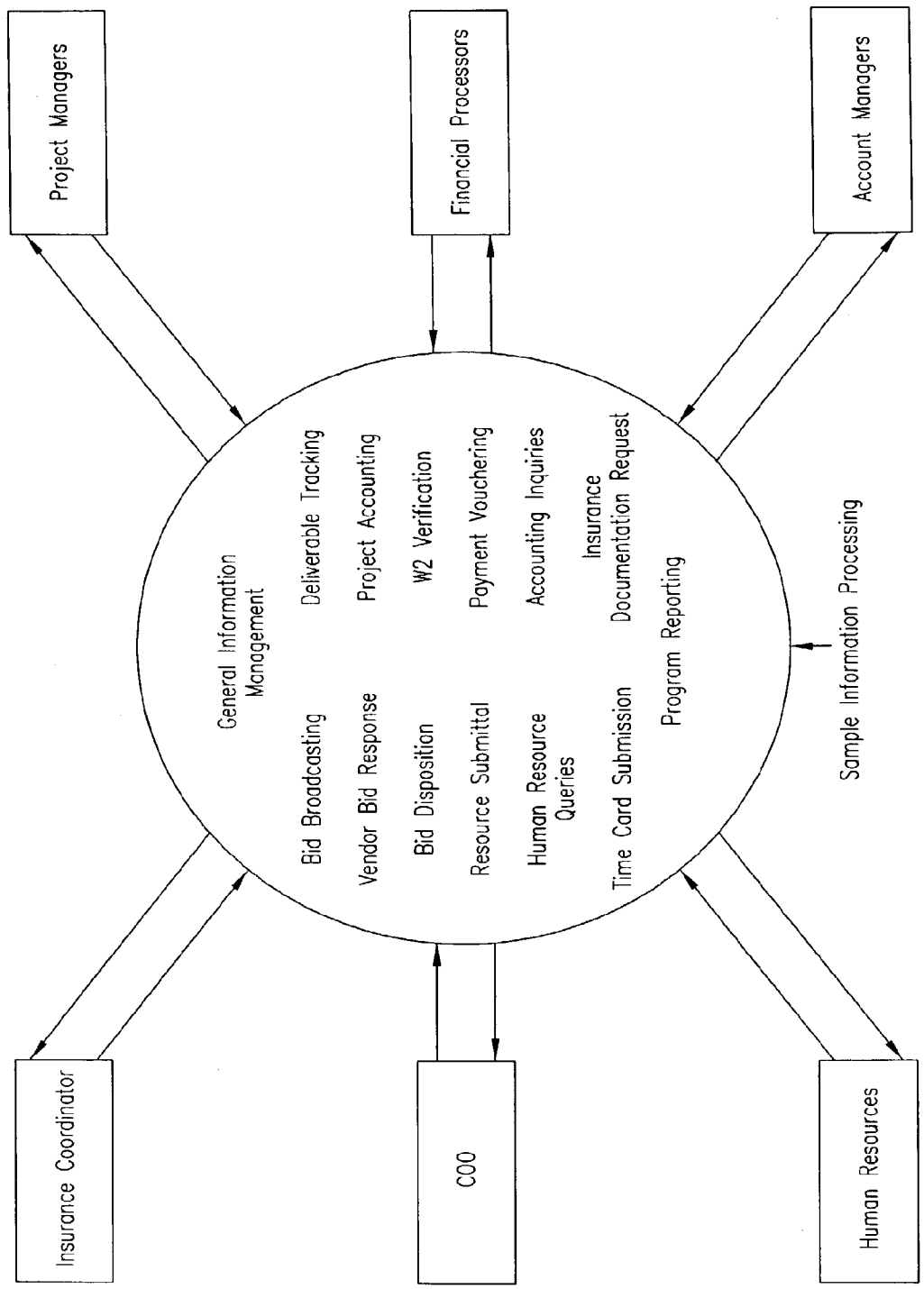
FIG. 8 illustrates sample information processing involved in responding to a bid request and various user roles responsible for the information processing.

Exemplary steps for qualifying vendors for buyers are shown in FIG. 7. Once the buyer-defined vendor criteria information is established (step 700) and vendor qualification information from a vendor is received (step 710), the buyer-defined vendor criteria information is compared to the vendor qualification information (step 720) to determine whether the vendor qualification information matches the buyer-defined vendor criteria information (step 730). If so, the vendor and buyer are notified of the match (step 740), and if the buyer approves of the vendor, the vendor information associated with the vendor is stored in the buyer's vendor list for later use in preparing bid requests (step 750). In addition, the buyer information can be stored in the vendor's buyer list for reference when receiving bid requests and preparing bid responses (step 760).

However, if the vendor qualification information does not match the buyer-defined vendor criteria information (step 730), the system determines whether additional vendor qualification information is needed to qualify the vendor for the buyer (step 770). If so, the vendor is requested to provide this additional vendor qualification information (step 780) to qualify the vendor for the buyer (step 710). If not, the vendor is not qualified for the buyer (step 790), and the vendor is not added to the buyer list.

In addition to qualifying vendors for buyers, vendors, buyers and administrators may want to designate certain personnel to handle various aspects of the bid/project process to synchronize communications, data and transaction processing across multiple user platforms. For example, referring now to FIG. 8, the bid/project process typically requires the inclusion of a broad spectrum of information processing and functional departments to facilitate the administration and management of the bid/project process. Such information processing can include, for example, bid request broadcasting, vendor bid responses, bid disposition (evaluation and award), resource submittal, time card submission, deliverables tracking and payment vouchering. Each of these information processing components may be handled by one or more different individuals or departments, such as the COO, Human Resources department, Project User and Financial Processor. To meet this functional need, the computer system of the present invention can enable a shared work environment, where the buyer, vendor and/or administrator can specify multiple custom user roles that need to participate in the bid/project process and designate personnel (resources) to each of the user roles for all bid/projects or for particular bid/projects.

Figure 9:
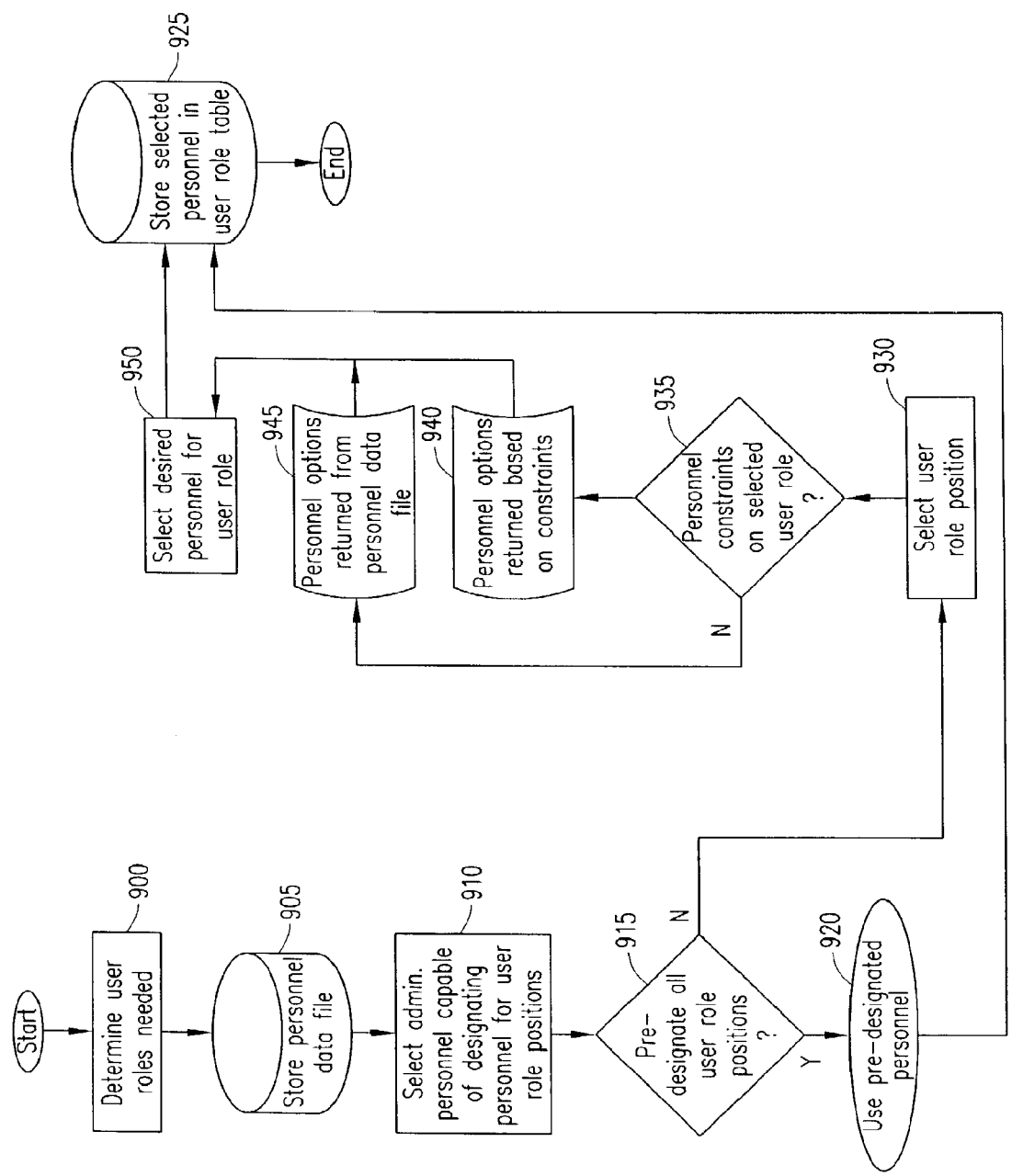
FIG. 9 is a flowchart illustrating exemplary steps for defining and assigning the various resources involved in the project work process, in accordance with embodiments of the present invention.
Figure 11:
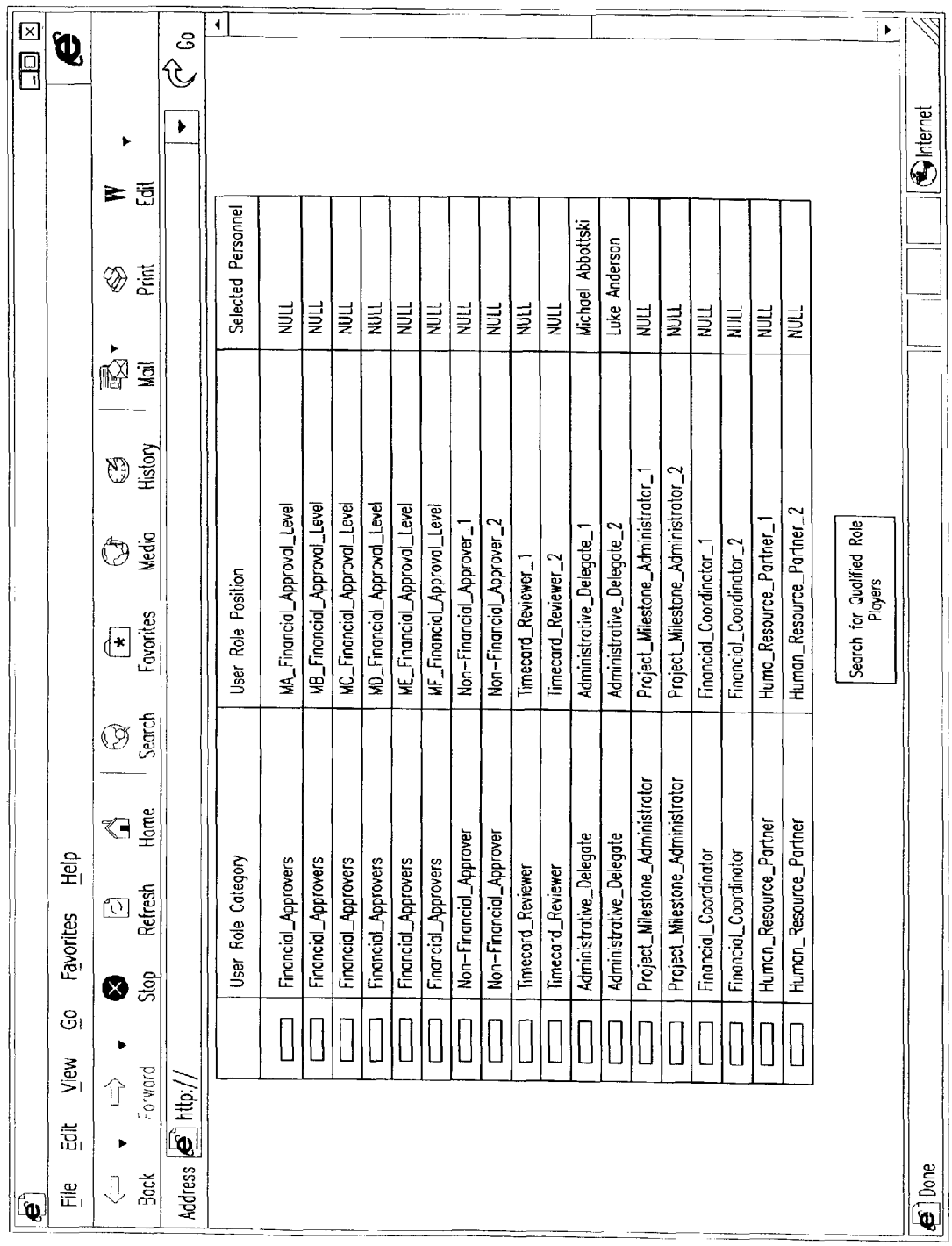
FIG. 11 is an exemplary screen shot of the assignment of resources to user roles.

Referring now to FIG. 9, there is illustrated exemplary steps for specifying user role positions and assigning personnel to the user role positions for a vendor, buyer or administrator. Initially, the vendor, buyer or administrator determine the specific user role positions that are needed for the bid/project process (step 900). For example, as shown in the sample buyer web page of FIG. 11, the buyer may determine that there is a need for several different user role categories, such as financial approvers, non-financial approvers, time card reviewers, administrate delegates, project milestone administrators, financial coordinators and human resource partners during the project/bid process. The vendor, buyer or administrator may further determine that multiple user role positions within one or more of the user role categories are needed for the bid/project process. For example, as shown in FIG. 11, the buyer may determine that there is a need for six financial approvers and two non-financial approvers.

Referring again to FIG. 9, once the user role positions are determined, a data file for the pertinent personnel of the vendor, buyer or administrator is stored for use in selecting appropriate personnel for each of the user role positions (step 905). One or more key personnel of the vendor, buyer or administrator (e.g., the COO, Project User, etc.) can be selected to designate the particular personnel to be assigned to each of the user role positions (step 910), or alternatively, the system can assign personnel to user role positions based on the information contained in the personnel data file. In some companies, user role positions are pre-designated (step 915), and in this case, the pre-designated personnel can be loaded into the system (step 920) and stored in a user role table (step 925). For example, for most vendors, personnel is pre-assigned to various user role positions for all projects. In other companies, one or more of the user role positions may not be pre-designated at all or not pre-designated for a particular project (step 915), and in this case, the selected key personnel or the system can assign specific personnel to the user role positions.

To assign specific personnel to user role positions, the specific user role position is selected (step 930), and a list of personnel that can be assigned to that user role position, depending upon user role constraints, is determined from the personnel data file (steps 935, 940 and 945). For example, if a user role position requires a particular level user, only those personnel at the particular user level or higher are included on the list. From the list of personnel for the user role position, one of the personnel is selected for the particular user role position (step 950) and the selected personnel is stored in the user role table (step 925). For example, as shown in FIG. 11, upon selecting a particular user role position (e.g., clicking on a user role position), the system can search for qualified personnel for the user role position, and after a selection has been made, the selected personnel for the user role position can be displayed.

Examples of data structures for selecting and assigning user role positions for a buyer are shown in Tables 1-9 hereinbelow. The data structures are illustrated for simplicity as being organized in a table format, with each table including all of the fields necessary for defining and assigning user role positions for the buyer. The tables are related in a hierarchical and/or relational manner, so that all of the necessary information for user role positions can be accurately stored and accessed, as will be described hereinbelow in connection with the exemplary database table structure 300 of FIG. 10. However, it should be understood that other buyer user role configurations can be included, and the system is not limited to the specific buyer user role configurations listed in Tables 1-9 or FIG. 10.

Figure 10:
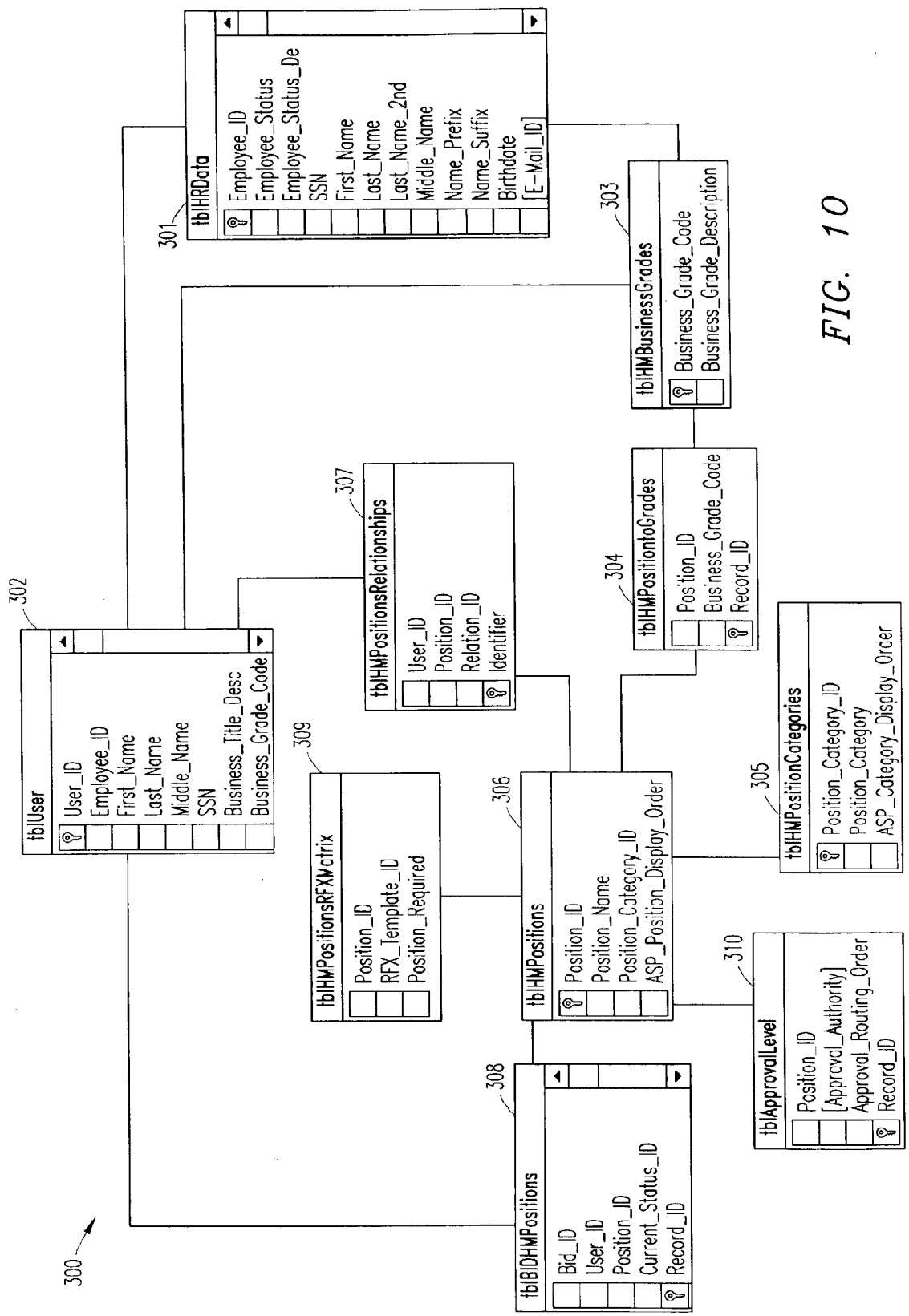
FIG. 10 is a database table view illustrating the definition and assignment of user roles, in accordance with embodiments of the present invention.

Tables 1 and 2 below illustrate sample user role categories and user role positions within each of the user role categories, respectively, which can be stored in the database in tables "tblHMPositionCategories" 305 and "tblHMPositions" 306, respectively, as shown in FIG. 10. In Table 1, each user role category is assigned an identification number and a display order for display on a web page. The user role category identification numbers are used within the user role positions table (Table 2) to correlate the user role positions with the specific user role categories. However, it should be understood that there could be numerous additional categories and positions, depending on the needs of the buyer. When initially selecting the user role positions, the user role categories can be displayed for the user to select from, with links to the specific user role positions within each of the categories. After all user role positions have been selected for the particular buyer, the selected user role positions and assigned personnel can be displayed as in FIG. 11

TABLE 1

Exemplary User Role Categories (tblHMPositionCategories)

| Position_Category_ID | Position_Category_Name | ASP_Category_Display_Order |
| --- | --- | --- |
| 1 | Financial_Approvers | 1 |
| 2 | Non-Financial_Approvers | 2 |
| 3 | Timecard_Reviewers | 3 |
| 4 | Administrative_Delegates | 4 |
| 5 | Project_Milestone_Administrators | 5 |
| 6 | Financial_Coordinators | 6 |
| 7 | Human_Resource_Partners | 7 |
| 8 | Security_Partners | 8 |
| 9 | Regulatory_Compliance_Partners | 9 |

TABLE 2

Exemplary User Role Positions (tblHMPositions)

| Position_ID | Position_Name | Position_Category_ID |
| --- | --- | --- |
| 1 | MA_Financial_Approval_Level | 1 |
| 2 | MB_Financial_Approval_Level | 1 |
| 3 | MC_Financial_Approval_Level | 1 |
| 4 | MD_Financial_Approval_Level | 1 |
| 5 | ME_Financial_Approval_Level | 1 |
| 6 | MF_Financial_Approval_Level | 1 |
| 7 | Non-Financial_Approver_1 | 2 |
| 8 | Non-Financial_Approver_2 | 2 |
| 9 | Timecard_Reviewer_1 | 3 |
| 10 | Timecard_Reviewer_2 | 3 |
| 11 | Administrative_Delegate_1 | 4 |
| 12 | Administrative_Delegate_2 | 5 |
| 13 | Project_Milestone_Administrator_1 | 5 |
| 14 | Project_Milestone_Administrator_2 | 5 |
| 15 | Financial_Coordinator_1 | 6 |
| 16 | Financial_Coordinator_2 | 6 |
| 17 | Human_Resource_Partner_1 | 7 |
| 18 | Human_Resource_Partner_2 | 7 |

TABLE 2-continued

Exemplary User Role Positions (tblHMPositions)

| Position_ID | Position_Name | Position_Category_ID |
|---|---|---|
| 19 | Project_Bid_Originator | 4 |
| 20 | Security_Administrator | 8 |
| 21 | Regulatory_Compliance_Administrator | 9 |

Table 3 below illustrates sample data stored within the personnel date file for each user of the system, which can be stored in the database in table "tblUser" 302, as shown in FIG. 10. From this user data, the qualified personnel for each user role position can be determined, and the requisite information for each assigned user for each user role position can be ascertained. One of the fields within Table 3 is the business grade assigned to the particular user. The business grade indicates the particular level of the user in the business system. For example, the user may be a level 3 user, and this information would be stored in the user table. The available business grades can be mapped to the user role positions, as shown in Tables 4 and 5 below to indicate the business grade required for the user assigned to each user role position which can be stored in the database in tables "tblHMBusinessGrades" 303 and "tblHMPositiontoGradeMap" 304, as shown in FIG. 10.

TABLE 3

Base System User Table (tblUser)

| Column | Data Type | Length |
|---|---|---|
| User_ID | int | 4 |
| Employee_ID | nvarchar | 10 |
| First_Name | nvarchar | 50 |
| Last_Name | nvarchar | 50 |
| Last_Name_2$^{nd}$ | nvarchar | 50 |
| Middle_Name | nvarchar | 10 |
| SSN | nvarchar | 50 |
| Business_Title_Description | nvarchar | 50 |
| Business_Grade_Code | nvarchar | 10 |
| Business_Grade_Description | nvarchar | 50 |
| Financial_Approval_Level | int | 4 |
| Birthdate | datetime | 8 |
| Business_Unit_Name | nvarchar | 100 |
| [Dept/Cost_Center] | nvarchar | 10 |
| Dept_Name | nvarchar | 50 |
| Work_Location_Code | numeric | 9 |
| Location_Type | nvarchar | 50 |
| Location_Address1 | nvarchar | 50 |
| Location_Address2 | nvarchar | 50 |
| Location_City | nvarchar | 50 |
| Location_State | nvarchar | 50 |
| Location_Country | nvarchar | 50 |
| Location_Zip | nvarchar | 4 |
| Country_ID | int | 4 |
| Work_Phone_Number | nvarchar | 50 |
| Fax_Number | nvarchar | 50 |
| [E-Mail] | nvarchar | 50 |
| User_Name | nvarchar | 50 |
| Password | nvarchar | 50 |
| Active | bit | 1 |
| Last_Logged_In | datetime | 8 |
| Date_Updated | datetime | 8 |
| US_Date_Format | bit | 1 |
| Currency_ID | int | 4 |

TABLE 4

Base Business Grade Table (tblHMBusinessGrades)

| Column Name | Data Type | Length |
|---|---|---|
| Business_Grade_Code | nvarchar | 10 |
| Business_Grade_Description | nvarchar | 50 |

TABLE 5

User Role to Business Grade Mapping Table (tblHMPositiontoGradeMap)

| Column Name | Data Type | Length |
|---|---|---|
| Position_ID | int | 4 |
| Business_Grade_Code | nvarchar | 10 |
| Record_ID | int | 4 |

Tables 6-9 below will be described in more detail hereinbelow in connection with FIG. 10.

TABLE 6

Position/Role to Bid Template Mapping Table (tblHMPositionsRFXMatrix)

| Column Name | Data Type | Length |
|---|---|---|
| Position_ID | int | 4 |
| RFX_Template_ID | int | 4 |
| Position_Required | char | 1 |

TABLE 7

Default User Role Mapping Table (tblHMPositionsRelationships)

| Column Name | Data Type | Length |
|---|---|---|
| User_ID | int | 4 |
| Position_ID | int | 4 |
| Relation_ID | int | 4 |
| Identifier | int | 4 |

TABLE 8

User Role to Bid Request Mapping Table (tblBidHMPositions)

| Column Name | Data Type | Length |
|---|---|---|
| Bid_Tracking_ID | int | 4 |
| User_ID | int | 4 |
| Position_ID | int | 4 |
| Relation_ID | int | 4 |
| Current_Status_ID | int | 4 |
| Record_ID | int | 4 |

TABLE 9

User Position/Role to Approval Level and Hierarchy Mapping
(tblApprovalLevel)

| Column Name | Data Type | Length |
|---|---|---|
| Position_ID | int | 4 |
| [Approval_Authority] | money | 8 |
| Approval_Routing_Order | numeric | 9 |
| Record_ID | int | 4 |

As can be seen in FIG. 10, there is a concise relationship between all the fields necessary to enable configurable work sharing and specific workflow components for the buyer. The database structure 300 is scalable and configurable, so that even when operating within a less sophisticated database environment, the functionality still exists as long as user role positions are specified and a personnel data file is available. It should be understood that similar database table structures are available to the vendor and administrator, which will be discussed in more detail hereinbelow.

The database table structure 300 for the buyer takes as input personnel data ("tblHRdata" 301) from the buyer and creates a personnel data file ("tblUser" 302) including the specific personnel that may be involved in the shared work environment. The personnel data is shown as table "tblHRdata" 301 for simplicity purposes. However, it should be understood that the personnel data may be in any form, depending on the buyer database system. Periodic downloads from the table "tblHRdata" 301 to the table "tblUser" 302 can be performed to update the system as to the current employees of the buyer to ensure that user role positions are properly assigned. The various business grades designated by the buyer can also be stored in table "tblHMBusinessGrades" 303 and mapped to table "tblUser" 302 for individual assignment of business grades, as discussed above in connection with Tables 3 and 4. In addition, the business grades can be mapped to the selected user roles in table "tblHMPositionto-Grade" 304, as discussed above in connection with Tables 4 and 5.

The user role categories table ("tblHMPositionCategories" 305) and user role positions table ("tblHMPositions" 306), and their interrelation to the position grades and assigned personnel are also shown in FIG. 10. For example, table "tblHMPositionsRelationship" 307 includes the user ID of the assigned personnel to each user role position. If user role positions are associated with specific bid template types (as described in more detail hereinbelow in connection with FIG. 15), the user role positions for each bid template type can be stored in table "tblHMPositionsRFXMatrix" 309. Furthermore, if user role positions are assigned specific to each bid transaction, the user ID of the assigned personnel to each user role position for a specific transaction can be stored in table "tblBidHMPositions" 308.

Figure 12:
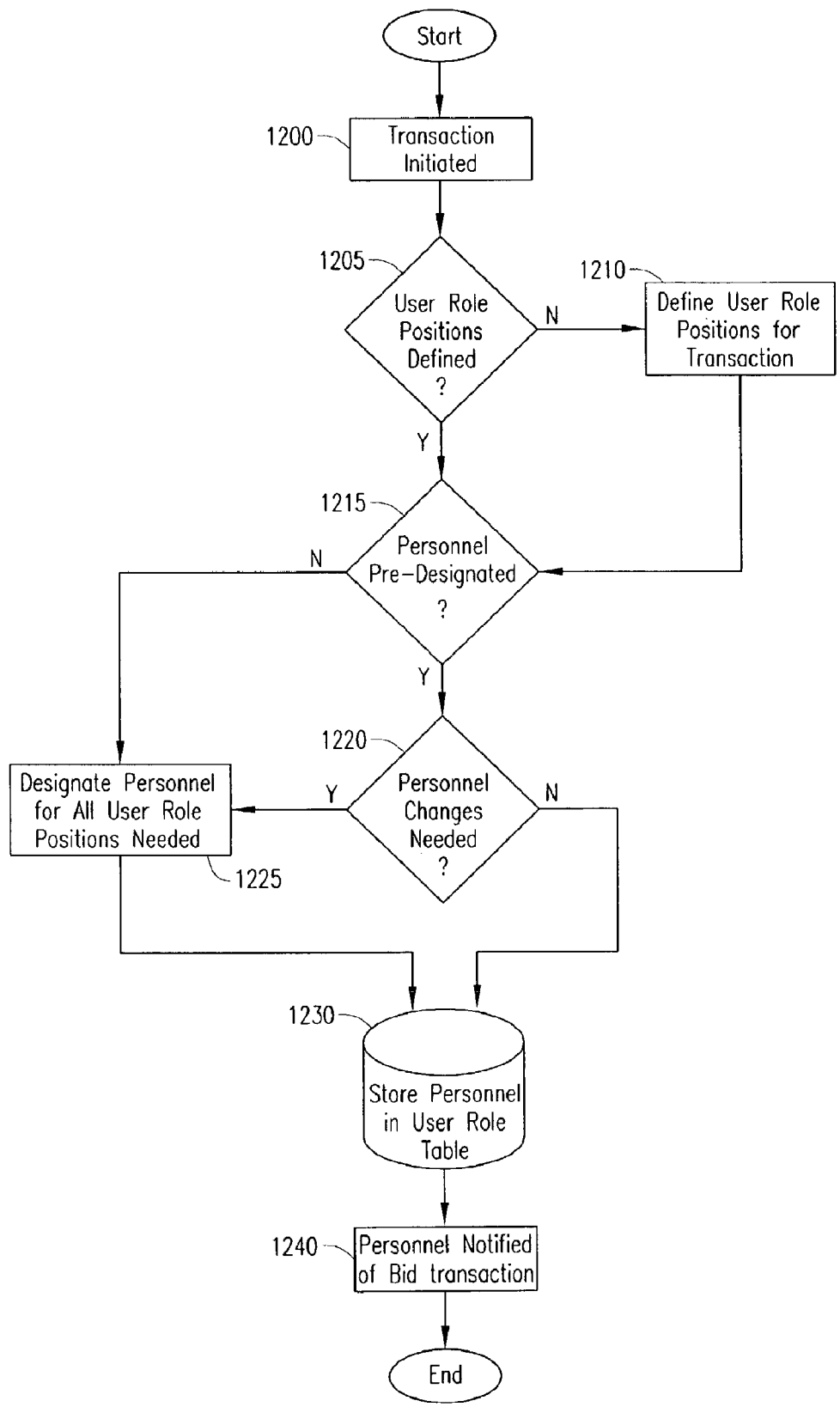
FIG. 12 is a flowchart illustrating exemplary steps for defining and assigning user roles during a bid or project transaction, in accordance with embodiments of the present invention.

Exemplary steps for a buyer to assign personnel to user role positions during a transaction are shown in FIG. 12. Upon initiation of a transaction (step 1200) (e.g., creation of a bid template or bid request, broadcasting of the bid request, receipt of bid response, evaluation of bid response, awarding of bid, payment of voucher, etc.), the system and/or key personnel determines whether all of the required user role positions for the transaction have been defined (step 1205). If not, the system and/or key personnel define the user role positions necessary for the transaction (step 1210).

Once the user role positions have been ascertained, the system and/or key personnel determines whether specific personnel (also referred to herein as users) have been pre-designated for the user role positions (step 1215) and whether any of the pre-designated users need to be changed for the transaction (step 1220). If one or more user role positions do not have a pre-designated user or if one or more pre-designated users should be changed, the system and/or key personnel designates the appropriate user for all user role positions (step 1225) and stores the identity of the designated users for the user role positions in the user role table (step 1230) (e.g., "tblBidHMPositions" in FIG. 10). If all users are pre-designated, the system stores the pre-designated personnel (step 1230), and if applicable, notifies the appropriate personnel of the transaction (step 1240).

Referring again to FIG. 10, in addition to assigning users to specific user role positions for a bid/project process, the database table structure 300 further provides the ability to designate transactions that require approving and specific approvers for a variety of reasons. Therefore, within a table "tblApprovalLevel" 310, certain user role positions can be classified as approval positions, and for each approval position, the routing order for approval can be specified. For example, a user role position approver (Approver A) can be designated to approve all transactions generated by another user role position (User B), so that the system automatically routes all transactions from User B to Approver A.

In addition, each user can be provided access rights to view and modify data within the system. For example, one user role position may have the authority to modify or enter data in the system through a first web page, while another user role position may only have the authority to view the data through a second web page. Thus, although the information displayed on the web page may be the same to both users, the actual web pages are different, depending on the approval level of the user role position. When a user logs in to the system, the system determines the approval level of the user and pushes the appropriate web pages to the user. An example of a data structure implementing user role to web page access mapping is shown below in Table 10.

TABLE 10

User Role to Web Page Access Mapping Table

| Column Name | Data Type | Length |
|---|---|---|
| ASP_Object_ID | int | 4 |
| Position_ID | int | 4 |
| Read_Access | char | 1 |
| Write_Access | char | 1 |
| Record_ID | int | 4 |

Figure 14:
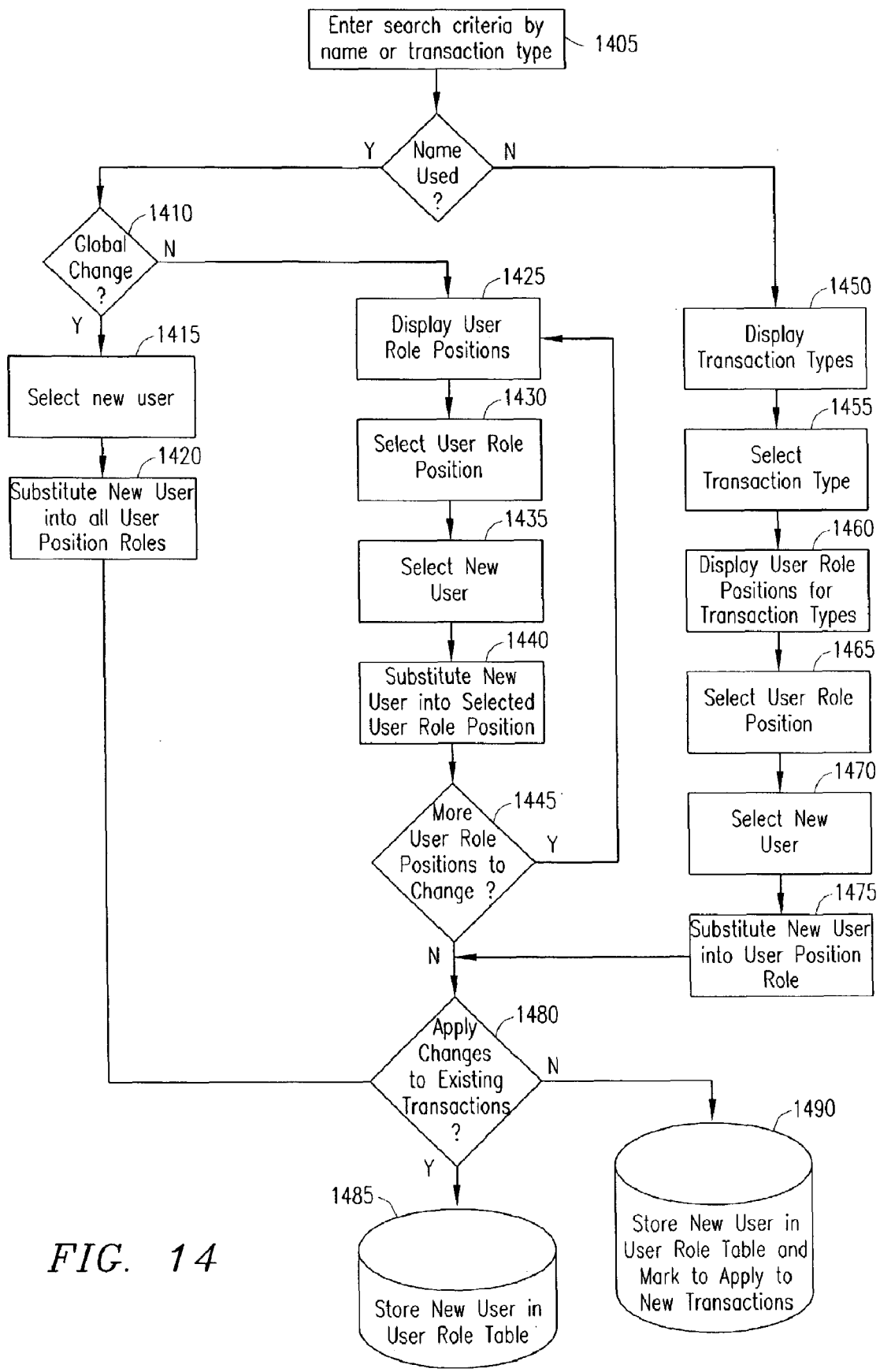
FIG. 14 is a flowchart illustrating exemplary steps for modifying user role assignments, in accordance with embodiments of the present invention.

In order to maintain the relationship between user role positions, internal personnel and specific transactions in an ongoing manner, the system of the present invention is further designed to account for shifts in organizational personnel and the business level and user authority of personnel. Referring now to FIG. 14, there is illustrated exemplary steps for modifying user role position assignments, in accordance with embodiments of the present invention. A user role position can be re-assigned based on the user name or the transaction type (step 1400). If the modification is made based on the user name (step 1405), the change can be made globally to all user role positions held by the user or to only specific user role positions held by the user. For global changes (step 1410), a new user is selected (step 1415) and the new user is substituted for the previous user for all user role positions held by the previous user (step 1420). This type of global change is necessary, for example, when an employee leaves the company, and a new employee takes the exiting employee's position within the company.

For specific user role position changes (step 1410), all of the user role positions held by the user can be displayed (step 1425), and one of the user role positions can be selected for changes (step 1430). A new user is chosen for that selected user role position (step 1435) and the new user is substituted for the previous user for that selected user role position (step 1440). This process can be repeated for each user role position that requires a change (step 1445). Specific user role position changes may occur for a number of reasons, such as promotion, reorganization, employee status changes (e.g. full-time to part-time), etc.

If the modification is made based on the transaction type (step 1405), a listing of all transaction types (e.g., bid request creation, bid request broadcasting, bid request receipt, bid response generation, bid response receipt, bid evaluation, bid award, time keeping, vouchering payment, etc.) can be displayed (step 1450), and a particular transaction type is selected (step 1455). All of the user role positions associated with that particular transaction type can be displayed (step 1460) and the particular user role position to be modified is selected (step 1465). A new user is chosen for that selected user role position (step 1470), and the new user is substituted for the previous user for that selected user role position (step 1475). Transaction type modifications may be beneficial, for example, when the particular user for a user role position is unknown, but a change is required due to customer complaints.

The user role position modifications can be applied to existing transactions or only to new transactions (step 1480), depending on the reason for the modification and the need for continuity in existing transactions. If the modification is to be applied to existing transactions, the user role table is updated with the new user and the previous user record is modified to "outdated" (step 1485). However, if the modification is only to be applied to new transactions, the user role table is updated with the new user, but the previous user is not deleted, and the new user is marked for new transactions only (step 1490).

For the vendor, user role positions are typically pre-designated to limit access to qualified personnel. Examples of data structures implementing vendor user roles are shown in Tables 11-13 hereinbelow. As can be seen, the vendor personnel can be assigned a vendor contact type, which can be mapped to access rights to view and modify data within the system, similar to that described above for the buyer in connection with Table 10. However, it should be understood that other vendor user role configurations can be included, and the system is not limited to the specific configurations listed in Tables 11-13.

TABLE 11

Exemplary Vendor Roles (tblVendorRoles)

| VendorContactTypeID | Description | ASP Display Order |
|---|---|---|
| 1 | CEO | 1 |
| 2 | CFO | 2 |
| 3 | COO | 3 |
| 4 | Financial Processing Supervisor | 6 |
| 5 | Staffing Personnel | 7 |
| 6 | Account User | 5 |
| 7 | Project User | 8 |
| 8 | Chief Counsel | 4 |

TABLE 12

Exemplary Vendor Contacts (tblVendorContacts)

| Column Name | Data Type | Length |
|---|---|---|
| VendorContactID | int | 4 |
| vcVendorContactGUID | uniqueidentifier | 16 |
| vcPermissionLevel | int | 4 |
| vcContactTypeID | int | 4 |
| vcFirstName | varchar | 50 |
| vcLastName | varchar | 50 |
| vcPositionTitle | varchar | 100 |
| vcSalutation | varchar | 50 |
| vcAddress1 | varchar | 50 |
| vcAddress2 | varchar | 50 |
| vcCity | varchar | 50 |
| vcState | varchar | 50 |
| vcCountryID | varchar | 50 |
| vcPostalCode | varchar | 20 |
| vcEmail | varchar | 50 |
| vcVendorID | int | 4 |
| vcLoginName | varchar | 50 |
| vcPassword | varchar | 50 |
| vcStatusID | int | 4 |
| vcDateExpire | datetime | 8 |
| vcInternationalFlag | varchar | 50 |

TABLE 13

Exemplary Vendor Roles Permissions (tblVendorRolePermissions)

| Column Name | Data Type | Length |
|---|---|---|
| ASP_Object_ID | int | 4 |
| VendorContactTypeID | int | 4 |
| Write_Access | char | 1 |
| Read_Access | char | 1 |
| Current_Status_ID | int | 4 |
| Record_ID | int | 4 |

Figure 13A:
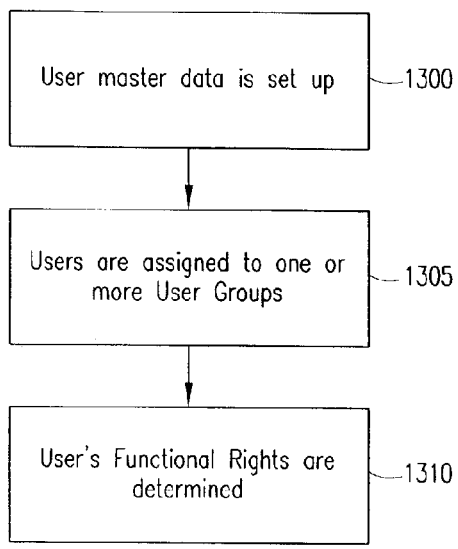
FIGS. 13A and 13B are flowcharts illustrating exemplary steps for managing workflow pertaining to a bid or project transaction based on user roles, in accordance with embodiments of the present invention.
Figure 13B:
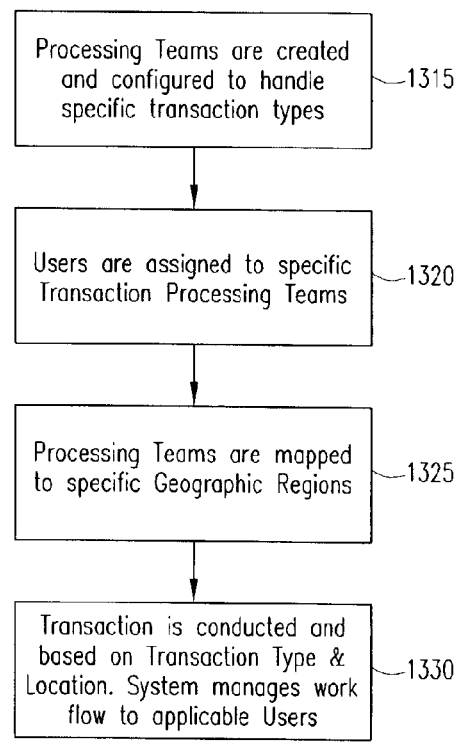

For the administrator, user role positions can be defined to enable entire processing teams and team members to be specified in order to administer transactional activity associated with specific bid types and for specific locations. Referring now to FIGS. 13A-13B, exemplary steps for implementing an administrative processing team are shown. Initially, an administrative user table for the administrator is established containing administrative user master data (step 1300). From the user table, various users can be assigned to one or more user groups and the mapping of users to user groups can be stored in a user group mapping table (step 1305). The user groups can be associated with business units within a company or transaction types or both. For each of the user groups, the functional rights and responsibilities of each user within the user group can be defined in a user group rights table (step 1310). For example, each user can be assigned access rights (as discussed above in connection with FIG. 10) for the user group. Examples of data structures implementing user groups and user group rights for the administrator are shown in Tables 14-19 hereinbelow. However, it should be understood that other administrator user role configurations can be included, and the system is not limited to the specific administrator user role configurations listed in Tables 14-19.

TABLE 14

Exemplary Administrative User Table

| Column Name | Data Type | Length |
|---|---|---|
| Administrative_ID | int | 4 |
| mLastName | varchar | 50 |
| mFirstName | varchar | 50 |

TABLE 14-continued

Exemplary Administrative User Table

| Column Name | Data Type | Length |
|---|---|---|
| Middle_Initial | varchar | 50 |
| Job_Title_ID | int | 4 |
| mloginName | varchar | 10 |
| mPassword | varchar | 10 |
| Permission | varchar | 50 |
| Phone | varchar | 50 |
| Fax | varchar | 50 |
| mEmail | varchar | 50 |
| Home_Address1 | varchar | 50 |
| Home_Address2 | varchar | 50 |
| City | varchar | 50 |
| State | varchar | 50 |
| Zip | varchar | 20 |
| Home_Phone | varchar | 50 |
| Mobile_Phone | varchar | 50 |
| Location_ID | int | 4 |
| Date_of_Birth | smalldatetime | 4 |
| Social_Security_No | varchar | 20 |
| Date_Start_with_Administrator | smalldatetime | 4 |
| Date_Start_with_Buyer | smalldatetime | 4 |
| Schooling_ID | int | 4 |
| Technical_Certifications | varchar | 50 |
| Primary_Language_ID | int | 4 |
| Secondary_Language_ID | int | 4 |
| MS_Excel_Proficiency | int | 4 |
| MS_Access_Proficiency | int | 4 |
| MS_Word_Proficiency | int | 4 |
| MS_PowerPoint_Proficiency | int | 4 |
| Application_Efficiency | int | 4 |
| Communication_Skills_ID | int | 4 |
| mActive | char | 1 |
| Supervisor | int | 4 |
| Last_Eval_Date | smalldatetime | 4 |
| Next_Eval_Date | smalldatetime | 4 |
| Employee_Type_ID | int | 4 |

TABLE 15

Exemplary Administrative User Group Table Values

| Admin_User_Group_ID | Admin_User_Group_Name |
|---|---|
| 1 | General_Administration |
| 2 | Business_Support |
| 3 | Customer_Service |
| 4 | Requisition_Transaction_Processors |
| 5 | Staff_Management |
| 6 | Staff_Professional |
| 7 | Supplier_Management |
| 8 | Systems_Admin |
| 9 | Application_Support |
| 10 | Financial_Processors |
| 12 | RFX_Transaction_Processors |

TABLE 16

Exemplary Administrative User to User Group Mapping Table

| Column Name | Data Type | Length |
|---|---|---|
| Administrative_ID | Int | 4 |
| User_Group_ID | Int | 4 |
| Record_ID | int | 4 |
| Date_Created | datetime | 8 |
| Creator_ID | int | 4 |
| Current_Status_ID | int | 4 |
| Last_Edit_Date | datetime | 8 |
| Last_Edited_By | int | 4 |

TABLE 17

Exemplary Administrative User Group Rights Table

| Column Name | Data Type | Length |
|---|---|---|
| ASP_Page_ID | int | 4 |
| User_Group_ID | int | 4 |
| Record_ID | int | 4 |
| Read_Access | char | 1 |
| Write_Access | char | 1 |

Once the user groups have been ascertained, as shown in FIG. 13B, processing teams can be created within the user groups to handle specific transaction types (step 1315). All of the users within a particular user group can be mapped to specific processing teams and assigned a routing order for the particular transaction type (step 1320). Exemplary data structures for creating and mapping users to processing teams are shown in Tables 18 and 19 hereinbelow.

TABLE 18

Exemplary Administrative Processing Teams Table

| Column Name | Data Type | Length |
|---|---|---|
| Team_ID | int | 4 |
| Team_Name | varchar | 50 |
| Staff_Supplementation | char | 1 |
| Project_Work | char | 1 |
| RFX_Processing | char | 1 |
| Requisition_Processing | char | 1 |
| Invoice_Processing | Char | 1 |
| Help_Desk_Processing | Char | 1 |
| Quality_Assurance_Processing | Char | 1 |
| Created_By | Int | 4 |
| Last_Edited_By | Int | 4 |
| Last_Edit_Date | Datetime | 8 |
| Current_Status_ID | Int | 4 |

TABLE 19

Exemplary Administrative Processing Teams to User Mapping Table

| Column Name | Data Type | Length |
|---|---|---|
| Administrative_ID | Int | 4 |
| Team_ID | int | 4 |
| Date_Created | datetime | 8 |
| Record_ID | int | 4 |
| Created_By | int | 4 |
| Current_Status_ID | int | 4 |
| Last_Edited_By | int | 4 |
| Last_Edit_Date | datetime | 8 |

In addition, processing teams can be mapped to specific geographic regions, so that different processing teams can handle the same type of transaction in different regions (step 1325). Therefore, when a particular type of transaction is conducted in a particular location, the system can manage the workflow to the appropriate users based on the transaction type and location (step 1330). For example, the appropriate users can be notified of the transaction via an e-mail and/or dashboard update.

Thus, the user role management supported by the system of the present invention provides a flexible, scalable and robust work-sharing environment for the entire bid/project process from bid creation to project completion. In addition, the system enables secure communications and transaction processing based upon user roles, which enables users to interface with the correct personnel at the right times while insuring that data view and access rights are limited to those users that have a functional need for the access.

Bid Activity

After the pre-bid activity is completed, a buyer can create and transmit a bid request to one or more vendors to solicit a bid response from the vendors for a particular project. To facilitate the bid process in the context of a complete bid/project process, bid templates can be used for specific project types to solicit the requisite information from vendors for the specific project type in a uniform and comprehensive manner to enable efficient and effective evaluation of bid responses.

Figure 15:
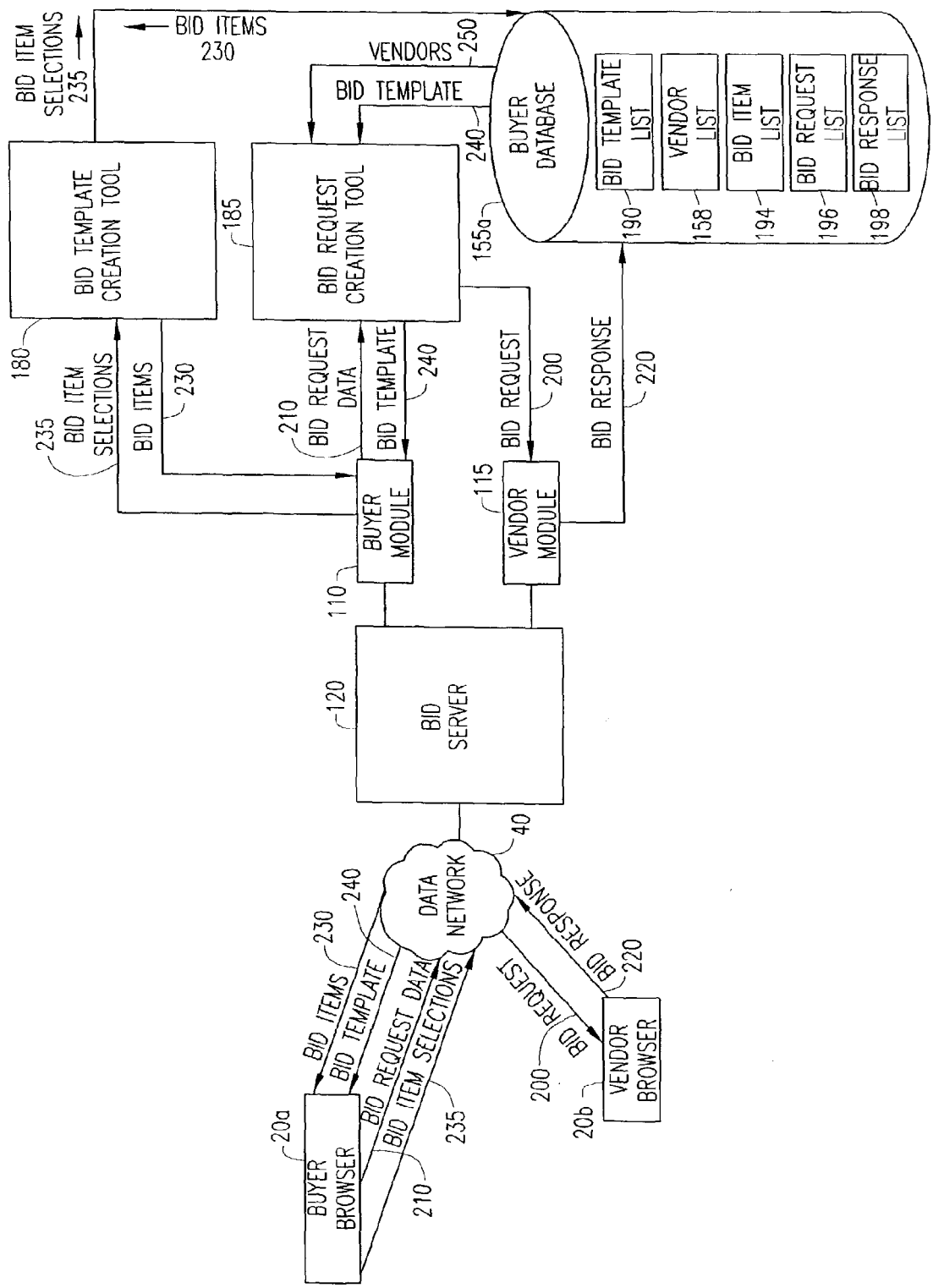
FIG. 15 a data flow diagram illustrating a bid template creation tool and bid request creation tool for generating a bid request for a particular project, in accordance with embodiments of the present invention.
Figure 16:
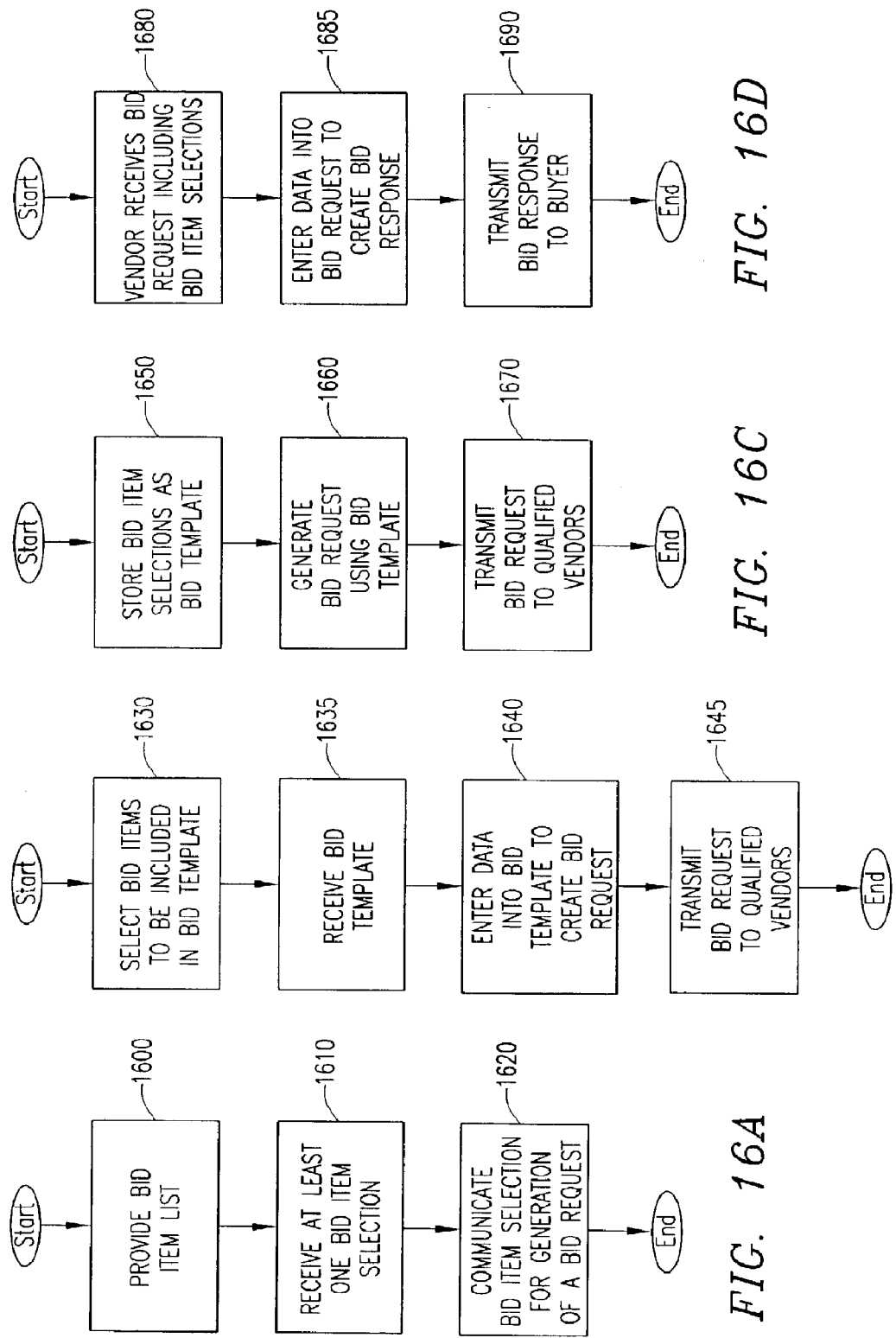
FIGS. 16A-16D are flowcharts illustrating exemplary steps for creating a bid template, a bid request from the bid template and a bid response from the bid request.

Exemplary functionality for creating a bid request utilizing a bid template is shown in FIG. 15. A bid template creation tool 180 and bid request creation tool 185 are illustrated in FIG. 15 for the creation of bid templates 240 and bid requests 200 from the bid templates 240, respectively, in accordance with embodiments of the present invention. The bid template creation tool 180 and bid request creation tool 185 can include any hardware, software and/or firmware required to perform the functions of the tools, and can be implemented within the web server 120 or an additional server (not shown). Each buyer can create one or more bid templates 240, depending on the nature of project work outsourced by the buyer. For example, if the buyer has a need for staff supplementation in only one department, the buyer may create only one bid template 240 to handle the staff supplementation bid requests 200.

To create a bid template 240, the bid template creation tool 180 accesses the buyer database 155a to retrieve bid items 230 within a bid item list 194 and provides the buyer with the bid item list 230 via the buyer module 110, web server 120, data network 40 and buyer browser 20a for the buyer to choose from. The bid items 230 are associated with specific types of information to be solicited from the buyer, vendor or both. From the list of bid items 230, the buyer selects and provides one or more bid item selections 235 for inclusion in a bid template 240. Depending on buyer configurations, one or more of the bid items 230 may be mandatory for the bid template 240, such as the name of the buyer, location of the work to be performed and type of project work requested. For one or more of the mandatory bid items 230, in addition to including the mandatory bid items 230 in the bid template 240, the specific information associated with each of the mandatory bid items 230 can also be included in fields associated with the mandatory bid items 230 within the bid template 240. For example, the buyer name and project work type can be stored in the bid template 240 for that project work type. Each bid template 240 created by the buyer is stored in the buyer database 155a within a bid template list 190 for later use in creating a bid request 200.

To create a bid request 200, the bid request creation tool 185 accesses the buyer database 155a to retrieve the bid templates 240 stored within the bid template list 190 and provides a list of bid templates 240 to the buyer via the buyer module 110, web server 120, data network 40 and buyer browser 20a for the buyer to choose from. Upon selecting an appropriate bid template 240, the buyer provides bid request data 210 to the bid request creation tool 185 for inclusion in a bid request 200 of the bid template 240 type. For example, the buyer can enter bid request data 210 into provided fields for each bid item selection 235 that requires information from the buyer within the bid template 240. By way of example, but not limitation, the bid request data 210 could include the location of work to be performed, the timing of the project and the specific vendor qualifications necessary for the project.

The bid request creation tool 185 further interfaces with the buyer database 155a to access the vendor list 158 for the buyer and determine the appropriate vendors to receive the bid request. The appropriate vendors can be selected based on the bid template 240 type and any other vendor qualifications included within the bid request 200 itself. Thus, the vendor list 158 can be separated into pre-qualified vendors for bid template 240 types to further reduce processing time when submitting bid requests 200. The bid request creation tool 185 further uses vendor contact information 250 associated with the selected vendors to broadcast (transmit) the bid request 200 to the appropriate vendors (as shown in FIGS. 1 and 2) via the vendor module 115, web server 120, data network 40 and vendor browser 20b, and stores the submitted bid request 200 in a bid request list 196 for the buyer.

Vendor bid responses 220 received from solicited vendors (as shown in FIGS. 1 and 2) can further be stored in the buyer database 155a in a bid response list 198 for later use in comparing and grading vendor bid responses 220. The vendor bid responses 220 are generated from the bid items included in the bid request 200. Specifically, the vendor populates data associated with the vendor and the bid response in data fields within enabled bid items in the bid request 200. Vendors access the bid request 200 via the vendor module 115 to view the bid request and complete the vendor response and submit completed bid responses 220 via the vendor module 115 for storage in the buyer database 155a via the buyer module 110 (step not shown). The bid response 220 can include data retrieved from a vendor database 115b (not shown) and can be stored in the vendor database 155b during and after the bid response creation.

Exemplary steps for creating a bid template, a bid request from the bid template and a bid response from the bid request from various system perspectives are shown in FIGS. 16A-16D. The main processing steps performed at the system for bid template creation are shown in FIG. 16A. The system creates a bid template by providing a buyer user a list of predetermined bid items (step 1600). In response thereto, the system receives one or more bid item selections from the bid item list for inclusion within a bid template stored within the system (step 1610). To create a bid request from the bid template, the system communicates the bid item selections within the bid template to the buyer user for generation of the bid request using the bid item selections (step 1620).

In FIG. 16B, at the buyer side, upon receipt of the bid item list, to create the bid template, the buyer user selects one or more bid items to be included in the bid template (step 1630). For subsequent generation of a bid request, the buyer user receives the bid template including the bid item selections (step 1635) and enters bid request data into fields associated with the bid item selections in the bid template to create the bid request (step 1640). After all applicable bid item selection fields have been completed by the buyer user, the bid request is transmitted to the system for broadcasting to qualified vendors (step 1645).

The main processing steps performed by the system for bid request generation and broadcasting are shown in FIG. 16C. After the creation of a bid template and the storage of the bid item selections for the bid template (step 1650), the system generates a bid request using bid request data entered by the buyer user for the bid request of the bid template type (step 1660). Thereafter, the system transmits the generated bid request to qualified vendors for solicitation of a bid response of the bid template type (step 1670).

In FIG. 16D, at the vendor side, the vendor receives the bid request including the enabled bid item selections selected by the buyer (step 1680). To create a bid response, a vendor user enters bid response data into fields associated with the bid item selections included in the bid request (step 1685) to create the bid response. After all applicable bid item selection fields have been completed by the vendor user, the bid response is transmitted to the system for forwarding to the buyer (step 1690).

Examples of data structures used for creating the bid templates are shown in Tables 20-25 hereinbelow. The data structures are illustrated for simplicity as being organized in a table format, with each table including all of the fields necessary for displaying bid items to the buyer user to select from and storing bid item selections for bid templates. The tables are related in a hierarchical and relational manner, as will be described hereinbelow in connection with FIG. 17. However, it should be understood that other bid template configurations can be included, and the system is not limited to the specific bid template configuration shown in Tables 20-25 and FIG. 17.

TABLE 20

Base Bid Items Section Table (tblRFXBidSections)

| Column Name | Data Type | Length |
|---|---|---|
| RFX_Section_ID | Int | 4 |
| RFX_Section | Varchar | 255 |
| ASP_Section_Display_Order | Numeric | 9 |
| Label_Comments | Varchar | 1000 |

TABLE 21

Base Bid Items Category Table (tblRFXBidCategories)

| Column Name | Data Type | Length |
|---|---|---|
| RFX_Category_ID | Int | 4 |
| RFX_Category | Varchar | 255 |
| RFX_Section_ID | Int | 4 |
| ASP_Category_Display_Order | Numeric | 9 |
| Label_Comments | Varchar | 1000 |

TABLE 22

Base Bid Items Table (tblRFXBidItems)

| Column Name | Data Type | Length |
|---|---|---|
| RFX_Item_ID | Int | 4 |
| RFX_Item | Varchar | 255 |
| Disablement_Allowed | Char | 1 |
| Supplier_Bid_Display | Char | 1 |
| Supplier_Response_Item | Char | 1 |
| RFX_Category_ID | Int | 4 |
| HM_Data_Type | Varchar | 255 |
| HM_Field_Length | Varchar | 255 |
| ASP_Item_Display_Order | Numeric | 9 |
| AV_Response_Data_Type | Varchar | 255 |
| AV_Field_Length | Varchar | 255 |

TABLE 23

Base Bid Template Type Table (tblRFXBidTemplates)

| RFX_Template_ID | RFX_Template |
|---|---|
| 1 | Project_RFP |
| 2 | Project_RFQ |
| 3 | Bulk_Staffing_RFQ |
| 4 | Regular_Staff_Supplementation |

TABLE 24

Base Bid Template To Bid Items Mapping Table (tblFRXTemplateItemMatrix)

| Column Name | Data Type | Length |
|---|---|---|
| RFX_Item_ID | Int | 4 |
| RFX_Template_ID | int | 4 |

TABLE 25

Base Client Bid Item Default Values Table (tblRFXBidItemsCDV)

| Column Name | Data Type | Length |
|---|---|---|
| RFX_Item_ID | int | 4 |
| Client_Default_Value | varchar | 7500 |

Figure 17:
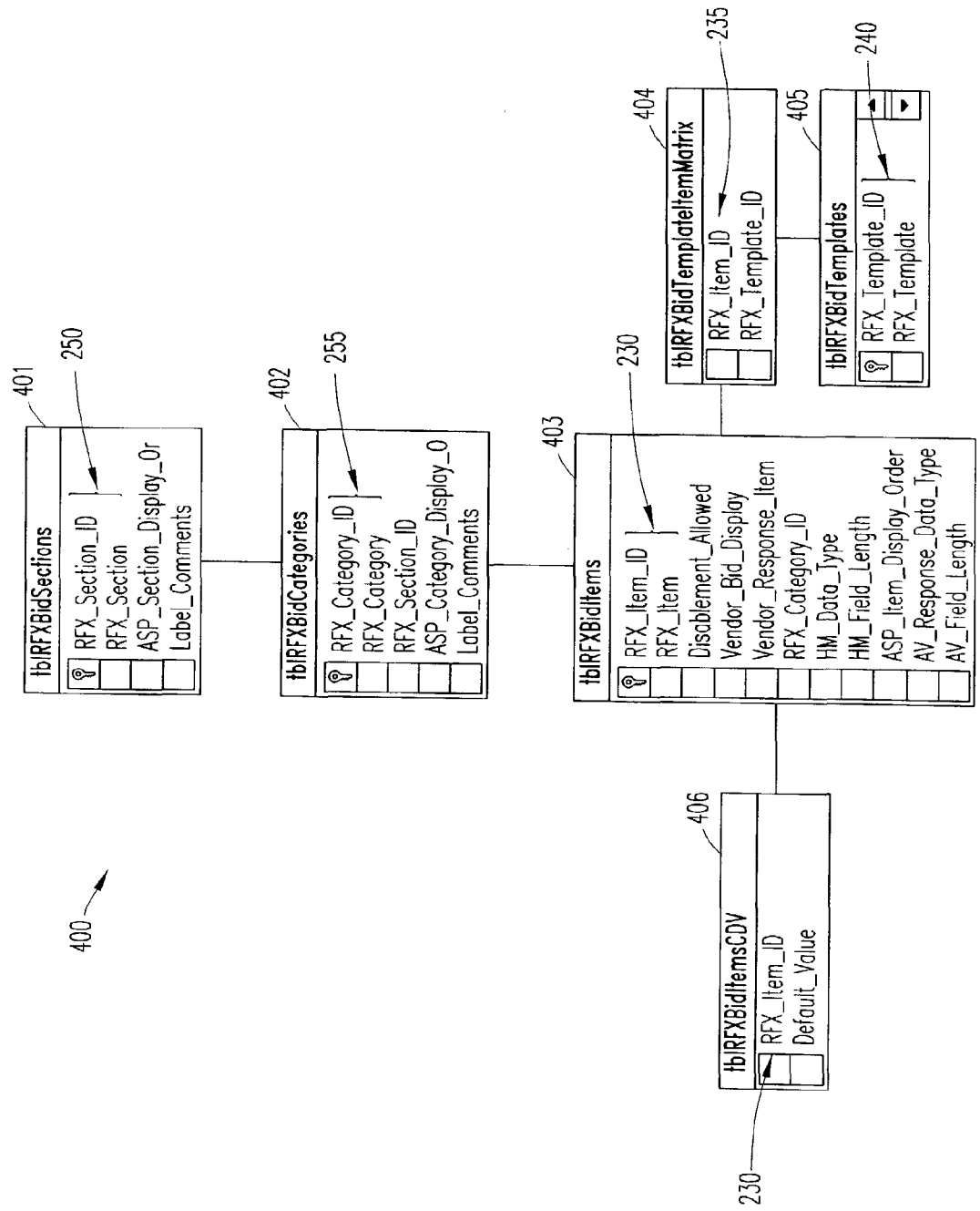
FIG. 17 is a database table view illustrating a hierarchical bid item list from which bid templates can be created

Referring now to FIG. 17, a database table structure 400 illustrating the interrelation between each of the above Tables 20-25 is shown. The bid items 230 are shown organized into bid sections and bid categories for convenience and logical business information processing segmentation when creating the bid templates 240. Thus, the buyer user is presented with bid sections 250, from which the buyer user can select a bid category 255 to display the bid items 230 associated with that bid category 255. Breaking the bid items 230 down into bid categories 255 and bid sections 250 fosters a compartmentalized format that is easily understood by the buyer user, thereby enabling a more efficient and effective bid template creation process.

The table "tblRFXBidSections" 401, which has the form of Table 20 above, includes the bid section name and identification of each section 250 of bid items 230, along with an indication of the display order for each bid section 250 on a web page and any comments to be included with the bid section 250 on the web page. Each bid section 250 can be stored as a separate record in table "tblRFXBidSections" 401, with each record having the form of Table 20. Within each bid section 250 are one or more bid categories 255. The table "tblRFXBidCategories" 402, which has the form of Table 21 above, includes the category name, the identification number of each bid category 255 and the associated bid section 250 for each bid category 255. In addition, the table "tblRFXBidCategories" 402 further includes the display order for each bid category 255 on a web page and any comments to be included with the bid category 255 on the web page. Each bid category 255 can be stored as a separate record in table "tblRFXBidCategories" 402, with each record having the form of Table 21.

Each bid category 255 further includes one or more bid items 230 associated with the bid category 255. Therefore, the table "tblRFXBidItems" 403, which has the form of Table 22 above, includes the bid item name and identification number, along with the bid category 255 associated with the bid item 230. A separate record for each bid item 230 can be stored in table "tblRFXBidItems" 403, with each record having the form of Table 22 above. The table "tblRFXBidItems" 403 further includes additional information pertaining to the bid item 230, such as whether or not disablement of the bid item 230 is allowed, whether the bid item 230 is displayed to the vendor, whether the bid item 230 requires a vendor response, the type of data entered by the buyer for the bid item 230, the field length for the data entered by the buyer for the bid item 230; the type of data entered by the vendor for the bid item 230 and the field length for the data entered by the vendor for the bid item 230. For example, the following Table 26 illustrates sample bid items 230 in the table "tblRFXBidItem" 403 making up a bid item list 194, as shown in FIG. 15.

TABLE 26

| RFX_Item_ID | RFX_Item | Disablement_Allowed | Vendor_Bid_Display | Vendor_Response_Item |
|---|---|---|---|---|
| 1 | Company/Organization_Information | N | Y | N |
| 2 | Purpose_of_the_RFP | N | Y | N |
| 3 | Business_Strategy/Objectives | N | Y | N |
| 4 | Business_Infrastructure | Y | Y | N |
| 5 | Business_Processes | Y | Y | N |
| 6 | Business_Systems | Y | Y | N |
| 7 | Internal/External_Clients | Y | Y | N |
| 8 | Affected_Departments | Y | Y | N |
| 9 | Project_Ownership/Management_Considerations | N | Y | N |
| 10 | Product_Ownership/Licensing_Considerations | N | Y | N |
| 11 | Project_Work_Location_Considerations | N | Y | N |
| 12 | Project_Phasing_Consdierations | Y | Y | N |
| 13 | Project_Phasing_Schedule | Y | Y | N |
| 14 | Project_Resource_Considerations | Y | Y | N |
| 15 | HM_Staffing_Resource_Profiles | N | Y | N |
| 16 | Resource_Backfill Considerations/Requirements | N | Y | N |
| 17 | Project_Resource_Travel_Considerations | N | Y | N |
| 18 | Handling_Of_Projcet_Resource_Expenses_Considerations | N | Y | N |
| 19 | Regulatory/Industry_Standards_Compliance_Considerations | Y | Y | N |
| 20 | Specific_Equipment/Tooling_Considerations | Y | Y | N |
| 21 | Specific__Economic_Considerations | Y | Y | N |
| 22 | Statement_Of_Work | N | Y | N |
| 23 | Non-Deliverable_Penalties | N | Y | N |
| 24 | Supplier_Incentive_Bonus | Y | Y | N |
| 25 | Statement_of_Confidentialty | N | Y | N |
| 26 | RFP_Organization/Contacts | Y | Y | N |
| 27 | RFP_Response_Requirements | N | Y | N |
| 28 | RFP_Supplier_Issuance_Date | N | Y | N |
| 29 | Supplier_Acknowledgment_of_Confidentiality_Date | N | Y | N |
| 30 | Supplier_Acknowledgment_of_Response_Intent_Date | Y | Y | N |
| 31 | Supplier_Submission_of_RFX_Questions_Date | Y | Y | N |
| 32 | Client_Posting_of_Answers_Date | Y | Y | N |
| 33 | Supplier_Submission_of_Completed_RFP_Response_Date | N | Y | N |
| 34 | Client_Submission_of_RFP_Response_Questions_Date | Y | Y | N |
| 35 | Supplier_Posting_of_Answers_Date | Y | Y | N |
| 36 | Client_RFX_Evaluation_Completion_Date | N | Y | N |
| 37 | Client_Disposition_to_Suppliers_Date | N | Y | N |
| 38 | RFX_Instructions | N | Y | N |
| 39 | Company_History | Y | Y | Y |
| 40 | Competitive_Analysis | Y | Y | Y |
| 41 | Product/Services_Heritage_Review | Y | Y | Y |
| 42 | Product/Services_Strategy | Y | Y | Y |
| 43 | Technology_Vision | Y | Y | Y |
| 44 | Strategic_Technology_Partners | Y | Y | Y |
| 45 | Track_Record | Y | Y | Y |
| 46 | Project_Management_Philosophy | Y | Y | Y |
| 47 | PMI_Certified_FTEs | Y | Y | Y |
| 48 | Customer_References | Y | Y | Y |
| 49 | Proposal_Narrative | N | Y | Y |
| 50 | Project_Planning/Strategy | N | Y | Y |
| 51 | Project_Phasing | N | Y | Y |
| 52 | Resource_Model | N | Y | Y |
| 53 | Knowledge_Transfer_Plan | Y | Y | Y |
| 54 | Deployment_Plan | N | Y | Y |
| 55 | Customer_Acceptance_Model | N | Y | Y |
| 56 | Resource_Labor_Pricing | N | Y | Y |
| 57 | Resource_Labor_Pricing_Amount | N | Y | Y |
| 58 | Equipment/Tooling_Pricing_Comments | N | Y | Y |
| 59 | Equipment/Tooling_Pricing_Amount | N | Y | Y |
| 60 | Physical_Site_Pricing_Comments | N | Y | Y |
| 61 | Physical_Site_Pricing_Amount | N | Y | Y |
| 62 | Project_Management_Premium_Comments | N | Y | Y |
| 63 | Project_Management_Premium_Amount | N | Y | Y |
| 64 | Intellectual_Property_Premium_Comments | N | Y | Y |
| 65 | Intellectual_Property_Premium_Amount | N | Y | Y |
| 66 | Miscellaneous_Project_Expenses_Comments | N | Y | Y |
| 67 | Miscellaneous_Project_Expenses_Amount | N | Y | Y |
| 68 | Anticipated_Margin | N | Y | Y |
| 69 | Total_Bid_Price | N | Y | Y |
| 70 | Resource_Travel_Expenses_Comments | N | Y | Y |
| 71 | Resource_Living_Expenses_Comments | N | Y | Y |
| 72 | Resource_Per_Diem_Comments | N | Y | Y |
| 73 | Resource_Mileage_Expense_Comments | N | Y | Y |
| 74 | Reimbersable_Miscellaneous_Expense_Comments | N | Y | Y |
| 75 | Capital_Risk_Model_Comments | N | Y | Y |
| 76 | Capital_Risk_Model_Amount | N | Y | Y |
| 77 | Rebate_Model_for_non-deployed_investment | N | Y | Y |
| 78 | Supplier_Payment_Release_Schedule | N | Y | Y |

TABLE 26-continued

| | | | | |
|---|---|---|---|---|
| 79 | Notes_to_MSP | Y | N | N |
| 80 | Notes_to_Supplier | Y | Y | N |
| 81 | Project_Phasing_Acceptance | N | Y | Y |
| 82 | Statement_Of_Work_Acceptance | N | Y | Y |
| 83 | Statement_Of_Work_Proposed_Changes | N | Y | Y |
| 84 | Non-Deliverable_Penalties_Acceptance | Y | Y | Y |
| 85 | Non-Deliverable_Penalties_Proposed_Changes | Y | Y | Y |
| 86 | Customer_Acceptance_Model_Agreement | Y | Y | Y |
| 87 | Customer_Acceptance_Model_Proposed_Changes | Y | Y | Y |
| 88 | Preferred_Customer_Acceptance_Model | Y | Y | N |
| 89 | Agree_To_Confidentiality_Terms | N | Y | Y |
| 90 | Intent_To_Respond | N | Y | Y |
| 91 | Materials_List | Y | Y | Y |
| 92 | Materials_Cost | Y | Y | Y |
| 93 | Desired_Assignment_Start_Date | N | Y | N |
| 94 | Desired_Assignment_End_Date | N | Y | N |

| RFX_Item_ID | RFX_Item | RFX_Category_ID | HM_Data_Type | HM_Field_Length |
|---|---|---|---|---|
| 1 | Company/Organization_Information | 1 | LongText | 5000 |
| 2 | Purpose_of_the_RFP | 2 | LongText | 5000 |
| 3 | Business_Strategy/Objectives | 3 | LongText | 5000 |
| 4 | Business_Infrastructure | 4 | LongText | 5000 |
| 5 | Business_Processes | 4 | LongText | 5000 |
| 6 | Business_Systems | 4 | LongText | 5000 |
| 7 | Internal/External_Clients | 4 | LongText | 5000 |
| 8 | Affected_Departments | 4 | LongText | 5000 |
| 9 | Project_Ownership/Management_Considerations | 5 | LongText | 5000 |
| 10 | Product_Ownership/Licensing_Considerations | 5 | LongText | 5000 |
| 11 | Project_Work_Location_Considerations | 5 | LongText | 5000 |
| 12 | Project_Phasing_Consdierations | 5 | LongText | 5000 |
| 13 | Project_Phasing_Schedule | 5 | HM Hyperlink to Sub-Table ASP | |
| 14 | Project_Resource_Considerations | 5 | Long Text | 5000 |
| 15 | HM_Staffing_Resource_Profiles | 5 | HM Hyperlink to Sub-Table ASP | |
| 16 | Resource_Backfill Considerations/Requirements | 5 | Text | 1000 |
| 17 | Project_Resource_Travel_Considerations | 5 | Text | 1000 |
| 18 | Handling_Of_Projcet_Resource_Expenses_Considerations | 5 | LongText | 5000 |
| 19 | Regulatory/Industry_Standards_Compliance_Considerations | 5 | LongText | 5000 |
| 20 | Specific_Equipment/Tooling_Considerations | 5 | LongText | 5000 |
| 21 | Specific__Economic_Considerations | 5 | LongText | 5000 |
| 22 | Statement_Of_Work | 6 | LongText | 5000 |
| 23 | Non-Deliverable_Penalties | 7 | LongText | 5000 |
| 24 | Supplier_Incentive_Bonus | 8 | LongText | 5000 |
| 25 | Statement_of_Confidentialty | 9 | LongText | 5000 |
| 26 | RFP_Organization/Contacts | 10 | LongText | 5000 |
| 27 | RFP_Response_Requirements | 11 | LongText | 5000 |
| 28 | RFP_Supplier_Issuance_Date | 12 | date time | |
| 29 | Supplier_Acknowledgment_of_Confidentiality_Date | 12 | date time | |
| 30 | Supplier_Acknowledgment_of_Response_Intent_Date | 12 | date time | |
| 31 | Supplier_Submission_of_RFX_Questions_Date | 12 | date time | |
| 32 | Client_Posting_of_Answers_Date | 12 | date time | |
| 33 | Supplier_Submission_of_Completed_RFP_Response_Date | 12 | date time | |
| 34 | Client_Submission_of_RFP_Response_Questions_Date | 12 | date time | |
| 35 | Supplier_Posting_of_Answers_Date | 12 | date time | |
| 36 | Client_RFX_Evaluation_Completion_Date | 12 | date time | |
| 37 | Client_Disposition_to_Suppliers_Date | 12 | date time | |
| 38 | RFX_Instructions | 13 | LongText | 5000 |
| 39 | Company_History | 14 | Text | 1000 |
| 40 | Competitive_Analysis | 14 | Text | 1000 |
| 41 | Product/Services_Heritage_Review | 14 | Text | 1000 |
| 42 | Product/Services_Strategy | 14 | Text | 1000 |
| 43 | Technology_Vision | 14 | Text | 1000 |
| 44 | Strategic_Technology_Partners | 14 | 'Text | 1000 |
| 45 | Track_Record | 14 | Text | 1000 |
| 46 | Project_Management_Philosophy | 14 | Text | 1000 |
| 47 | PMI_Certified_FTEs | 14 | Text | 1000 |
| 48 | Customer_References | 14 | Text | 1000 |
| 49 | Proposal_Narrative | 15 | Text | 1000 |
| 50 | Project_Planning/Strategy | 15 | Text | 1000 |
| 51 | Project_Phasing | 15 | Text | 1000 |
| 52 | Resource_Model | 15 | Text | 1000 |
| 53 | Knowledge_Transfer_Plan | 15 | Text | 1000 |
| 54 | Deployment_Plan | 15 | Text | 1000 |
| 55 | Customer_Acceptance_Model | 15 | Text | 1000 |
| 56 | Resource_Labor_Pricing | 16 | Text | 1000 |
| 57 | Resource_Labor_Pricing_Amount | 16 | Text | 1000 |

TABLE 26-continued

| | | | | |
|---|---|---|---|---|
| 58 | Equipment/Tooling_Pricing_Comments | 16 | Text | 1000 |
| 59 | Equipment/Tooling_Pricing_Amount | 16 | Text | 1000 |
| 60 | Physical_Site_Pricing_Comments | 16 | Text | 1000 |
| 61 | Physical_Site_Pricing_Amount | 16 | Currency | |
| 62 | Project_Management_Premium_Comments | 16 | Text | 1000 |
| 63 | Project_Management_Premium_Amount | 16 | Currency | |
| 64 | Intellectual_Property_Premium_Comments | 16 | Text | 1000 |
| 65 | Intellectual_Property_Premium_Amount | 16 | Currency | |
| 66 | Miscellaneous_Project_Expenses_Comments | 16 | Text | 1000 |
| 67 | Miscellaneous_Project_Expenses_Amount | 16 | Text | |
| 68 | Anticipated_Margin | 16 | Text | 1000 |
| 69 | Total_Bid_Price | 16 | Text | 1000 |
| 70 | Resource_Travel_Expenses_Comments | 17 | Text | 1000 |
| 71 | Resource_Living_Expenses_Comments | 17 | Text | 1000 |
| 72 | Resource_Per_Diem_Comments | 17 | Text | 1000 |
| 73 | Resource_Mileage_Expense_Comments | 17 | Text | 1000 |
| 74 | Reimbersable_Miscellaneous_Expense_Comments | 17 | Text | 1000 |
| 75 | Capital_Risk_Model_Comments | 18 | Long Text | 5000 |
| 76 | Capital_Risk_Model_Amount | 18 | | |
| 77 | Rebate_Model_for_non-deployed_investment | 19 | | |
| 78 | Supplier_Payment_Release_Schedule | 20 | Text | 1000 |
| 79 | Notes_to_MSP | 21 | Long Text | 5000 |
| 80 | Notes_to_Supplier | 22 | Long Text | 5000 |
| 81 | Project_Phasing_Acceptance | 15 | | |
| 82 | Statement_Of_Work_Acceptance | 15 | | |
| 83 | Statement_Of_Work_Proposed_Changes | 15 | | |
| 84 | Non-Deliverable_Penalties_Acceptance | 15 | | |
| 85 | Non-Deliverable_Penalties_Proposed_Changes | 15 | Long Text | 5000 |
| 86 | Customer_Acceptance_Model_Agreement | 15 | | |
| 87 | Customer_Acceptance_Model_Proposed_Changes | 15 | Long Text | 5000 |
| 88 | Preferred_Customer_Acceptance_Model | 6 | Long Text | 5000 |
| 89 | Agree_To_Confidentiality_Terms | 14 | Text | 1000 |
| 90 | Intent_To_Respond | 14 | Text | 1000 |
| 91 | Materials_List | 16 | Text | 1000 |
| 92 | Materials_Cost | 16 | Text | 1000 |
| 93 | Desired_Assignment_Start_Date | 12 | date time | |
| 94 | Desired_Assignment_End_Date | 12 | date time | |

| RFX_Item_ID | RFX_Item | Item_Display_Order | AV_Response_Data_Type | AV_Field_Length |
|---|---|---|---|---|
| 1 | Company/Organization_Information | 5 | | |
| 2 | Purpose_of_the_RFP | 5 | | |
| 3 | Business_Strategy/Objectives | 5 | | |
| 4 | Business_Infrastructure | 5 | | |
| 5 | Business_Processes | 10 | | |
| 6 | Business_Systems | 15 | | |
| 7 | Internal/External_Clients | 20 | | |
| 8 | Affected_Departments | 25 | | |
| 9 | Project_Ownership/Management_Considerations | 5 | | |
| 10 | Product_Ownership/Licensing_Considerations | 10 | | |
| 11 | Project_Work_Location_Considerations | 15 | | |
| 12 | Project_Phasing_Consdierations | 20 | | |
| 13 | Project_Phasing_Schedule | 25 | | |
| 14 | Project_Resource_Considerations | 30 | | |
| 15 | HM_Staffing_Resource_Profiles | 35 | | |
| 16 | Resource_Backfill Considerations/Requirements | 40 | | |
| 17 | Project_Resource_Travel_Considerations | 45 | | |
| 18 | Handling_Of_Projcet_Resource_Expenses_Considerations | 50 | | |
| 19 | Regulatory/Industry_Standards_Compliance_Considerations | 55 | | |
| 20 | Specific_Equipment/Tooling_Considerations | 60 | | |
| 21 | Specific__Economic_Considerations | | | |
| 22 | Statement_Of_Work | 5 | | |
| 23 | Non-Deliverable_Penalties | 5 | | |
| 24 | Supplier_Incentive_Bonus | 5 | | |
| 25 | Statement_of_Confidentialty | 5 | | |
| 26 | RFP_Organization/Contacts | 5 | | |
| 27 | RFP_Response_Requirements | 5 | | |
| 28 | RFP_Supplier_Issuance_Date | 5 | | |
| 29 | Supplier_Acknowledgment_of_Confidentiality_Date | 10 | | |
| 30 | Supplier_Acknowledgment_of_Response_Intent_Date | 15 | | |
| 31 | Supplier_Submission_of_RFX_Questions_Date | 20 | | |
| 32 | Client_Posting_of_Answers_Date | 25 | | |
| 33 | Supplier_Submission_of_Completed_RFP_Response_Date | 30 | | |
| 34 | Client_Submission_of_RFP_Response_Questions_Date | 35 | | |
| 35 | Supplier_Posting_of_Answers_Date | 40 | | |
| 36 | Client_RFX_Evaluation_Completion_Date | 45 | | |
| 37 | Client_Disposition_to_Suppliers_Date | 50 | | |
| 38 | RFX_Instructions | 5 | | |
| 39 | Company_History | 5 | Long Text | 5000 |

TABLE 26-continued

| | | | | |
|---|---|---|---|---|
| 40 | Competitive_Analysis | 10 | Long Text | 5000 |
| 41 | Product/Services_Heritage_Review | 15 | Long Text | 5000 |
| 42 | Product/Services_Strategy | 20 | Long Text | 5000 |
| 43 | Technology_Vision | 25 | Long Text | 5000 |
| 44 | Strategic_Technology Partners | 30 | AV Hyperlink to Sub-Table ASP | |
| 45 | Track_Record | 35 | AV Hyperlink to Sub-Table ASP | |
| 46 | Project_Management_Philosophy | 40 | Long Text | 5000 |
| 47 | PMI_Certified_FTEs | 45 | Long Text | 5000 |
| 48 | Customer_References | 50 | AV Hyperlink to Sub-Table ASP | |
| 49 | Proposal_Narrative | 5 | Long Text | 5000 |
| 50 | Project_Planning/Strategy | 10 | Long Text | 5000 |
| 51 | Project_Phasing | 15 | AV Hyperlink to Sub-Table ASP | |
| 52 | Resource_Model | 20 | AV Hyperlink to Sub-Table ASP | |
| 53 | Knowledge_Transfer_Plan | 25 | Long Text | 5000 |
| 54 | Deployment_Plan | 30 | Long Text | 5000 |
| 55 | Customer_Acceptance_Model | 35 | Long Text | 5000 |
| 56 | Resource_Labor_Pricing | 5 | AV Hyperlink to Sub-Table ASP | |
| 57 | Resource_Labor_Pricing_Amount | 10 | Currency | |
| 58 | Equipment/Tooling Pricing_Comments | 15 | Long Text | 5000 |
| 59 | Equipment/Tooling_Pricing_Amount | 20 | Currency | |
| 60 | Physical_Site_Pricing_Comments | 25 | Long Text | 5000 |
| 61 | Physical_Site_Pricing_Amount | 30 | Currency | |
| 62 | Project_Management_Premium_Comments | 35 | Long Text | 5000 |
| 63 | Project_Management_Premium_Amount | 40 | Currency | |
| 64 | Intellectual_Property_Premium_Comments | 45 | Long Text | 5000 |
| 65 | Intellectual_Property_Premium_Amount | 50 | Currency | |
| 66 | Miscellaneous_Project_Expenses_Comments | 55 | Long Text | 5000 |
| 67 | Miscellaneous_Project_Expenses_Amount | 60 | Currency | |
| 68 | Anticipated_Margin | 65 | Currency | |
| 69 | Total_Bid_Price | 70 | Currency | |
| 70 | Resource_Travel_Expenses_Comments | 5 | Long Text | 5000 |
| 71 | Resource_Living_Expenses_Comments | 10 | Long Text | 5000 |
| 72 | Resource_Per_Diem_Comments | 15 | Long Text | 5000 |
| 73 | Resource_Mileage_Expense_Comments | 20 | Long Text | 5000 |
| 74 | Reimbersable_Miscellaneous_Expense_Comments | 25 | Long Text | 5000 |
| 75 | Capital_Risk_Model_Comments | 5 | Long Text | 5000 |
| 76 | Capital_Risk_Model_Amount | 10 | Currency | |
| 77 | Rebate_Model_for_non-deployed_investment | 5 | Long Text | 5000 |
| 78 | Supplier_Payment_Release_Schedule | 5 | Long Text | 5000 |
| 79 | Notes_to_MSP | 5 | | |
| 80 | Notes_to_Supplier | 5 | | |
| 81 | Project_Phasing_Acceptance | 16 | Char | 1 |
| 82 | Statement_Of_Work_Acceptance | 11 | Char | 1 |

TABLE 26-continued

| | | | | |
|---|---|---|---|---|
| 83 | Statement_Of_Work_Proposed_Changes | 12 | Long Text | 5000 |
| 84 | Non-Deliverable_Penalties_Acceptance | 40 | Char | 1 |
| 85 | Non-Deliverable_Penalties_Proposed_Changes | 45 | Long Text | 5000 |
| 86 | Customer_Acceptance_Model_Agreement | 36 | Char | 1 |
| 87 | Customer_Acceptance_Model_Proposed_Changes | 37 | Long Text | 5000 |
| 88 | Preferred_Customer_Acceptance_Model | 6 | Long Text | 5000 |
| 89 | Agree_To_Confidentiality_Terms | 1 | Char | 1 |
| 90 | Intent_To_Respond | 2 | Char | 1 |
| 91 | Materials_List | 16 | AV Hyperlink to Sub-Table ASP | |
| 92 | Materials_Cost | 17 | Currency | |
| 93 | Desired_Assignment_Start_Date | 51 | | |
| 94 | Desired_Assignment_End_Date | 52 | | |

Referring again to FIG. 17, each of the bid items 230 can be disabled or enabled for a particular bid template 240, depending on the type of project work that the bid template 240 is created for. However, as discussed above in connection with FIG. 15, there may be some bid items 230 that are required to be included in one or more bid template 240 types. Therefore, for the required bid items 230, disablement is not allowed. If an entire bid section 250 or bid category 255 is not applicable to a particular bid template 240, the database table structure 400 can be configured to allow the bid items 230 within entire bid sections 250 or bid categories 255 to be disabled, if all of the bid items 230 within that bid section 250 or bid category 255 can be disabled.

Once all of the bid items 230 have been disabled or enabled (bid item selections 235 are enabled bid items) for a particular bid template 240, the bid template 240 and associated bid item selections 235 can be stored in the database table structure 400. The table "tblRFXBidTemplates" 405, which has the form of Table 23 above, includes the bid template name and bid template identification number for use in associating bid item selections 235 with the bid template 240 in the table "tblRFXTemplateItemMatrix" 404, which has the form of Table 24 above. A separate record for each bid template 240 can be stored in table "tblRFXBidTemplates" 405, with each record having the from of Table 23. In addition, a separate record for each bid item selection 235 included within a particular bid template 240 can be stored in table "tblRFX-TemplateItemMatrix" 404, with each record having the form of Table 24.

If there are specific bid items 230 that have a default value applicable to all bid templates 240, such as the buyer name, the default value for that particular bid item 230 can be stored in the table "tblRFXBidItemsCDV" 406, which has the form of Table 25. A separate record for each default value associated with each bid item 230 can be stored in table "tblRFX-BidItemsCDV" 406, with each record having the form of Table 25. By providing selectable bid items in a structured, configurable and scalable format, any bid item 230 can be added or removed at any time depending on the specific needs of the buyer.

Figure 18:
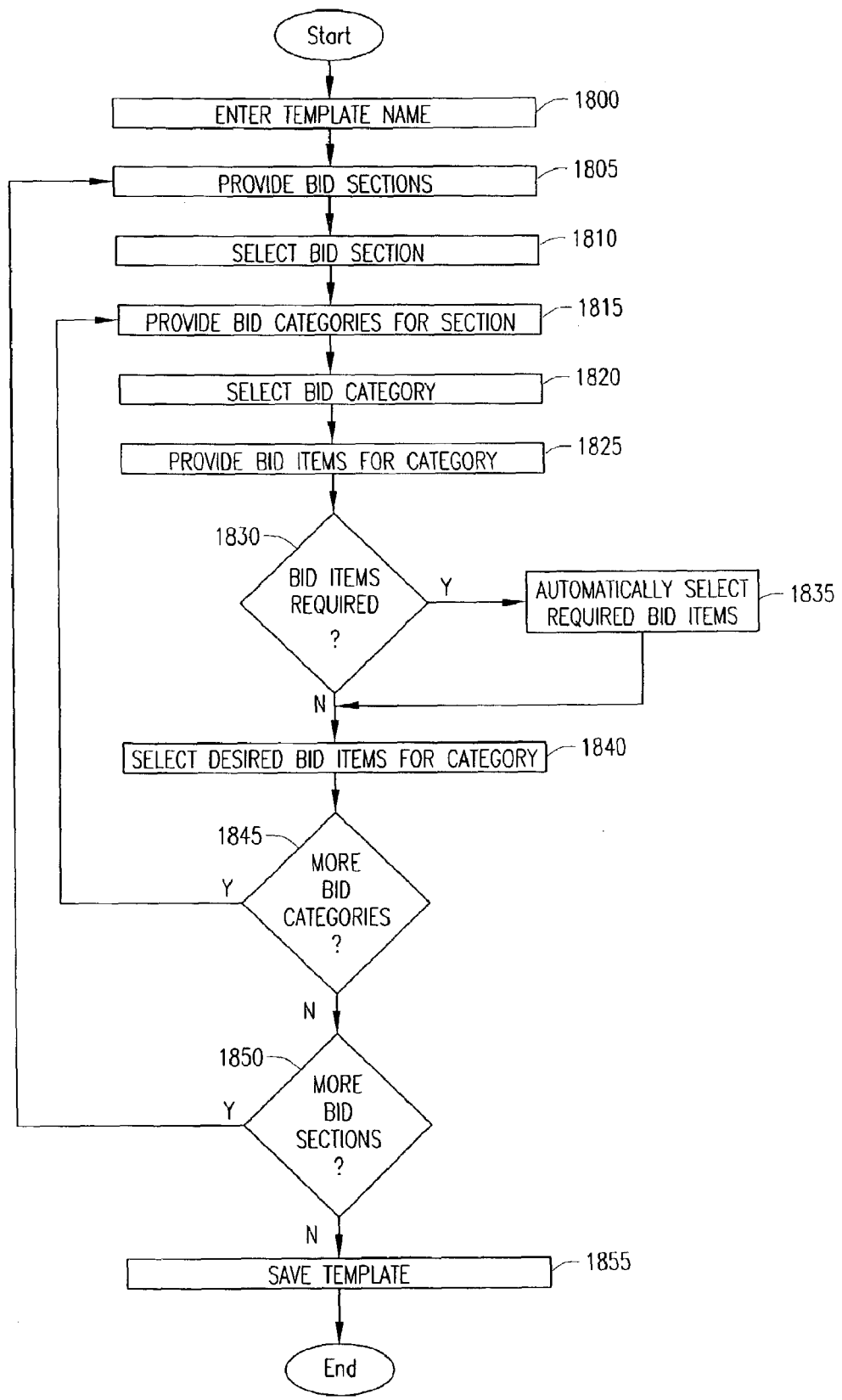
FIG. 18 is a flowchart illustrating exemplary steps for accessing the hierarchical bid item list to create a bid template.

Exemplary steps for creating a bid template using the hierarchical and relational database table structure are illustrated in FIG. 18. To create a bid template, a buyer user enters a name for the template to create a record for the template in the database table structure (step 1800). Thereafter, the buyer user selects a particular bid section from a list of bid sections (steps 1805 and 1810) and a particular bid category from a list of bid categories (steps 1815 and 1820) to begin the process of selecting bid items for inclusion in the bid template (step 1825).

If one or more of the bid items in the selected bid category are required (step 1830), the required bid selections are automatically included in the bid template (step 1835). Other bid items are selected based on the needs of the buyer user for the particular type of bid template (step 1840). This process is repeated for each bid category within the selected bid section (step 1845) and for each bid section within the list of bid sections (step 1850), until all bid items have been reviewed and either enabled (selected) or disabled for the bid template. As discussed above, in other embodiments, all bid items within a bid section or bid category may be able to be disabled without individual bid item review if disablement of all of those bid items is allowed. Once the bid item selections have been made for the bid template, the bid template is stored in the bid template list (step 1855) for later use in creating a bid request.

Figure 19:
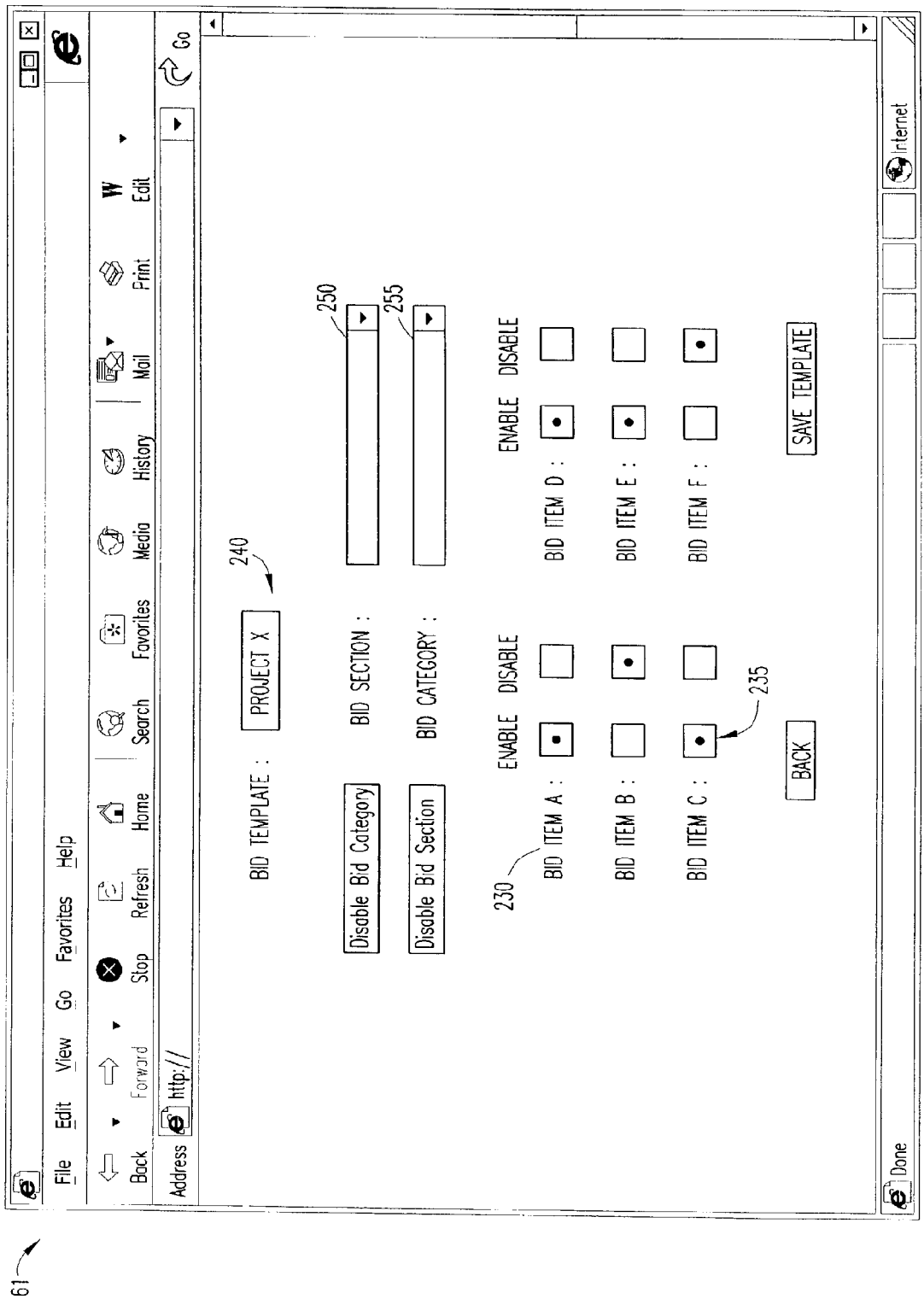
FIG. 19 is a screen shot illustrating the creation of a bid template.

A screen shot of an exemplary web page for creating a bid template is shown in FIG. 19. Using one or more web pages (only one of which is shown), the buyer user can enter the bid template name 240, select a bid section 250 and select a bid category 255 to display specific bid items 230 that may be included in the bid template 240. For each bid item 230 within a displayed bid category 255, the buyer user can select to either enable or disable that bid item 230. However, if a particular bid item 230 cannot be disabled, the disable button is ghosted to prevent the buyer user from disabling the bid item 230. In addition, if the option is available, the buyer user may also be allowed to disable all bid items 230 within a particular bid section 250 or bid category 255 by clicking on a disable button next to the bid section 250 or bid category 255 currently displayed. Once all of the bid items 230 have been enabled or disabled for the bid template 240, the buyer user can save the bid template 240. In some embodiments, the buyer user may be able to temporarily save the bid template 240 if all bid items selections 235 have not yet been completed. In other embodiments, the save button is ghosted until all bid items 230 have been enabled or disabled.

Figure 20:
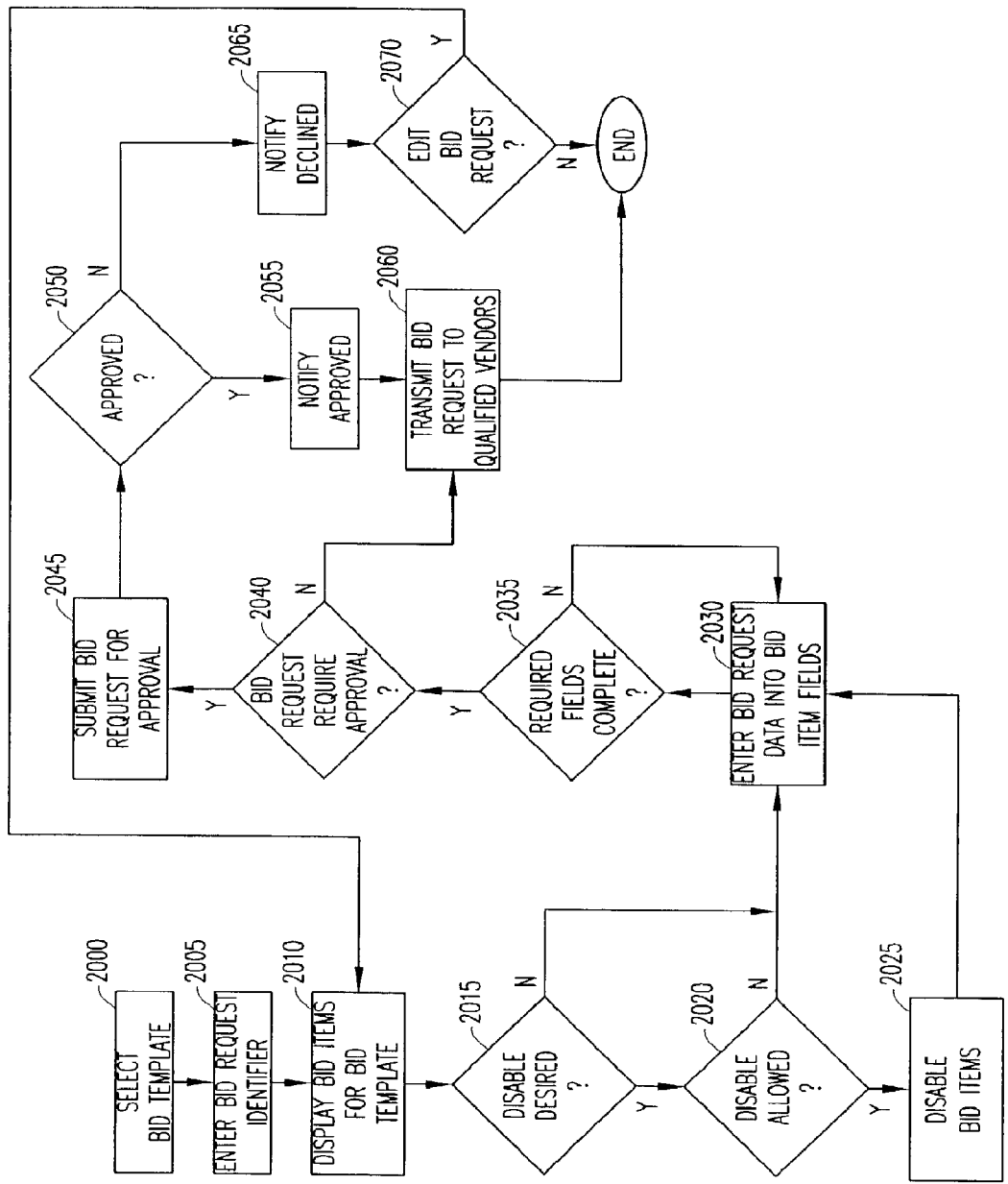
FIG. 20 is a flow chart illustrating exemplary steps for generating a bid request utilizing a bid template, in accordance with embodiments of the present invention.

FIG. 20 illustrates exemplary steps for creating a bid request from a bid template, as shown in FIG. 15, using bid items organized in a hierarchical and relational format, as shown in FIG. 17. Initially, a bid template is selected by a buyer user from the bid template list for the bid request (step 2000). It should be understood that the bid template can be created immediately prior to generation of the bid request or the bid template can be created well in advance of the bid request. After the particular bid template for the bid request is selected, the buyer user enters a bid request identifier for the bid request (step 2005), such as a bid request name or number. In addition, the system will assign a bid tracking number to refer to the bid as it applies throughout the system to the vendor, buyer, contractor and administrator.

All of the bid item selections in the bid template are displayed by bid section and bid category to the buyer user for review (step 2010). If one or more of the bid item selections in the bid template are not applicable to the particular bid request (step 2015), and the undesired bid item selections can be disabled (step 2020), the buyer user can disable those bid item selections that are not needed for the particular bid request (step 2025). Thereafter, the buyer user enters the requisite bid request data into appropriate fields for the bid item selections enabled in the bid request (step 2030). For example, one or more bid item selections may contain a field for the buyer to enter data, such as the location of the work to be performed or the type of project work. These fields can be variable type data fields, such as text-entry fields or selectable options fields with links to other web pages containing the selectable option.

An example of a selectable option field that may be displayed involves the selection of a particular type of project work for the bid request from a number of pre-established project types. To implement the project type selection process, a configurable and scalable database structure can be provided that enables the buyer's specific project work business requirements to be classified in a non-prose fashion. By selecting from pre-established project work types, the buyer can ensure that vendor bid responses are synchronous with the buyer's project work requirements. The project work types can also be selected by the vendor when completing vendor qualification data (shown in FIG. 2) for selecting of vendors to receive the bid request. Examples of data structures used for selecting the project work type are shown in Tables 27-29 hereinbelow. The data structures are illustrated for simplicity as being organized in a table format, with each table including all of the fields necessary for displaying the project work types to the buyer user to select from and storing the selected project work type within the field of the associated bid item selection of the bid request. The tables are related in a hierarchical and relational manner, such that the tables are accessed in a particular order for displaying the project work types to the buyer user.

Table 27 below illustrates sample project services types, such as consulting, staff supplementation and other project services. Within each of the project services types may be one or more project sectors, as shown in Table 28, and within each of the project sectors may be one or more project families, as shown in Table 29. Therefore, to select a particular project work type (project family) for the bid request, the buyer user can select a project services type and project sector type to display a list of project families to select from. It should be understood that other configurations and project types can be included and the system is not limited to the specific configurations and information listed in Tables 27-29.

TABLE 27

Project Services Type Table

| Project_Work_Type_Name | Services_Type_ID | ASP_Display_Order |
|---|---|---|
| Consulting | 1 | 2 |
| Staff_Supplementation | 2 | 3 |
| Project_Services | 3 | 1 |

TABLE 28

Project Sector Type Table

| Project_Section_ID | Project_Sector_Name | ASP_Display_Order | Project_Services_ID |
|---|---|---|---|
| 1 | Consulting/Professional Services | 2 | 1 |
| 2 | Engineering/Construction | 3 | 1 |
| 3 | Technology | 1 | 1 |

TABLE 29

Project Family Type Table

| Project_Family_ID | Project_Family_Name | ASP_Display_Order | Project_Sector_ID |
|---|---|---|---|
| 7 | Enterprise_Resource_Solutions | 5 | 3 |
| 8 | E-Business_Solutions | 10 | 3 |
| 9 | Telecommunications_Solutions | 15 | 3 |
| 10 | Technical_Integration_Solutions | 15 | 3 |
| 11 | Network_Management_Solutions | 25 | 3 |
| 12 | Custom_Software_Development/Engineering | 30 | 3 |
| 13 | Business_Strategy/Planning_Solutions | 5 | 1 |
| 14 | Human_Resource_Solutions | 10 | 1 |
| 15 | Audit/Assurance_Solutions | 15 | 1 |
| 16 | Financial_Advisory_Solutions | 20 | 1 |
| 17 | Tax_Solutions | 25 | 1 |
| 18 | Risk_Management_Solutions | 30 | 1 |
| 19 | Real_Estate_Services | 35 | 1 |
| 20 | Legal_Services | 40 | 1 |
| 21 | Engineering_Services | 5 | 2 |

TABLE 29-continued

Project Family Type Table

| Project_Family_ID | Project_Family_Name | ASP_Display_Order | Project_Sector_ID |
|---|---|---|---|
| 22 | Building/Construction_Services | 10 | 2 |
| 23 | Product_Development | 15 | 2 |

Referring again to FIG. 20, once the buyer user has entered the bid request data into all of the required bid item fields (step 2035), the bid request is complete. It should be understood that not all of the bid item fields require the user to enter bid request data. For example, one or more of the bid item selections may be a vendor bid response bid item selection that only the vendor responds to. For the vendor bid response bid item selections, the buyer user can enable or disable that bid item selection, and does not enter any data into the field for that bid item selection except data that may assist the vendor in completing the bid response for that bid item. For bid request completeness, every enabled bid item selection where the buyer user can enter bid request data is preferably filled out by the buyer user before the bid request is submitted.

In many companies, bid requests must be approved prior to transmission to vendors. Therefore, if the bid request requires approval (step 2040), the originator of the bid request submits the bid request to the appropriate approvers (step 2045). In exemplary embodiments, as discussed above in connection with FIGS. 9-14, the approval user role positions are predesignated for all bid requests or for the particular bid request, so that the bid request is automatically routed to the appropriate approver. If the bid request is approved (step 2050), the originator is informed of the bid request approval (step 2055), and the bid request is transmitted to qualified vendors (step 2060). However, if the bid request is not approved (step 2050), the originator is notified of the bid request declination (step 2065), and provided the opportunity to edit the bid request (step 2070), if possible. For example, the originator may have disabled one or more bid item selections that need to be included in the bid request for approval purposes, or left blank one or more buyer-required data fields. If approval of the bid request is not required (step 2040), the bid request is transmitted to the qualified vendors for the bid request (step 2060).

Figure 22:
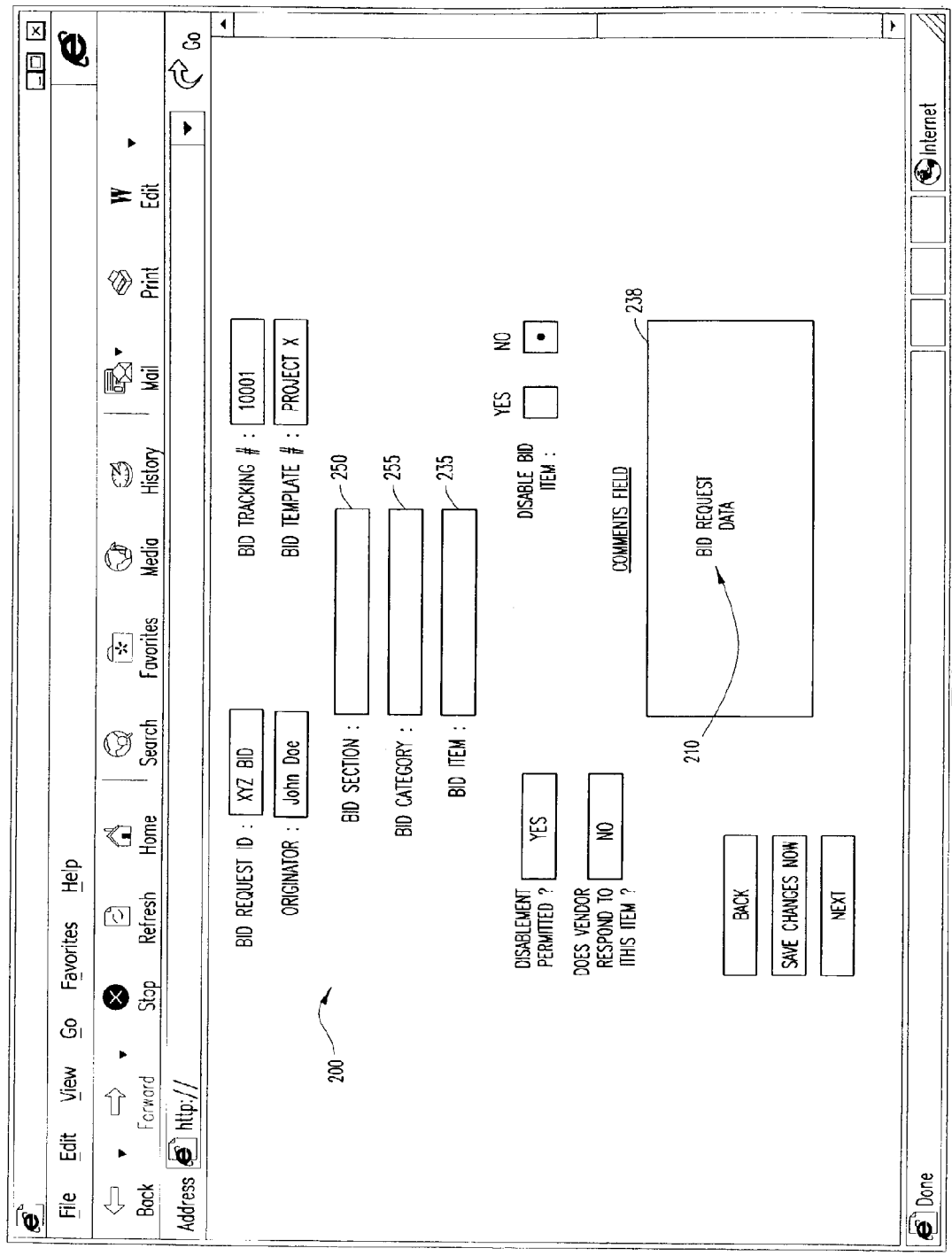

FIGS. 21 and 22 are screen shots of exemplary web pages that can be provided to the buyer user for bid request creation. Using one or more web pages, the buyer user can enter the bid request name 200, select a bid section 250 and select a bid category 255 to display specific bid item selections 230 within the bid category 255 that may be included in the bid request 200. FIG. 21 shows an overview of the status of the bid request 200 listing the number of bid item selections 235 in each section 250 and the number of bid item selections 235 in each section 250 that are completed or disabled. To complete or disable a bid item selection 235, the buyer user can click on the bid section 250 to display the bid categories 255 and bid item selections 235 within each of the bid categories 255. Once all of the bid item selections 235 have been completed or disabled, the buyer user can click on a submit completed bid request button for approval and/or transmission to qualified vendors.

As shown in FIG. 22, each bid item selection 235 in each bid category 255 within each bid section 250 can be reviewed to determine whether or not the bid item selection 235 should be disabled. Some of the bid item selections 235 in one or more of the categories 255 may also require bid request data 210 from the buyer user. For each bid item selection 235 within a bid category 255, the buyer user can either enable or disable that bid item selection 235. However, if a particular bid item selection 235 cannot be disabled, the disable button is ghosted to prevent the buyer user from disabling the bid item selection 235. In addition, if the option is available, the buyer user may also be allowed to disable all bid item selections 235 within a particular bid section 250 or bid category 255. If a bid item selection 235 is enabled and has a field 238 for entering bid request data 210, the buyer user can enter bid request data 210 into the associated data field 238. In addition, if the bid template contains default bid request data 210 for a particular bid item selection 235, the default data 210 can be displayed in the data field 238 and may or may not be allowed to be changed, depending on the template settings.

Figure 23:
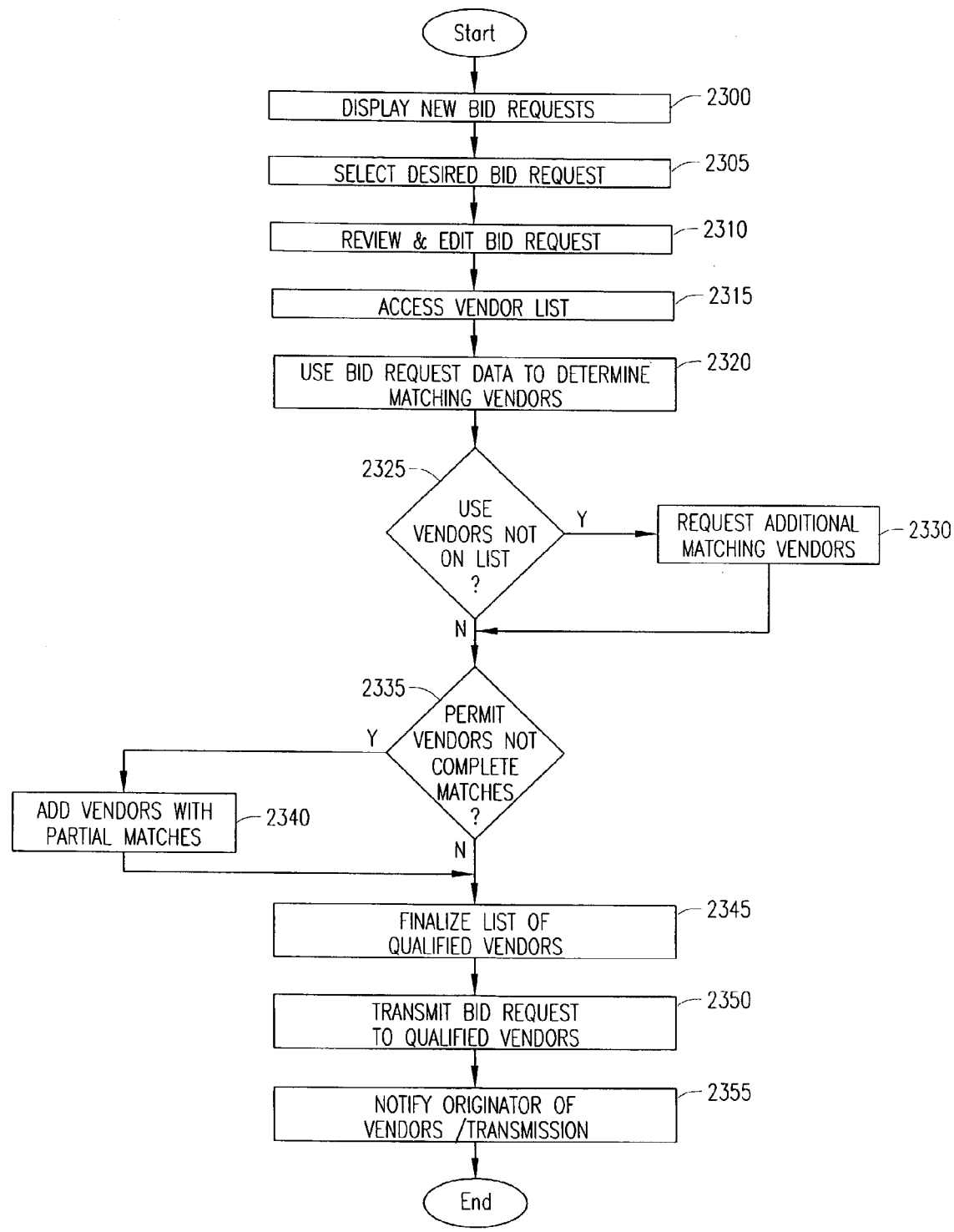
FIG. 23 is a flowchart illustrating exemplary steps for administering the communication of a bid request to qualified vendors.

FIG. 23 illustrates exemplary steps for reviewing and transmitting bid requests to qualified vendors, as shown in FIG. 15. The originator of the bid request can select appropriate qualified vendors from the vendor list based on bid template type and entered bid request data or the bid request can be submitted to a project administrator to choose the qualified vendors, depending on buyer constraints. If the latter, the new bid requests can be displayed to an administrative user (step 2300) to select the desired bid request for review and transmission (step 2305). During the review process, the administrative user may be allowed to edit the bid request for quality control purposes or may request the originator of the bid request to edit the bid request, if significant changes are necessary (step 2310).

Once the bid request is in a completed form, the administrative user accesses the vendor list (step 2315) to determine qualified vendors for the bid request based on the bid template type and entered bid request data (step 2320) (e.g., based on the project family in conjunction with the anticipated geographic work location). If the list of qualified vendors is insufficient (step 2325), the administrative user may also query the top-level database (as shown in FIG. 6) for additional matching vendors to add to the qualified vendor list (step 2330). In addition to or instead of supplementing the qualified vendor list with matching vendors from the top-level database, the administrative user may also be provided the option to include vendors that do not completely match all of the bid request data (steps 2335 and 2340).

Figure 24:
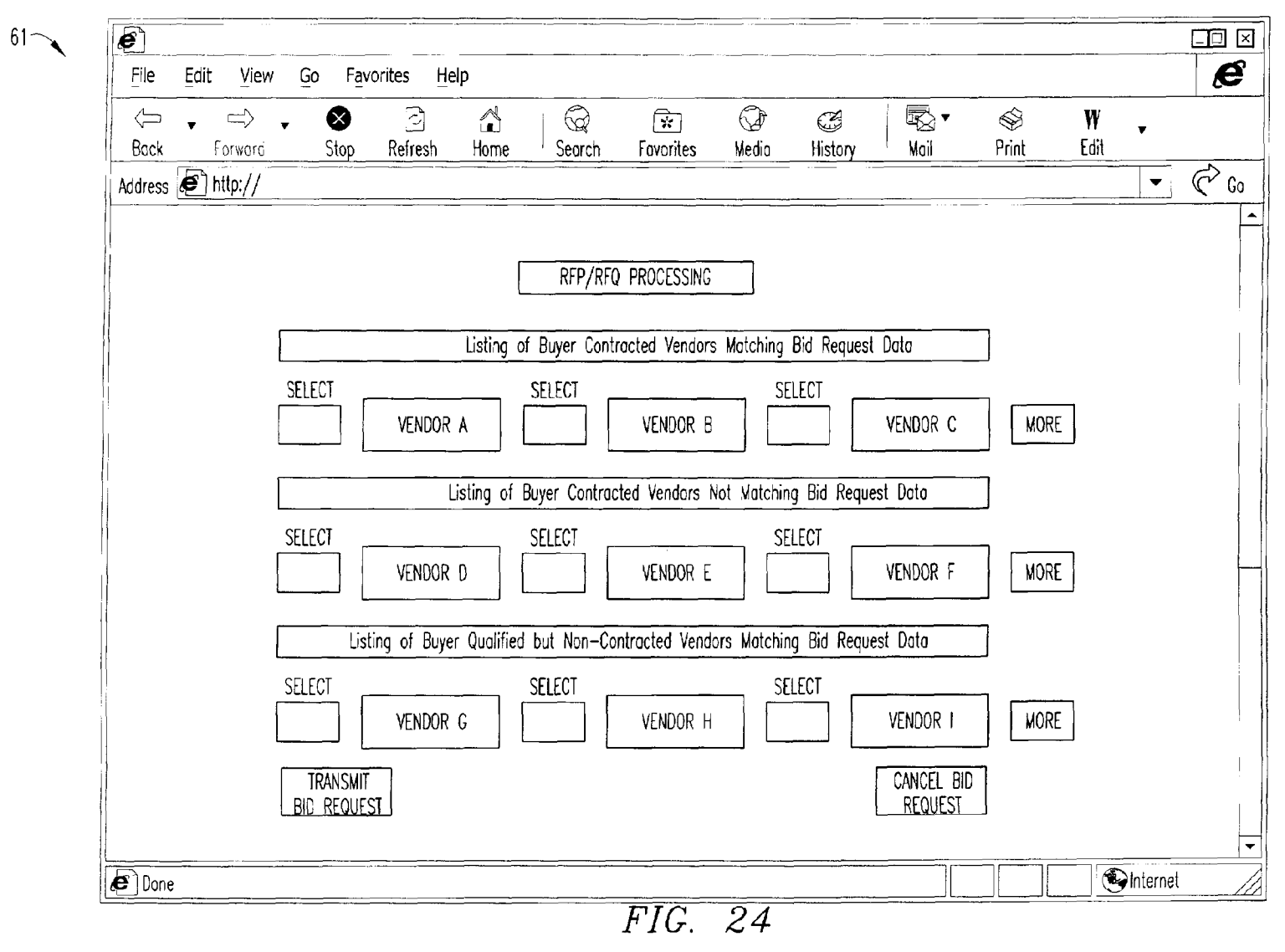

A screen shot of an exemplary web page displaying all of the potential vendors to be selected from to include on the qualified vendor list is shown in FIG. 24. The administrative user can select from buyer-contracted vendors that match the bid request data, buyer-contracted vendors that do not completely match the bid request data and non-contracted vendors that match the bid request data provided by the top-level database. The administrative user can select vendors for inclusion in the vendor qualification list based on any number of factors, including previous contract experience with the vendor, vendor reputation and vendor availability.

Turning back to FIG. 23, once the list of qualified vendors is finalized (step 2345), the administrative user transmits the bid request to the qualified vendors (step 2350) and notifies the originator of the bid request of the bid request status (step 2355). For example, the originator can be notified of the particular vendors that received the bid request and any modifications made to the bid request prior to transmission.

Figure 25:
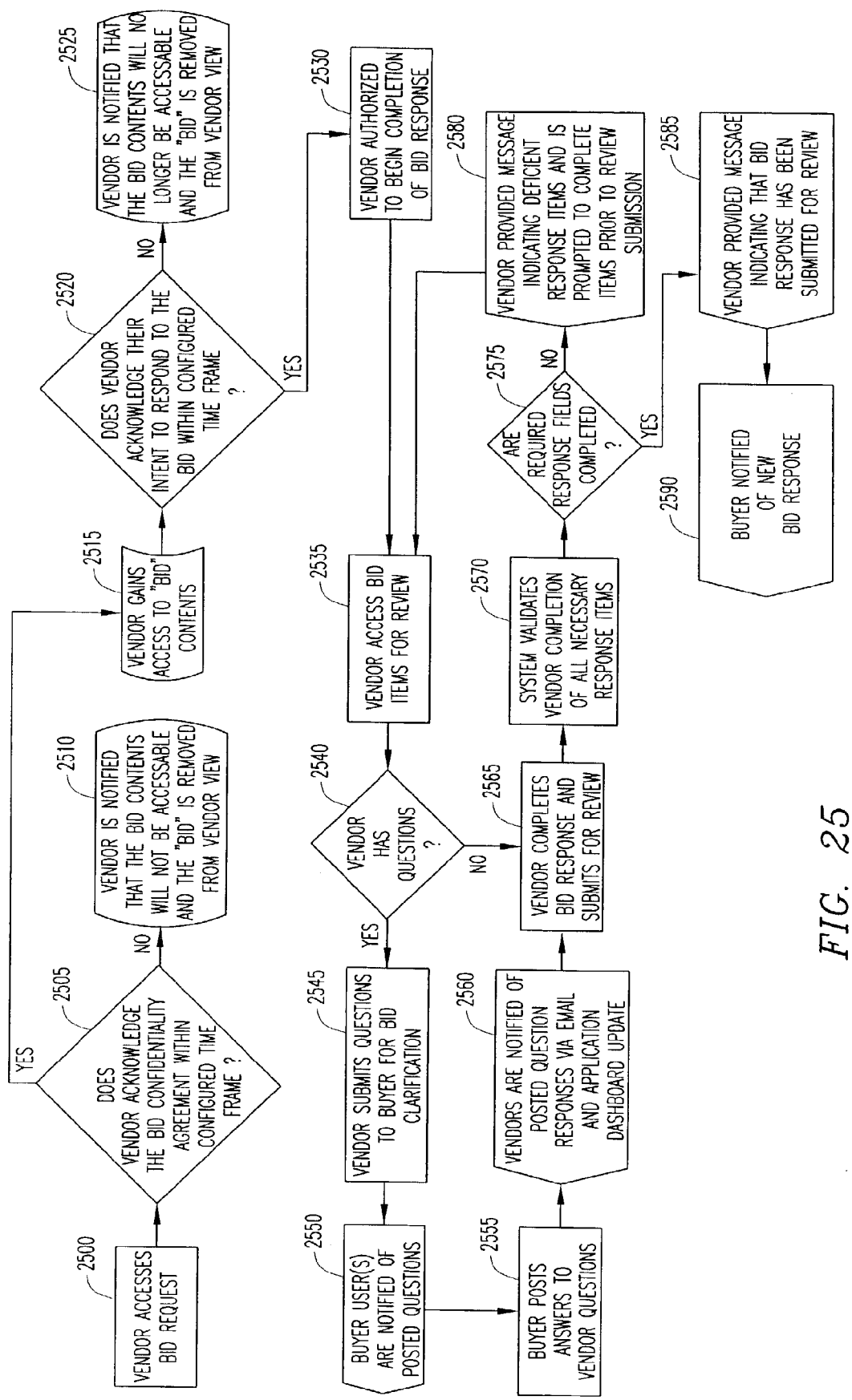
FIG. 25 is a flowchart illustrating exemplary steps in a vendor bid response process, in accordance with embodiments of the present invention.

Exemplary steps for generation and transmission of a vendor bid response, as shown generally in FIGS. 1 and 15 at 220, to a received bid request are shown in FIG. 25. In exemplary embodiments, bid requests are transmitted to vendors and routed to the appropriate vendor users, based on vendor user role configurations, as discussed above in connection with FIGS. 9-14. Upon receipt of a bid request, an appropriate vendor user can access the bid request via a menu or dashboard control notification (step 2500). In further exemplary embodiments, the bid request is submitted with a bid confidentiality agreement binding the vendor user to maintain the contents of the bid request in confidence prior to displaying the bid request contents to the vendor user. If the vendor user acknowledges the confidentiality agreement (e.g., by clicking on an accept button) (step 2505), the vendor user can gain access to the contents of the bid request (step 2515). Otherwise, the vendor user is notified that the hid contents will not be accessible and the bid request is removed from the vendor user's view (step 2510).

To limit the amount of time that vendors have to submit vendor bid responses, the bid request may also include a time frame that the vendor must agree to respond within. If the vendor user cannot agree to respond within the time frame (e.g., by clicking on an accept button) (step 2520), the vendor user is notified that the contents of the bid request will no longer be available to the vendor user and the bid request is removed from the vendor user's view (step 2525). The buyer or project administrator is also notified of the vendors that do not acknowledge the confidentiality agreement or time frame constraints, and based on the number of non-acknowledged vendors, the buyer or project administrator can add vendors to the qualified vendor list and transmit the bid request to the additional vendors to ensure that a sufficient number of vendor bid responses are received.

If the vendor user does agree to respond within the time frame (step 2520), the vendor is authorized to begin completion of the vendor bid response (step 2530). To respond to the bid request, the vendor user accesses the bid item selections by bid section and bid category that require vendor response data for review (step 2535). If the vendor user has any questions regarding the bid request (e.g., the type or amount of vendor response data that is required) (step 2540), the vendor user can submit questions to the buyer for bid clarification within a buyer-configured time frame (step 2545). An appropriate buyer user (e.g., the bid request originator or project administrator) is notified of each question submitted by a vendor via e-mail and/or dashboard update (step 2550) and that buyer user is responsible for providing an answer to the submitted questions within applicable time constraints (step 2555). The vendors are notified of the buyer answers via e-mail and/or dashboard update (step 2560).

Figure 27:
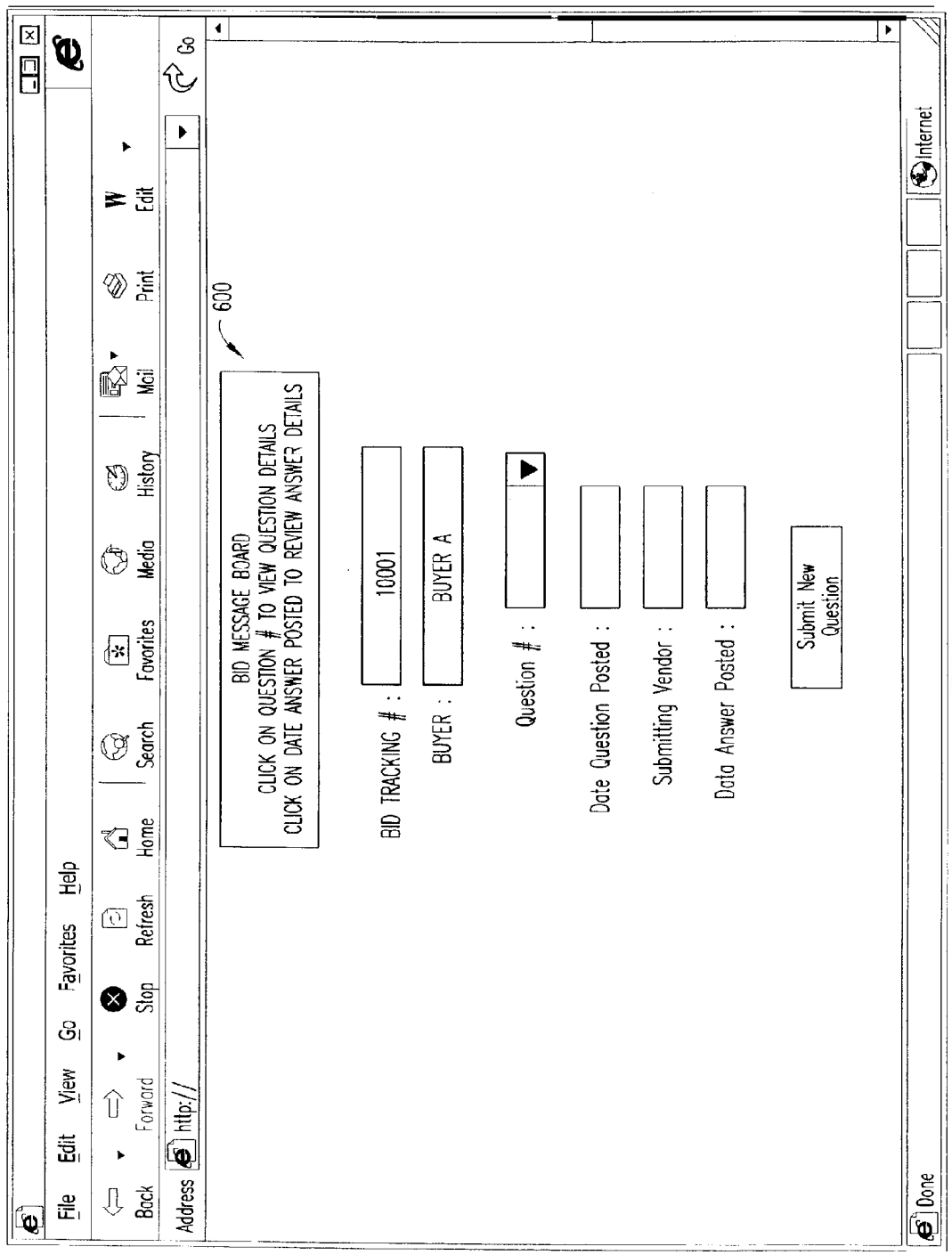

For example, a bid message board can be provided by the system that both the vendors and the buyer can access for a particular bid request. A screen shot of an exemplary bid message board 600 is shown in FIG. 27. Only the buyer and the vendors responding to a particular bid request can access the bid message board 600. All of the vendors may be provided access to all of the submitted questions and buyer answers, or only the vendor that submitted the question may be allowed to view the buyer answer, depending on the buyer settings. In addition, the vendor questions may be anonymous to the vendors and the buyer or only to the vendors, depending on the vendor and/or buyer preferences.

Turning back to FIG. 25, if the vendor user does not have any questions (step 2540) or all of the vendor questions have been answered (step 2560), the vendor user enters the requisite vendor response data into appropriate fields for the required bid item selections in the bid (step 2565). The vendor response data can include costing information including costing elements (e.g., resource requirements, expense types, etc.) and associated pricing information (e.g., resource rates, expense amounts, etc.) and deliverables information including deliverables types (e.g., number of units to be completed, phasing information, etc.) and completion information (e.g., project end date, phase end dates, etc.). Each of the costing elements and deliverables types is associated with a different bid item selection to enable effective comparison and grading of vendor bid responses.

The bid item fields can be of various data types, such as text/currency/numeric-entry fields and/or selectable options fields. In addition, the fields can have multiple levels of detail associated with a singular bid response item for different aspects of the project. For example, if a project has several phases, as determined by the buyer and/or vendor, the vendor response fields can include a separate section for each phase of the project. Upon attempted submission of the vendor bid response, the system validates vendor completion of all necessary data fields for bid item selections in the vendor bid response (step 2570). If all required data fields are not completed (step 2575), the vendor user is provided a system message indicating the deficient vendor response bid item selections, and is prompted to complete the required bid item selections prior to submitting the vendor bid response (step 2580). Once all required data fields for bid item selections are completed in a bid response (step 2575), the vendor (upon submission) is provided a message indicating that the vendor bid response has been submitted to the buyer or project administrator for review (step 2585) and the appropriate buyer user is notified of a new vendor bid response via e-mail and/or dashboard update (step 2590).

Figure 26A:
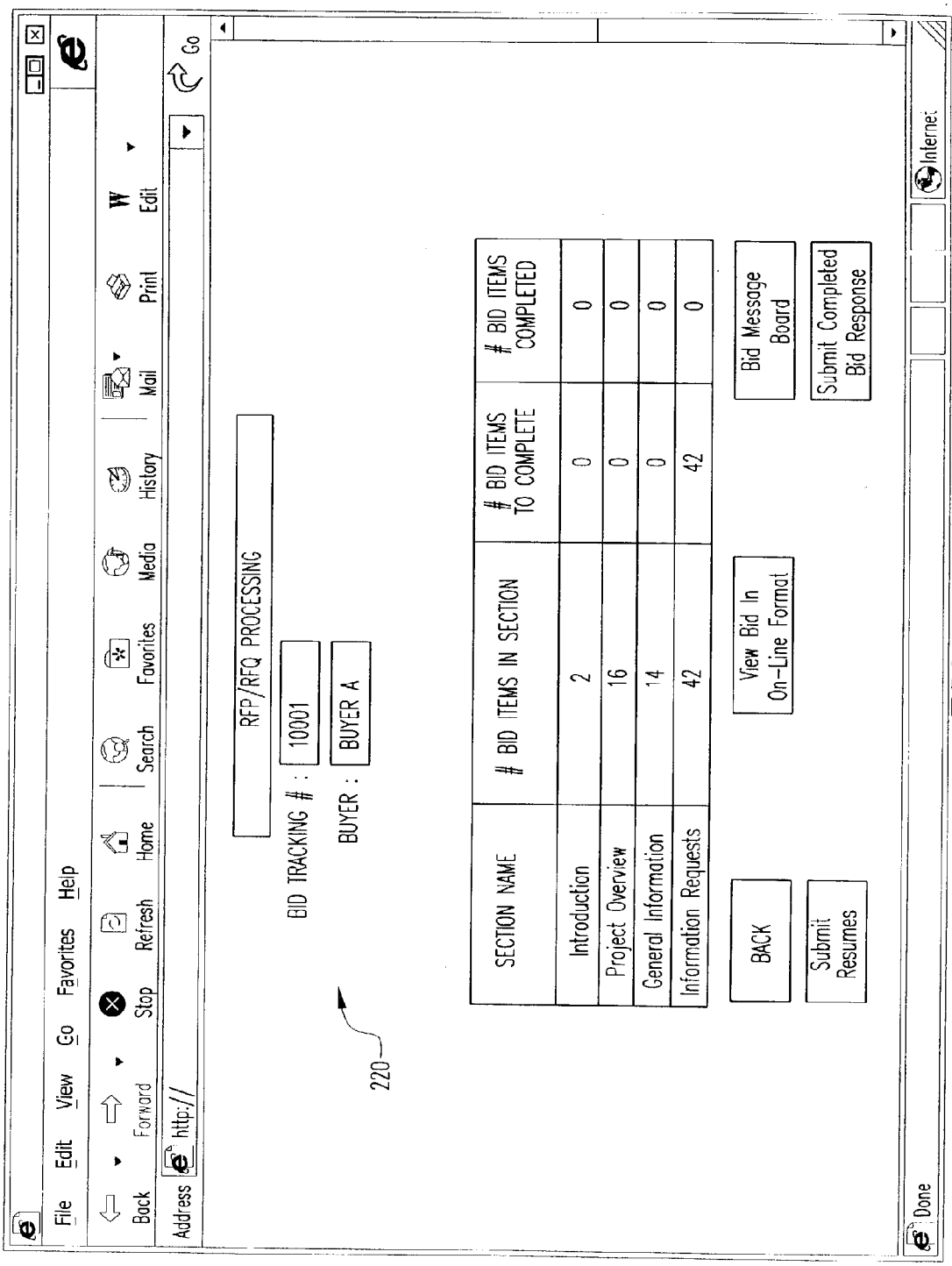
Figure 26B:
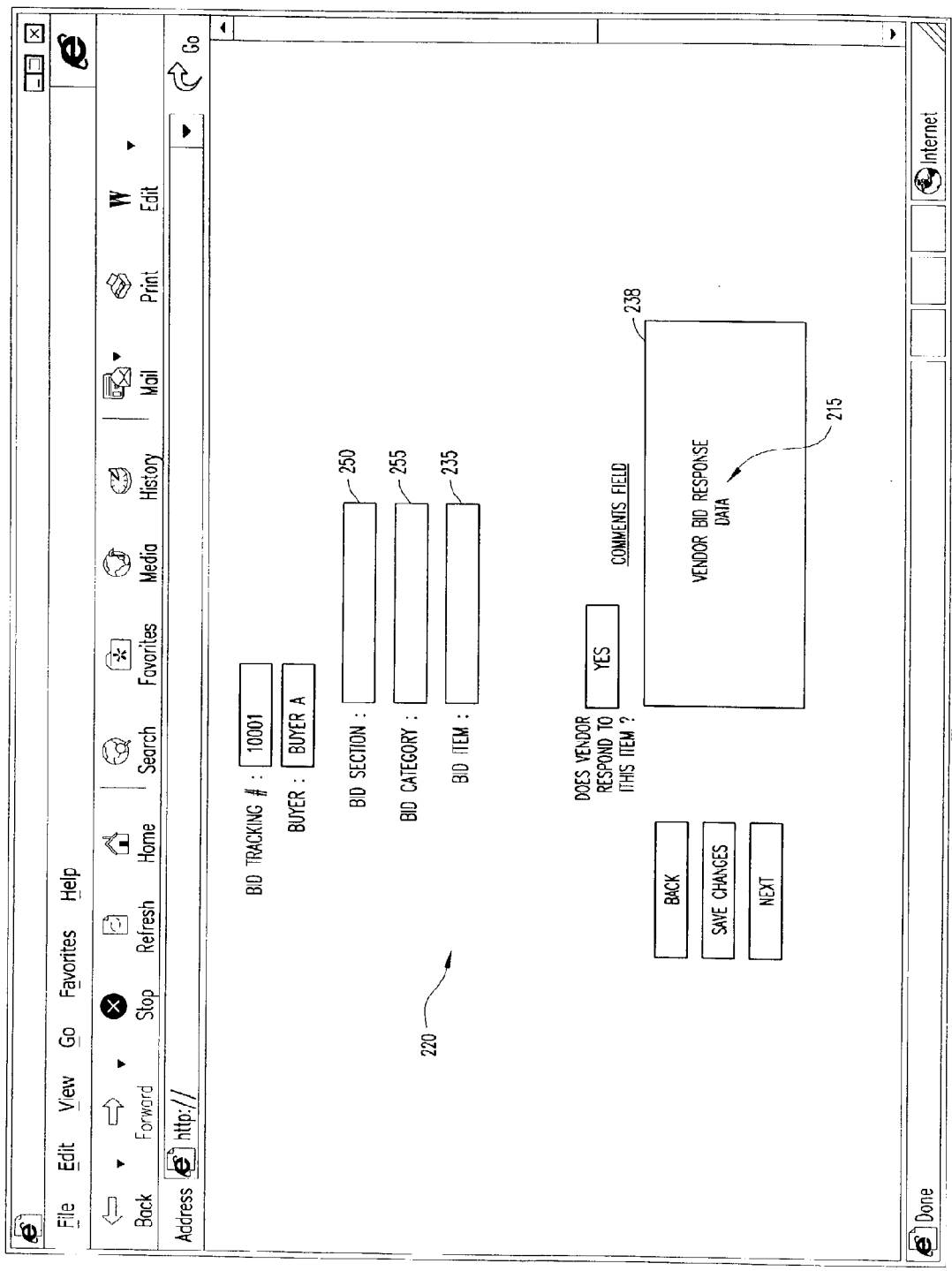

FIGS. 26A and 26B are screen shots of exemplary web pages that can be provided to the vendor user for bid response generation. The vendor user is provided with web pages displaying the bid item selections within the bid request that require vendor response data. For example, as shown in FIG. 26A, the status of the vendor bid response can be displayed to the vendor user listing the number of bid item selections 235 in each section 250, the number of bid item selections 235 in each section that the vendor user must complete and the number of bid item selections 235 in each section 250 that have been completed. In addition, the vendor user can access the bid message board to post vendor questions, view the bid response in an on-line format that is easily readable or submit resumes of potential contractors to be included in the vendor bid response. Furthermore, once the vendor responses to all of the bid item selections 235 have been completed, the vendor user can click on the submit completed bid response button for approval and/or transmission to the buyer or project administrator.

To complete a vendor response to a bid item selection 235, as shown in FIG. 26B, the vendor user can click on the bid section 250 to display the bid categories 255 and bid item selections 235 within each of the hid categories 255. If a vendor response to a particular bid item selection is required, the vendor user can enter the vendor response data 215 into a data field 238 for the bid item selection 235. As discussed above, the data field 238 can be a direct text-entry field or include links to other web pages for selection of the appropriate vendor response data 215 from pre-established vendor responses. In addition, the data field 238 can have multiple levels, with links to web pages for each level. Furthermore, the data field 238 may be able to be directly populated from the vendor database with default vendor response data 215, such as vendor name and vendor address. For example, upon receipt of a bid request, the vendor module can search for particular bid item selections 235 and populate the data fields 238 for those bid item selections 235 with the appropriate vendor response data 215.

An example of vendor response data selected from pre-established vendor responses is shown in FIG. 28. If the bid request includes a bid item selection requiring the vendor to provide resource requirement information for the project, along with, for example, the resource rates associated with the resource requirement information, the data field 238 can provide links to other web pages for selection of pre-established resource profile parameters. For example, each resource profile can indicate a particular resource type and associated skills needed for the resource profile. To facilitate effective comparison of resource profiles and rates by the buyer, the vendor can select from a number pre-established resource types and associated skills. To implement the resource type and skills selections, a configurable and scalable database structure can be provided that enables the vendor's specific resource requirements to be classified in non-prose fashion.

Examples of data structures used for selecting the resource type and associated skills are shown in Tables 30-37 hereinbelow. The data structures are illustrated for simplicity as being organized in a table format, with each table including all of the fields necessary for displaying the resource types and associated skills to the vendor user to select from and storing the selected resource profile within the data field of the associated bid item selection. The tables are related in a hierarchical and relational manner, such that the tables are accessed in a particular order for displaying the resource types and associated skills to the vendor user, as will be described hereinbelow in connection with FIG. 29, which illustrates a database table structure 800 representing an exemplary data scheme associated with a complete vendor bid response the interrelation between the vendor bid response and the buyer bid request.

Table 30 below illustrates sample business sector categories, such as light industrial, management/professional, office and technical. Within each of the business sector categories are one or more business arenas, as shown in Table 31, and within each of the business arenas are one or more business families, as shown in Table 32. Therefore, to select a particular business family associated with the resource type for the bid response, the vendor user can select a business sector category and business arena to display a list of business families to select from. Once the business family is selected, the various skills (general functions and business skills) associated with the resource type can be selected and mapped to the particular resource type, as shown in Tables 33-37. For example, the general functions can identify the level of skill associated with the resource type, the skills category can identify the types of skills, training and experience that the resource type possesses and one or more skills sets associated with each skills category can identify the specific experience associated with the resource type. In addition, certain skills sets can be emphasized over other skills sets by establishing a priority level for each of the skills sets of the resource type. It should be understood that other resource type and skill selections can be provided, and the system is not limited to the particular configuration and information shown in Tables 30-37. For a more complete discussion of resource profiling, reference is made to co-pending and commonly assigned U.S. patent application Ser. No. 10/128,751, which is hereby incorporate by reference in its entirety herein.

TABLE 30

Exemplary Business Sectors Table (tblBusSector)

| Bus_Sector_Name | Bus_Section_ID | ASP_Display_Order |
|---|---|---|
| Light Industrial | 1 | 4 |
| Mgmt/Professional | 2 | 2 |
| Office | 3 | 3 |
| Technical | 4 | 1 |

TABLE 31

Exemplary Business Arenas Table (tblBusArena)

| Bus_Arena_ID | Bus_Arena_Name | Bus_Sector_ID | ASP_Display_Order |
|---|---|---|---|
| 1 | Administrative Support | 3 | 5 |
| 2 | Business Support | 4 | 5 |
| 3 | Communications Software | 4 | 10 |
| 4 | Controller | 2 | 10 |
| 5 | Enterprise Resource Applications | 4 | 15 |
| 6 | Finance | 2 | 15 |
| 7 | General Business Support | 3 | 10 |
| 8 | General Clerical | 3 | 15 |
| 9 | General Support | 1 | 5 |
| 10 | Human Resources | 2 | 20 |
| 11 | Legal | 2 | 25 |
| 12 | Logistics Support | 1 | 10 |
| 13 | Management Information Systems | 4 | 20 |
| 14 | Manufacturing | 2 | 30 |
| 15 | Materials Management | 2 | 35 |
| 16 | Network Engineering | 4 | 25 |
| 17 | Product Development | 4 | 30 |
| 18 | Production | 1 | 15 |
| 21 | Sales | 2 | 40 |
| 22 | Call Center | 2 | 5 |

TABLE 32

| Exemplary Business Families Table (tblBusFamily) | | | |
|---|---|---|---|
| Bus_Family_ID | Bus_Family_Name | Bus_Arena_ID | ASP_Page_Display |
| 23 | Maintenance | 9 | 5 |
| 24 | Driver/Courier | 9 | 10 |
| 26 | Shipping/Receiving | 12 | 5 |
| 27 | Distribution | 12 | 10 |
| 28 | Inventory Control | 12 | 15 |
| 29 | Light Assembly | 18 | 5 |
| 30 | Electronic Assembly | 18 | 10 |
| 31 | Quality Assurance/Control | 18 | 15 |
| 32 | Assets Management | 4 | 5 |
| 33 | Audit | 4 | 10 |
| 34 | Budgeting | 4 | 15 |
| 35 | Cost Center Accounting | 4 | 20 |
| 36 | Overheads | 4 | 25 |
| 37 | Product Costing | 4 | 30 |
| 38 | Profit Center Accounting | 4 | 35 |
| 39 | Profitability | 4 | 40 |
| 40 | Project Accounting | 4 | 45 |
| 41 | Taxation | 4 | 50 |
| 42 | TreasuryCash Management | 4 | 55 |
| 43 | Accounts Payable | 6 | 5 |
| 44 | Accounts Receivable | 6 | 10 |
| 45 | Capital Investment | 6 | 15 |
| 46 | Consolidation | 6 | 20 |
| 47 | Credit/Collections | 6 | 25 |
| 48 | General Ledger | 6 | 30 |
| 49 | Other Ledgers | 6 | 35 |
| 50 | Benefits | 10 | 5 |
| 51 | Payroll | 10 | 10 |
| 52 | Personnel | 10 | 15 |
| 53 | Services | 10 | 20 |
| 54 | Antitrust Law | 11 | 5 |
| 55 | Contract Law | 11 | 10 |
| 56 | Corporate Law | 11 | 15 |
| 57 | Environmental Law | 11 | 20 |
| 58 | International Law | 11 | 25 |
| 59 | Labor Law | 11 | 30 |
| 60 | Real Estate Law | 11 | 35 |
| 61 | Taxation Law | 11 | 40 |
| 62 | Maintenance in Manufacturing | 14 | 5 |
| 63 | Manufacturing Process | 14 | 10 |
| 64 | Manufacturing Production | 14 | 15 |
| 65 | Manufacturing Quality Control | 14 | 20 |
| 66 | Distribution/Transportation/Warehousing | 15 | 25 |
| 67 | Materials Management | 15 | 30 |
| 68 | Purchasing | 15 | 35 |
| 69 | Sales Management | 21 | 5 |
| 70 | Sales Operations | 21 | 10 |
| 71 | Customer Service | 22 | 5 |
| 72 | Operations | 22 | 10 |
| 73 | Sales/Marketing | 22 | 15 |
| 74 | Bookkeeping | 7 | 5 |
| 75 | Database Support | 7 | 10 |
| 76 | Desk Top Publishing | 7 | 15 |
| 77 | Spreadsheet Support | 7 | 20 |
| 20 | General Clerical Support | 8 | 5 |
| 21 | Administrative Support | 1 | 5 |
| 18 | Business Analysis | 2 | 5 |
| 19 | Business Support | 2 | 10 |
| 1 | Network Design/Planning/Consulting | 16 | 5 |
| 2 | Network Infrastructure | 16 | 10 |
| 3 | Network Operations/Administration | 16 | 15 |
| 4 | OS Programming | 3 | 15 |
| 5 | Application Development | 3 | 5 |
| 6 | Database Development | 3 | 10 |
| 8 | Product Management | 17 | 10 |
| 9 | Product Design/Development | 17 | 5 |
| 10 | OS Programming | 13 | 9 |
| 11 | Network Infrastructure Support | 13 | 15 |
| 12 | Application Development | 13 | 5 |
| 13 | Network Management/Administration | 13 | 20 |
| 14 | SAP | 5 | 20 |
| 15 | PeopleSoft | 5 | 15 |
| 16 | Oracle | 5 | 10 |
| 17 | Baan | 5 | 5 |
| 78 | Database Development | 13 | 10 |

TABLE 33

Exemplary Business General Functions

| Column Name | Data Type | Length | Resource Profile Info |
|---|---|---|---|
| Business_Family_ID | Int | 4 | 78 |
| General_Function_ID | Int | 4 | 3 |
| General_Function_Name | Nvarchar | 100 | Database Admin. |

TABLE 34

Skill Categories Table (tblCategory)

| Column Name | Data Type | Length |
|---|---|---|
| Skills_Category_ID | Int | 4 |
| Skills_Category | Nvarchar | 255 |

TABLE 35

Skills By Category Table (tblSkillsMap)

| Column Name | Data Type | Length |
|---|---|---|
| Skill_ID | int | 4 |
| Skill_Name | nvarchar | 255 |
| Skills_Category | nvarchar | 255 |
| Skills_Category_ID | int | 4 |

TABLE 36

Business Family to Skill Category Map (tblBusFamtoSkillCat)

| Column Name | Data Type | Length |
|---|---|---|
| BusinessFamilyID | int | 4 |
| Skills_Category_ID | int | 4 |
| Skills_Category | nvarchar | 255 |
| Required | char | 1 |
| Record_ID | int | 4 |

TABLE 37

Exemplary Business Skills Priority

| Column Name | Data Type | Length | Resource Profile Info |
|---|---|---|---|
| Skill_Priority_ID | int | 4 | 2 |
| Skill_Priority_Name | varchar | 50 | Critical |

Figure 29:
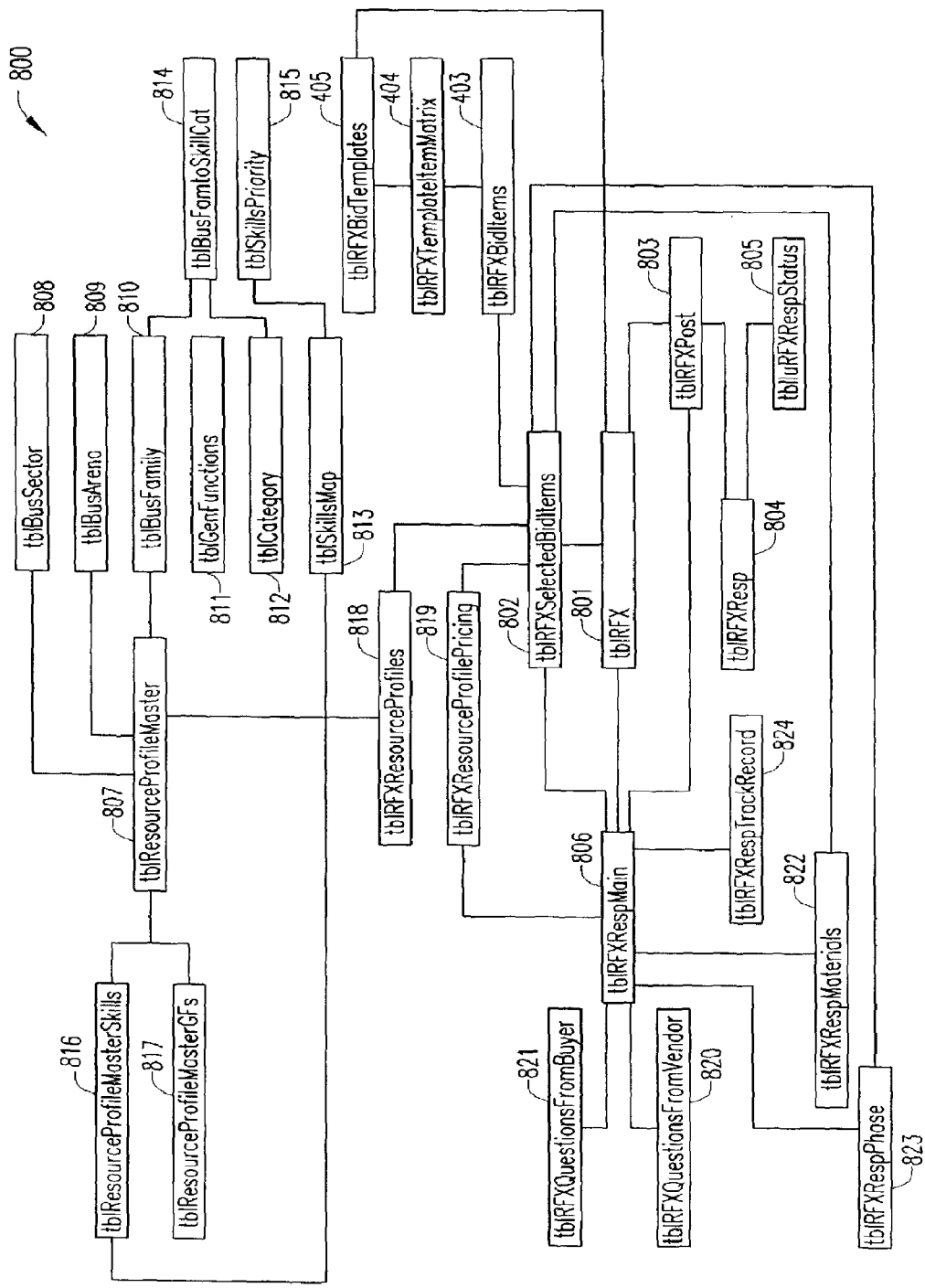
FIG. 29 is a database table view illustrating the interrelation between the bid request and vendor bid response data, in accordance with embodiments of the present invention.

Upon submission of the vendor bid response, all of the bid item selection fields are populated with bid data (either bid request data or vendor response data), which is stored in system (buyer database and vendor database) as a bid in a hierarchical and relational manner, as shown in the database table structure 800 of FIG. 29. Exemplary data structures for storing the bid data are shown hereinbelow in Tables 38-55, which will be discussed in connection with FIG. 29.

Tables 38 and 39 below illustrate sample bid request data associated with a particular bid request that can be stored in the database in tables "tblRFX" 801 and "tblRFXSelectedBidItems" 802, as shown in FIG. 29. For example, in table "tblRFX" 801, general information concerning the bid request can be stored, such as the bid tracking number assigned to the bid request by the system, the bid request name assigned by the originator, the identity of the bid request originator, the bid template type, the project type, project work location, budgeted expenditure amount for the project, the status of the bid request (e.g., new, submitted, evaluated, awarded, etc.), whether or not top-level database vendors received the bid request and whether any approval was required. However, it should be understood that other bid information can also be included, and the system is not limited to the specific information shown in Tables 38 and 39.

The specific bid items selections included within the bid request and the bid request data (buyer comments) entered by the originator for each of the bid item selections can be stored in the table "tblRFXSelectedBidItems" 802. Each bid item selection can be stored as a separate record in "tblRFXSelectedBidItems" 802, with each record containing all of the fields shown in Table 39 below. Table "tblRFXSelectedBidItems" 802 is tied to the general bid request information table "tblRFX" 801. As discussed above in connection with FIG. 10, the bid item selections contained within table "tblRFXSelectedBidItems" 802 are selected from the table "tblRFXBidItems" 403 and associated with a particular bid template type stored within table "tblRFXBidTemplates" 405 through table "tblRFXTemplateItemMatrix" 404.

TABLE 38

Master Bid Table (tblRFX - db structure view)

| Column Name | Data Type | Length |
|---|---|---|
| RFX_Tracking_ID | int | 4 |
| Originator_User_ID | int | 4 |
| RFX_Template_ID | int | 4 |
| Project_Sector_ID | int | 4 |
| Project_Family_ID | int | 4 |
| Project_Type_ID | int | 4 |
| RFX_Status_ID | int | 4 |
| Buyer_Bid_ID | varchar | 100 |
| RFP_Title | varchar | 100 |
| RFX_Administration_Location_ID | numeric | 9 |
| Primary_Work_Location_ID | numeric | 9 |
| External_Work_Location | varchar | 500 |
| Solicit_TLD_Vendors | char | 1 |
| Currency_ID | int | 4 |
| Budgeted_Expenditure | money | 8 |
| Assigned_to_ID | int | 4 |
| RFQ_Team_Member | int | 4 |
| Financial_Approval_Required | char | 1 |
| Non_Financial_Approval_Required | char | 1 |

TABLE 39

RFX Bid Items Table (tblRFXSelectedBidItems)

| Column Name | Data Type | Length |
|---|---|---|
| RFX_Tracking_ID | int | 4 |
| RFX_Item_ID | int | 4 |
| RFX_Item | varchar | 255 |
| Disablement_Allowed | char | 1 |
| HM_Disabled | char | 1 |
| Buyer_Comments | varchar | 8000 |
| Vendor_Bid_Display | char | 1 |
| Vendor_Response_Item | char | 1 |
| Vendor_Response_Required | char | 1 |
| Item_Complete | char | 1 |
| Identity_Key | int | 4 |

Sample information pertaining to the posting (transmitting) of the bid request to qualified vendors is shown hereinbelow in Table 40, which can be stored in the database in table "tblRFXPost" 803, as shown in FIG. 29. In exemplary embodiments, posting information is related to each particular vendor that received the bid request, and can include, for example, the date and time the bid request was submitted (posted) to the qualified vendor, the identity of the administrative user that posted the bid request, the identity of the qualified vendor that received the bid request, the vendor bid response identifier and the score assigned to the vendor, as described below in connection with FIGS. 31-35. However, it should be understood that other information can be included, and the system is not limited to the specific information shown in Table 40. A separate record for each vendor that received the bid request can be stored in table "tblRFXPost" 803, with each record including all of the fields shown hereinbelow.

TABLE 40 tblRFXPost

| Column Name | Data Type | Length |
|---|---|---|
| Bid_Tracking_ID | int | 4 |
| Vendor_ID | int | 4 |
| Posting_Record | int | 4 |
| Post_Time | datetime | 8 |
| Admin_Poster_ID | int | 4 |
| Response_ID | int | 4 |
| Score | int | 4 |

Sample information pertaining to the receipt of the bid request by the vendor and the submission of the vendor bid response is shown hereinbelow in Table 41, which can be stored in the database in table "tblRFXResp" 804, as shown in FIG. 29. For example, such response submission information can include the vendor bid response identifier, the status of the vendor bid response, the identity of the vendor, the vendor bid response submission date and the dates the vendor acknowledged the confidentiality and intend to respond agreements. Examples of the types of status information that can be included in the table "tblRFXResp" 804 are shown hereinbelow in Table 42, which can be stored in the database in table "tblRFXRespStatus" 805, as shown in FIG. 29. Tables "tblRFXResp" 804 and "tblRFXRespStatus" 805 are tied to table "tblRFXPost" 803, which in turn, is tied to "tblRFX" 801 to associate the vendor response submission information to the bid posting information for the bid request. However, it should be understood that other information can be included, and the system is not limited to the specific information shown in Tables 41 and 42. A separate record for each vendor bid response can be stored in "tblRFXResp" 804, with each record containing the fields shown in Table 41 below.

TABLE 41 tblRFXResp

| Column Name | Data Type | Length |
|---|---|---|
| Response_ID | int | 4 |
| RFX_Resp_Status_ID | int | 4 |
| Vendor_ID | int | 4 |
| Confidentiality_Acceptance_Date | datetime | 8 |
| Intend_to_Respond_Date | datetime | 8 |
| RFX_Resp_Submit_Date | datetime | 8 |
| Last_Edit_Date | datetime | 8 |

TABLE 42

Exemplary Data from tblRFXRespStatus

1 New
2 Confidentiality_Terms_Accepted
3 Confidentiality_Terms_Not_Accepted
4 Response_Intended TABLE 42-continued Exemplary Data from tblRFXRespStatus 5 Response_Declined
6 Temporarily_Saved
7 Response_Submitted
8 Bid_Not_Accepted
9 Awaiting_Re-Bid
10 Re-Bid_Declined
11 Bid_Accepted
12 Bid_On_Hold
13 Waiting_Bid_Description Table 43 below illustrates sample vendor bid response data submitted in a vendor bid response from a vendor to a buyer, which can be stored in the database in table "tblRFXRespMain" 806, as shown in FIG. 29. For example, such vendor bid response data can include the bid tracking number, the vendor response identifier, the identity of the vendor, the particular bid item selection the vendor has responded to, the vendor response to that particular bid item selection, any bid request data (buyer comments) associated with that particular bid item selection, the record identifier for the vendor response to the particular bid item selection and any grade given to the vendor response by the buyer, as will be described in more detail hereinbelow in connection with FIGS. 31-35. However, it should be understood that other information can be included, and the system is not limited to the specific information shown in Table 43. A separate record for each bid item selection responded to by the vendor is stored in "tblRFXRespMain" 806, with each record containing the fields shown in Table 43 below. Table "tblRFXRespMain" 806 is tied to "tblRFX" 801 and "tblRFXPost" 803 to associate the vendor bid response with the bid request.

TABLE 43 tblRFXRespMain

| Column Name | Data Type | Length |
|---|---|---|
| Bid_Tracking_ID | int | 4 |
| Response_ID | int | 4 |
| Vendor_ID | int | 4 |
| Identity_Key | int | 4 |
| RFX_Item_ID | int | 4 |
| RFX_Item | varchar | 50 |
| Vendor_Response | varchar | 7000 |
| Required_Item | char | 1 |
| Buyer_Comments | varchar | 7000 |
| Resp_Record_ID | int | 4 |
| Record_Create_Date | datetime | 8 |
| Last_Save_Date | datetime | 8 |
| Item_Grade | char | 1 |

Associated with one or more of the vendor responses to bid item selections may be one or more resource profiles of the particular resources (contractors) that the vendor identified as necessary to complete the project. The resource profiles can be created in advance or as part of the vendor bid response. The resource profiles are generated using the business sector, business arena, business family, general functions and skills discussed above in connection with FIG. 28 and shown in Tables 30-37 above.

Examples of resource profile information (resource type and skills) for resource profiles are shown hereinbelow in Tables 44-46, which can be stored in the database in tables "tblResourceProfileMaster" 807, "tblResourceProfile MasterSkills" 816 and "tblResourceProfileMasterGF's" 817, as shown in FIG. 29. The table "tblResourceProfileMaster" 807 stores the resource type of the resource profile (e.g., business sector, arena and family), while table "tblResourceProfileMasterSkills" 816 stores the business skills (skills sets and skill sets priorities) associated with the resource type and table "tblResourceProfileMasterGF's" 817 stores the general functions of the resource type. However, it should be understood that other information can be included, and the system is not limited to the specific information shown in Tables 44-46. A separate record for each resource profile is included in tables "tblResourceProfileMaster" 807, "tblResourceProfileMasterSkills" 816 and "tblResourceProfileMasterGF's" 817, with each of the records containing all of the fields shown below in Tables 45-46. The table "tblResourceProfileMaster" 807 is tied to tables "tblResourceProfileMasterSkills" 816 and "tblResourceProfileMasterGF's" 817 to associate the general functions and skills sets with the resource type of each resource profile.

TABLE 44 tblResourceProfileMaster (db structure view)

| Column Name | Data Type | Length |
|---|---|---|
| Resource_Profile_ID | int | 4 |
| Resource_Profile_Name | varchar | 255 |
| User_ID | int | 4 |
| Vendor_ID | int | 4 |
| Bus_Sector_ID | int | 4 |
| Bus_Arena_ID | int | 4 |
| Bus_Family_ID | int | 4 |
| User_Notes | varchar | 1000 |
| Record_Date | datetime | 8 |
| Profile_Status | char | 4 |

TABLE 45 tblResourceProfileMasterGFs (db structure view)

| Column Name | Data Type | Length |
|---|---|---|
| Resource_Profile_ID | Int | 4 |
| General_Function_ID | Int | 4 |
| Record_ID | Int | 4 |

TABLE 46 tblResourceProfileMasterSkills (db structure view)

| Column Name | Data Type | Length |
|---|---|---|
| Resource_Profile_ID | int | 4 |
| Skill_ID | int | 4 |
| Record_ID | int | 4 |
| Skill_Priority | int | 4 |

Sample information relating to the particular selected resource profiles submitted with the vendor bid response is shown in Table 47 below, which can be stored in table "tblRFXResourcePfoiles" 818 in FIG. 29. For example, such selected resource profile information can include the identity of the resource profile and the anticipated quantity of that particular selected resource profile that are needed to complete the project. However, it should be understood that other information can be included, and the system is not limited to the specific information shown in Table 47. A separate record for each selected resource profile for the project is stored in "tblRFXResourceProfiles" 818, with each record containing all of the fields shown in Table 47 below. Table "tblRFXResourceProfiles" 818 is tied to table "tblRFXResourceProfileMaster" 807 to associate the particular resource type, skills and general functions with the selected resource profile. Table "tblRFXResourceProfiles" 818 is further tied to table "tblRFXSelectedBidItems" 802 to associate the selected resource profiles with the particular bid item selections requesting the resource profiles.

TABLE 47 tblRFXResouceProfile (db structure view)

| Column Name | Data Type | Length |
|---|---|---|
| Resource_Profile_ID | int | 4 |
| Anticipated_Quantity | int | 4 |
| User_ID | int | 4 |
| Record_Date | datetime | 8 |
| Identity_Key | int | 4 |
| Record_ID | int | 4 |

Depending on the bid request, as part of the vendor bid response to one or more bid item selections, the vendor may also provide pricing information associated with the particular selected resource profiles for the project. Sample resource pricing information is shown in Table 48 below, which can be stored in the database in table "tblRFXResourcesProfilePricing" 819, as shown in FIG. 29. For example, such resource pricing information can include the resource profile identifier, the identity of the vendor bid response record for the bid item selection requesting the resource profile and pricing information, the anticipated number of hours the resource associated with the resource profile will work, the billing rate associated with the resource profile and the anticipated billing amount of the resource associated with the resource profile. However, it should be understood that other information can be included, and the system is not limited to the specific information shown in Table 48. A separate record for each resource associated with one of the selected resource profiles is stored in table "tblRFXResourcesProfilePricing" 819, with each record containing the fields shown in Table 48 below. Table "tblRFXResourcesProfilePricing" 819 is tied to table "tblRFXResourceProfiles" 818 to associate the resource pricing information for a particular resource to a particular selected resource profile. In addition, table "tblRFXResourcesProfilePricing" 819 is tied to table "tblRFXRespMain" 806 and table "tblRFXSelectedBidItems" to associate the resource pricing information and selected resource profile with the vendor bid response to a particular bid item selection.

TABLE 48 tblRFXResourceProfilesPricing (db structure view)

| Column Name | Data Type | Length |
|---|---|---|
| Resource_Profile_ID | int | 4 |
| Resp_Record_ID | int | 4 |
| Vendor_ID | int | 4 |
| Anticipated_Hours | int | 4 |
| Bill_Rate | money | 8 |
| Anticipated_Billing | money | 8 |
| Record_Date | datetime | 8 |
| Record_ID | int | 4 |
| Identity_Key | int | 4 |

In addition to the particular resource profiles and pricing, the vendor bid response may also include information related to the types of materials needed for the project. Sample material information is shown below in Table 49, which can be stored in the database in table "tblRFXRespMaterials" 822, as shown in FIG. 29. For example, such material information can include the identity of the vendor bid response record for the bid item selection requesting the material information, the type of material and the cost of the material. However, it should be understood that other information can be included, and the system is not limited to the specific information shown in Table 49. A separate record for each type of material is stored in table "tblRFXRespMaterials" 822, with each record containing the fields shown in Table 49 below. Table "tblRFXRespMaterials" 822 is tied to table "tblRFXRespMain" 806 and table "tblRFXSelectedBidItems" to associate the material information with the vendor bid response to a particular bid item selection.

TABLE 49 tblRFXRespMaterials (db structure view)

| Column Name | Data Type | Length |
|---|---|---|
| Resp_Record_ID | int | 4 |
| Material_Name | varchar | 100 |
| Material_Description | varchar | 500 |
| Material_Manufacturer | varchar | 100 |
| Unit_Cost | money | 8 |
| Unit_Count | numeric | 9 |
| Line_Item_Cost | money | 8 |
| Record_Date | datetime | 8 |
| Record_ID | int | 4 |
| Identity_Key | int | 4 |

The vendor bid response may also include information related to the phasing of the project. Sample phasing information is shown below in Table 50, which can be stored in the database in table "tblRFXRespPhase" 823, as shown in FIG. 29. For example, for each phase of the project, the phasing information can include the identity of the vendor bid response record for the bid item selection requesting the phasing information, the number of the particular phase, a description of the phase, the anticipated duration of the phase and the project deliverables at the end of the phase (e.g., number of units to be completed or other project milestones). However, it should be understood that other information can be included, and the system is not limited to the specific information shown in Table 50. A separate record for each phase is stored in table "tblRFXRespPhase" 823, with each record containing the fields shown in Table 50 below. Table "tblRFXRespPhase" 823 is tied to table "tblRFXRespMain" 806 and table "tblRFXSelectedBidItems" to associate the phasing information with the vendor bid response to a particular bid item selection.

TABLE 50 tblRFXRespPhase (db structure view)

| Column Name | Data Type | Length |
|---|---|---|
| Resp_Record_ID | int | 4 |
| User_ID | int | 4 |
| Project_Phase_# | numeric | 9 |
| Project_Phase_Description | varchar | 7000 |
| Project_Phase_Duration_Anticipated | varchar | 1000 |
| Project_Phase_Deliverables | varchar | 7000 |
| Record_Date | datetime | 8 |
| Record_ID | int | 4 |
| Identity_Key | int | 4 |

All of the questions and answers posted by the vendor and buyer on the bid message board and any questions submitted to the vendor from the buyer regarding the vendor bid response can also be stored in the system and associated with the particular vendor bid response. Sample question information is shown in Tables 51 and 52 below, which can be stored in the database in tables "tblRFXQuestionsFromVendor" 820 and "tblRFXQuestionsFromBuyer" 821, as shown in FIG. 29. A separate record for each vendor question/buyer response and buyer question/vendor response is stored in tables "tblRFXQuestionsFromVendor" 820 and "tblRFXQuestionsFromBuyer" 821, with each record containing the fields shown in Tables 51 and 52 below. In addition tables "tblRFXQuestionsFromVendor" 820 and "tblRFXQuestionsFromBuyer" 821 are tied to table "tblRFXRespMain" 806 to associate the questions with the particular vendor bid response.

TABLE 51 tblRFXQuestionsfromVendor (db structure view)

| Column Name | Data Type | Length |
|---|---|---|
| Vendor_ID | int | 4 |
| [Vendor_Question/Comment] | varchar | 8000 |
| Question_Post_Date | datetime | 8 |
| Buyer_Response | varchar | 8000 |
| Buyer_Answer_Post_Date | datetime | 8 |
| Record_ID | int | 4 |
| Resp_Record_ID | int | 4 |

TABLE 52 tblRFXQuestionsfromBuyer (db structure view)

| Column Name | Data Type | Length |
|---|---|---|
| Vendor_ID | Int | 4 |
| Identity_Key | int | 4 |
| [Buyer_Question/Comment] | varchar | 8000 |
| Buyer_Post_Date | datetime | 8 |
| Vendor_Response | varchar | 8000 |
| Vendor_Response_Date | datetime | 8 |
| Record_ID | int | 4 |
| Resp_Record_ID | int | 4 |

The vendor bid response can also be associated with details about previous project work that has been performed by the vendor to aid in bid response process. Sample previous project work details are shown in Table 53 below, which can be stored in the database in table "tblRFXRespTrackRecord" 824, as shown in FIG. 29. For example, such previous project work details can include the vendor bid response identifier, the project name, the name of the buyer, the value of the project, a description of the project, a discussion of deployed resources (contractors) for the project, a discussion of the performance of the vendor, the project start date and the project end date. It should be understood that additional previous project work details can be stored, and the system is not limited to the specific previous project work details shown in Table 53.

TABLE 53 tblRFXRespTrackRecord (db structure view)

| Column Name | Data Type | Length |
|---|---|---|
| Response_ID | Int | 4 |
| Project_Name | Varchar | 255 |
| Buyer_Name | Varchar | 255 |
| Project_Value | money | 8 |
| Project_Description | varchar | 7000 |
| Deployed_Resources | varchar | 7000 |
| Company_Performance | varchar | 7000 |
| Project_Start_Date | datetime | 8 |
| Project_End_Date | datetime | 8 |

TABLE 53-continued tblRFXRespTrackRecord (db structure view)

| Column Name | Data Type | Length |
|---|---|---|
| Record_ID | int | 4 |
| Record_Date | datetime | 8 |

Figure 30:
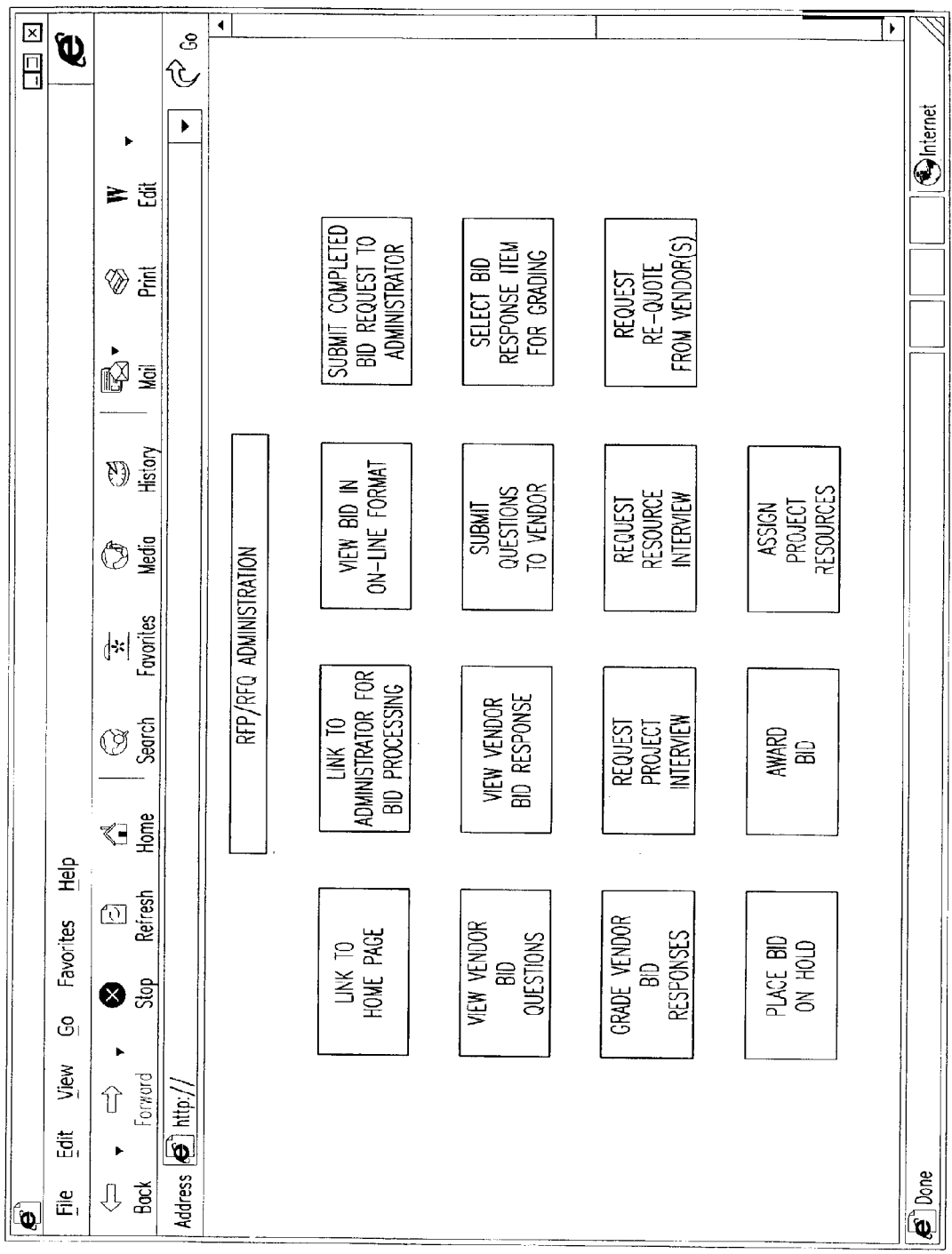
FIG. 30 is a screen shot illustrating the various bid processing features provided to a buyer.

Referring now to FIG. 30, a screen shot of a sample web page displaying options to the buyer for administration of the bid request and vendor bid responses is illustrated. From the bid request administration web page, the buyer user can submit a completed bid request to an administrator (or to qualified vendors), view vendor bid responses to a bid request, grade vendor bid responses, submit questions to the vendor about the vendor bid response, request a re-quote from a vendor, request project interviews with vendors or resource interviews with potential resources (contractors) for a project, award the bid (project) to a particular vendor, assign resources for a project or place a bid request on hold.

Once the buyer has received one or more vendor bid responses to a particular bid request, the buyer can grade or otherwise compare the vendor bid responses in order to determine which vendor will get awarded the project. With the use of pre-established bid items in the (bid request and bid responses, all vendor bid responses have the same format, enabling efficient and effective grading and comparison of vendor bid responses. Therefore, prior to begin grading of the vendor bid responses, the buyer can select one or more bid items for grading purposes.

Figure 31:
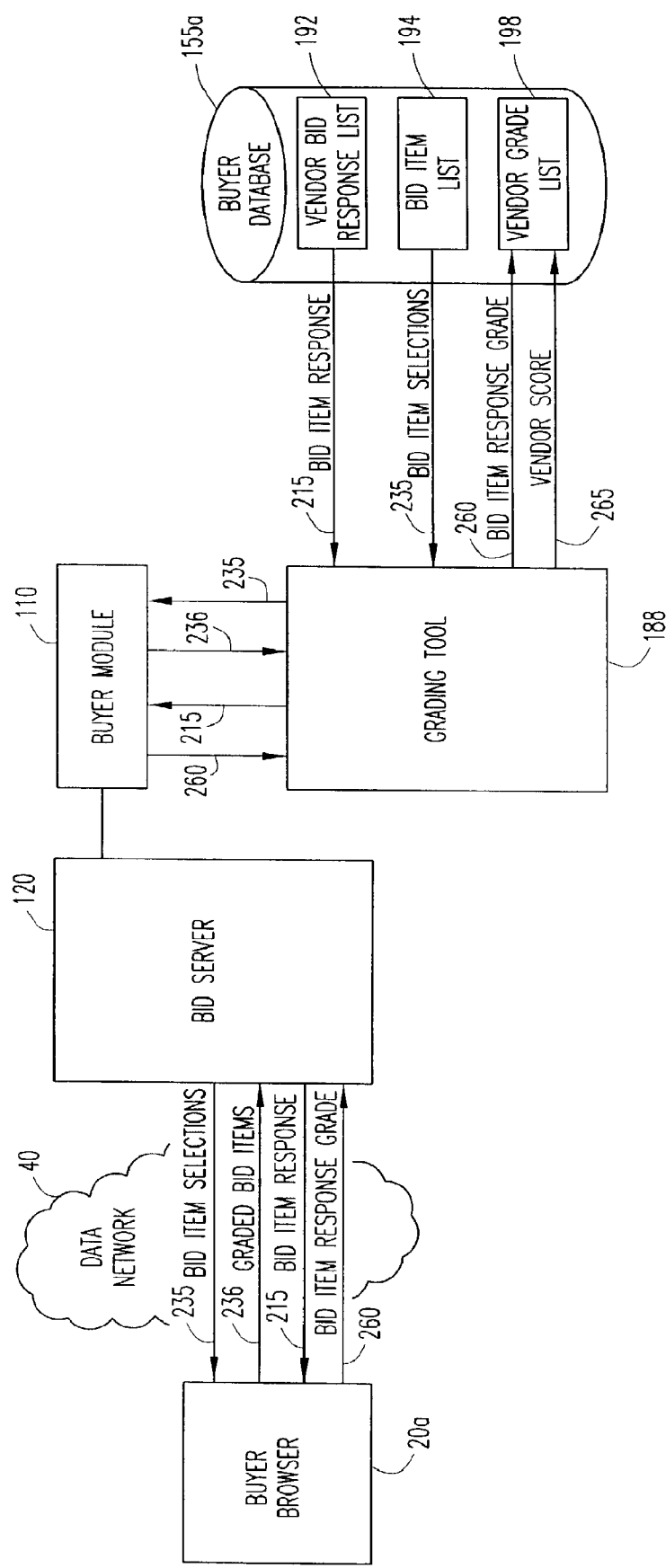
FIG. 31 is a data flow diagram illustrating the electronic facilitation of vendor bid response grading, in accordance with embodiments of the present invention.

Exemplary functionality for selecting graded bid items and grading vendor responses to the selected graded bid items is shown in FIG. 31. A grading tool 188 is illustrated in FIG. 31 for the selection of graded bid items and grading of vendor bid responses, in accordance with embodiments of the present invention. The grading tool 188 can include any hardware, software and/or firmware required to perform the functions of the tools and can be implemented within the web server 120 or an additional server (not shown).

At any time after the creation of the bid request, a grader (e.g. buyer user or project administrator user) responsible for grading vendor bid responses can access the grading tool 188 to select one or more bid item selections 235 from the bid request for grading purposes. The grading tool accesses the bid item list 194 stored in the database 155, retrieves the bid item selections 235 from the bid item list 194 that are included within the particular bid request identified by the grader and displays the bid item selections 235 to the grader via the buyer module 110, web server 120, data network 40 and buyer browser 20a to choose from. From the bid item selections 235, the grader can select one or more graded bid items 236 and provide a list of the graded bid items 236 to the grading tool 188.

Upon receipt of one or more vendor bid responses, the grading tool 188 can access a vendor bid response list 192 to retrieve the vendor response data 215 associated with one of the graded bid items 236 for one of the vendor bid responses in the list 192. The bid item response data 215 is displayed to the grader for grading purposes. Based on various factors (objective and subjective) regarding the quality and information included within the displayed bid item response data 215, the grader can assign a grade for that bid item response 215 and transmit a bid item response grade 260 to the grading tool 188.

The grading tool 188 further interfaces with the database 155 to store the bid item response grade 260 for the vendor in a vendor grades list 198 that contains the bid item response grades 260 for all graded bid items 236 for each of the vendor bid responses in the vendor bid response list 192. In addition, based on all of the bid item response grades 260 received by the grading tool 188 for all of the graded bid items 236 for a particular vendor bid response, the grading tool 188 can calculate an overall vendor score 265 for the particular vendor bid response and store the vendor score 265 in the vendor grades list 198.

Figures 32, 33:
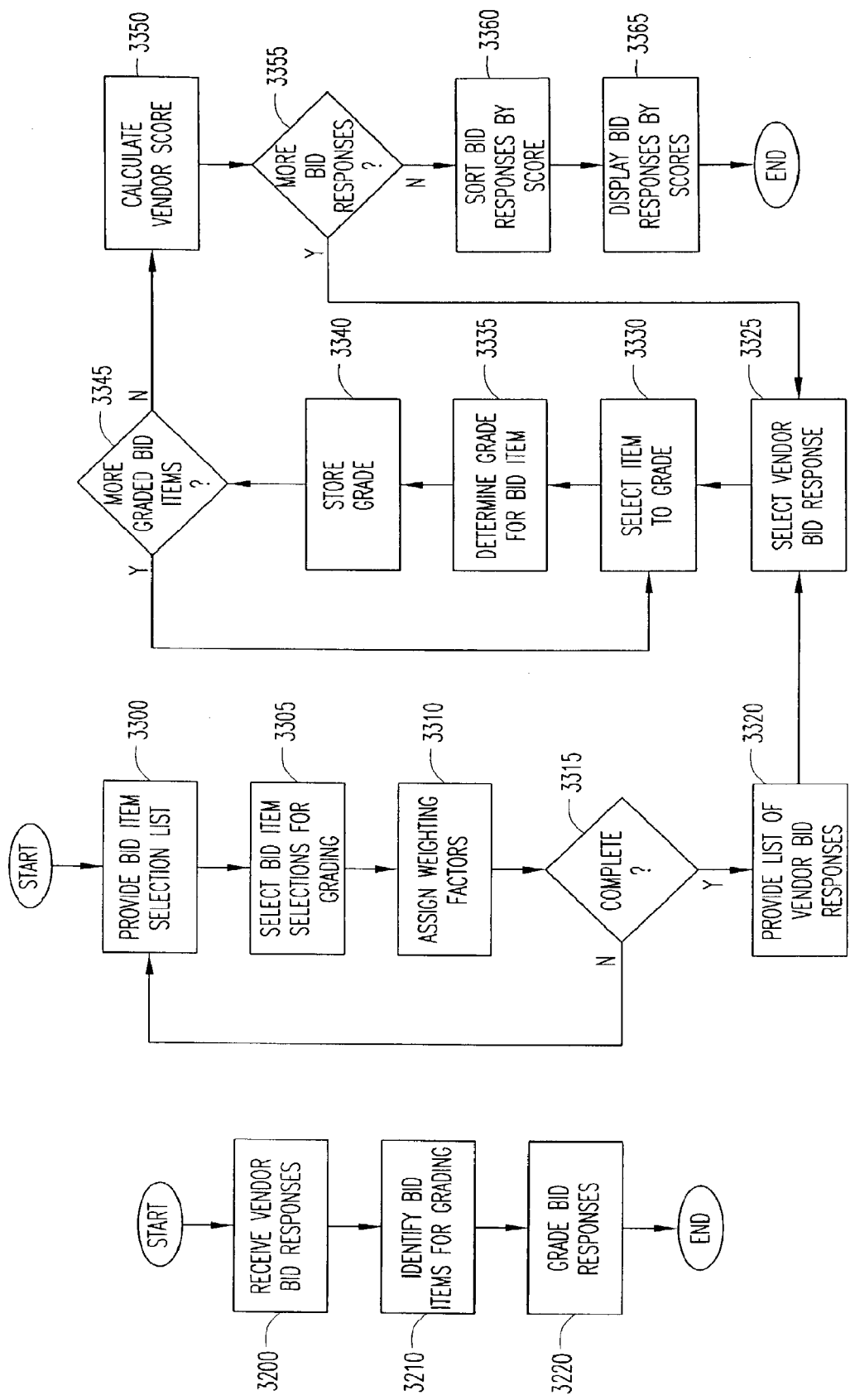
FIGS. 32 and 33 are flowcharts illustrating exemplary steps for grading vendor bid responses, in accordance with embodiments of the present invention.

Exemplary steps for selecting graded bid items and grading vendor bid responses using the graded bid items are shown in FIGS. 32 and 33. The main processing steps performed for bid response grading are shown in FIG. 32. Upon receipt of vendor bid responses (step 3200), the bid item selections to be used for grading purposes are identified (step 3210). The bid item selections are associated with the bid request soliciting the vendor bid responses, and vendor bid response data is included within the bid item selections chosen for grading purposes. Using the vendor bid response data within the graded bid items, the vendor bid responses are graded (step 3220).

A more detailed grading process is shown in FIG. 33. After a bid request is created, a buyer user is provided a list of bid item selections associated with the bid request (step 3330). From the list of bid item selections, one or more graded bid items are chosen (step 3305), and each graded bid item may be assigned a weighting factor (e.g., a weighting percentage) (step 3310) to weigh certain responses more heavily than other responses in the final score. It should be noted that in some embodiments, the weighting factors can be equal, thereby eliminating the requirement that the buyer user enter a specific weighting factor. The weighting factors for all the graded bid items must be complete before the vendor bid responses can be graded (step 3315).

Once all of the graded bid items have been chosen and assigned a weighting factor, the grader is provided a list of vendor bid responses (step 3320) and selects one of the vendor bid responses for grading purposes (step 3325). Thereafter, the grader selects one of the graded bid items (step 3330) to grade the vendor bid response data included within the graded bid item (step 3335). The grader can grade the vendor bid response data using any mechanism available to the grader. In one embodiment, the grader can pre-establish grading criteria for a particular graded bid item to enable the system to automatically grade the vendor response data. For example, to grade pricing information, the grader can pre-assign grades to specific pricing ranges, and the system can automatically provide a grade for a pricing graded bid item based on the price submitted in the vendor bid response. In other embodiments, the grader can compare all of the vendor bid response data for a particular graded bid item initially before assigning grades based on the relative differences between the vendor bid response data. In still further embodiments, the grader can pre-establish a checklist or thresholds for each grade to be assigned to a particular graded bid item.

The grade assigned to the vendor response data for the graded bid item is stored in the database (step 3340), and the process is repeated for each graded bid item until the vendor response data included within each graded bid item for a particular vendor bid response is graded (step 3345). Once all of the grades have been completed, the system calculates the vendor's total score based on the individual grades assigned to each graded bid item (step 3350). For example, if the possible grades are A, B, C and D, the vendor score can be calculated by assigning four points for an A, three points for a B, two points for a C and one point for a D.

Each vendor bid response is graded in the same manner (step 3355) to enable the vendor scores to be sorted into descending order (step 3360) for display to the buyer user (step 3365). In addition to the total score, the grader can also be provided with the individual grades for the graded bid items to determine if any re-quotes are necessary. By providing the grader with the total scores and individual grades, the grader can visually determine which vendor had the highest overall score and which vendors had the highest grades for particular graded bid items in order to make a decision as to which vendor to award the project. However, it should be understood that other bid response comparison techniques can be used with the system of the present invention, instead of the specific grading and scoring described herein.

Figure 34B:
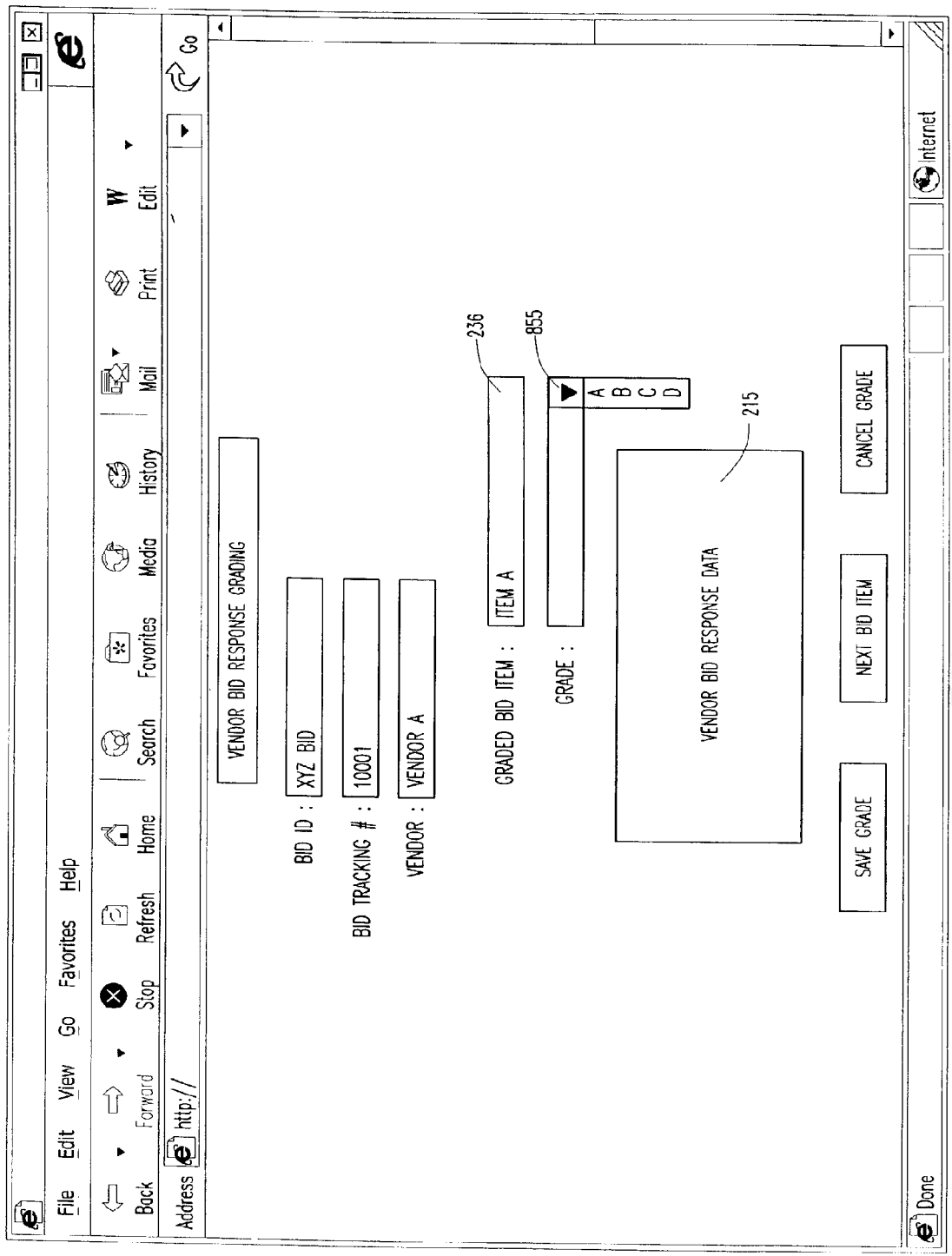

Screen shots of exemplary web pages 61 that can be displayed to the grader for selection of graded bid items and grading of vendor bid responses are shown in FIGS. 34A-34E. In FIG. 34A, the web page contains a list of bid item selections 235 for the grader to select from. For each of the selected graded bid items 236, the grader can also enter a weighting percentage 850 for that graded bid item 236. The grader can adjust the weighting percentages 850 based on pre-established criteria or personal preferences until the weighted percentage 850 total equals one-hundred percent. As discussed above, in other embodiments, all graded bid items 236 can be assigned equal weights, so that the weighting percentages 850 would not need to be displayed to or selected by the grader.

Figure 34C:
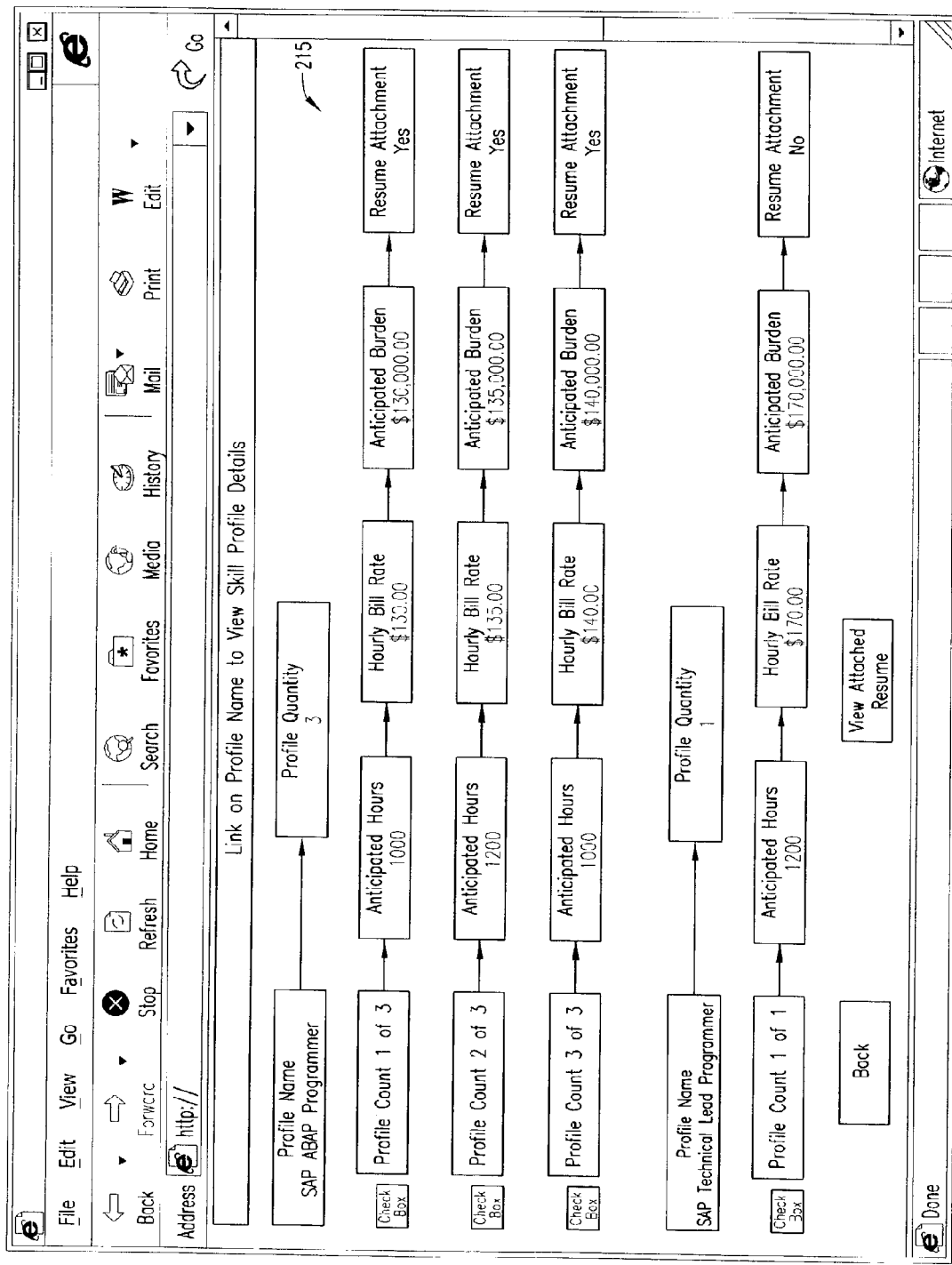

In order to grade vendor bid responses, as shown in FIG. 34B, the grader can be provided a web page listing the particular graded bid item 236 and either displaying the vendor bid response data 215 or providing a link to the vendor bid response data 215. For example, as shown in FIG. 34C, a link to the resource profile and associated resource pricing information can be provided in order to grade a particular graded bid item. Referring again to FIG. 34B, the grader can further be provided a prompt to enter the grade 855 for the vendor bid response data 215 associated with the graded bid item 236. In other embodiments, the grades 855 may be automatically assigned by the system, based on pre-established grading criteria.

Figure 34D:
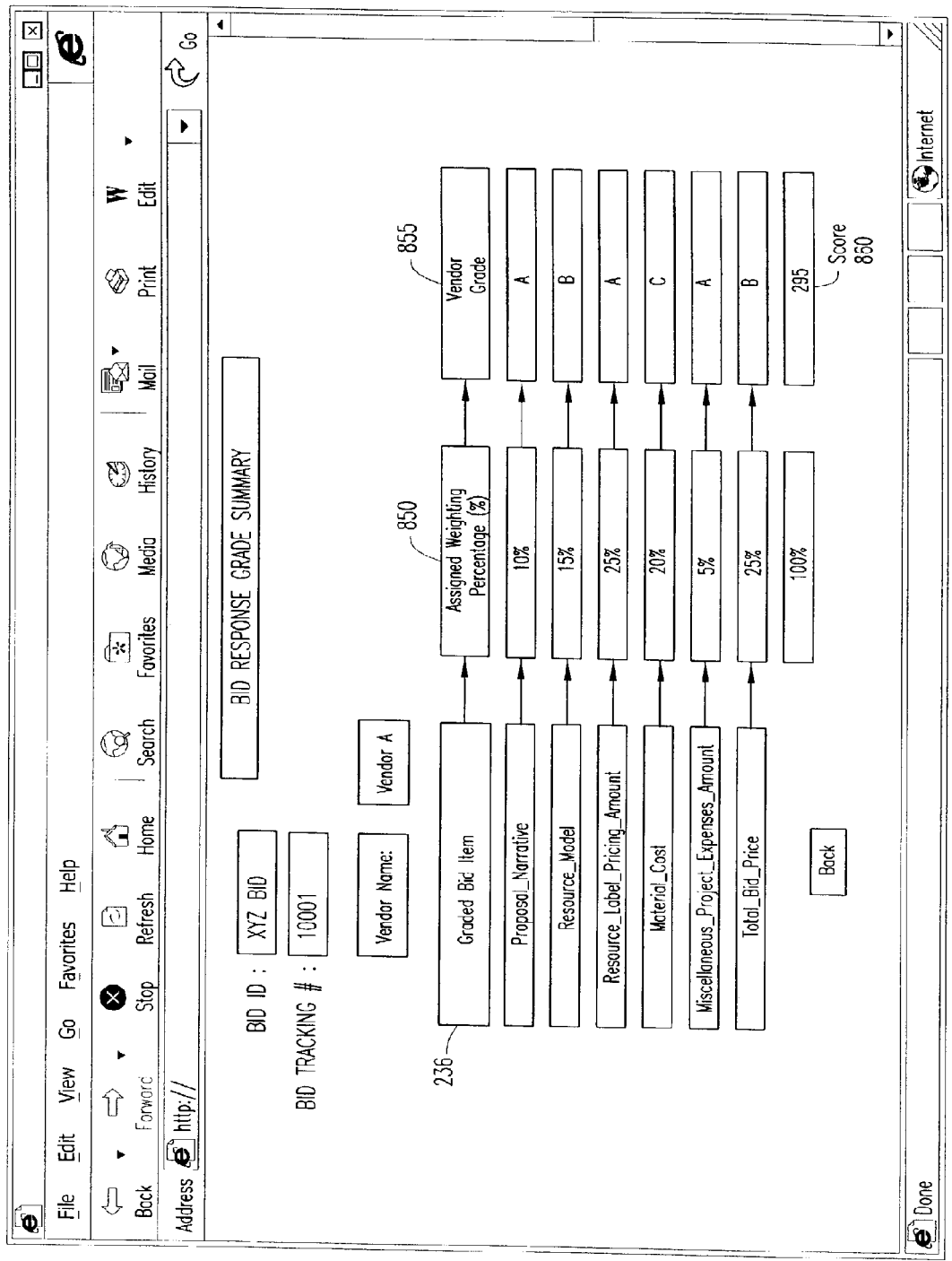
Figure 34E:
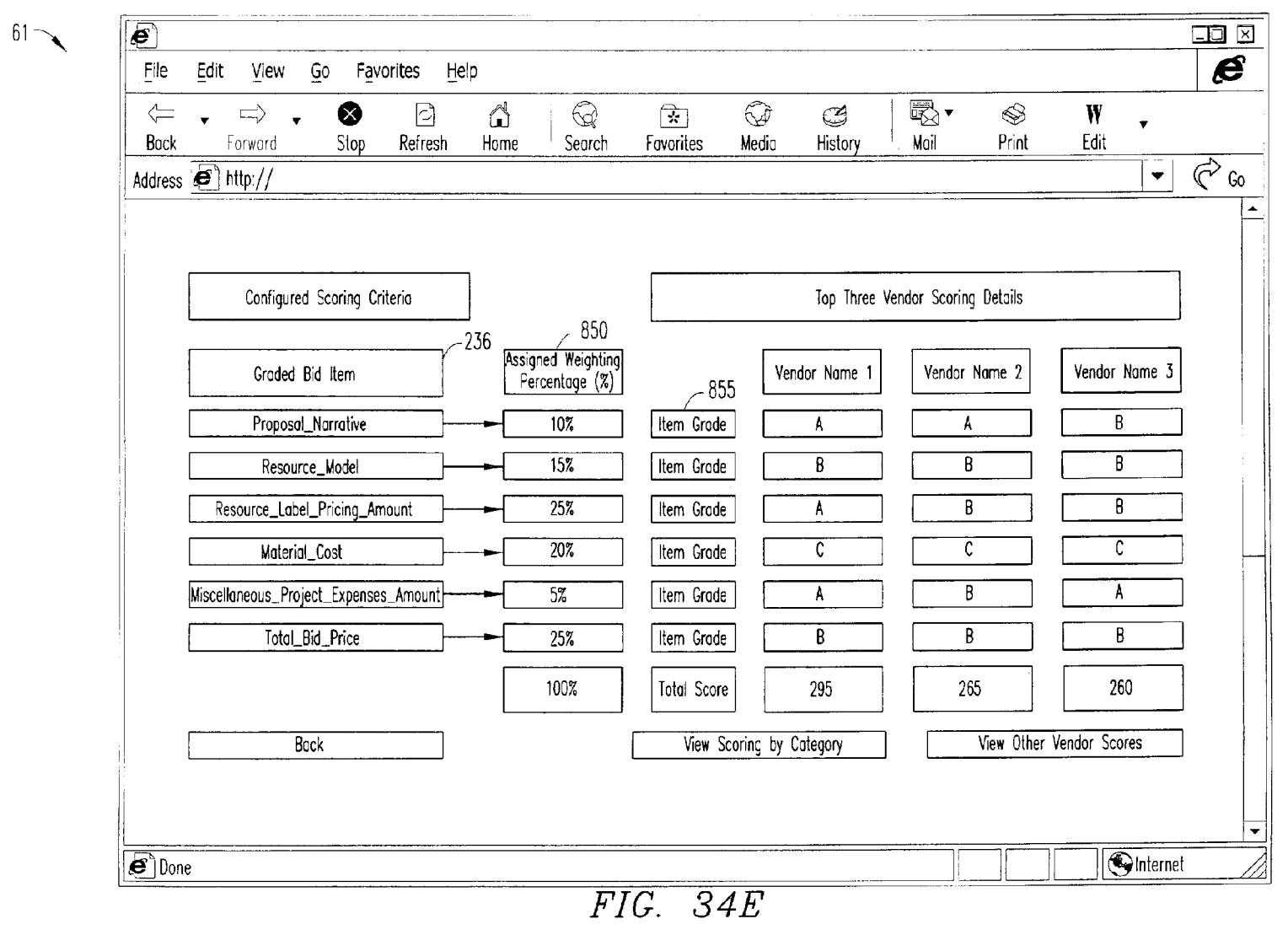

Once a vendor bid response has been graded, as shown in FIG. 34D, the grader can be provided a web page displaying all of the graded bid items 236, the weighting percentages 850 assigned to the graded bid items 236 and the vendor grade 855 assigned to each of the graded bid items 236 by the grader. In addition, the total vendor score 860 can also be displayed to enable the grader to determine the total quality of the vendor bid response. Referring now to FIG. 34E, vendor bid responses can be compared side-by-side based on the total vendor score 860 and individual grades 855 assigned to each of the graded bid items 236.

Examples of the data structures used for selecting the graded bid items and storing the vendor grades are shown in Tables 54-56 hereinbelow. The data structures are illustrated for simplicity as being organized in a table format, with each table including all of the fields necessary for displaying bid item selections to the buyer user to select from and storing grades and scores for vendor bid responses. The tables are related in a hierarchical and relational manner, as will be discussed in connection with FIG. 35.

Sample bid item selections that could be included in a bid request and associated vendor bid response are shown in Table 54 below. However, it should be understood that other information can be included, and the system is not limited to the specific information shown in Table 54. For each bid item selection, there is an indication of whether or not that bid item selection is gradable. For example, not all of the bid item selections may include vendor response data to grade. Therefore, only the gradable bid item selections are displayed to the buyer user to select from.

TABLE 54

Exemplary Vendor Listing of Potential Graded Bid Items (By Category)

| RFX_Category | RFX_Item | Default_Gradable_Item | AV_Response_Data_Type |
|---|---|---|---|
| Supplier_General_Information | Agree_To_Confidentiality_Terms | | Char |
| Supplier_General_Information | Intent_To_Respond | | Char |
| Supplier_General_Information | Company_History | | LongText |
| Supplier_General_Information | Competitive_Analysis | | LongText |
| Supplier_General_Information | Product/Services_Heritage_Review | | LongText |
| Supplier_General_Information | Product/Services_Strategy | | LongText |
| Supplier_General_Information | Technology_Vision | | LongText |
| Supplier_General_Information | Strategic_Technology_Partners | | AV Hyperlink to Sub-Table ASP |
| Supplier_General_Information | Track_Record | | AV Hyperlink to Sub-Table ASP |
| Supplier_General_Information | Project_Management_Philosophy | | LongText |
| Supplier_General_Information | PMI_Certified_FTEs | | LongText |
| Supplier_General_Information | Customer_References | | AV Hyperlink to Sub-Table ASP |
| Supplier_Project_Information | Proposal_Narrative | Y | LongText |
| Supplier_Project_Information | Project_Planning/Strategy | Y | LongText |
| Supplier_Project_Information | Statement_Of_Work_Acceptance | | Char |
| Supplier_Project_Information | Statement_Of_Work_Proposed_Changes | | LongText |
| Supplier_Project_Information | Project_Phasing | Y | AV Hyperlink to Sub-Table ASP |
| Supplier_Project_Information | Project_Phasing_Acceptance | | Char |
| Supplier_Project_Information | Resource_Model | Y | AV Hyperlink to Sub-Table ASP |
| Supplier_Project_Information | Knowledge_Transfer_Plan | Y | LongText |
| Supplier_Project_Information | Deployment_Plan | Y | LongText |
| Supplier_Project_Information | Customer_Acceptance_Model | Y | LongText |
| Supplier_Project_Information | Customer_Acceptance_Model_Agreement | | Char |
| Supplier_Project_Information | Customer_Acceptance_Model_Proposed_Changes | | LongText |
| Supplier_Project_Information | Non-Deliverable_Penalties_Acceptance | | Char |

TABLE 54-continued

Exemplary Vendor Listing of Potential Graded Bid Items (By Category)

| RFX_Category | RFX_Item | Default_Gradable_Item | AV_Response_Data_Type |
|---|---|---|---|
| Supplier_Project_Information | Non-Deliverable_Penalties_Proposed_Changes | | LongText |
| Supplier_Project_Pricing | Resource_Labor_Pricing | | AV Hyperlink to Sub-Table ASP |
| Supplier_Project_Pricing | Resource_Labor_Pricing_Amount | Y | Currency |
| Supplier_Project_Pricing | Equipment/Tooling_Pricing_Comments | | LongText |
| Supplier_Project_Pricing | Materials_List | | AV Hyperlink to Sub-Table ASP |
| Supplier_Project_Pricing | Materials_Cost | Y | Currency |
| Supplier_Project_Pricing | Equipment/Tooling_Pricing_Comments | | Currency |
| Supplier_Project_Pricing | Physical_Site_Pricing_Comments | | LongText |
| Supplier_Project_Pricing | Physical_Site_Pricing_Amount | Y | Currency |
| Supplier_Project_Pricing | Project_Management_Premium_Comments | | LongText |
| Supplier_Project_Pricing | Project_Management_Premium_Amount | Y | Currency |
| Supplier_Project_Pricing | Intellectual_Property_Premium_Comments | | LongText |
| Supplier_Project_Pricing | Intellectual_Property_Premium_Amount | Y | Currency |
| Supplier_Project_Pricing | Miscellaneous_Project_Expenses_Comments | | LongText |
| Supplier_Project_Pricing | Miscellaneous_Project_Expenses_Amount | Y | Currency |
| Supplier_Project_Pricing | Anticipated_Margin | Y | Currency |
| Supplier_Project_Pricing | Total_Bid_Price | Y | Currency |
| Supplier_Resource_Expenses_Handling | Resource_Travel_Expense_Comments | | LongText |
| Supplier_Resource_Expenses_Handling | Resource_Living_Expense_Comments | | LongText |
| Supplier_Resource_Expenses_Handling | Resource_Per_Diem_Comments | | LongText |
| Supplier_Resource_Expenses_Handling | Resource_Mileage_Expense_Comments | | LongText |
| Supplier_Resouce_Expenses_Handling | Reimbersable_Miscellaneous_Expense_Comments | | LongText |
| Capital_Risk_Model | Capital_Risk_Model_Comments | | LongText |
| Capital_Risk_Model | Capital_Risk_Model_Amount | Y | Currency |
| Supplier_Rebate_Model_for_Non-deployed_Investment | Rebate_Model_for_non-deployed_investment | Y | LongText |
| Supplier_Payment_Release_Schedule | Supplier_Payment_Release_Schedule | | LongText |

Figure 35:
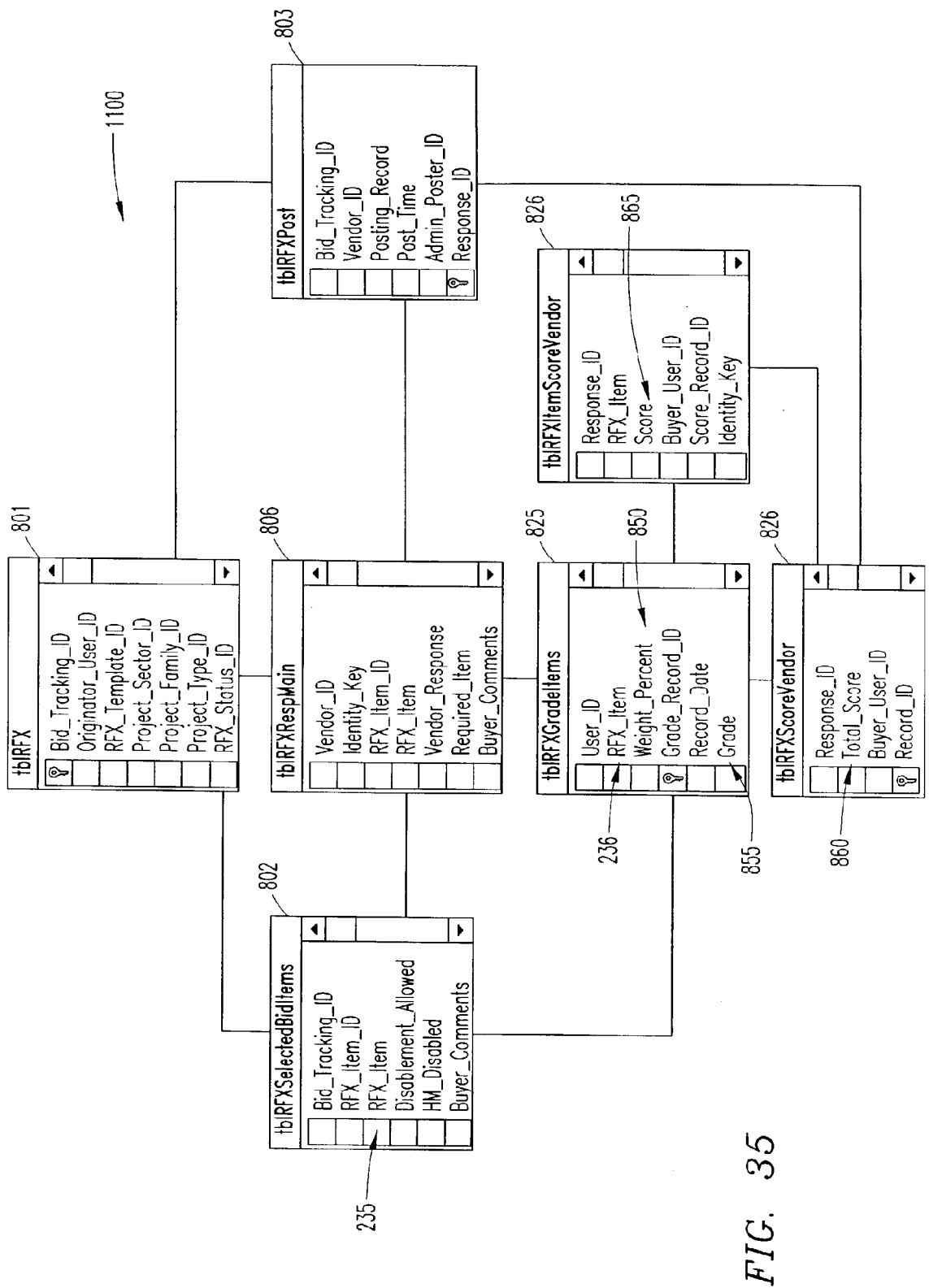
FIG. 35 is a database table views illustrating the interrelation between the bid request, vendor bid responses and grading of vendor bid responses, in accordance with embodiments of the present invention.

A separate grade is stored for each of the graded bid items, as shown in Table 55 below, which can be stored in the database table structure 1100 in table "tblRFXGradeItems" 825, as shown in FIG. 35. Along with the assigned grade 855 for a particular graded bid item 236, table "tblRFXGradeItems" 825 may also include the identity of the buyer user grader, the weighting percentage 850 assigned to the graded bid item 236 and the vendor bid response identifier associated with the grade 855. However, it should be understood that other information can be included, and the system is not limited to the specific information shown in Table 55. Each vendor grade 855 for each vendor is stored in a separate record in the table "tblRFXGradeItems" 825, with each record containing the fields shown below in Table 55. In addition, table "tblRFXGradeItems" 825 is tied to the table "tblRFXRespMain" 806, which is tied to table "tblRFX" 801, both of which are described above in connection with FIG. 29, in order to associate the vendor grade 855 to the vendor bid response and bid request. In addition, the table "tblRFXGradeItems" 825 is tied to the table "tblRFXSelectedBidItems" 802 to associate the vendor grade 855 to the particular bid item selection 235.

TABLE 55

Graded Bid Items Table (tblRFXGradeItems)

| Column Name | Data Type | Length |
|---|---|---|
| User_ID | Int | 4 |
| RFX_Item | Varchar | 50 |
| Weight_Percent | percent | 4 |
| Grade_Record_ID | int | 4 |
| Record_Date | datetime | 8 |
| Grade | char | 1 |
| Response_ID | int | 4 |

The calculated scores 865 for each of the vendor grades 855 for each bid item 235 can be stored as shown below in Table 56, which can be stored in the database in table "RFX-ItemScoreVendor" 826, as shown in FIG. 35. A separate record for each graded bid item for each vendor bid response is stored in table "tblRFXItemScoreVendor" 826, with each record containing the fields shown in Table 56. In addition, the total score 860 based on all of the vendor scores 865 stored in the table "tblRFXItemScoreVendor" 826 can also be stored as shown in Table 57 below, which can be stored in the database in table "tblRFXScoreVendor" 827, as shown in FIG. 35. A separate record for each vendor bid response is stored in table "tblRFXScoreVendor" 827, with each record containing the fields shown in Table 57.

The table "tblRFXItemScoreVendor" 826 is tied to the table "tblRFXGradeItems" 825 to associate each score 865 with the pertinent grade 855 for all of the graded bid items 236 for a particular vendor bid response. In addition, the table "tblRFXScoreVendor" 827 is tied to the table "tblRFXItemScoreVendor" 826 to associate all of the scores 865 for all of the graded bid items 236 for a particular vendor bid response with the total score 860 for that particular vendor bid response. Furthermore, table "tblRFXScoreVendor" 827 is tied to table "tblRFXPost" 803, which is described above in connection with FIG. 29, to update the table "tblRFXPost" with the vendor score 860.

TABLE 56

Vendor Item Scoring Table (tblRFXItemScoreVendor)

| Column Name | Data Type | Length |
|---|---|---|
| Response_ID | Int | 4 |
| RFX_Item | Int | 4 |
| Score | Numeric | 4 |

TABLE 56-continued

Vendor Item Scoring Table (tblRFXItemScoreVendor)

| Column Name | Data Type | Length |
| --- | --- | --- |
| Buyer_User_ID | Int | 4 |
| Score_Record_ID | Int | 4 |
| Identity_Key | Int | 4 |

TABLE 57

Vendor Scoring Table (tblRFXScoreVendor)

| Column Name | Data Type | Length |
| --- | --- | --- |
| Response_ID | int | 4 |
| Total_Score | numeric | 9 |
| Buyer_User_ID | int | 4 |
| Score_Record_ID | int | 4 |
| Identity_Key | int | 4 |

After a vendor bid response is received and graded, the buyer user may provide the opportunity for a vendor to submit a re-quote on one or more graded bid items to improve the vendor's score. For example, a vendor that the buyer user typically chooses or that has high grades on other graded bid items may have a lower score than another vendor, and the buyer user may want to provide, the vendor the opportunity to revise the vendor bid response data for the one or more graded bid items that have low grades.

Figure 36:
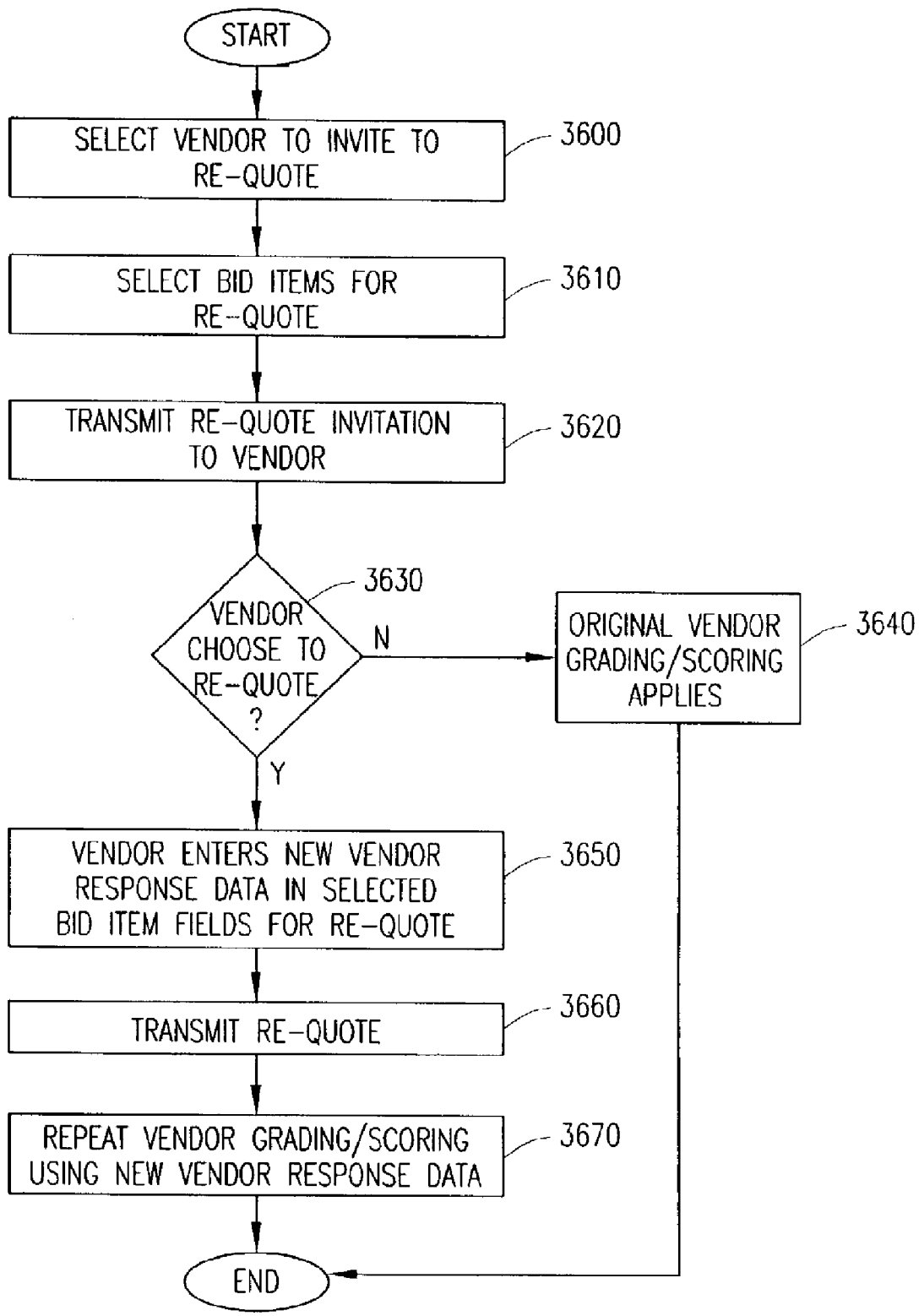
FIG. 36 is a flowchart illustrating a vendor re-quotation process based upon the vendor bid response grading, in accordance with embodiments of the present invention.

Exemplary steps for facilitating the re-quote process are shown in FIG. 36. When the grader becomes aware of one or more low grades for a particular vendor on one or more graded bid items, the grader can invite the vendor to re-quote on one or more selected graded bid items (steps 3600 and 3610). The invitation to re-quote (step 3620) may identify only the particular graded bid items that the vendor is allowed to re-quote on to prevent the vendor from re-quoting on any other graded bid items that the grader does not want to re-grade. For example, the re-quote can include a copy of the original vendor bid response and enable only those re-quoted bid items to be selected by the vendor user to input new vendor response data. The old vendor response data can be deleted or stored along with the new response data in the database for reference purposes. In addition, the re-quote invitation can indicate the vendor grade for each re-quoted bid item, along with the vendor ranking for each re-quoted bid item, and other similar information, such as the high and low vendor grades for the re-quoted bid item.

If the vendor chooses to not re-quote within a buyer-constrained time frame (step 3630), the original vendor grading and scoring applies to the vendor bid response (step 3640). However, if the vendor does re-quote on one or more of the re-quoted bid items (step 3630), the vendor user can enter new vendor response data into bid item fields for the selected re-quoted bid items (step 3650). Upon receipt of the re-quote (step 3660), the grader grades the re-quoted bid items using the new vendor response data and modifies the vendor score accordingly (step 3670).

Figure 37:
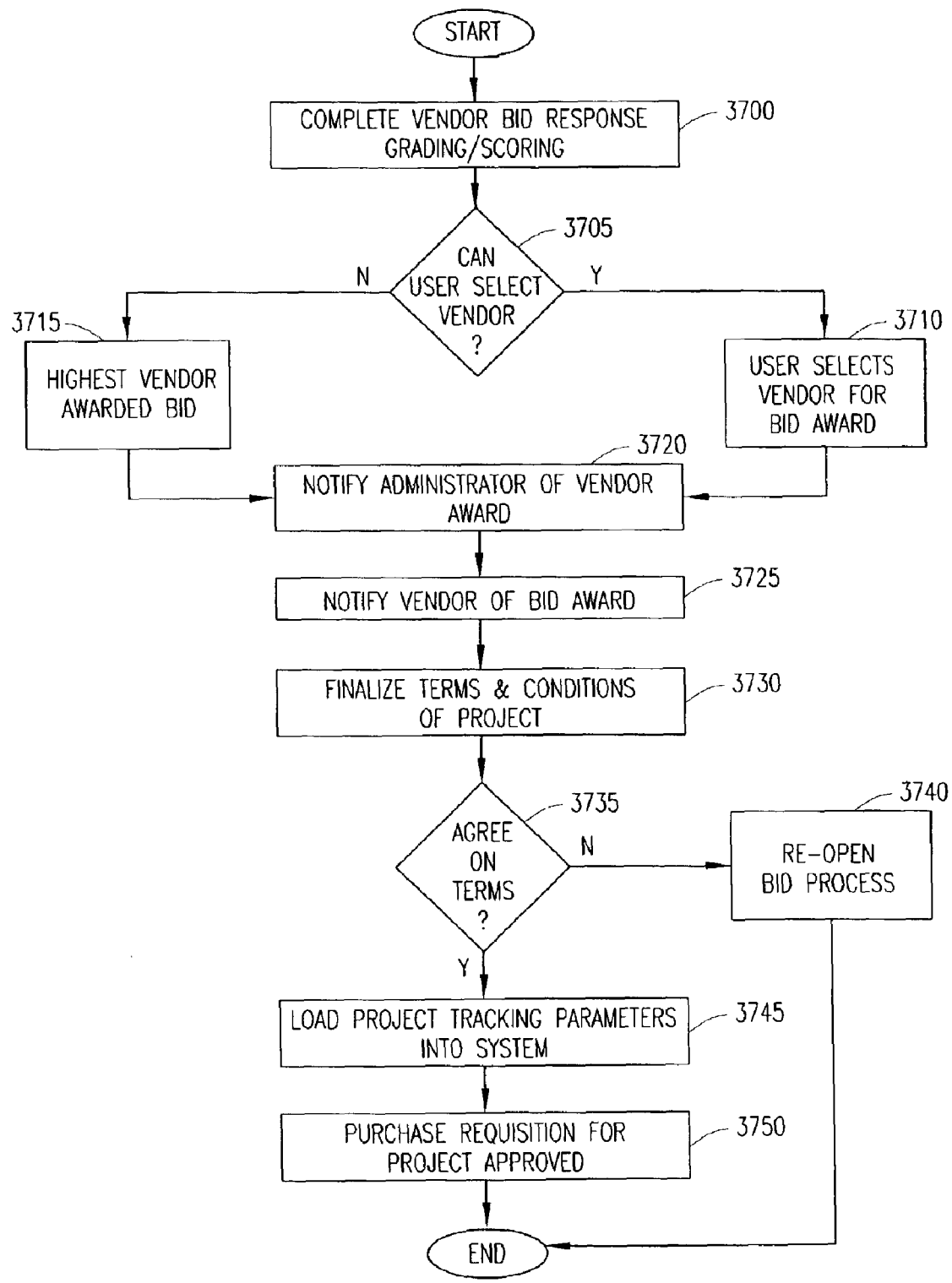
FIG. 37 is a flowchart illustrating exemplary steps in a project administration setup process, in which the project is awarded to a vendor and the terms and conditions of the project are finalized and entered into the computer system to track milestones and deliverables, in accordance with embodiments of the present invention.

Exemplary steps for awarding the bid and entering project tracking parameters are shown in FIG. 37. Once all of the vendor bid response grading and scoring is completed (step 3700), the bid can be awarded to one of the vendors. If the buyer user has the authority to select the vendor based on vendor score and other factors (e.g., personal preferences, knowledge of vendor reputation, knowledge of vendor availability, etc.) (step 3705), the buyer user can select the vendor for the project (step 3710). Otherwise, the vendor with the highest score is awarded the bid (step 3715).

Once the vendor for the project has been selected, the system notifies both the project administrator (step 3720) and the awarded vendor of the bid award (step 3725). Thereafter, the awarded vendor and buyer enter into negotiations to finalize the terms and conditions of the project, as conventionally done (step 3730). If the awarded vendor and buyer cannot agree on the terms and conditions of the project (step 3735), the buyer can re-open the bid process to select a new vendor based on existing vendor scores, based on new vendor bid responses or both (step 3740). However, if the terms and conditions are agreed to (step 3735), the buyer and awarded vendor can load various project tracking parameters into the system (step 3745), such as the project start date, project end date, anticipated project expenditure (requisition amount), assigned resources, project phasing schedule, project payment release schedule, project deliverables, project materials and project expenses to create a purchase requisition for the project. It should be understood that additional project tracking parameters can be loaded into the system to track the performance of the project, and the system is not limited to the project tracking parameters described herein. Once the purchase requisition for the project is approved by the appropriate approval users for the project administrator and the vendor (step 3750), the project can begin.

Screen shots of exemplary web pages 61 for the project administrator and vendor to load project tracking parameters 870 into the system are shown in FIGS. 39A and 39B. For the project administrator, as shown in FIG. 39A, various requisition information can be entered into the system, such as the purchase requisition create date, purchase requisition status (which can be updated automatically by the system), the purchase requisition amount, purchase requisition currency (e.g., U.S. dollars), project start date and project end date. In addition, the project administrator can also enter into the system various project terms and conditions, such as the statement of work, project goods and services deliverables, project contract, project materials, assigned project resources and billable rates, project expenses, project phasing schedule and project payment release schedule. Furthermore, the project administrator can assign administrative users to various administrative user roles that have not already been assigned for the project. Moreover, other financial project tracking parameters applicable to the project can also be entered into the system, such as account assignments, ledger codes, cost center codes, project codes, tax codes and accounting plants.

As shown in FIG. 39B, the vendor can access the buyer-entered data to modify previously entered project tracking parameters 870 in the system and/or enter new project tracking parameters 870 into the system as the project administrator. For example, the vendor can enter one or more of the project terms and conditions discussed above. The parties can agree on who is going to enter the project tracking parameters 870, or both parties can enter and/or modify the project tracking parameters 870, and the system can provide notification to both parties if any changes are made. It should be understood that other project tracking parameters can be inserted into the system, and the system is not limited to those project tacking parameters shown in FIGS. 39A and 39B.

Figure 40A:
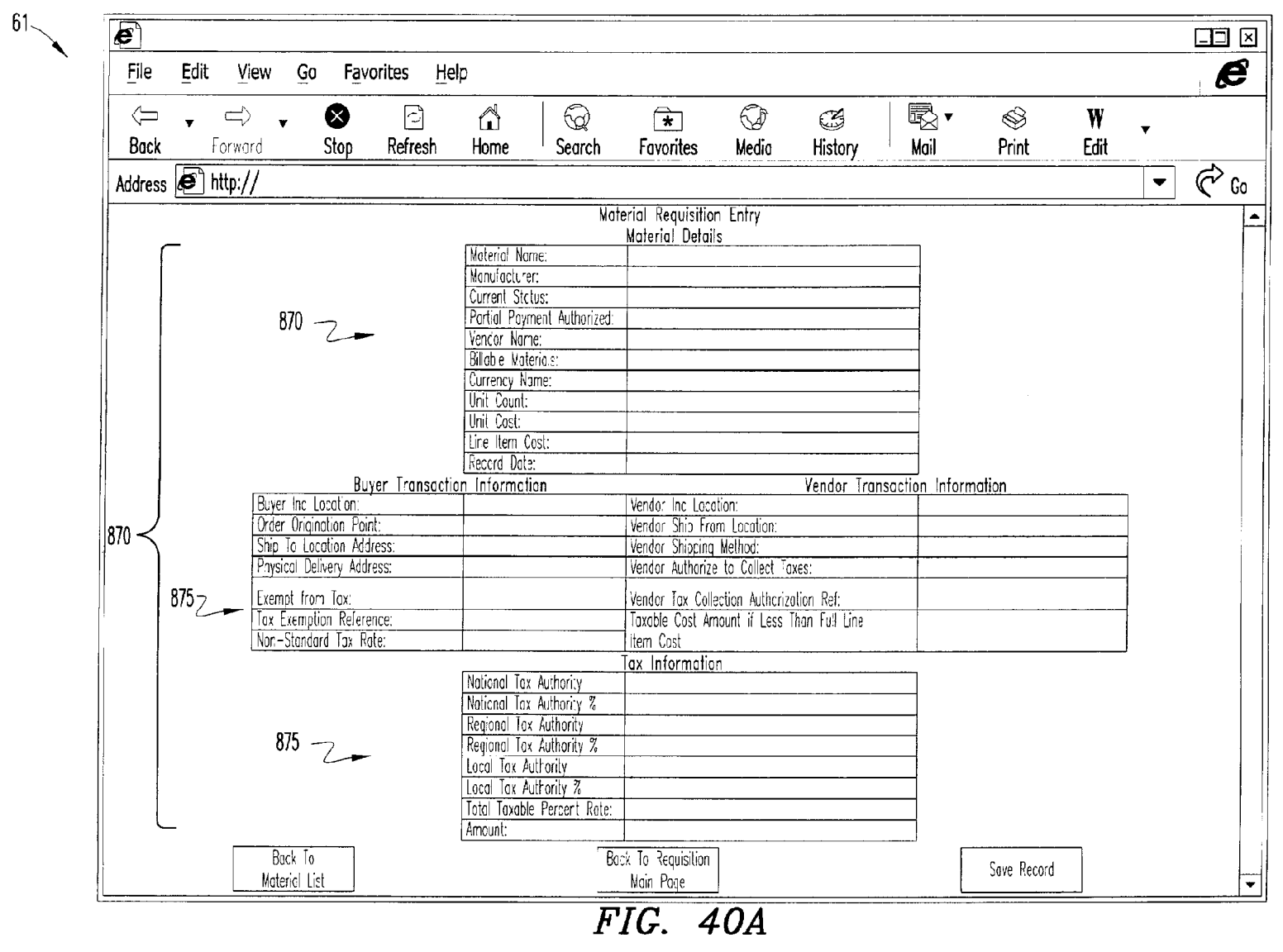

For example, as shown in FIGS. 40A and 40B, taxation information 875 can also be entered into the system as part of the project tracking parameters 870. The taxation information 875 can be used by the buyer and vendor to ensure that all taxation authorities and applicable taxation amounts are accounted for in the project for financial administration and tax liability purposes. As shown in FIGS. 40A and 40B, when a requisition item line number is created for an activity, e.g., a material used by the vendor during the course of the project, the buyer and vendor can designate within the system all pertinent transactional information that would be necessary to properly assess taxation.

For example, as shown in FIG. 40A, as part of the material requisition entry, the buyer and vendor can originate or update the taxation information 875 by entering location information related to the buyer location, origination location, shipping address, physical delivery address, vendor location, etc., all of which may indicate an applicable taxation authority. In addition, if the buyer is tax exempt, the buyer can designate a tax exempt reason. Both the buyer and the vendor can further originate or update the taxation information 875 by entering the applicable taxation authorities and the taxation percentage rates. As shown in FIG. 40B, when a purchase order for a particular activity is submitted for payment, the system can access the taxation percentage rates previously entered by the buyer and vendor for the particular activity and calculate the taxation amount for the purchase order. The taxation information 875, including the taxation authorities, percentage rates, amounts, and other taxation-related transactional information, are stored in the database and made available to authorized users.

Figure 40C:
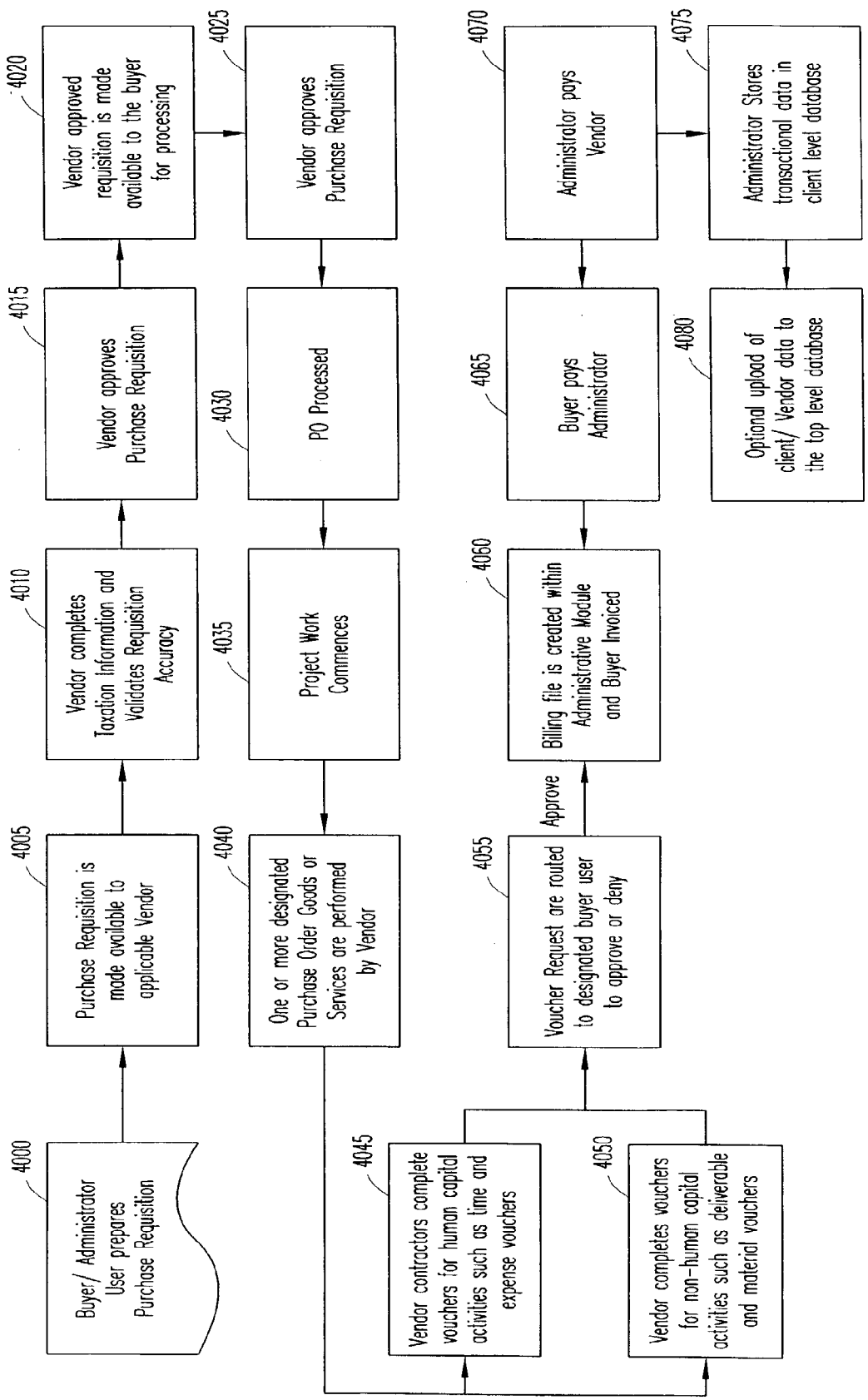
FIG. 40C is a flowchart illustrating exemplary steps for entering and processing project taxation information.

An exemplary process for entering and processing taxation information is shown in FIG. 40C. When a purchase requisition is created by the buyer/administrator that specifies all elements of an activity of the project (project tracking parameters), including human labor, expenses, materials, deliverables, unit work and other miscellaneous expenses, the location of where the goods/services will be delivered or performed (step 4000) and taxation information, the system can make the purchase requisition, including the taxation information, available to the applicable vendor to review (step 4005). At that time, the vendor can also enter any pertinent taxation information into the system and approve the purchase requisition (steps 4010 and 4015). The complete purchase requisition, including both vendor-approved buyer taxation information and vendor taxation information is provided to the buyer for final approval (steps 4020 and 4025).

Upon approval by the buyer, the vendor purchase order is created and issued to the vendor (step 4030) to begin working on the project (step 4035). During the commencement of the project, one or more purchase order designated goods or services are performed by the vendor (step 4040). If the good/service is related to billable time expenses of a contractor, the contractor completes his or her time card (step 4045), as will be described in more detail hereinbelow in connection with FIGS. 42-47. For all other goods/services, the vendor enters other voucher information (step 4050), as will be described in more detail hereinbelow in connection with FIGS. 48-50. Thereafter, the voucher is routed to the designated buyer user for review (step 4055). Upon approval of the voucher by the buyer, the system administrator can create a billing file that imports any applicable taxation amount calculated using the previously entered taxation percentage rates, where applicable, and submits an invoice to buyer for payment thereof (step 4060). Thereafter, the buyer pays the administrator (step 4065) and the administrator pays the vendor (step 4070). The administrator maintains financial transactional data in the billing file related to the payment of the voucher and grants access to the financial transaction data to authorizes buyer or vendor personnel (step 4075), and can optionally upload the financial transaction data to the top-level database for subsequent processing (step 4080), as will be described in more detail hereinbelow in connection with FIG. 59.

As another example of project tracking parameters that can be entered into the system, during the final negotiation, the buyer may request the vendor to submit resumes of resource candidates (actual contractors) for the buyer to approve to ensure that the resource profile positions included in the vendor bid response are filled by actual candidates having the resource profiles. Exemplary data structures for the submission of resource candidates and the review of resource candidates are shown in Tables 58 and 59 below.

Table 58 below illustrates sample resource candidate information that can be submitted for each resource candidate selected by the vendor for a resource profile position in the project. For example, the resource candidate information can include the bid tracking number of the particular bid (bid request and bid response) associated with the resource candidate, the identity of the resource profile for the resource candidate, personal resource candidate information, vendor information, the resume of the resource candidate and the status of the resource candidate submittal. Table 59 illustrates various resource submittal status information that can be included in Table 58. However, it should be understood that other information can be included, and the system is not limited to the specific information shown in Table 58.

TABLE 58

Exemplary Resource Submittal Table (db structure view)

| Column Name | Data Type | Length |
| --- | --- | --- |
| Submitted_ID | int | 4 |
| Bid_Tracking_ID | int | 4 |
| RFX_Resource_Profile_ID | int | 4 |
| Profile_ID | int | 4 |
| Candidate_ID | int | 4 |
| First_Name | varchar | 50 |
| Last_Name | varchar | 50 |
| Middle_Name | varchar | 50 |
| Name_Suffix | varchar | 10 |
| Citizenship_Country1 | int | 4 |
| Citizenship_Country2 | int | 4 |
| Authorized_in_Work_Country | char | 1 |
| Authorization_Description | varchar | 500 |
| Resume_Attachment | char | 1 |
| Vendor_ID | int | 4 |
| Vendor_Contact_Name | varchar | 100 |
| Vendor_Contact_Phone | varchar | 50 |
| Vendor_Contact_Email | varchar | 100 |
| Record_Date | datetime | 8 |
| Submittal_Status_ID | int | 4 |

TABLE 59

Exemplary Resource Submittal Status Table (data view)

| Submittal_Status_ID | Submittal_Status | Display_Value |
| --- | --- | --- |
| 1 | New | Being_Reviewed_by_Admin |
| 2 | On_Hold_by_Admin | Admin_Temporary_Hold |
| 3 | Declined_by_Admin | Candidate_Declined_by_Admin |
| 4 | Submitted_to_Buyer | Forwarded_for_Buyer_Review |
| 5 | Declined_by_Buyer | Candidate_Declined_by_Buyer |
| 6 | Interview_Requested | Interview_Requested |

TABLE 59-continued

Exemplary Resource Submittal Status Table (data view)

| Submittal_Status_ID | Submittal_Status | Display_Value |
|---|---|---|
| 7 | Interview_Scheduled | Interview_Scheduled |
| 8 | Interview_Conducted | Interview_Conducted |
| 9 | Offer_Tendered | Buyer_Offer_Tendered |
| 10 | Offer_Accepted | Vendor_Offer_Accepted |
| 11 | Candidate_Engaged | Candidate_Assigned_To_Order |
| 12 | On_Hold_by_Buyer | Buyer_Temporary_Hold |
| 13 | Withdrawn | No_Longer_Available |

Figure 38:
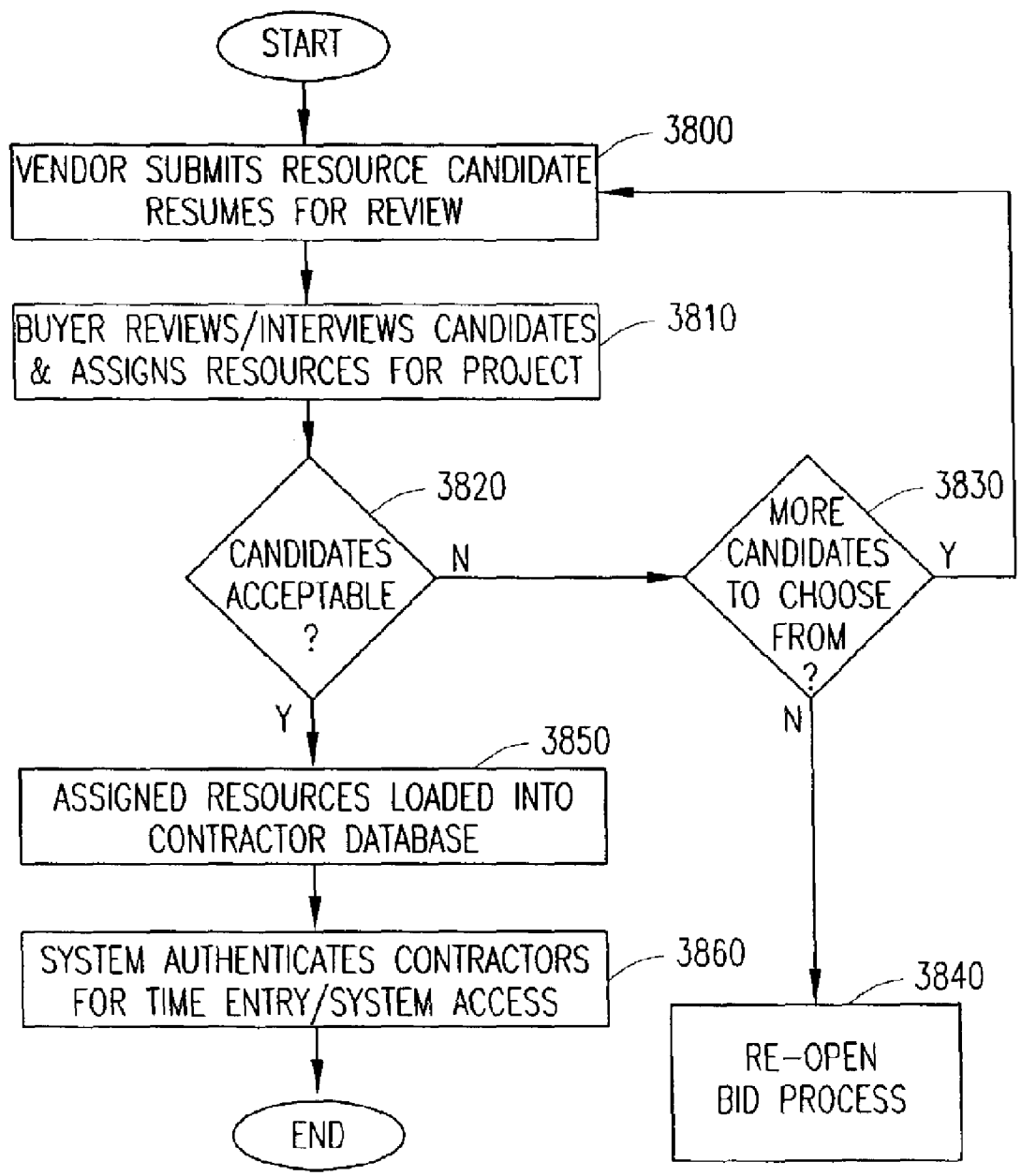
FIG. 38 is a flowchart illustrating exemplary steps for approval of assigned resources to a project, in accordance with embodiments of the present invention.

Exemplary steps for approving resource candidates are shown in FIG. 38. For each resource profile included in the vendor bid response, the vendor submits a resume of a potential resource candidate for the resource profile position (step 3800). The buyer reviews all of the resumes and assigns qualified resource candidates to the resource profile positions (step 3810).

If one or more of the resource candidates is not acceptable (e.g., the resume does not indicate that the resource candidate has the requisite skills for the resource profile) (step 3820), and there are no other acceptable candidates for the resource profile position (step 3830), the buyer can re-open the bid process to secure another vendor for the project that can provide the necessary resources (step 3840). However, if all resource profile positions can be filled by qualified resource candidates, the buyer and/or vendor enters resource information associated with each of the assigned resource candidates (contractors) into the contractor database (step 3850). For example, personal information concerning the contractor, such as the contractor name, address, telephone numbers and employee number, can be entered into the contractor database. In addition, specific project-related contractor information, such as the total number of authorized billable hours, billable rate, the total amount and type of expenses authorized and any agreements or documents that the contractor needs to execute or provide prior to beginning work, can be entered into the contractor database.

Once the contractor information is entered, the system can authenticate the contractor for time keeping and system access purposes (step 3860). For example, the system can provide a user name and password to the contractor for system log-in and authentication purposes. In addition, the system can require the contractor to execute one or more agreements (e.g., by acknowledging the terms of the agreements on-line) and/or provide one or more documents before being allowed access to the time keeping system.

Figure 42:
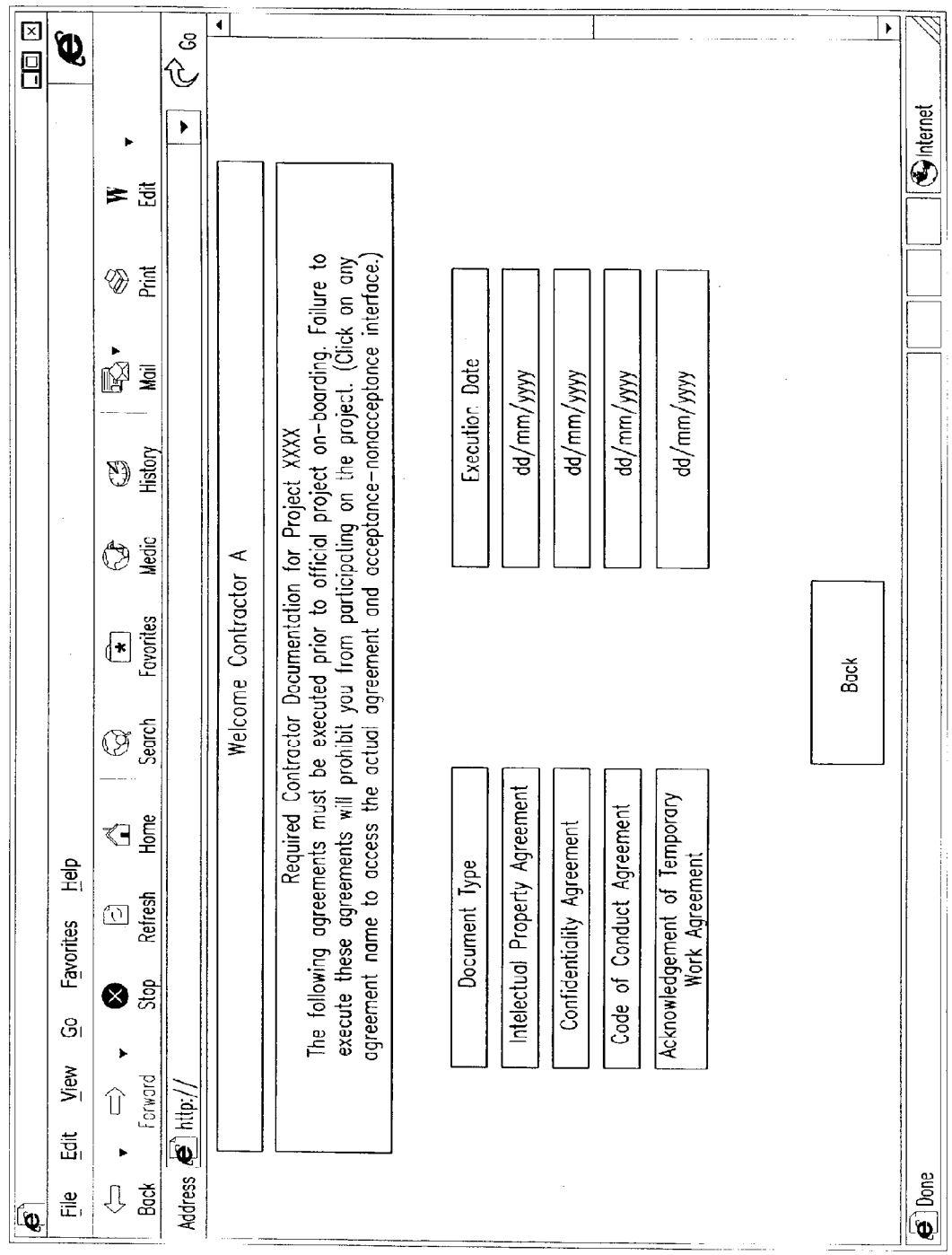
FIG. 42 is a screen shot illustrating the types of liability issues that can be managed by the computer system of the present invention.

A screen shot of an exemplary web page 61 displayed to a contractor upon initial log-in and authentication is shown in FIG. 42. The web page lists several documents that must be executed before the contractor can begin working on the project. For example, the contractor may need to sign an Intellectual Property agreement, a Confidentiality agreement, a Code-of-Conduct agreement and an Acknowledgement of Temporary Work agreement. By clicking on each of the listed documents, a web page showing the agreement can be displayed to the contractor and the contractor can click on an acceptance button to execute the agreement.

Exemplary database structures for storing contractor information and ensuring that relevant documents are obtained from the contractor or agreed to by the contractor are shown in Tables 60-63 below. Table 60 lists various sample documents that either need to be obtained from the contractor or that the contractor needs to execute at some point during the project. Table 60 also lists the time constraints for obtaining or executing such documents. Table 61 lists the contractor information, such as the identity of the contractor, the number of billable hours authorized, the amount of expenses authorized, the execution date of various documents and the contractor type. Table 62 lists the particular document and identifies whether the contractor has executed or provided that document and the date of such execution or provision. It should be understood that a separate record for each document is stored having the format of Table 62. Table 63 illustrates various exemplary information identifying the type of contractors, such as the number of days the contractor has and has not worked for the buyer. However, it should be understood that other information can be included, and the system is not limited to the specific information shown in Tables 60-63.

TABLE 60

Exemplary Contractor Documents Table

| Non-Employee_Document_ID | Document_Description | Due_Diligence_Method | Time_Constraint |
|---|---|---|---|
| 1 | Confidentiality Agreement | Electronic Challenge/Acknowledgment | Project_Duration |
| 2 | Intellectual Property Rights Agreement | Electronic Challenge/Acknowledgment | Project Duration |
| 3 | Code of Conduct Agreement | Electronic Challenge/Acknowledgment | Project_Duration |
| 4 | Temporary Work Assignment Agreement | Electronic Challenge/Acknowledgment | Project_Duration |
| 5 | Commercial Drivers License (CDL) | Physical Copy/Purchasing Database Approval | License_Defined |
| 6 | Drug Test Documentation | Physical Copy/Purchasing Database Approval | 6 months |
| 7 | USA Military Clearance | Physical Copy/Purchasing Database Approval | Clearance Defined |
| 8 | Bonded | Physical Copy/Purchasing Database Approval | Notary Defined |

TABLE 60-continued

Exemplary Contractor Documents Table

| Non-Employee_Document_ID | Document_Description | Due_Diligence_Method | Time_Constraint |
|---|---|---|---|
| 9 | USA Technology Export Compliant Citizen | Physical Copy/Purchasing Database Approval | Project_Duration |
| 10 | Independent Contractor Qualified | Physical Copy/Purchasing Database Approval | Project_Duration |
| 11 | W-2 Verification | Physical Copy/Purchasing Database Approval | 6 months |
| 12 | Certified Union Member | Physical Copy/Purchasing Database Approval | Certification Defined |
| 13 | Right to Work Country | Physical Copy/Purchasing Database Approval | Project_Duration |

TABLE 61

Exemplary Contractor Table

| Column Name | Data Type | Length |
|---|---|---|
| Requistion_ID | int | 4 |
| Buyer_PO_# | varchar | 20 |
| Current_Status_ID | int | 4 |
| Contractor_ID | int | 4 |
| Time_Keeping_Only | char | 1 |
| Billable_Hours_Authorized | int | 4 |
| Expenses_Authorized | money | 8 |
| Vendor_ID | int | 4 |
| User_ID | int | 4 |
| Record_ID | int | 4 |
| IP_Agreement_Date | datetime | 8 |
| ATW_Agreement | datetime | 8 |
| Confidentiality_Agreement | datetime | 8 |
| Drug_Screen | datetime | 8 |
| Code_Of_Conduct | datetime | 8 |
| Contractor_Type | int | 4 |
| Profile_ID | int | 4 |

TABLE 62

Exemplary Contractor Execution Dates Table

| Column Name | Data Type | Length |
|---|---|---|
| Contractor_ID | int | 4 |
| Non-Employee_Liability_Issue_ID | int | 4 |
| Agreement_Executed | char | 1 |
| Agreement_Execution_Date | datetime | |
| Assessment_Complete_Date | datetime | 1 |
| Assessment_Disposition | char | 1 |
| Assessment_User_ID | int | 4 |
| Tickler_Date | datetime | |

TABLE 63

Exemplary ContractorTypes Table (db structure view)

| Column Name | Data Type | Length |
|---|---|---|
| Contractor_Type_ID | Int | 4 |
| Contractor_Type | Varchar | 50 |
| Notes | Varchar | 500 |
| Tenure_Days | Numeric | 9 |
| Separation_Days | Numeric | 9 |

Examples of the data structures used for storing the project tracking parameters are shown in Tables 64-79 hereinbelow. The data structures are illustrated for simplicity as being organized in a table format, with each table including all of the fields necessary for tracking the performance of the project. The tables are related in a hierarchical and relational manner, as will be discussed in connection with FIG. 41.

Figure 41:
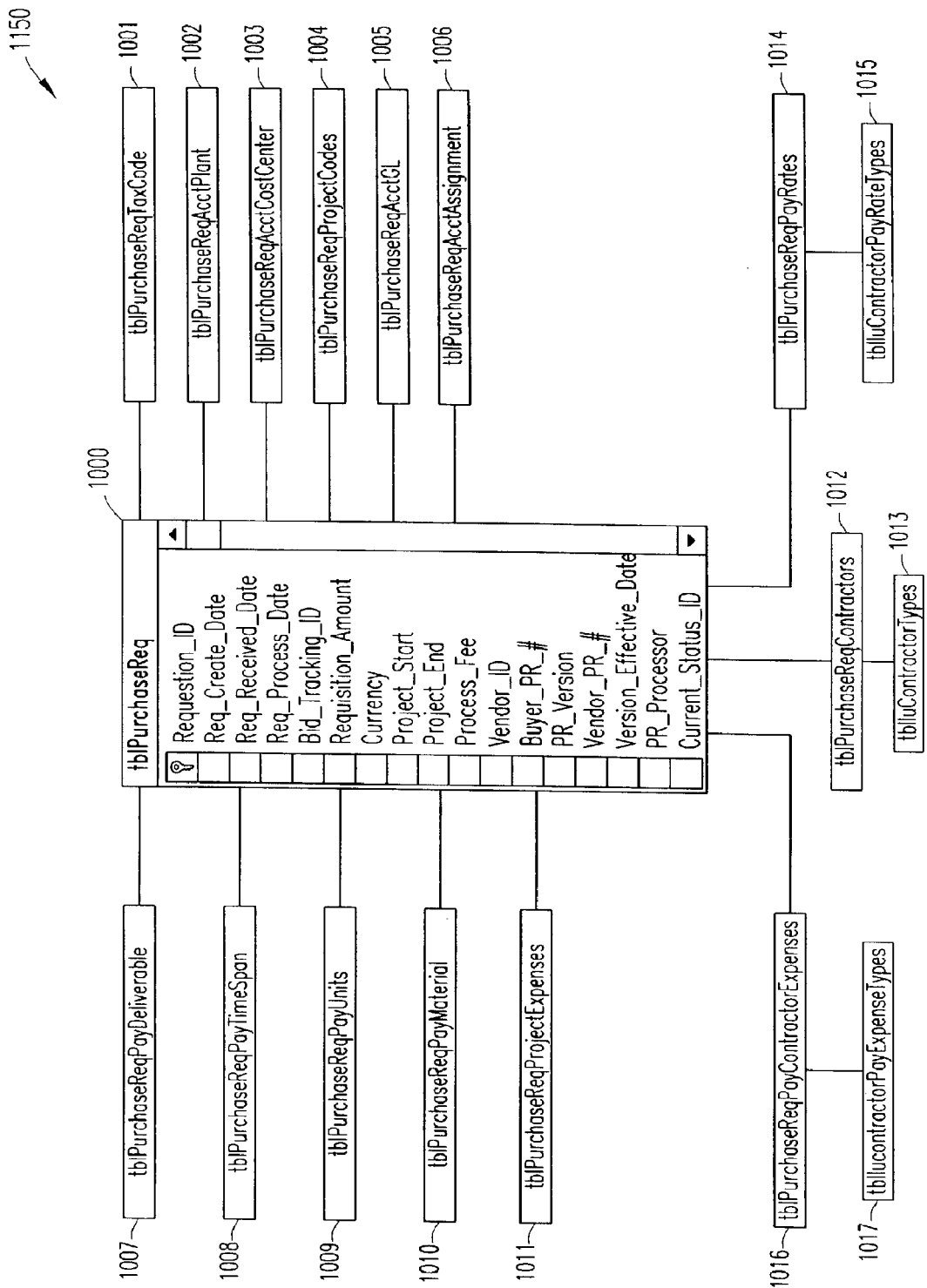
FIG. 41 is a database table view illustrating various project administration components handled by the computer system of the present invention.

Table 64 below illustrates sample general purchase requisition information, which can be stored in the database in table "tblPurchaseReq" 1000, as shown in FIG. 41. For example, such general purchase information can include the identity assigned to the purchase requisition by the system, the buyer and the vendor, the requisition create date, the requisition amount, the bid tracking number for the bid (bid request and bid response) associated with the purchase requisition, the project start and end dates, along with any other pertinent purchase requisition information. However, it should be understood that other information can be included, and the system is not limited to the specific information shown in Table 64. Referring now to the database table structure 1150 in FIG. 41, table "tblPurchaseReq" 1000 is shown tied to table "tblPurchaseReqContractors" 1012 and table "tblluContractorTypes" 1013, which include information in the data structure format corresponding to Tables 61 and 63 above, respectively, to associate the assigned contractors to the purchase requisition.

TABLE 64 tblPurchaseReq

| Column Name | Data Type | Length |
|---|---|---|
| Requisition_ID | int | 4 |
| Req_Created_Date | datetime | 8 |
| Req_Received_Date | datetime | 8 |
| Req_Process_Date | datetime | 8 |
| Bid_Tracking_ID | int | 4 |
| Requistion_Amount | money | 8 |
| Currency | int | 4 |
| Project_Start | datetime | 8 |
| Project_End | datetime | 8 |
| Process_Fee | numeric | 9 |
| Vendor_ID | int | 4 |
| Buyer_PR_# | varchar | 20 |
| PR_Version | numeric | 9 |
| Vendor_PR_# | varchar | 20 |
| Version_Effective_Date | datetime | 8 |
| Req_Processor | int | 4 |
| Current_Status_ID | int | 4 |

Tables 65-70 below illustrate sample specific purchase requisition information associated with tax codes, account plants, cost centers, project codes, account assignment and other similar buyer specific purchase requisition information, all of which can be stored in the database in respective tables "tblPurchaseReqTaxCode" 1001, "tblPurchaseReqAcctPlant" 1002, "tblPuchaseReqAcctCostCenter" 1003, "tblPurchaseReqProjectCodes" 1004, "tblPurchaseReqAcctGL" 1005 and "tblPurchaseReqAcctAssignment" 1006, as shown in FIG. 41. However, it should be understood that additional tables and information related to the purchase requisition can be included, depending on the purchase requisition requirements. Tables "tblPurchaseReqTaxCode" 1001, "tblPurchaseReqAcctPlant" 1002, "tblPuchaseReqAcctCostCenter" 1003, "tblPuchaseReqProjectCodes" 1004, "tblPurchaseReqAcctGL" 1005 and "tblPurchaseReqActAssignment" 1006 are tied to the table "tblPurchaseReq" 1000 to associate the specific purchase requisition information with the general purchase requisition information.

TABLE 65

| tblPurchaseReqTaxCodes | | |
|---|---|---|
| Column Name | Data Type | Length |
| Requistion_ID | int | 4 |
| Buyer_PR_# | varchar | 20 |
| Tax_Code | varchar | 10 |
| Current_Status_ID | int | 4 |
| Record_ID | int | 4 |

TABLE 66

| tblPurchaseReqAcctPlant | | |
|---|---|---|
| Column Name | Data Type | Length |
| Requisition_ID | int | 4 |
| Buyer_PR_# | varchar | 20 |
| Accounting_Plant | varchar | 10 |
| Record_ID | int | 4 |
| Current_Status_ID | int | 4 |

TABLE 67

| tblPurchaseReqAcctCostCenter | | |
|---|---|---|
| Column Name | Data Type | Length |
| Requistion_ID | int | 4 |
| [Billable_Dept/Cost_Center] | nvarchar | 10 |
| Buyer_PR_# | varchar | 20 |
| Record_ID | int | 4 |
| Current_Status_ID | int | 4 |

TABLE 68

| tblPurchaseReqProjectCodes | | |
|---|---|---|
| Column Name | Data Type | Length |
| Purchase_Req_ID | int | 4 |
| Buyer_PR_# | varchar | 20 |
| Project_Code | varchar | 20 |
| [Billable_Dept/Cost_Center] | nvarchar | 20 |
| Record_ID | int | 4 |
| Current_Status_ID | int | 4 |

TABLE 69

| tblPurchaseReqAcctGL | | |
|---|---|---|
| Column Name | Data Type | Length |
| Requisition_ID | int | 4 |
| Buyer_PR_# | varchar | 20 |
| G_L_Account | varchar | 20 |
| Record_ID | int | 4 |
| Current_Status_ID | int | 4 |

TABLE 70

| tblPurchaseReqAcctAssignment | | |
|---|---|---|
| Column Name | Data Type | Length |
| Requisiton_ID | int | 4 |
| Buyer_PR_# | varchar | 20 |
| Account_Assignment | varchar | 10 |
| Current_Status_ID | int | 4 |
| Record_ID | int | 4 |

Tables 71-75 below illustrate sample requisition payment information related to the purchase requisition. For example, such requisition payment information can include payment amounts based on project deliverables (e.g., goods and services delivered at the end of the project or during phases of the project), payment amounts based on time frames, payment amounts based on the number of units completed, payment amounts based on project materials and payment amounts based on project expenses. In FIG. 41, the requisition payment information is shown as stored in the database in tables "tblPurchaseReqPayDeliverable" 1007, "tblPurchaseReqPayTimeSpan" 1008, "tblPurchaseReqPayUnits" 1009, "tblPurchaseReqPayMaterials" 1010 and "tblPurchaseReqPayProjectExpenses" 1011. Each of the tables "tblPurchaseReqPayDeliverable" 1007, "tblPurchaseReqPayTimeSpan" 1008, "tblPurchaseReqPayUnits" 1009, "tblPurchaseReqPayMaterials" 1010 and "tblPurchaseReqPayProjectExpenses" 1011 are shown tied to table "tblPurchaseReq" to associate the payment information with the general purchase requisition information.

It should be understood that additional tables or information may be included, depending on the purchase requisition requirements. In addition, it should be understood that one or more of the payment tables can be included, depending on the project. Furthermore, it should be understood that a separate record for each payment amount is included having the format of one of Tables 71-75 below.

TABLE 71

| Exemplary tblPurchaseReqPayDeliverable (db structure view) | | |
|---|---|---|
| Column Name | Data Type | Length |
| Requisition_ID | int | 4 |
| Buyer_PR_# | varchar | 20 |
| Deliverable_Description | varchar | 1000 |
| Anticipated_Completion_Date | datetime | 8 |
| Payment_Amount | money | 8 |
| Partial_Payment_Authorized | char | 1 |
| Current_Status_ID | int | 4 |
| Vendor_ID | int | 4 |
| User_ID | int | 4 |
| Record_ID | int | 4 |
| Record_Date | datetime | 8 |

TABLE 72

| Exemplary tblPurchaseReqPayTimeSpan (db structure view) | | |
|---|---|---|
| Column Name | Data Type | Length |
| Requisition_ID | int | 4 |
| Buyer_PR_# | varchar | 20 |
| Current_Status_ID | int | 4 |
| Work_Start_Date | datetime | 8 |
| Payment_Release_Date | Datetime | 8 |
| Payment_Amount | Money | 8 |
| Vendor_ID | Int | 4 |

TABLE 72-continued

Exemplary tblPurchaseReqPayTimeSpan (db structure view)

| Column Name | Data Type | Length |
| --- | --- | --- |
| User_ID | Int | 4 |
| Record_ID | Int | 4 |

TABLE 73

Exemplary tblPurchaseReqPayUnits (db structure view)

| Column Name | Data Type | Length |
| --- | --- | --- |
| Requisition_ID | int | 4 |
| Buyer_PR_# | varchar | 20 |
| Current_Status_ID | int | 4 |
| Unit_Completion_Description | varchar | 1000 |
| Unit_Count | numeric | 9 |
| Unit_Cost | money | 8 |
| Partial_Payment_Authorized | char | 1 |
| Vendor_ID | int | 4 |
| User_ID | int | 4 |
| Record_ID | int | 4 |

TABLE 74

Exemplary tblPurchaseReqPayMaterials (db structure view)

| Column Name | Data Type | Length |
| --- | --- | --- |
| Requisition_ID | Int | 4 |
| Buyer_PR_# | Varchar | 20 |
| Vendor_ID | int | 4 |
| Material_Name | varchar | 100 |
| Material_Description | varchar | 500 |
| Material_Manufacturer | varchar | 100 |
| Unit_Cost | money | 8 |
| Unit_Count | numeric | 9 |
| Line_Item_Cost | money | 8 |
| Currency_ID | int | 4 |
| Current_Status_ID | int | 4 |
| User_ID | int | 4 |
| Record_ID | int | 4 |
| Record_Date | datetime | 8 |

TABLE 75

Exemplary tblPurchaseReqPayProjectExpenses (db structure view)

| Column Name | Data Type | Length |
| --- | --- | --- |
| Requisition_ID | int | 4 |
| Buyer_PR_# | varchar | 20 |
| Project_Expense_Description | varchar | 500 |
| Maximum_Threshold | money | 8 |
| Currency_ID | int | 4 |
| User_ID | int | 4 |
| Vendor_ID | int | 4 |
| Current_Status_ID | int | 4 |
| Record_ID | int | 4 |
| Record_Date | datetime | 8 |

Tables 77 and 77 below illustrate sample information associated with the pay rates for contractors assigned to the purchase requisition. For example, the contractor pay rate information can indicate the type of pay (e.g., hourly, fixed, overtime, etc.) and the pay rate amount (e.g., billable rate per hour, billable rate per overtime hour, billable amount). The pay rate information can be stored in the database in tables "tblPurchaseReqPayRates" 1014 and "tblluContractorPayRateTypes" 1015, which are shown in FIG. 41 tied to table "tblPurchaseReq" 1000 to associate the pay rate information with the purchase requisition. It should be understood that a separate pay rate record for each pay rate type of each contractor can be stored in table "tblPurchaseReqPayRates" 1014. It should further be understood that additional tables or information can be included, depending on the purchase requisition requirements.

TABLE 76 tblPurchaseReqPayRates (db structure view)

| Column Name | Data Type | Length |
| --- | --- | --- |
| Requisition_ID | int | 4 |
| Buyer_PR_# | varchar | 20 |
| Current_Status_ID | int | 4 |
| Contractor_ID | int | 4 |
| Pay_Rate_Type | int | 4 |
| Pay_Rate | money | 8 |
| Currency_ID | int | 4 |
| User_ID | int | 4 |
| Vendor_ID | int | 4 |
| Record_ID | int | 4 |

TABLE 77 tblluContractorPayRateTypes (db structure view)

| Column Name | Data Type | Length |
| --- | --- | --- |
| Hour_Type_ID | Int | 4 |
| Hour_Type_Description | varchar | 50 |

Tables 78 and 79 below illustrate sample payment information associated with the contractor expenses for contractors assigned to the purchase requisition. For example, the contractor expense information can indicate the type of expense and the maximum amount allocated for the expense. The contractor expense information can be stored in the database in tables "tblPurchaseReqPayContractorExpenses" 1016 and "tblluContractorPayExpenseTypes" 1017, which are shown in FIG. 41 tied to table "tblPurchaseReq" 1000 to associate the contractor expense information with the purchase requisition. It should be understood that a separate contractor expense record for each contractor expense type of each contractor can be stored in table "tblPurchaseReqPayContractorExpenses" 1016. It should further be understood that additional tables or information can be included, depending on the purchase requisition requirements.

TABLE 78 tblPurchaseReqPayContractorExpenses (db structure view)

| Column Name | Data Type | Length |
| --- | --- | --- |
| Requisition_ID | int | 4 |
| Buyer_PR_# | varchar | 20 |
| Current_Status_ID | int | 4 |
| Contractor_ID | int | 4 |
| Expense_Type_ID | int | 4 |
| Maximum_Threshold | money | 8 |
| Currency_ID | int | 4 |
| User_ID | int | 4 |
| Vendor_ID | int | 4 |
| Record_ID | int | 4 |

TABLE 79

| tblluContractorPayExpenseTypes (db structure view) | | |
| --- | --- | --- |
| Column Name | Data Type | Length |
| Contractor_Expense_Type_ID | Int | 4 |
| Contractor_Expense_Type | varchar | 50 |

Post-Bid Activity

Once the project has begun, the project administrator (or buyer) can monitor the progress of the project using a time keeping system, in which contractors enter time into time cards for project work performed. The time cards can be stored to assess project performance for requisition payment information and/or to generate payment vouchers based on time worked, depending on the requisition payment information. For example, if the requisition payment amount was based, at least in part, on an anticipated number of billable hours of a particular contractor at a particular pay rate, and the contractor completed the project under the anticipated number of billable hours, the project administrator and vendor may be able to re-negotiate the requisition payment amount that was initially set for payment based on deliverables, time frames or units.

Figure 43:
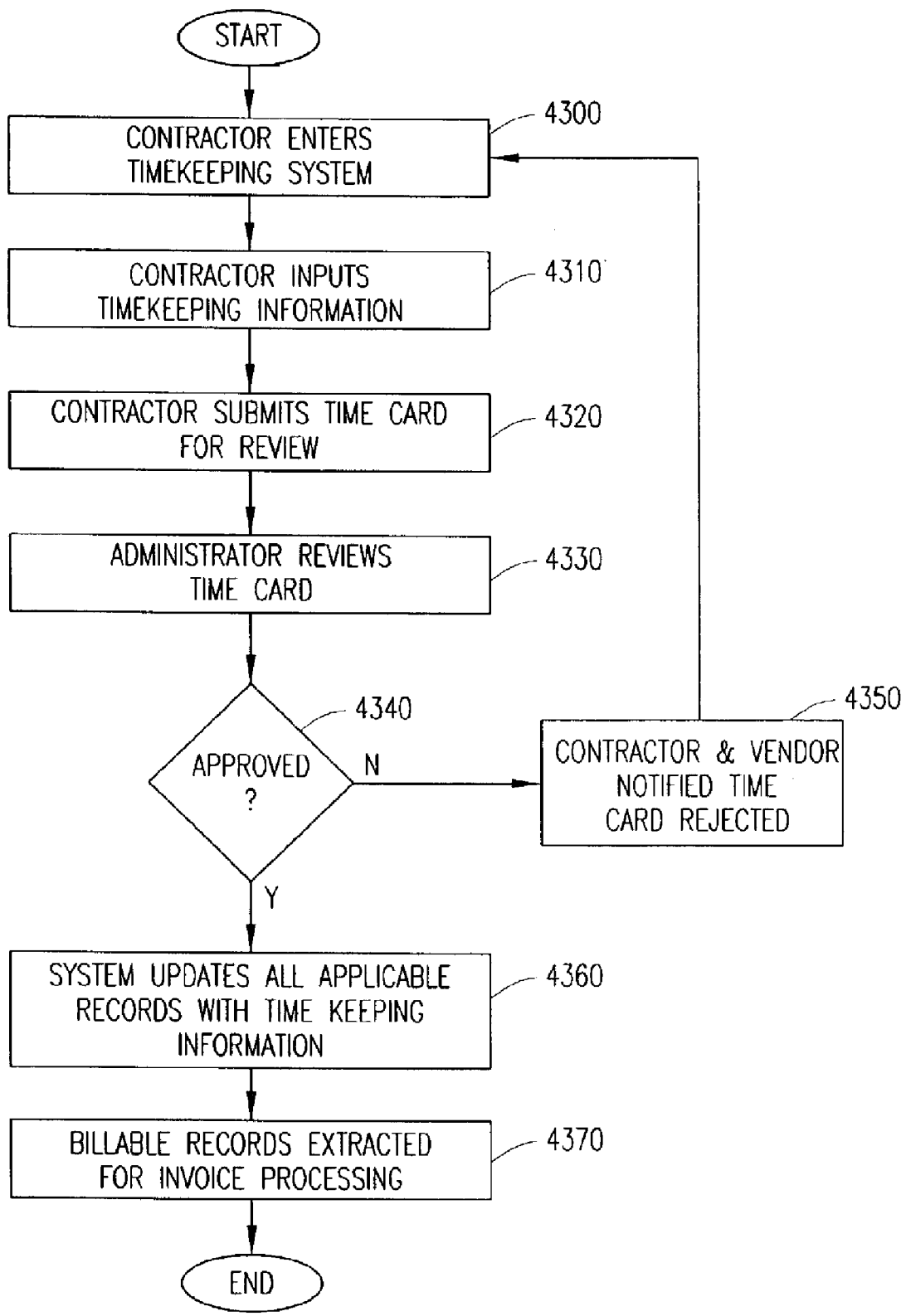
FIG. 43 is a flowchart illustrating exemplary steps for entering contractor time for a project, in accordance with embodiments of the present invention.

Referring now to FIG. 43, there are illustrated exemplary steps for implementing a time keeping system within the system of the present invention. After the contractor has completed all necessary documentation and is authorized to enter the time keeping system, the contractor can enter the time keeping system (step 4300) to input time keeping information (step 4310) associated with the number of hours worked by the contractor into a time card (e.g., a time keeping record for the contractor). The time keeping information can be entered at any time the time keeping system is accessible. For example, the time keeping system can be accessible only at specific times (e.g., the end of the week, the beginning of week, etc.) as determined by the project administrator or during times that the time keeping system is not off-line.

Once the contractor has entered the time keeping information into the time card, the time card is provided to the project administrator (step 4325) for review and approval (step 4330). If the time card is not approved (step 4340), the contractor and vendor are notified of the time card rejection (step 4350) and the contractor is instructed to access the time keeping system to modify the time card (step 4300). For example, if the contractor has not completely filled out the time card, the time keeping information (e.g., number of hours) entered into the time card is out of the normal or unreasonable or the project administrator has knowledge that the time keeping information is incorrect, the time card may be rejected. If the time card is approved (step 4340), all applicable records within the system are updated with the time keeping information (step 4360) and any payable vouchers associated with the time keeping information are extracted for invoice processing (step 4370). For example, if requisition payment is based on the number of hours worked within a particular time frame, a payable voucher may need to be generated based on the time keeping information entered by the contractor.

Figure 44:
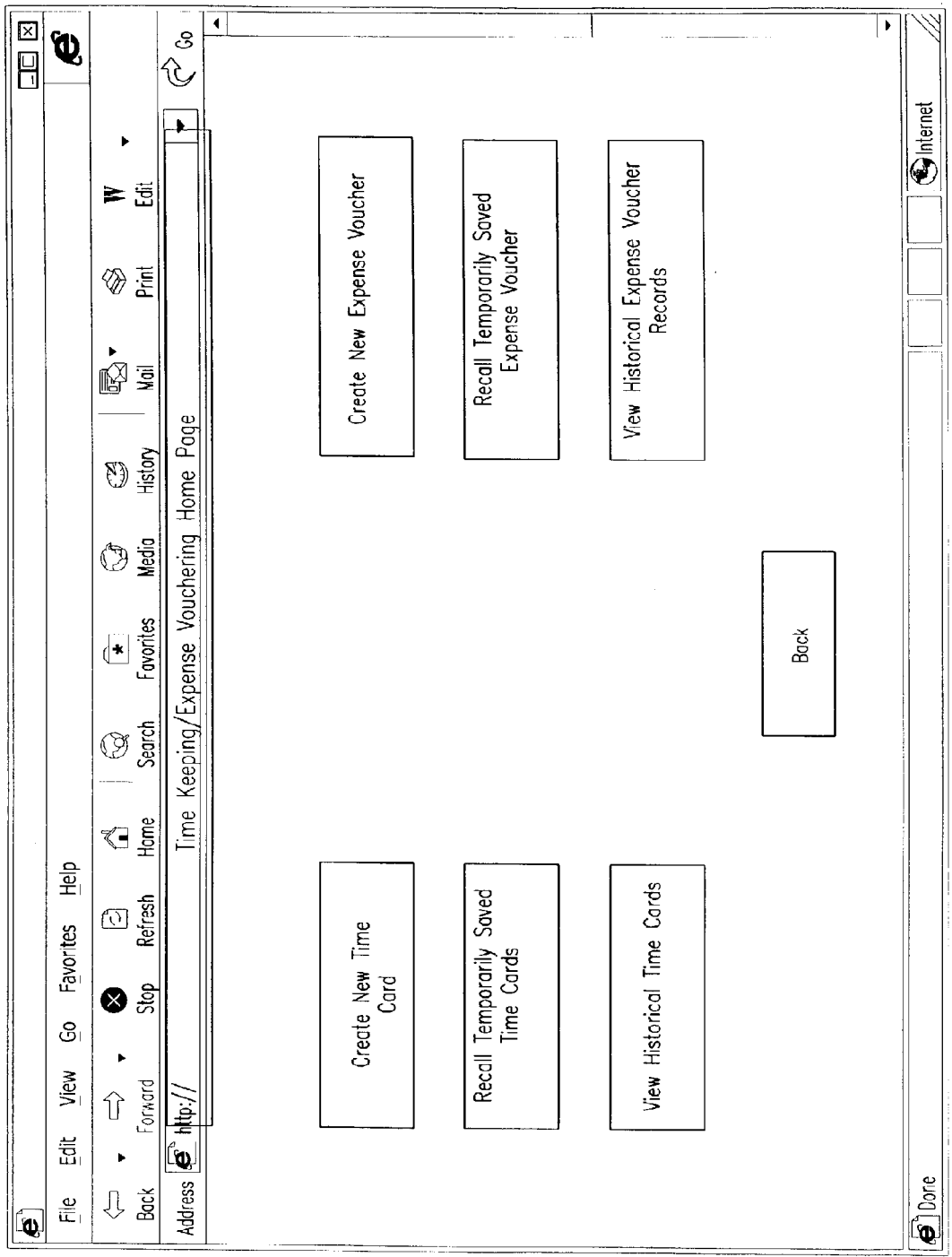

Screen shots of exemplary web pages 61 provided to the contractor through the time keeping system are shown in FIGS. 44 and 45. A sample time keeping system home page is illustrated in FIG. 44. From the home web page, the contractor can create a new time card, recall temporarily saved time cards for completion purposes or view previously submitted time cards. In addition, if the contractor is allowed to enter contractor expenses (depending on the purchase requisition), the contractor can create a new expense voucher, recall a temporarily saved expense voucher for completion or view previously submitted expense vouchers.

To create a new time card (or complete a temporarily saved time card), as shown in FIG. 45, the contractor can enter various time keeping information 1150 into the time card 1100. For example, the contractor can enter the week ending work date, project code for the project and cost center responsible for payment. In addition, the contractor can enter the number of regular hours worked each day and the number of overtime hours worked each day (at each overtime pay rate). It should be understood that other time keeping information can also be entered by the contractor, and the system is not limited to the particular time keeping information shown in FIG. 45.

Figure 46:
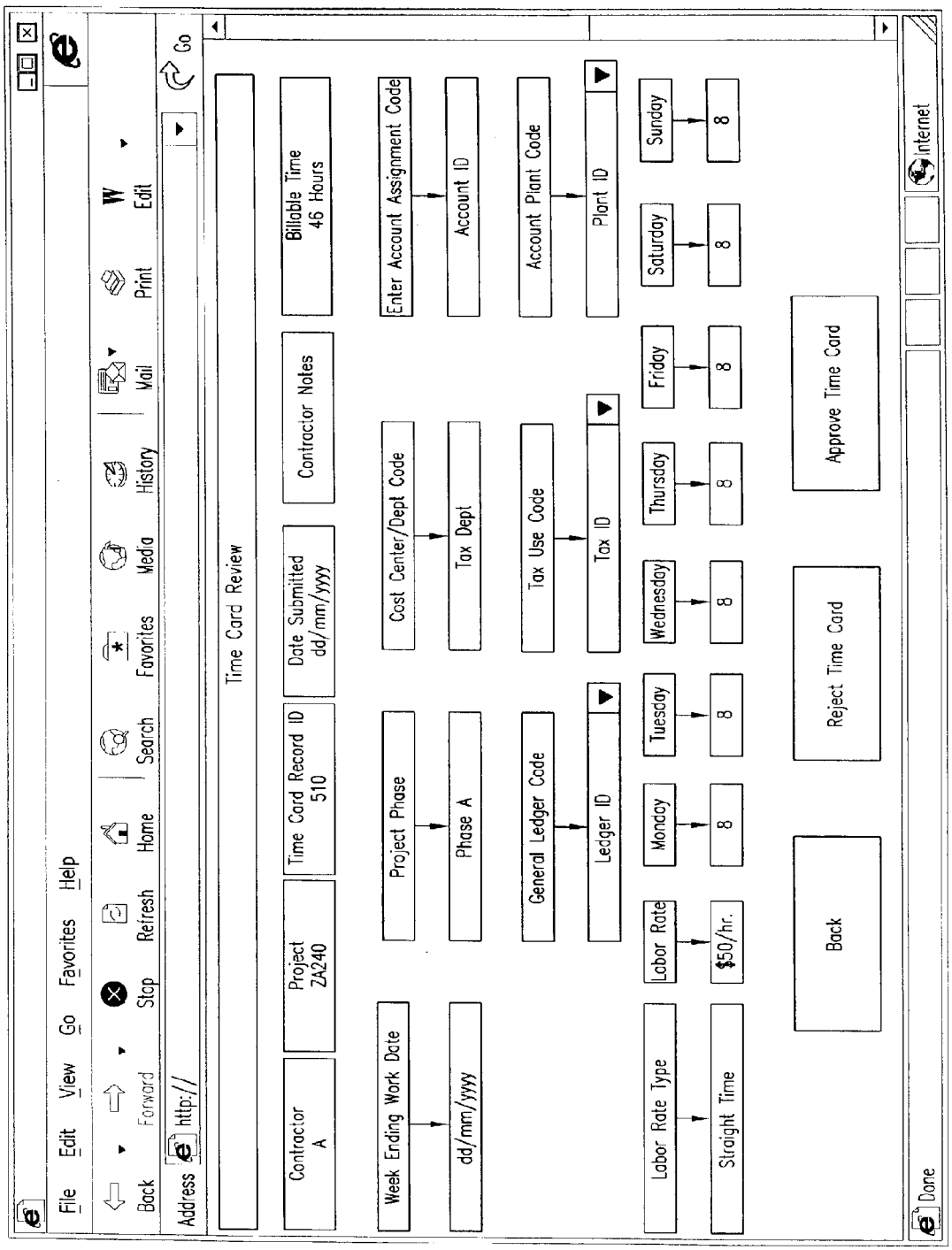

A screen shot of a sample web page 61 displayed to the project administrator for review of the submitted time card is shown in FIG. 46. In addition to the entered time keeping information, the project administrator may also be provided with other pertinent purchase requisition information associated with the time card, such as the current project phase, general ledger code, tax use code, account assignment code and account plant code. Based on the displayed time keeping information, the project administrator can either reject the time card or approve the time card. If the project administrator rejects the time card, a pop-up window can be displayed for the project administrator to provide a reason for time card rejection. It should be understood that other information can be displayed to the project administrator for time card approval purposes, and the system is not limited to the specific information shown in FIG. 46.

Exemplary database structures for storing the time cards and contractor expense vouchers are shown in Tables 80-83 below. The data structures are illustrated for simplicity as being organized in a table format, with each table including all of the fields necessary for storing time cards and contractor expense vouchers. The tables are related in a hierarchical and relational manner with other tables stored in the database, as will be discussed in connection with FIG. 47.

Figure 47:
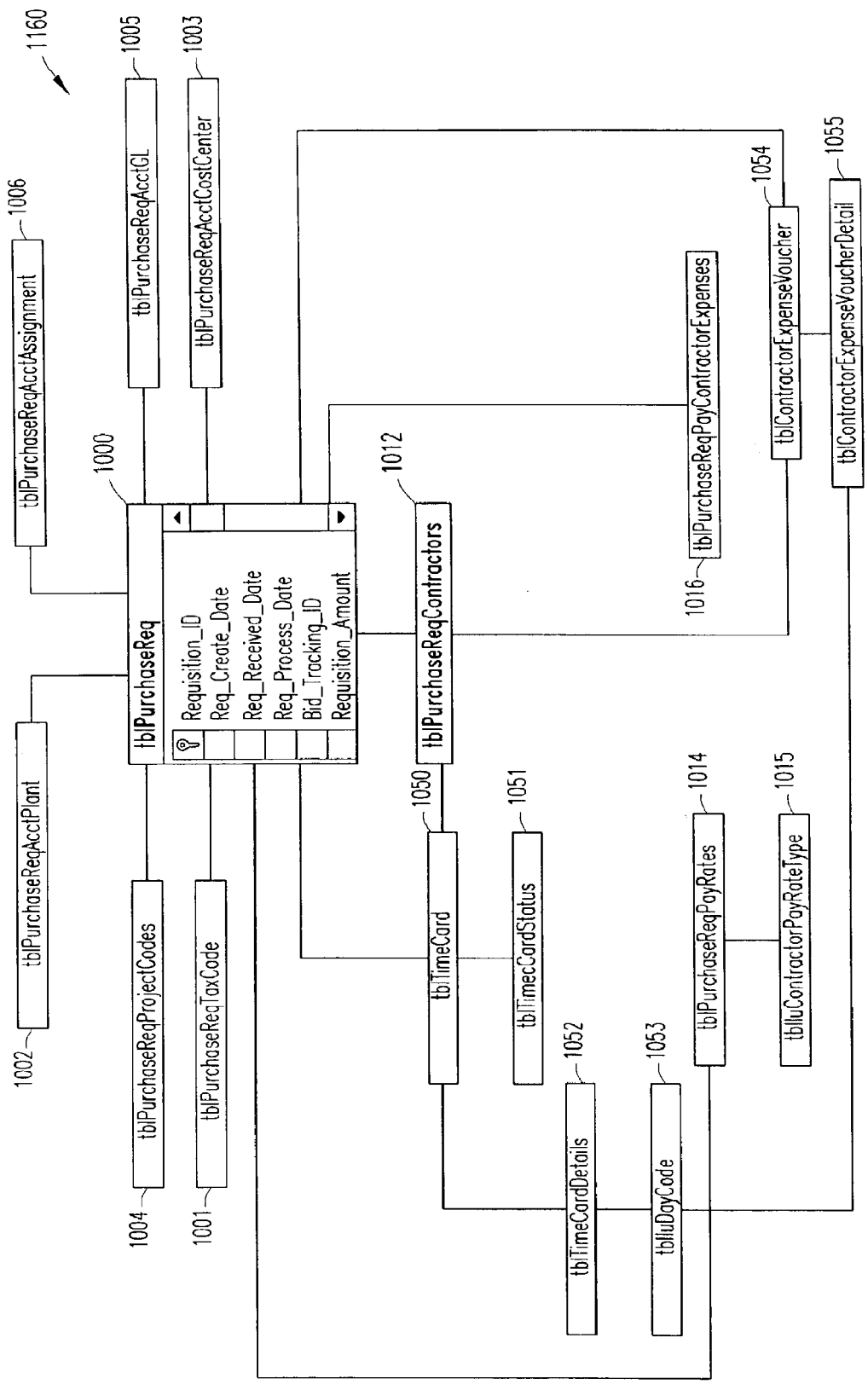
FIG. 47 is a database table view illustrating the tracking of project deliverables and vouchering, in accordance with embodiments of the present invention.

Table 80 below illustrates sample general time keeping information, which can be stored in the database table structure 1160 in table "tblTimeCard" 1050, as shown in FIG. 47. For example, the time keeping information can include the time card identifier, the associated purchase requisition identifier, the contractor identifier, the vendor identifier, an indication of whether or not the time entered is billable time for generation of a billing record, the week ending date associated with the time card, the creation date, the review date and an indication of whether or not the time card has been approved. However, it should be understood that other information can be included, and the system is not limited to the specific information shown in Table 80. Table "tblTimeCard" 1050 is shown in FIG. 47 tied to table "tblPurchaseReqContractors" 1012, which is tied to table "tblPurchaseReq" 1000, both of which are discussed above in connection with FIG. 41, to associate the time card with the contractor and the purchase requisition. In addition, various other tables shown in FIG. 41 are illustrated in FIG. 47 to show the interrelation between the various purchase requisition tables and the time card and contractor expense voucher tables.

TABLE 80

Exemplary tblTimeCard (db structure view)

| Column Name | Data Type | Length |
|---|---|---|
| Time_Card_ID | int | 4 |
| tcStatus_ID | int | 4 |
| Requisition_ID | int | 4 |
| Contractor_ID | int | 4 |
| Vendor_ID | int | 4 |
| Billable_Time | char | 1 |
| HM_Submitter_ID | int | 4 |
| Vendor_Submitter_ID | int | 4 |
| Reviewer_ID | int | 4 |
| Week_Ending_Date | datetime | 8 |
| Record_Create_Date | datetime | 8 |
| Last_Edit_Date | datetime | 8 |
| Submit_Date | datetime | 8 |
| Review_Date | datetime | 8 |
| Approval_Date | datetime | 8 |
| Date_Rejected | datetime | 8 |
| Contractor_Notes | varchar | 1000 |
| Client_Notes | varchar | 1000 |

The time card status identifier stored in the table "tblTimeCard" 1050 can be selected from a table "tblluTimeCardStatus" 1051, which stores time card status types (e.g., temporarily saved, submitted, approved, rejected, etc.) and their associated time card status identifiers.

Table 81 illustrates sample detailed time keeping information, which can be stored in the database in table "tblTimeCardDetails" 1052, as shown in FIG. 47. For example, such detailed time keeping information can include the number of hours entered as worked on a particular day for a particular pay rate type, the pay rate associated with the pay rate type and other detailed time keeping information. Table "tblTimeCardDetails" 1052 is shown tied to table "tblTimeCard" 1050 to associate the detailed time keeping information with the general time keeping information. In addition, table "tblTimeCardDetails" 1052 is tied to table "tblluDayCode" 1053 to associate the day code stored in table "tblTimeCardDetails" 1052 with the particular day. It should be understood that a separate record in the format of Table 81 is stored in table "tblTimeCardDetails" 1052 for each pay rate type on each day for which the contractor enters time. It should further be understood that other tables and time keeping information can be included, and the system is not limited to the specific tables and time keeping information shown in FIG. 47.

TABLE 81

Exemplary tblTimeCardDetails (db structure view)

| Column Name | Data Type | Length |
|---|---|---|
| Time_Card_ID | int | 4 |
| Record_ID | int | 4 |
| Pay_Rate_Type_ID | int | 4 |
| Day_Code | int | 4 |
| Quantity | float | 8 |
| Account_Assignment | varchar | 10 |
| [Billable_Dept/Cost_Center] | nvarchar | 10 |
| Accounting_Plant | varchar | 10 |
| Project_Code | varchar | 20 |
| Tax_Code | varchar | 10 |
| G_L_Account | varchar | 20 |
| Pay_Rate | money | 8 |

Table 82 below illustrates sample general contractor expense voucher information, which can be stored in the database in table "tblContractorExpenseVoucher" 1054, as shown in FIG. 47. For example, such general contractor expense voucher information can include the expense voucher identifier, the associated purchase requisition identifier, the contractor identifier, the vendor identifier, the week ending date associated with the expense voucher, the creation date, the review date and an indication of whether or not the expense voucher has been approved. However, it should be understood that other information can be included, and the system is not limited to the specific information shown in Table 82. Table "tblContractorExpenseVoucher" 1054 is shown tied to table "tblPurchaseReqContractors" 1012, which is tied to table "tblPurchaseReq" 1000, both of which are discussed above in connection with FIG. 41, to associate the contractor expense voucher with the particular contractor and the purchase requisition.

TABLE 82

Standard tblContractorExpenseVoucher (db structure view)

| Column Name | Data Type | Length |
|---|---|---|
| Requisition_ID | int | 4 |
| Expense_Voucher_ID | int | 4 |
| tcStatus_ID | int | 4 |
| Contractor_ID | int | 4 |
| Vendor_ID | int | 4 |
| HM_Submitter_ID | int | 4 |
| Vendor_Submitter_ID | int | 4 |
| Approver_ID | int | 4 |
| Week_Ending_Date | datetime | 8 |
| Record_Create_Date | datetime | 8 |
| Last_Edit_Date | datetime | 8 |
| Submit_Date | datetime | 8 |
| Approval_Date | datetime | 8 |
| Date_Rejected | datetime | 8 |
| Contractor_Notes | varchar | 1000 |
| Client_Notes | varchar | 1000 |

Table 83 below illustrates sample detailed contractor expense voucher information, which can be stored in the database in table "tblContractorExpenseVoucherDetails" 1055, as shown in FIG. 47. For example, such detailed expense voucher information can include the expense amount of a particular expense type on a particular day and other detailed expense voucher information. Table "tblContractorExpenseVoucherDetails" 1055 is shown tied to table "tblContractorExpenseVoucher" 1054 to associate the detailed expense voucher information with the general expense voucher information. In addition, table "tblContractorExpenseVoucherDetails" 1055 is tied to table "tblluDayCode" 1053 to associated the day code stored in table "tblContractorExpenseVoucherDetails" 1055 with the particular day. It should be understood that a separate record in the format of Table 83 is stored in table "tblContractorExpenseVoucherDetails" 1055 for each type of expense on each day for which the contractor enters an amount. It should further be understood that other tables and contractor expense voucher information can be included, and the system is not limited to, the specific tables and contractor expense voucher information shown in FIG. 47.

TABLE 83

Standard tblContractorExpenseVoucherDetails (db structure view)

| Column Name | Data Type | Length |
|---|---|---|
| Expense_Voucher_ID | int | 4 |
| Record_ID | int | 4 |
| Expense_Type_ID | int | 4 |
| Day_Code | int | 4 |

TABLE 83-continued

Standard tblContractorExpenseVoucherDetails (db structure view)

| Column Name | Data Type | Length |
|---|---|---|
| Expense_Amount | money | 8 |
| Account_Assignment | varchar | 10 |
| [Billable_Dept/Cost_Center] | varchar | 10 |
| Accounting_Plant | varchar | 10 |
| Project_Code | varchar | 20 |
| Tax_Code | varchar | 10 |
| G_L_Account | varchar | 20 |

Figure 48:
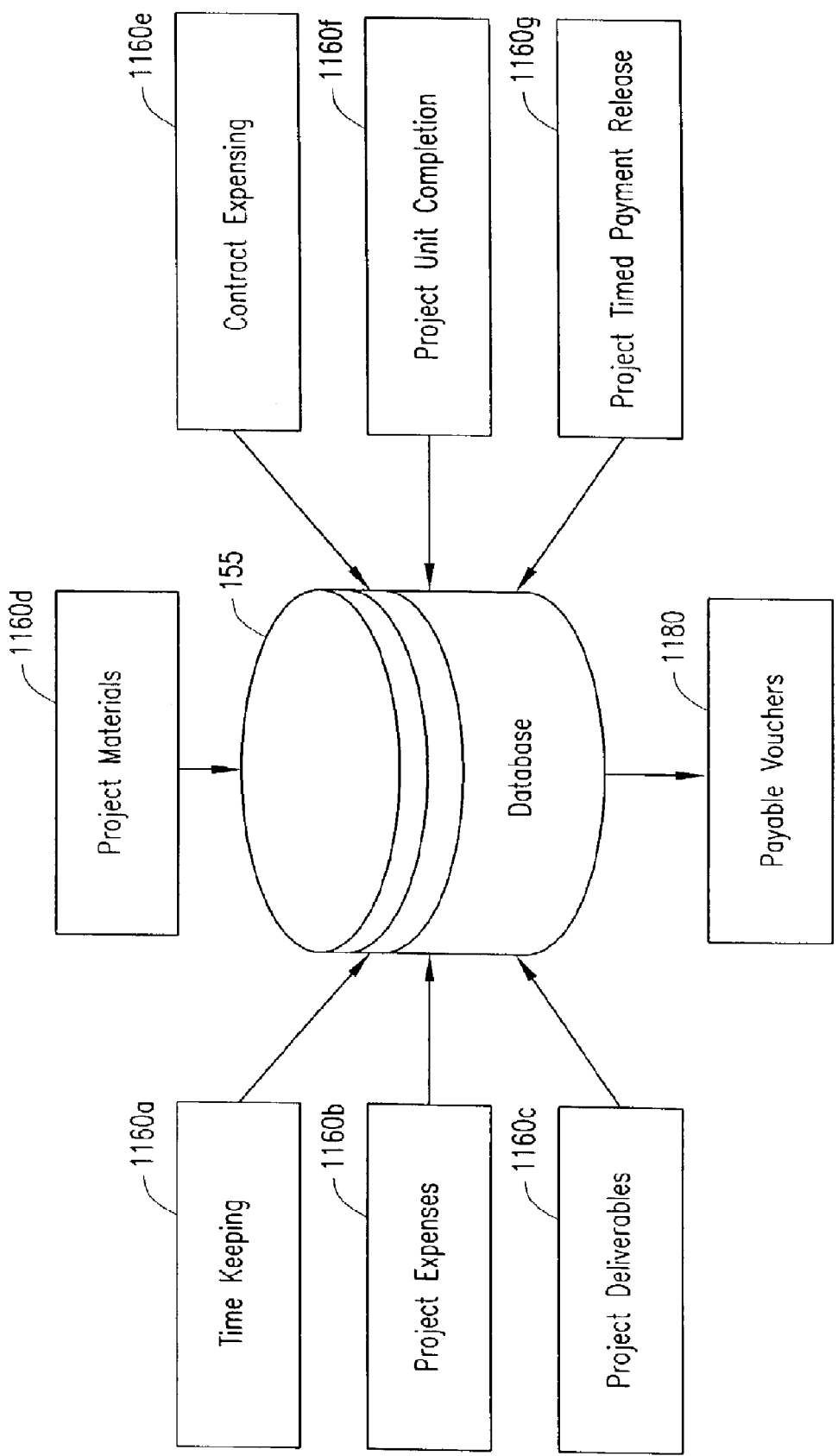
FIG. 48 illustrates the electronic facilitation of a payment vouchering process for submitting and approving payment vouchers and creating a payment voucher, in accordance with embodiments of the present invention.

Referring now to FIG. 48, there are a number of different types of voucher information 1160 that can be entered into the system and stored in the database 155 for generation of a payable voucher 1180 to be paid by the buyer or project administrator to the awarded vendor. For example, the voucher information 1160 can include time keeping voucher information 1160a, which includes the time keeping information 1150 (shown in FIG. 45 above) entered by the contractor and requisition payment information as determined by the entered project work tracking parameters 870 (shown in FIGS. 39 and 40 above) pertaining to the time keeping information. The voucher information can also include project expenses voucher information 1160b, project deliverables voucher information 1160c, project materials voucher information 1160d, contractor expensing voucher information 1160e, project unit completion voucher information 1160f and project timed payment release voucher information 1160g. The system can automatically generate payable vouchers 1180 based on voucher information 1160 previously entered in other contexts (e.g., project tracking parameters entry, time keeping entry, contractor expense entry and/or project expense entry), or the vendor or buyer/project administrator can generate payable vouchers 1180 and enter various applicable portions of the voucher information 1160 (e.g., unit completion entry or deliverable completion entry) into the payable vouchers 1180.

Figure 49:
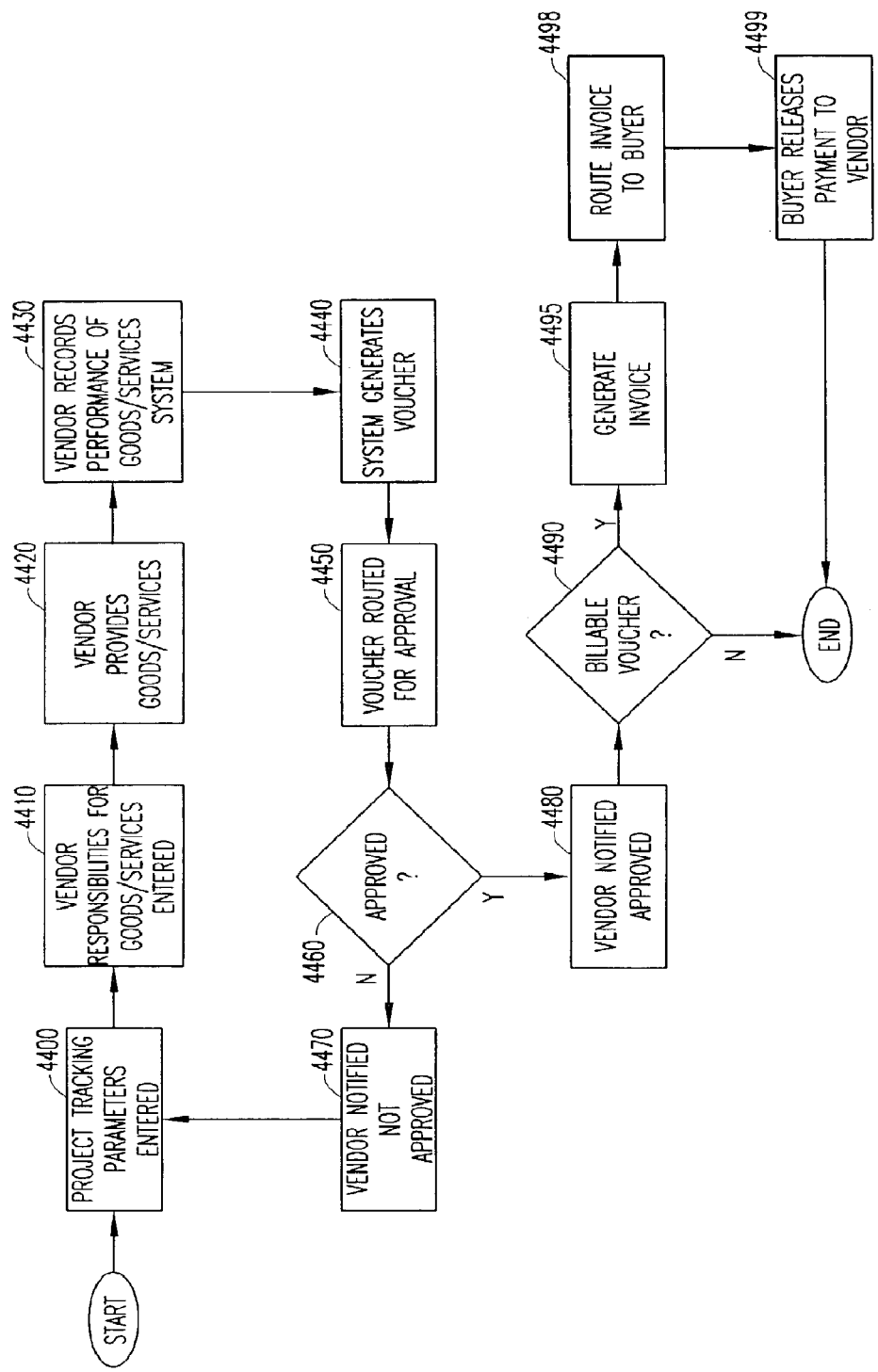
FIG. 49 is a flowchart illustrating a voucher payment process, in accordance with embodiments of the present invention.

Referring now to FIG. 49, exemplary steps involved in a voucher processing and payment system are illustrated. Initially, various project tracking parameters (e.g., purchase requisition information) are entered into the system (step 4400) and all vendor responsibilities for goods and services, both billable and non-billable are stored in the database (step 4410). When the vendor provides an authorized good or service (as determined by the entered vendor responsibilities) (step 4420), the vendor accesses the system to record the good or service performed and request payment for the good or service (step 4430). In other embodiments, payment may be automatically requested by the system at certain time intervals. The system generates a voucher based on the project tracking parameters and other voucher information (e.g., timekeeping information, expenses, materials, etc.) (step 4440) and routes the voucher to the appropriate buyer user or administrator user for approval of the voucher (step 4450).

If the voucher is not approved (step 4460), the vendor is notified and provided the option of re-submitting the voucher (step 4470). If the voucher is approved (step 4460), the vendor is notified of the approval of the voucher (step 4480). If the voucher is a billable voucher (step 4490), the voucher is processed for electronic invoicing based on prescribed scheduling (using system or buyer constraints) (step 4495). For example, the system can employ a batch process to collect all payment vouchers for the buyer (for one or more projects) approved during a pre-designated time period. All invoices can be generated in a format based on buyer specifications or in a system-defined format. The buyer receives the invoice(s) (step 4498) and releases payment of the invoice(s) to the vendor(s) via a pre-configured method (e.g., EFI, check, etc.) (step 4499).

Exemplary database structures for storing the voucher information in payable vouchers and generating a paid voucher record are shown in Tables 84-92 below. The data structures are illustrated for simplicity as being organized in a table format, with each table including all of the fields necessary for storing voucher information. The tables are related in a hierarchical and relational manner with other tables stored in the database, as will be discussed in connection with FIG. 50.

Figure 50:
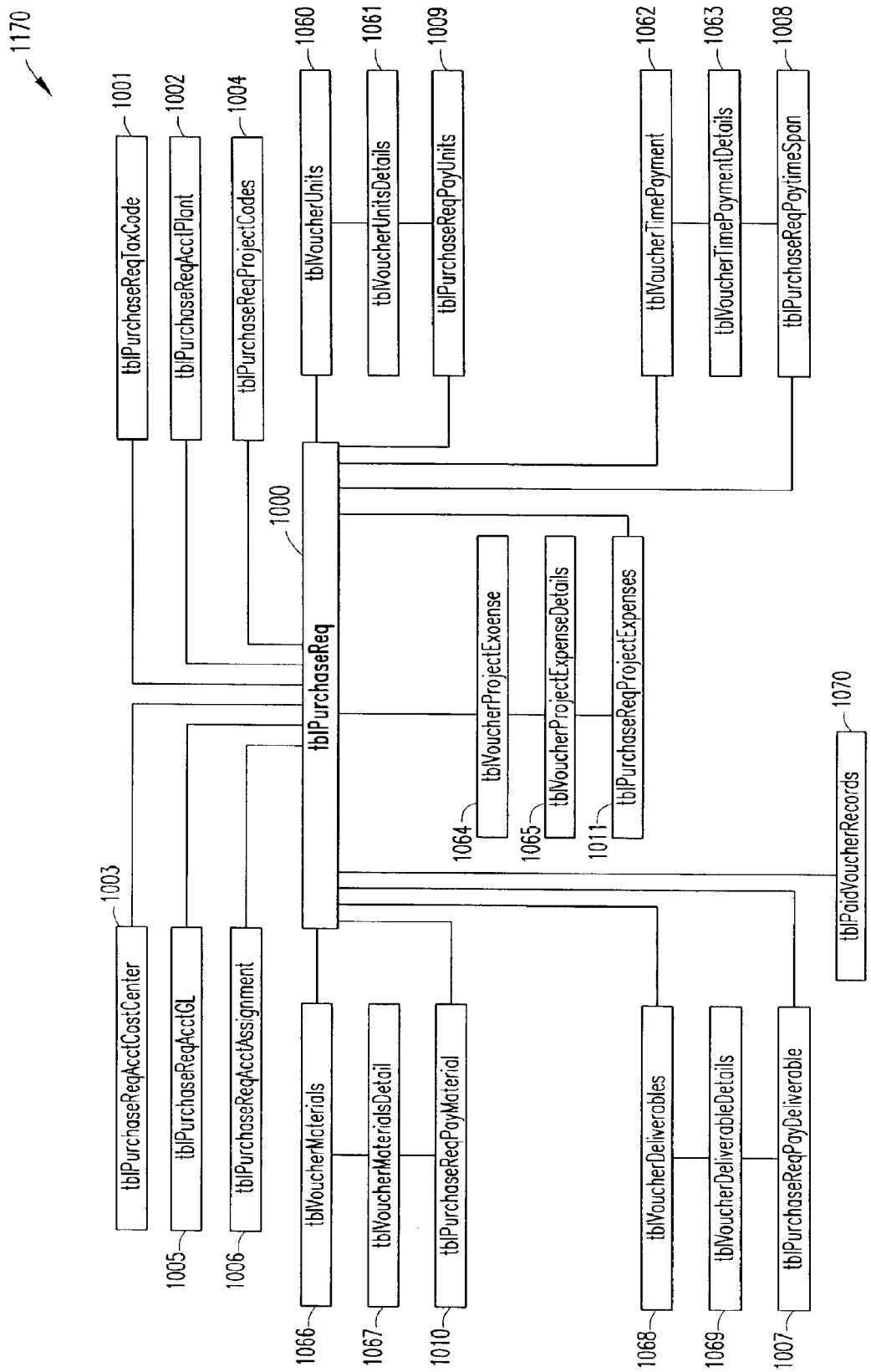
FIG. 50 is a database table view illustrating the generation of payable vouchers, in accordance with embodiments of the present invention.

Table 84 below illustrates sample general project unit completion voucher information, which can be stored in the database table structure 1170 in table "tblVoucherUnits" 1060, as shown in FIG. 50. For example, the general project unit completion voucher information can include the unit voucher identifier, the associated purchase requisition identifier, an indication of whether all time cards associated with the unit completion have been approved, the vendor identifier, the week ending date associated with the voucher information, the creation date, the review date and an indication of whether or not the voucher information has been approved. Table "tblVoucherUnits" 1060 is shown tied to table "tblPurchaseReq" 1000, which is discussed above in connection with FIG. 41, to associate the voucher information with the purchase requisition. In addition, various other tables shown in FIG. 41 are illustrated here in FIG. 50 to show the interrelation between the various purchase requisition tables and the voucher tables. It should be understood that a separate record in the format of Table 84 is stored in table "tblVoucherUnits" 1060 for each payable unit voucher.

Furthermore, although not shown, the table "tblContractorExpenseVoucher" 1054, shown in FIG. 47, is also considered a voucher table for generation of a payable voucher. It should be understood that other tables and voucher information can be included, and the system is not limited to the specific tables and voucher information shown in FIG. 50.

TABLE 84 tblVoucherUnits (db structure view)

| Column Name | Data Type | Length |
|---|---|---|
| Requisition_ID | int | 4 |
| Unit_Voucher_ID | int | 4 |
| tcStatus_ID | int | 4 |
| Vendor_ID | int | 4 |
| Week_Ending_Date | datetime | 8 |
| Record_Create_Date | datetime | 8 |
| Last_Edit_Date | datetime | 8 |
| Submit_Date | datetime | 8 |
| Approval_Date | datetime | 8 |
| Review_Date | datetime | 8 |
| Date_Rejected | datetime | 8 |
| Reviewer_ID | int | 4 |
| Vendor_Notes | varchar | 1000 |
| Buyer_Notes | varchar | 1000 |

Table 85 below illustrates sample detailed project unit completion voucher information, which can be stored in the database in table "tblVoucherUnitsDetails" 1061, as shown in FIG. 50. For example, such detailed project unit completion voucher information can include a description of the unit completion, the number of units authorized, the cost per unit, the number of units completed and other detailed project unit completion voucher information. Table "tblVoucherUnitsDetails" 1061 is shown tied to table "tblVoucherUnits" 1060 to associate the detailed project unit completion voucher information with the general project unit completion voucher information. In addition, table "tblVoucherUnitsDetails" 1061 is tied to table "tblPurchaseReqPayUnits" 1009 to associated the requisition unit payment information with the project unit completion voucher information.

It should be understood that a separate record in the format of Table 85 is stored in table "tblVoucherUnitsDetails" 1061 for each payable unit voucher. It should further be understood that other tables and project unit completion voucher information can be included, and the system is not limited to the specific tables and project unit completion voucher information shown in FIG. 50.

TABLE 85 tblVoucherUnitsDetails (db structure view)

| Column Name | Data Type | Length |
|---|---|---|
| Unit_Voucher_ID | int | 4 |
| puRecord_ID | int | 4 |
| Unit_Completion_Description | varchar | 1000 |
| Units_Authorized | numeric | 9 |
| Unit_Cost | money | 8 |
| Units_Completed | numeric | 9 |
| Line_Item_Cost | money | 8 |
| Account_Assignment | varchar | 10 |
| [Billable_Dept/Cost_Center] | varchar | 10 |
| Accounting_Plant | varchar | 10 |
| Project_Code | varchar | 20 |
| Tax_Code | varchar | 10 |
| G_L_Account | varchar | 20 |
| Record_ID | int | 4 |

Table 86 below illustrates sample general time completion voucher information, which can be stored in the database in table "tblVoucherTimePayment" 1062, as shown in FIG. 50. For example, the general time completion voucher information can include the time voucher identifier, the associated purchase requisition identifier, an indication of whether all time cards associated with the time completion have been approved, the vendor identifier, the week ending date associated with the voucher information, the creation date, the review date and an indication of whether or not the voucher information has been approved. Table "tblVoucherTimePayment" 1062 is shown tied to table "tblPurchaseReq" 1000, which is discussed above in connection with FIG. 41, to associate the voucher information with the purchase requisition. It should be understood that a separate record in the format of Table 86 is stored in table "tblVoucherTimePayment" 1062 for each payable time voucher.

TABLE 86 tblVoucherTimePayment (db structure view)

| Column Name | Data Type | Length |
|---|---|---|
| Requistion_ID | int | 4 |
| Time_Pay_Voucher_ID | int | 4 |
| tcStatus_ID | int | 4 |
| Vendor_ID | int | 4 |
| Week_Ending_Date | datetime | 8 |
| Record_Create_Date | datetime | 8 |
| Last_Edit_Date | datetime | 8 |
| Approval_Date | datetime | 8 |
| Date_Rejected | datetime | 8 |
| Review_ID | int | 4 |
| Vendor_Notes | varchar | 1000 |
| Buyer_Notes | varchar | 1000 |

Table 87 below illustrates sample detailed time completion voucher information, which can be stored in the database in table "tblVoucherTimePaymentDetails" 1063, as shown in FIG. 50. For example, such detailed time completion voucher information can include the work start date, payment release date, payment amount and other detailed time completion voucher information. Table "tblVoucherTimeCompletionDetails" 1063 is shown tied to table "tblVoucherTimePayment" 1062 to associate the detailed time completion voucher information with the general time completion voucher information. In addition, table "tblVoucherTimePaymentDetails" 1063 is tied to table "tblPurchaseReqPayTimeSpan" 1008 to associated the requisition time payment information with the time completion voucher information.

It should be understood that a separate record in the format of Table 87 is stored in table "tblVoucherTimePaymentDetails" 1063 for each payable unit voucher. It should further be understood that other tables and time completion voucher information can be included, and the system is not limited to the specific tables and time completion voucher information shown in FIG. 50.

TABLE 87 tblVoucherTimePaymentDetails (db structure view)

| Column Name | Data Type | Length |
|---|---|---|
| Time_Pay_Voucher_ID | int | 4 |
| pptRecord_ID | int | 4 |
| Work_Start_Date | datetime | 8 |
| Payment_Release_Date | datetime | 8 |
| Payment_Amount | money | 8 |
| Account_Assignment | varchar | 10 |
| [Billable_Dept/Cost_Center] | nvarchar | 10 |
| Accounting_Plant | varchar | 10 |
| Project_Code | varchar | 20 |
| Tax_Code | varchar | 10 |
| G_L_Account | varchar | 20 |
| Record_ID | int | 4 |

Table 88 below illustrates sample general project expense voucher information, which can be stored in the database in table "tblVoucherProjectExpense" 1064, as shown in FIG. 50. For example, the general project expense voucher information can include the project expense voucher identifier, the associated purchase requisition identifier, an indication of whether all time cards associated with the project expense (if any) have been approved, the vendor identifier, the week ending date associated with the voucher information, the creation date, the review date and an indication of whether or not the voucher information has been approved. Table "tblVoucherProjectExpense" 1064 is shown tied to table "tblPurchaseReq" 1000, which is discussed above in connection with FIG. 41, to associate the voucher information with the purchase requisition. It should be understood that a separate record in the format of Table 88 is stored in table "tblVoucherProjectExpense" 1064 for each payable project expense voucher.

TABLE 88 tblVoucherProjectExpense (db structure view)

| Column Name | Data Type | Length |
|---|---|---|
| Requisition_ID | int | 4 |
| Project_Expense_Voucher_ID | int | 4 |
| tcStatus_ID | int | 4 |
| Vendor_ID | int | 4 |
| Week_Ending_Date | datetime | 8 |

TABLE 88-continued tblVoucherProjectExpense (db structure view)

| Column Name | Data Type | Length |
|---|---|---|
| Record_Create_Date | datetime | 8 |
| Last_Edit_Date | datetime | 8 |
| Submit_Date | datetime | 8 |
| Approval_Date | datetime | 8 |
| Date_Rejected | datetime | 8 |
| Reviewer_ID | int | 4 |
| Vendor_Notes | varchar | 1000 |
| Buyer_Notes | varchar | 1000 |

Table 89 below illustrates sample detailed project expense voucher information, which can be stored in the database in table "tblVoucherProjectExpenseDetails" 1065, as shown in FIG. 50. For example, such detailed project expense voucher information can include the date the expense was incurred, a description of the project expense, the amount of the project expense and other detailed project expense voucher information. Table "tblVoucherProjectExpenseDetails" 1065 is shown tied to table "tblVoucherProjectExpense" 1064 to associate the detailed project expense voucher information with the general project expense voucher information. In addition, table "tblVoucherProjectExpenseDetails" 1065 is tied to table "tblPurchaseReqPayProjectExpense" 1011 to associated the requisition project expense payment information with the project expense voucher information.

It should be understood that a separate record in the format of Table 89 is stored in table "tblVoucherProjectExpenseDetails" 1065 for each payable project expense voucher. It should further be understood that other tables and project expense voucher information can be included, and the system is not limited to the specific tables and project expense voucher information shown in FIG. 50.

TABLE 89 tblVoucherProjectExpenseDetails (db structure view)

| Column Name | Data Type | Length |
|---|---|---|
| Project_Expense_Voucher_ID | int | 4 |
| Expense_Incurred_Date | datetime | 8 |
| ppeRecord_ID | int | 4 |
| Project_Expense_Description | varchar | 500 |
| Project_Expense_Amount | money | 8 |
| Account_Assignment | varchar | 10 |
| [Billable_Dept/Cost_Center] | nvarchar | 10 |
| Accounting_Plant | varchar | 10 |
| Project_Code | varchar | 20 |
| Tax_Code | varchar | 10 |
| G_L_Account | varchar | 20 |
| Record_ID | int | 4 |

Table 90 below illustrates sample general material voucher information, which can be stored in the database in table "tblVoucherMaterials" 1066, as shown in FIG. 50. For example, the general material voucher information can include the material voucher identifier, the associated purchase requisition identifier, an indication of whether all time cards associated with the material (if any) have been approved, the vendor identifier, the week ending date associated with the voucher information, the creation date, the review date and an indication of whether or not the voucher information has been approved. Table "tblVoucherMaterials" 1066 is shown tied to table "tblPurchaseReq" 1000, which is discussed above in connection with FIG. 41, to associate the voucher information with the purchase requisition. It should be understood that a separate record in the format of Table 90 is stored in table "tblVoucherMaterial" 1066 for each payable material voucher.

TABLE 90 tblVoucherMaterials (db structure view)

| Column Name | Data Type | Length |
|---|---|---|
| Reqisition_ID | int | 4 |
| Material_Voucher_ID | int | 4 |
| tcStatus_ID | int | 4 |
| Vendor_ID | int | 4 |
| Week_Ending_Date | datetime | 8 |
| Record_Create_Date | datetime | 8 |
| Last_Edit_Date | datetime | 8 |
| Submit_Date | datetime | 8 |
| Approved_Date | datetime | 8 |
| Reviewed_Date | datetime | 8 |
| Date_Rejected | datetime | 8 |
| Reviewer_ID | int | 4 |
| Vendor_Notes | varchar | 1000 |
| Buyer_Notes | varchar | 1000 |

Table 91 below illustrates sample detailed material voucher information, which can be stored in the database in table "tblVoucherMaterialsDetails" 1067, as shown in FIG. 50. For example, such detailed material voucher information can include the date the material expense was incurred, the name of the material, a description of the material, the number of units of material purchased, the cost per unit of material and other detailed project expense voucher information. Table "tblVoucherMaterialsDetails" 1067 is shown tied to table "tblVoucherMaterials" 1066 to associate the detailed material voucher information with the general material voucher information. In addition, table "tblVoucherMaterialsDetails" 1067 is tied to table "tblPurchaseReqPayMaterials" 1010 to associated the requisition material payment information with the material voucher information.

It should be understood that a separate record in the format of Table 91 is stored in table "tblVoucherMaterialsDetails" 1067 for each payable material voucher. It should further be understood that other tables and material voucher information can be included, and the system is not limited to the specific tables and material voucher information shown in FIG. 50

TABLE 91 tblVoucherMaterialsDetails (db structure view)

| Column Name | Data Type | Length |
|---|---|---|
| Material_Voucher_ID | int | 4 |
| Expense_Incurred_Date | datetime | 8 |
| ppmRecord_ID | int | 4 |
| Material_Name | varchar | 100 |
| Material_Description | varchar | 500 |
| Unit_Count | numeric | 9 |
| Unit_Cost | money | 8 |
| Line_Item_Cost | money | 8 |
| [Billable_Dept/Cost_Center] | nvarchar | 10 |
| Accounting_Plant | varchar | 10 |
| Project_Code | varchar | 20 |
| Tax_Code | varchar | 1- |
| G_L_Account | varchar | 20 |
| Record_ID | int | 4 |

Table 92 below illustrates sample general deliverables voucher information, which can be stored in the database in table "tblVoucherDeliverables" 1068, as shown in FIG. 50. For example, the general deliverables voucher information can include the deliverables voucher identifier, the associated purchase requisition identifier, an indication of whether all time cards associated with the deliverable (if any) have been approved, the vendor identifier, the week ending date associated with the voucher information, the creation date, the review date and an indication of whether or not the voucher information has been approved. Table "tblVoucherDeliverables" 1068 is shown tied to table "tblPurchaseReq" 1000, which is discussed above in connection with FIG. 41, to associate the voucher information with the purchase requisition. It should be understood that a separate record in the format of Table 92 is stored in table "tblVoucherDeliverables" 1068 for each payable deliverables voucher. However, it should be understood that other information can be included, and the system is not limited to the specific information shown in Table 92.

TABLE 92 tblVoucherDeliverables (db structure view)

| Column Name | Data Type | Length |
|---|---|---|
| Requisition_ID | int | 4 |
| Deliverable_Voucher_ID | int | 4 |
| tcStatus_ID | int | 4 |
| Vendor_ID | int | 4 |
| Week_Ending_ID | datetime | 8 |
| Record_Create_Date | datetime | 8 |
| Last_Edit_Date | datetime | 8 |
| Submit_Date | datetime | 8 |
| Approval_Date | datetime | 8 |
| Review_Date | datetime | 8 |
| Date_Rejected | datetime | 8 |
| Reviewer_ID | int | 4 |
| Vendor_Notes | varchar | 1000 |
| Buyer_Notes | varchar | 1000 |

Table 93 below illustrates sample detailed deliverables voucher information, which can be stored in the database in table "tblVoucherDeliverablesDetails" 1069, as shown in FIG. 50. For example, such detailed deliverables voucher information can include a description of the deliverable, the anticipated completion date of the deliverable, the actual completion date of the deliverable, the payment amount requested and other detailed deliverables voucher information. Table "tblVoucherDeliverablesDetails" 1069 is shown tied to table "tblVoucherDeliverables" 1068 to associate the detailed deliverables voucher information with the general deliverables voucher information. In addition, table "tblVoucherDeliverablesDetails" 1069 is tied to table "tblPurchaseReqPayDeliverables" 1007 to associated the requisition deliverables payment information with the deliverables voucher information.

It should be understood that a separate record in the format of Table 93 is stored in table "tblVoucherDeliverablesDetails" 1069 for each payable deliverables voucher. It should further be understood that other tables and deliverables voucher information can be included, and the system is not limited to the specific tables and deliverables voucher information shown in FIG. 50.

TABLE 93 tblVoucherDeliverableExpenseDetails (db structure view)

| Column Name | Data Type | Length |
|---|---|---|
| Deliverable_Vendor_ID | int | 4 |
| ppdRecord_ID | int | 4 |
| Deliverable_Description | varchar | 1000 |
| Anticipated_Completion_Date | datetime | 8 |
| Actual_Completion_Date | datetime | 8 |
| Payment_Amount_Requested | money | 8 |
| Account_Assignment | varchar | 10 |
| [Billable_Dept/Cost_Center] | nvarchar | 10 |
| Accounting_Plant | varchar | 10 |
| Project_Code | varchar | 20 |
| Tax_Code | varchar | 10 |
| G_L_Account | varchar | 20 |
| Record_ID | int | 4 |

TABLE 93-continued

Table 94 below illustrates sample paid voucher information, which can be stored in the database as table "tblPaidVoucherRecords" 1070, as shown in FIG. 50. For example, such paid voucher information can include the invoice number, purchase requisition identities assigned by the buyer and vendor, the voucher approval date, the name of the approver, the type of voucher (e.g., time card, contractor expense, project expense, deliverable, time completion or unit completion) and associated voucher identifier, the invoice amount, the payment date and other paid voucher information.

Table "tblPaidVoucherRecords" 1070 is shown tied to table "tblPurchaseReq" 1000, which is discussed above in connection with FIG. 41, to associate the paid voucher information with the purchase requisition. It should be understood that a separate record in the format of Table 94 is stored in table "tblPaidVoucherRecords" 1070 for each paid voucher. However, it should be understood that other information can be included, and the system is not limited to the specific information shown in Table 94.

TABLE 94

Exemplary tblPaidVoucherRecords (db structure view)

| Column Name | Data Type | Length |
|---|---|---|
| Invoice_ID | int | 4 |
| Buyer_PR_# | varchar | 20 |
| PR_Version | numeric | 9 |
| Vendor_PR_# | varchar | 20 |
| Approval_Date | datetime | 8 |
| Approver_Name | varchar | 100 |
| Approver_Employee_ID | nvarchar | 10 |
| Time_Card_ID | int | 4 |
| Expense_Voucher_ID | int | 4 |
| Material_Voucher_ID | int | 4 |
| Project_Expense_Voucher_ID | int | 4 |
| Deliverable_Voucher_ID | int | 4 |
| Time_Pay_Voucher_ID | int | 4 |
| Unit_Voucher_ID | int | 4 |
| Invoice_Amount | money | 8 |
| Account_Assignment | varchar | 10 |
| [Billable_Dept/Cost_Center] | varchar | 10 |
| Accounting_Plant | varchar | 10 |
| Project_Code | varchar | 20 |
| Tax_Code | varchar | 10 |
| G_L_Account | varchar | 20 |
| Currency_ID | int | 4 |
| File_Extract_Date | datetime | 8 |
| EDI_File_Transmission_Date | datetime | 8 |
| Buyer_Check_Register_Date | datetime | 8 |
| Vendor_Payment_Date | datetime | 8 |
| Vendor_AP_Register_# | varchar | 20 |
| Vendor_Check_# | varchar | 25 |
| Vendor_Check_Issuance_Date | datetime | 8 |
| Record_ID | int | 4 |

Figure 51:
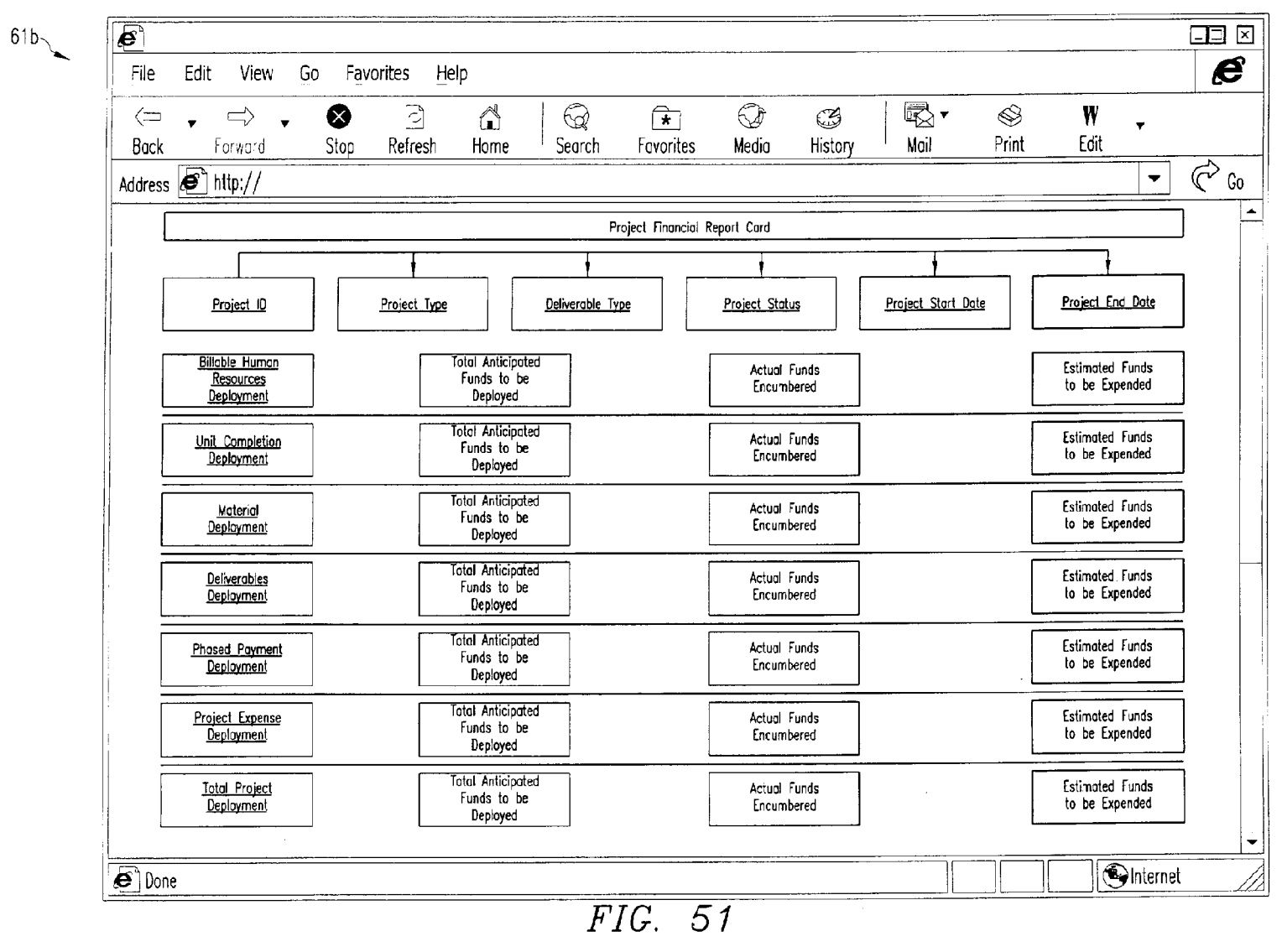

Referring now to FIG. 51, there is illustrated a screen shot of an exemplary web page 61 showing the financial status of the project. This web page may be accessible in one or more formats to the buyer, vendor and/or administrator, depending upon system constraints. As can be seen in FIG. 51, the different types of payment vouchers, and the estimated amount for each of the payment vouchers can be displayed. In addition, the actual amount expended for each of the payment voucher types and the estimated additional funds to be expended for each of the payment voucher types can also be tracked. In this way, the buyer, vendor and/or administrator can maintain a working knowledge of the project performance from a financial perspective. However, it should be understood that other financial information can be displayed instead of or in addition to the specific financial information shown in FIG. 51. Furthermore, it should be understood that other project related information (in lieu of or in addition to financial information) can be displayed depending on the buyer, vendor, administrator and/or system configuration, as discussed in more detail hereinbelow.

Analysis and Reporting of Transactional Data

Figure 58:
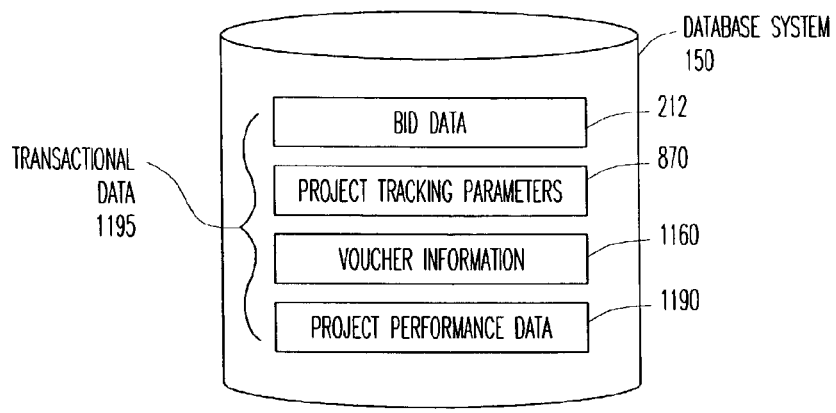
FIG. 58 illustrates exemplary transactional data related to the bid/project process stored within the database system of the present invention.

During the pre-bid, bid and post-bid activities described above, various transactional data related to the bid/project process are obtained from the buyer, vendor and other parties (e.g., administrator) involved in the process. As shown in FIG. 58, the transactional data 1195 may include one or more components: bid data 212, project tracking parameters 870, voucher information 1160 and project performance data 1190. Each of the components of the transactional data 1195 is obtained during separate stages of the bid/project process. Other components can also be included in the transactional data 1195, such as vendor qualification information, buyer-defined vendor criteria information, commodity information and other pre-bid and project-related data. In sum, the transactional data 1195 can include any data stored within the database system 150.

Figure 52:
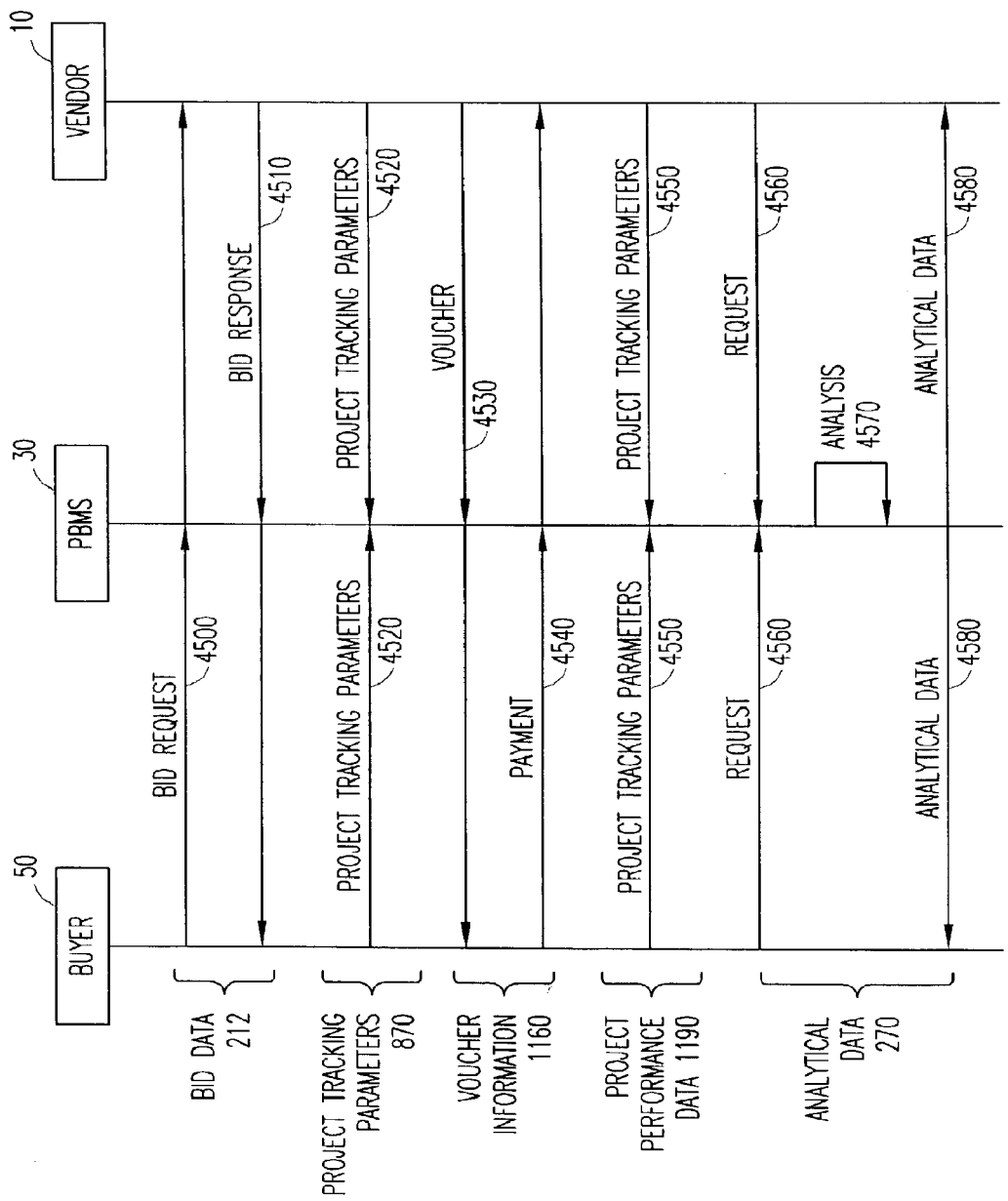
FIG. 52 is a flow diagram illustrating the information exchange between the buyer, vendor and system to facilitate analysis of the information.

For example, referring now to FIG. 52, there is illustrated a signaling diagram showing the information exchange between the buyer 50, the vendor 10 and the PBMS (hereinafter the "system") 30. As discussed above, initially, a buyer 50 transmits a bid request via the system 30 to the vendor 10 (step 4500). The bid request contains data fields having bid request data entered therein by the buyer 50 and data fields for the vendor 10 to enter bid response data. When the vendor 10 has entered the bid response data into the appropriate data fields, a bid response including the bid response data is transmitted back to the buyer 50 via the system 30 (step 4510). Together, the bid request data and bid response data form the bid data 212 of the completed bid. The bid data 212 is stored in the system database in records associated with the bid, as described above.

Once the buyer 50 has awarded the bid to a particular vendor 10, both the buyer 50 and vendor 10 can enter project tracking parameters 870 (e.g., purchase requisition information, taxation information, etc.) into the system 30 (step 4520) for storage in the database, along with the bid data 212. The project tracking parameters 870 can include some or all of the contract terms and conditions, including vendor responsibilities for goods and services, both billable and non-billable. When the vendor 10 provides an authorized good or service (as determined by the entered project tracking parameters 870), the vendor 10 can access the system to submit a voucher to request payment, or buyer acknowledgment of completion in the event that the activity is non-billable, for the good provided or service performed (step 4530). Upon approval of the voucher and subsequent invoicing for the same, the buyer releases payment to the vendor via a pre-configured method (step 4540). The information entered by the buyer 50 and vendor 10 during the voucher submittal and payment process is stored as voucher information 1160 in the database.

During the performance of the project, various project performance data 1190 can be entered into the system 30, or generated automatically by both the vendor 10 and the buyer 50 (step 4550), as will be described in more detail hereinbelow with respect to FIGS. 53-57. For example, the project performance data 1190 can include various status information, such as timing information (e.g., an indication of the timeliness of the vendor on completion of one or more phases or components of the project), or cost information (e.g., the actual cost of one or more components of the project as compared with the respective projected (requisition) costs). The project performance data 1190 can also include project-specific information, such as the importance of the project or the impact of the project on other aspects of the company, or other customer-specific information.

The bid data 212, project tracking parameters 870, voucher information 1160 and project performance data 1190 are all stored in the system database as transactional data related to the bid and project. With access to all of this transactional data, the system 30 can perform virtually any type of analysis desired and generate reports based on the analysis. Thus, the system 30 is operable to receive requests for certain types of analytical data from the buyer, vendor or another user with access to the analytical data (step 4560). In accordance with the request, the system 30 performs an analysis of the transactional data to generate the analytical data (step 4570) and provides the analytical data to the requestor (e.g., buyer 50, vendor 10 or other user) (step 4580) in a reporting view.

For example, a buyer 50 can request reports containing analytical data related to a specific project, multiple projects or multiple vendors 10. The analytical data can be directed to financial information (e.g., invoice details, spending (past, present and future) and other types of financial analysis), project information (e.g., project performance, future project activity and project planning), vendor information (e.g., vendor financial information, vendor operational information and supply chain information) and any other type of information desired. In addition, a buyer 50 can request reports containing industry analytical data related to multiple projects commissioned by multiple buyers 50. The industry analytical data can be directed to financial information (e.g., the percentage of total cost spent on various aspects of a project type or the percentage amount spent industry-wide on various types of projects), vendor information (e.g., the on-time percentage of the vendor in the industry or the cost percentage over/under budget of the vendor in the industry), and any other type of industry information as desired. Similar analytical data can be provided to a vendor 10 or other authorized user. For example, a vendor 10 or administrator can request reports containing analytical data related to a specific project or multiple projects that the vendor 10 is involved in conducting.

Figure 53:
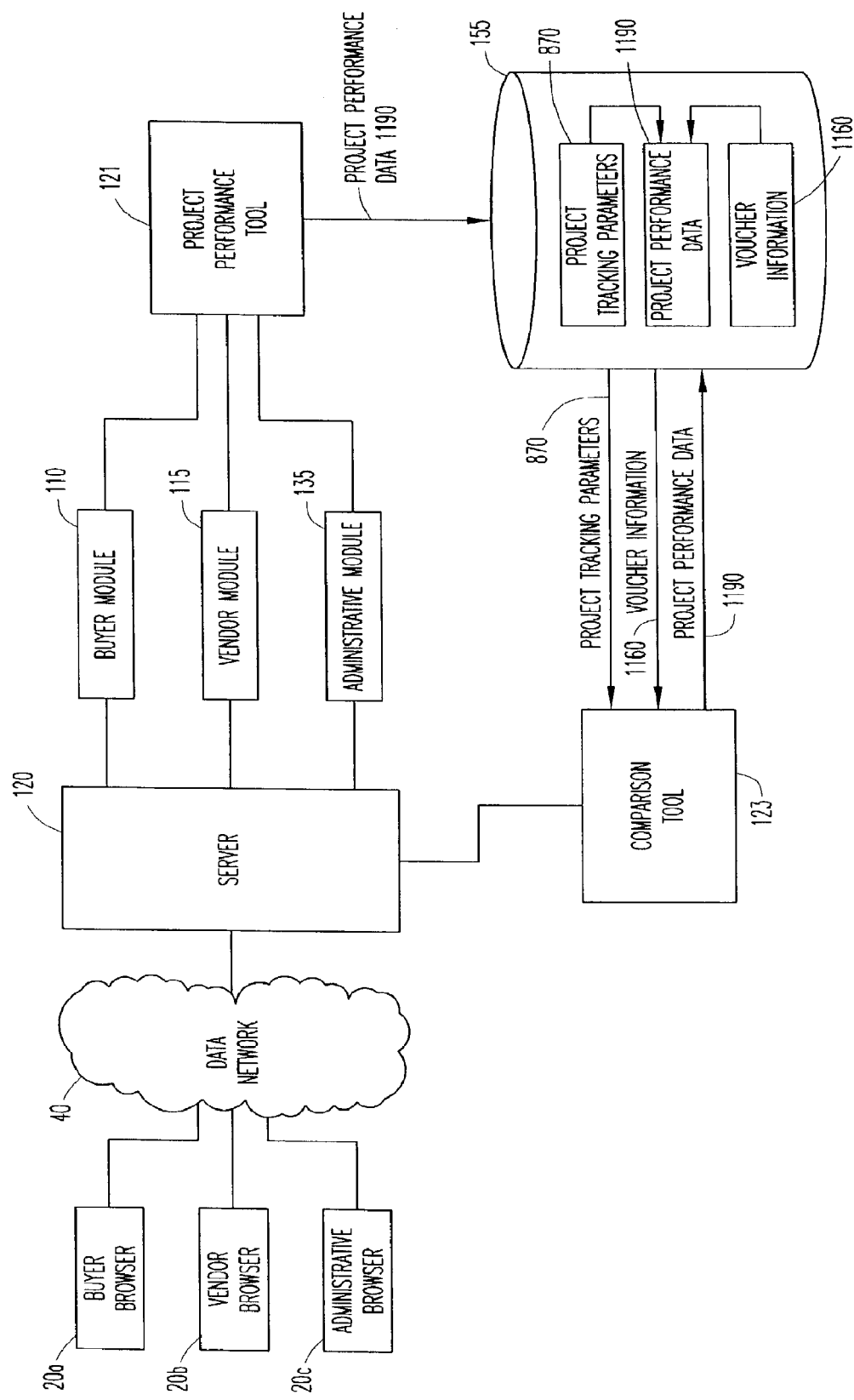
FIG. 53 illustrates exemplary functionality for entering project performance data related to the performance of projects into the system, in accordance with embodiments of the present invention.

Turning now to FIG. 53, there is illustrated exemplary functionality for entering project performance data 1190. A project performance tool 121 and comparison tool 123 are illustrated in FIG. 53 for the entering of the project performance data, in accordance with embodiments of the present invention. The project performance tool 121 and comparison tool 123 can include any hardware, software and/or firmware required to perform the functions of the tools, and can be implemented within the server 120 or an additional server (not shown). For example, the project performance tool 121 and comparison tool 123 can be resident in software modules 128 within the server 120, as shown in FIG. 3B.

In one embodiment, the project performance data 1190 can be entered directly into the database 155 by a buyer, vendor or administrator through the project performance tool 180. The buyer, vendor or administrator can access the server 120 of the computer system 100 via the buyer browser 20a, vendor browser 20b or administrative browser 20c, respectively, and the data network 40. The buyer module 110, vendor module 115 or administrative module 135 interfaces with the project performance tool 121 to push web pages to the buyer browser 20a, vendor browser 20b or administrative browser 20c, respectively, soliciting the project performance data. The project performance tool 121 accesses the database 155 to populate project performance data fields associated with a particular project with the project performance data entered by the buyer, vendor and/or administrator. For example, the project performance data can include comments by the buyer, vendor and/or administrator on the status or personal project satisfaction thus far.

Upon receiving project performance data 1190 from either the buyer, vendor or administrator, the project performance tool 121 can further be configured to automatically generate a message (e.g., e-mail message) to the other parties informing them of the new project performance data 1190, thereby enabling the other parties to enter additional project performance data 1190 clarifying, responding or providing data unrelated to the previously entered project performance data 1190.

In other embodiments, the comparison tool 123 can automatically enter the project performance data 1190 into the database 155 based on a comparison of project tracking parameters 870 and voucher information 1160 associated with a particular project. The comparison tool retrieves requisite project tracking parameters 870 and voucher information 1160 from the database 155, performs a comparison or analysis of the retrieved project tracking parameters 870 and voucher information 1160, and based on the results of the comparison or analysis, enters any necessary project performance data 1190 into data fields associated with the project within the database 155.

As an example, the comparison tool 123 can be configured to monitor the database 155 for new voucher information 1160 entries or otherwise be triggered upon the entry of new voucher information 1160 to compare the entered voucher information 1160 with the previously stored project tracking parameters 870 for the project. The voucher information 1160 can contain cost, timing or other information with which to compare to the project tracking parameters 870. The results of the comparison can be stored as project performance data 1190 in the database 155. For example, the voucher information 1160 could indicate an invoice amount paid by the buyer 50 on a project, and the comparison tool 123 can compare the invoice amount with the requisition amount to determine if a discrepancy exists. In this case, the project performance data 1190 could include an indication of the cost status, such as under-budget, over-budget or in-budget, and the amount over or under budget, if any.

As another example, the comparison tool 123 can be configured to search the database 155 for particular project tracking parameters 870, and enter the status of the project tracking parameters 870 as project performance data 1190. For example, the comparison tool 123 can search the database 155 for expired target completion dates on projects, and enter the number of days each of the projects are past due as project performance data 1190 related to those projects. The comparison tool 123 can further search for voucher information 1160 related to those past due projects and enter the status of the projects based on the voucher information 1160. For example, if the vendor has submitted a voucher for payment, but the buyer has not yet made the payment, the status could indicate "voucher submitted, awaiting payment."

Figure 54:
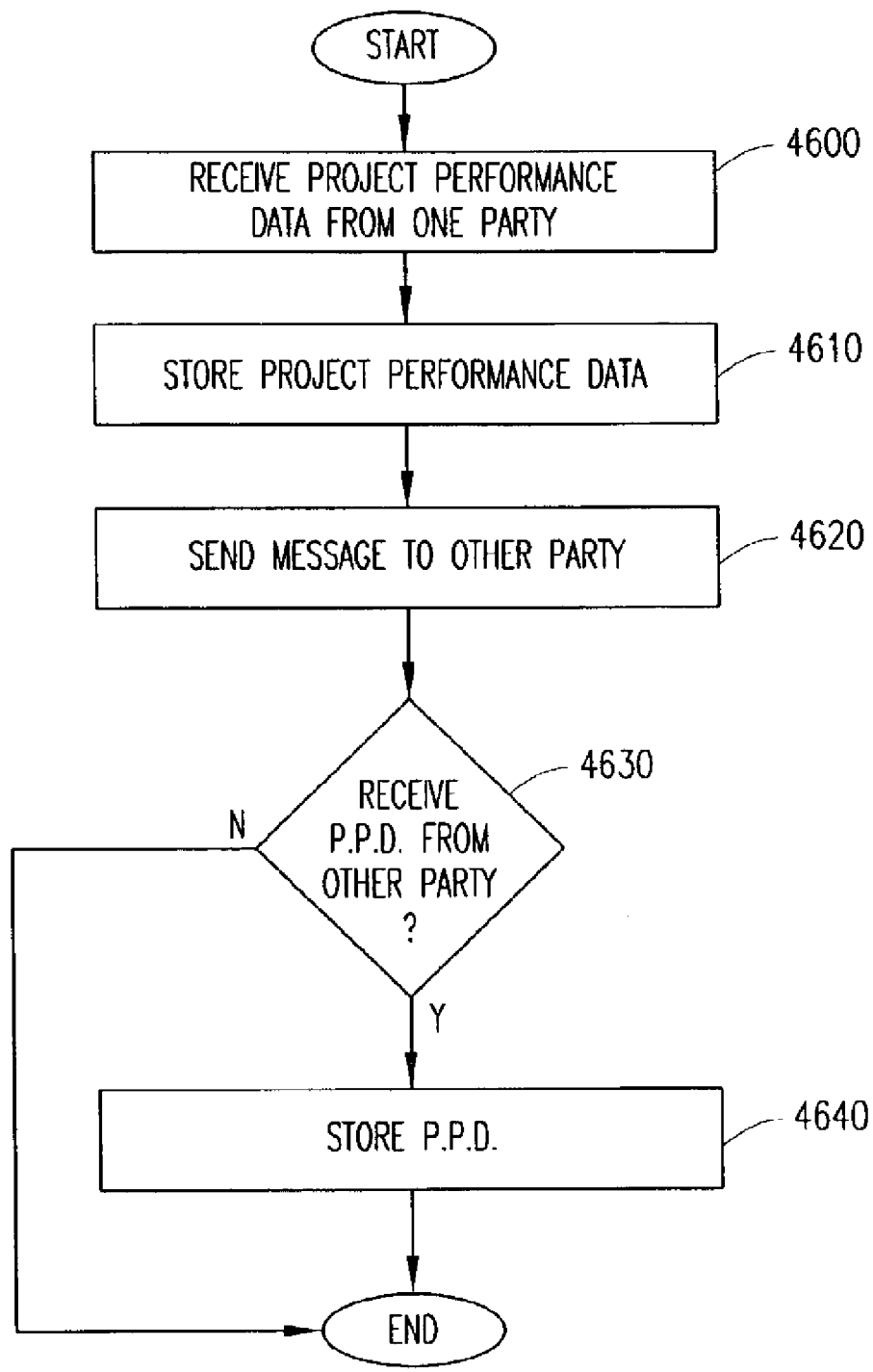
FIGS. 54-56 are flow charts illustrating exemplary steps for entering project performance data.
Figure 56:
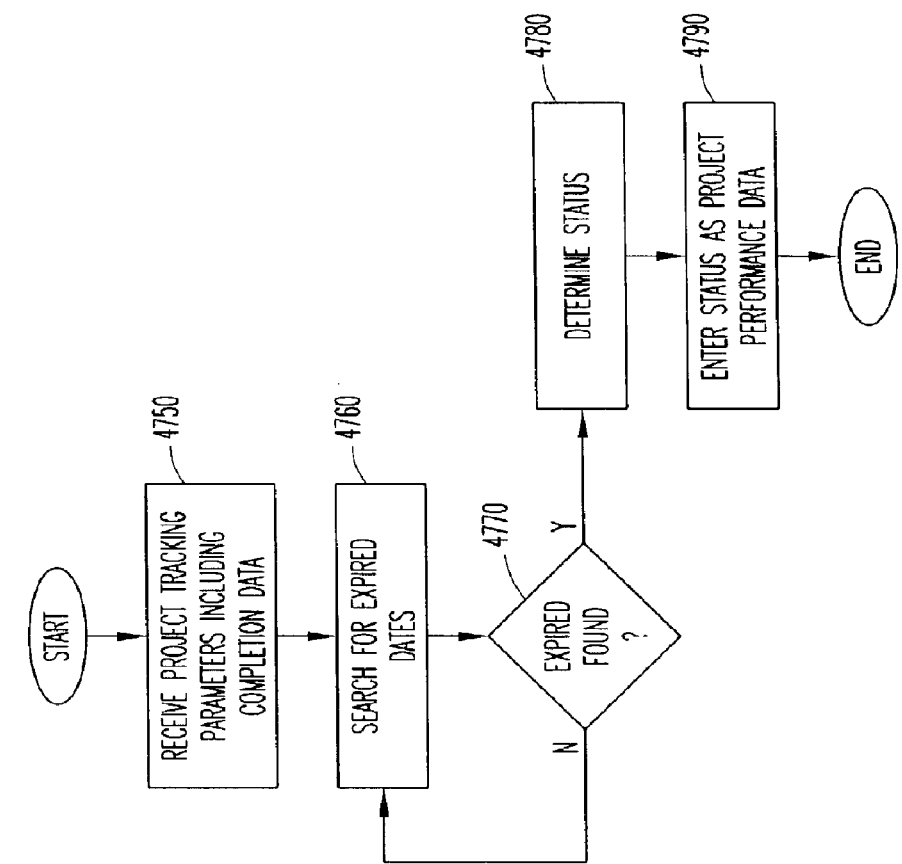
Figure 55:
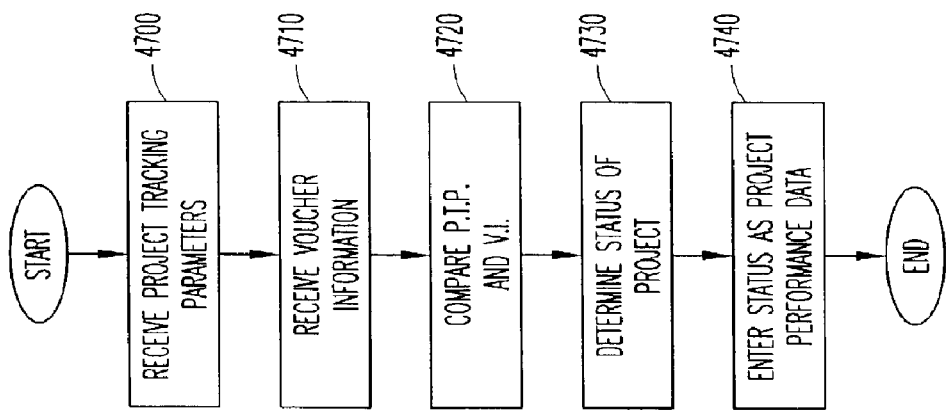

Exemplary processes for entering project performance data 1190 from various system perspectives are shown in FIGS. 54-56. FIG. 54 illustrates exemplary steps for a user, such as a buyer, vendor or administrator, to enter project performance data into the system. Upon receiving the project performance data from a user associated with a project (step 4600), the system stores the project performance data in data fields associated with the project for later use and retrieval (step 4610). If the parties (buyer, vendor and administrator) involved in the project have established conditions for allowing disclosure of some or all project performance data between the parties, the system generates a message to the other parties informing them of the received project performance data in accordance with the conditions set by the parties (step 4620). In response to the message, the other parties may choose to enter additional project performance data clarifying, responding or providing data unrelated to the previously entered project performance data. If additional project performance data is received (step 4630), the system stores the additional project performance data in data fields associated with the project, along with the previously entered project performance data, within the database (step 4640).

FIG. 55 illustrates exemplary steps for automatically entering project performance data into the system based on the previously stored project tracking parameters and the voucher information. After the system receives both project tracking parameters (step 4700) and voucher information (step 4710) for a particular project, the system can compare the project tracking parameters with the voucher information (step 4720) to determine the status of the project (step 4730). The project status can be entered into the system and stored as project performance data related to the project (step 4740). For example, the voucher information can indicate the actual project completion date on a project, and the system can compare the actual project completion date with the target project completion date to determine if a discrepancy exists. In this case, the project performance data could include an indication of the status, such as complete on-time, complete past-due or complete early, along with the number of days past-due or early.

FIG. 56 illustrates exemplary steps for automatically entering project performance data into the system based on the status of previously stored project tracking parameters. After the system receives project tracking parameters for a particular project (step 4750), such as a target completion date, the system can search the database for expired target completion dates on projects (step 4760). If expired completion dates are found (step 4770), the system can determine the status of the project (step 4780), based on any voucher information that has been received, and enter the status of the project into the system as project performance data (step 4790).

Exemplary database structures for storing the project performance data 1190 are shown in Tables 95-112 below. The data structures are illustrated for simplicity as being organized in a table format, with each table including all of the fields necessary for storing project performance data 1190. The tables are related in a hierarchical and relational manner with other tables stored in the database, as will be discussed in connection with FIG. 57.

Figure 57:
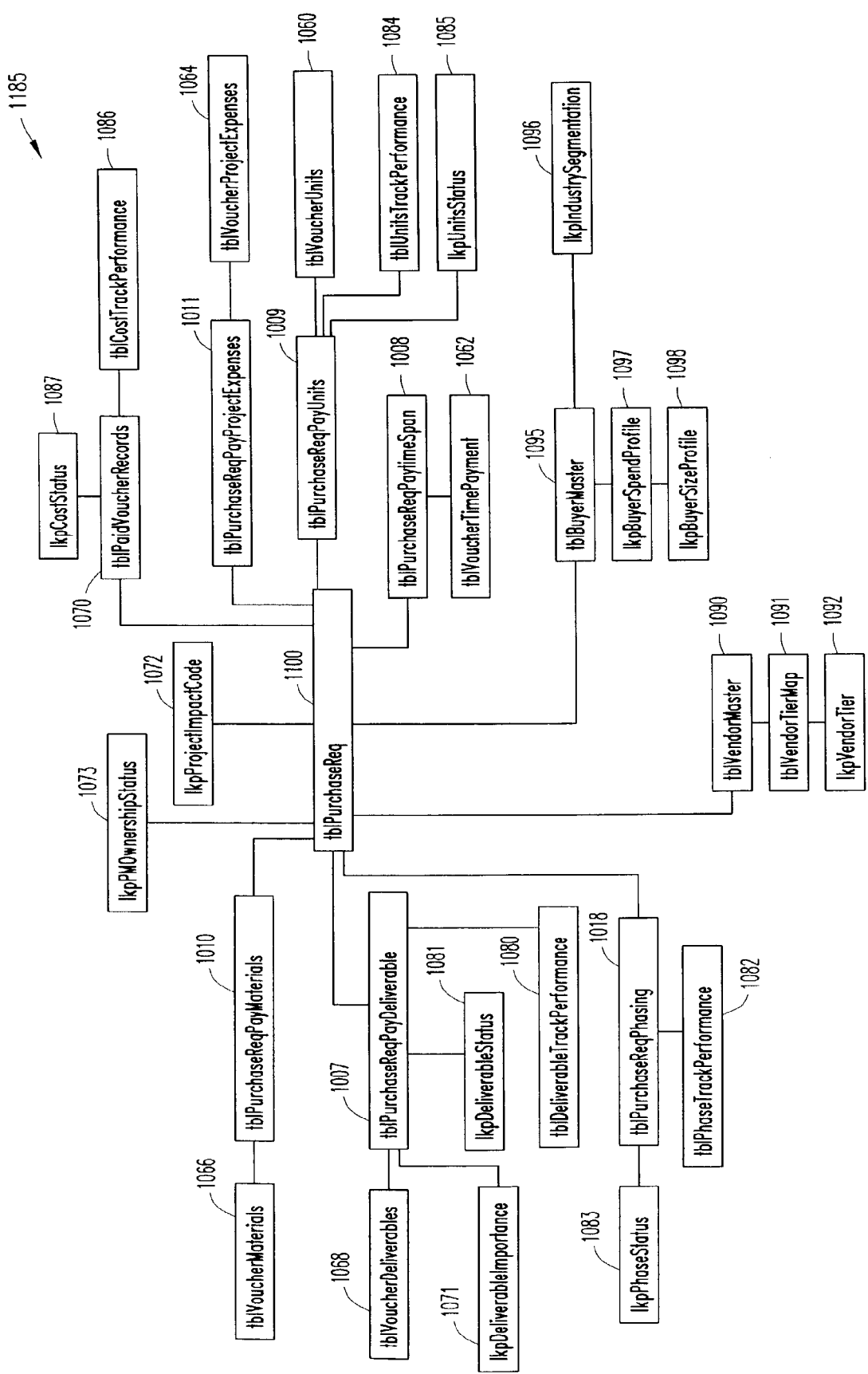
FIG. 57 is a database table view illustrating the storage of project performance data, in accordance with embodiments of the present invention.

Tables 95 and 96 below illustrate sample deliverable project performance data, which can be stored in the database table structure 1185 in table "tblDeliverableTrackPerformance" 1080 and table "lkpDeliverableStatus" 1081, as shown in FIG. 57. The deliverable project performance data can include the deliverable status as determined from the table "lkpDeliverableStatus" 1081. For example, the deliverable status can be "incomplete—current," "incomplete—past due," "partial complete—current," "partial complete—past due," "complete—on-time," complete—past due" or "complete—early." The identifier associated with the status can be stored in the table "tblDeliverableTrackPerformance," along with the identifier associated with the deliverable project tracking parameters stored in the table "tblPurchaseReqPayDeliverables" 1007, the current status (e.g., the number of days late or early), and any user notes.

For example, if the buyer, vendor or other user has entered any comments related to the status of the deliverables, these comments can be stored in table "tblDeliverableTrackPerformance" 1080. The identity of the user that entered the comments, along with the date the comments were entered can also be stored in-addition to the comments. If the system is configured to inform the vendor when the buyer enters comments, the status of the vendor response (e.g., not yet responded, no response, response) can also be stored.

Tables "tblDeliverableTrackPerformance" 1080 and "lkpDeliverableStatus" 1081 are shown tied to table "tblPurchaseReqPayDeliverable" 1007, which in turn is tied to table "tblPurchaseReq" 1000, which are discussed above in connection with FIG. 41, to associate the project performance data with the voucher information and the project tracking parameters (e.g., purchase requisition). In addition, various other tables shown in FIG. 41 are illustrated here in FIG. 57 to show the interrelation between the various project performance tables, voucher tables and purchase requisition tables. It should be understood that a separate record in the format of Table 95 is stored in table "tblDeliverableTrackPerformance" 1080 for each deliverable. It should be understood that other tables and project performance data can be included, and the system is not limited to the specific tables and project performance data shown in FIG. 57.

TABLE 95

Exemplary tblDeliverableTrackPerformance

| Column | Data Type | Length |
|---|---|---|
| DeliverableID | int | 4 |
| DeliverableStatusID | int | 4 |
| CurrentStatus | varchar | 1000 |
| BuyerUserID | int | 4 |
| BuyerUserNotes | varchar | 1000 |
| BuyerRecordDate | datetime | 8 |
| VendorUserID | int | 4 |
| VendorUserNotes | varchar | 1000 |
| VendorRecordDate | datetime | 8 |

TABLE 96

Exemplary lkpDeliverableStatus

| DeliverableStatusID | DeliverableStatusDesc |
|---|---|
| 1 | Incomplete-Current |
| 2 | Incomplete-PastDue |
| 3 | PartialComplete-Current |
| 4 | PartialComplete-PastDue |
| 5 | Complete-OnTime |
| 6 | Complete-PastDue |
| 7 | Complete-Early |

Tables 97 and 98 below illustrates sample phase project performance data, which can be stored in the database table structure 1185 in table "tblPhaseTrackPerformance" 1082 and table "lkpPhaseStatus" 1083, as shown in FIG. 57. The phase project performance data can include the phase status as determined from the table "lkpPhaseStatus" 1082. For example, the phase status can be "open—current," "open—out of date," "open—future date," "closed—on-time," "closed—out of date," or "closed—early." The identifier associated with the status can be stored in the table "tblPhaseTrackPerformance," along with the identifier associated with the phase project tracking parameters stored in the table "tblPurchaseReehasing" 1018, which can be a table similar to the tables shown in FIG. 41, the current status (e.g., the number of days late or early), and any user notes.

For example, if the buyer, vendor or other user has entered any comments related to the status of the phasing, these comments can be stored in table "tblPhaseTrackPerformance" 1083. The identity of the user that entered the comments, along with the date the comments were entered can also be stored in addition to the comments. If the system is configured to inform the vendor when the buyer enters comments, the status of the vendor response (e.g., not yet responded, no response, response) can also be stored.

TABLE 97

Exemplary tblPhaseTrackPerformance

| Column | Data Type | Length |
|---|---|---|
| PhaseID | int | 4 |
| PhaseStatusID | int | 4 |
| CurrentStatus | varchar | 1000 |
| BuyerUserID | int | 4 |
| BuyerUserNotes | varchar | 1000 |
| BuyerRecordDate | datetime | 8 |
| VendorUserID | int | 4 |
| VendoruserNotes | varchar | 1000 |
| VendorRecordDate | datetime | 8 |

TABLE 98

Exemplary lkpPhaseStatus

| PhaseStatusID | PhaseStatusDesc |
|---|---|
| 1 | Open-Current |
| 2 | Open-Out Of Date |
| 3 | Open-Future Date |
| 4 | Closed-On-Time |
| 5 | Closed-Out Of Date |
| 6 | Closed-Early |

Tables 99 and 100 below illustrates sample units project performance data, which can be stored in the database table structure 1185 in table "tblUnitsTrackPerformance" 1084 and table "lkpUnitStatus" 1085, as shown in FIG. 57. The units project performance data can include the units status as determined from the table "lkpUnitsStatus" 1085. For example, the units status can be "Incomplete-Current," "Incomplete-PastDue," "Complete-On-Time," "Complete-PastDue" or "Complete-Early." The identifier associated with the status can be stored in the table "tblUnitTrackPerformance," along with the identifier associated with the unit project tracking parameters stored in the table "tblPurchaseReqPayUnits" 1009, the current status (e.g., the number of days late or early), and any user notes.

For example, if the buyer, vendor or other user has entered any comments related to the status of the units, these comments can be stored in table "tblUnitsTrackPerformance" 1084. The identity of the user that entered the comments, along with the date the comments were entered can also be stored in addition to the comments. If the system is configured to inform the vendor when the buyer enters comments, the status of the vendor response (e.g., not yet responded, no response, response) can also be stored.

TABLE 99

Exemplary tblUnitsTrackPerformance

| Column | Data Type | Length |
|---|---|---|
| UnitsID | int | 4 |
| UnitsStatusID | int | 4 |
| CurrentStatus | varchar | 1000 |
| BuyerUserID | int | 4 |
| BuyerUserNotes | varchar | 1000 |
| BuyerRecordDate | datetime | 8 |
| VendorUserID | int | 4 |
| VendoruserNotes | varchar | 1000 |
| VendorRecordDate | datetime | 8 |

TABLE 100

Exemplary lkpUnitsStatus

| UnitsStatusID | UnitsStatusDesc |
|---|---|
| 1 | Incomplete-Current |
| 2 | Incomplete-PastDue |
| 3 | Complete-Current |
| 4 | Complete-PastDue |
| 5 | Complete-Early |

Tables 101 and 102 below illustrates sample cost project performance data, which can be stored in the database table structure 1185 in table "tblCostTrackPerformance" 1086 and table "lkpCostStatus" 1087, as shown in FIG. 57. The cost project performance data can be related to any paid voucher for any type of voucher, including materials vouchers, expenses vouchers, deliverables vouchers, phasing vouchers, units vouchers and time payment vouchers. The cost project performance data is represented by the cost status as determined from the table "lkpCostStatus" 1087. For example, the cost status can be "over-budget," "under-budget" or "in-budget." The identifier associated with the status can be stored in the table "tblCostTrackPerformance," along with the identifier associated with the voucher information stored in the table "tblPaidVoucherRecords" 1070, the current status (e.g., the amount over or under budget), and any user notes.

For example, if the buyer, vendor or other user has entered any comments related to the status of the cost, these comments can be stored in table "tblCostTrackPerformance" 1086. The identity of the user that entered the comments, along with the date the comments were entered can also be stored in addition to the comments. If the system is configured to inform the vendor when the buyer enters comments, the status of the vendor response (e.g., not yet responded, no response, response) can also be stored.

TABLE 101

Exemplary tblCostTrackPerformance

| Column | Data Type | Length |
|---|---|---|
| PaidVoucherRecordID | int | 4 |
| CostStatusID | int | 4 |
| CurrentStatus | varchar | 1000 |
| BuyerUserID | int | 4 |
| BuyerUserNotes | varchar | 1000 |
| BuyerRecordDate | datetime | 8 |

TABLE 101-continued

Exemplary tblCostTrackPerformance

| Column | Data Type | Length |
|---|---|---|
| VendorUserID | int | 4 |
| VendoruserNotes | varchar | 1000 |
| VendorRecordDate | datetime | 8 |

TABLE 102

Exemplary lkpCostStatus

| CostStatusID | CostStatusDesc |
|---|---|
| 1 | Over-Budget |
| 2 | Under-Budget |
| 3 | In-Budget |

Other tables are shown in FIG. 57 that contain additional data related to the project and/or vendor or buyer that can serve to further identify the type of project and other project variables that have not been explicitly discussed previously. The additional data can also be included in the transactional data utilized for analysis and reporting purposes. For example, Table 103 below illustrates the impact of the project on other aspects of the buyer, which can be stored in the database table structure 1185 in table "lkpProjectImpactCode" 1072, Table 104 below illustrates the deliverable importance, which can be stored in the database table structure 1185 in table "lkpDeliverableImportance," and Table 105 below illustrates the ownership status of the project, which can be stored in the database table structure 1185 in table "lkpPMOwndershipStatus" 1073, as shown in FIG. 57.

Other information related to the vendor and the buyer can be stored in additional tables. For example, Table 106 below illustrates master vendor data, which can be stored in the database table structure 1185 in table "lkpVendorMaster" 1090, and Table 107 below illustrates master buyer data, which can be stored in the database table structure 1185 in table "lkpBuyerMaster" 1095, as shown in FIG. 57. In addition, Tables 108 and 109 below illustrate vendor tier information indicating the tier group that the buyer has assigned to the vendor (e.g., Tier 1 vendors are the vendors that are typically used first or most often), which can be stored in the database table structure 1185 in tables "lkpVendorTier" 1091 and "tblVendorTierMap" 1092, as shown in FIG. 57. Furthermore, Tables 110-112 below illustrate buyer industry segmentation, spend and size information, which can be stored in the database table structure 1185 in tables "lkpIndustrySegmentation" 1096 "lkpBuyerSpendProfile" 1097 and "lkpBuyerSizeProfile" 1098, as shown in FIG. 57. The industry segmentation can be project-specific or applicable to the buyer as a whole.

TABLE 103

Exemplary lkpProjectImpactCode

| ProjectImpactCodeID | ProjectImpactCode |
|---|---|
| 1 | EmployeeHealty&Safety |
| 2 | EmployeeTraining |
| 3 | FacilitiesImprovement |
| 4 | InternalProcessImprovement |
| 5 | LiabilityReduction |
| 6 | MarketShareIncrease |
| 7 | MarketShareRetention |

TABLE 103-continued

Exemplary lkpProjectImpactCode

| ProjectImpactCodeID | ProjectImpactCode |
|---|---|
| 8 | ProductDevelopment-Core |
| 9 | ProjectDevelopmentNon-Core |
| 10 | ProfitabilityGains |
| 11 | ProvisionClientServices |
| 12 | PublicReputationEnhancement |

TABLE 104

Exemplary lkpDeliverableImportance

| DeliverableImportanceID | DeliverableImportanceDesc |
|---|---|
| 1 | Critical |
| 2 | HighPriority |
| 3 | MediumPriority |
| 4 | LowPriority |

TABLE 105

Exemplary lkpPMOwnershipStatus

| PMOwnershipID | PMOwnershipDesc |
|---|---|
| 1 | ClientOwned |
| 2 | SupplierOwned |
| 3 | JointOwnership-ClientPM |
| 4 | JointOwnership-SupplierPM |
| 5 | 3rdPartyConsultantPM |

TABLE 106

Exemplary lkpVendorMaster

| Column | Data Type | Length |
|---|---|---|
| VendorID | int | 4 |
| vCompanyName | varchar | 100 |
| vParentCompanyName | varchar | 100 |
| vBusinessEntityTypeID | int | 4 |
| vFedIdentity | varchar | 50 |
| vYearCorp | varchar | 50 |
| vFTEmployees | int | 4 |
| vURL | varchar | 100 |
| vPhone | varchar | 50 |
| vFax | varchar | 50 |
| vEmail | varchar | 50 |
| vCountryID | int | 4 |

TABLE 107

Exemplary lkpBuyerMaster

| Column | Data Type | Length |
|---|---|---|
| BuyerID | int | 4 |
| bCompanyName | varchar | 100 |
| bParentCompanyName | varchar | 100 |
| bBusinessEntityTypeID | int | 4 |
| bFedIdentity | varchar | 50 |
| bYearCorp | varchar | 50 |
| bFTEmployees | int | 4 |
| bURL | varchar | 100 |
| bPhone | varchar | 50 |
| bFax | varchar | 50 |
| bEmail | varchar | 50 |
| bCountryID | int | 4 |

TABLE 108

Exemplary lkpVendorTier

| Column | Data Type | Length |
|---|---|---|
| TierCode | int | 4 |
| TierCodeDesc | varchar | 50 |
| CurrentStatusID | int | 4 |
| UserTypeID | int | 4 |
| UserID | int | 4 |
| RecordDate | datetime | 8 |

TABLE 109

Exemplary tblVendorTierMap

| Column | Data Type | Length |
|---|---|---|
| VendorID | int | 4 |
| TierID | int | 4 |
| CurrentStatusID | int | 4 |
| UserTypeID | int | 4 |
| UserID | int | 4 |
| RecordDate | datetime | 8 |
| RowID | int | 4 |

TABLE 110 lkpIndustrySegmentation

| IndustrySegmentID | IndustrySegmentDesc |
|---|---|
| 1 | Aerospace |
| 2 | Automotive |
| 3 | Banking |
| 4 | Engineering |
| 5 | Finance |
| 6 | Government |
| 7 | Insurance |
| 8 | Manufacturing |
| 9 | Medical/BioResearch |
| 10 | Pharmaceutical |
| 11 | Retail |
| 12 | Telecommunications |
| 13 | Transportation |

TABLE 111 lkpBuyerSpendProfile

| BuyerSpendProfileDesc | SpendThresholdLow |
|---|---|
| ExtraLargeCommoditySpender | $250,000,000 |
| LargeCommoditySpender | $100,000,000 |
| MidSizeCommoditySpender | $40,000,000 |
| SmallCommoditySpender | $5,000,000 |

TABLE 112 lkpBuyerSizeProfile

| BuyerSizeProfileDesc | CapLowThreshold |
|---|---|
| XLCap | $10,000,000,000 |
| LCap | $5,000,000,000 |
| MCap | $1,000,000,000 |
| SCap | $100,000,000 |

As described above in connection with FIG. 52, the project performance data forms a part of the transactional data that is stored in the database. Referring again to FIG. 58, the transactional data 1195 may include not only the bid data 212, but also the project tracking parameters 870, voucher information 1160 and project performance data 1190. All of the transactional data 1195 is stored in the lower-level database system 150 that contains databases (155, not shown) for buyers, vendors and administrators. In some embodiments, the transactional data 1195 is maintained only at the lower-level database 150, and therefore, the analytical data is restricted to only the transactional data 1195 within that lower-level database. For example, a buyer/administrator or vendor may not permit their transactional data to be accessed by any outside (third-party) sources. In this situation, to generate analytical data including the buyer/administrator or vendor transactional data, the buyer/administrator or vendor is limited to just their transactional data.

Figure 59:
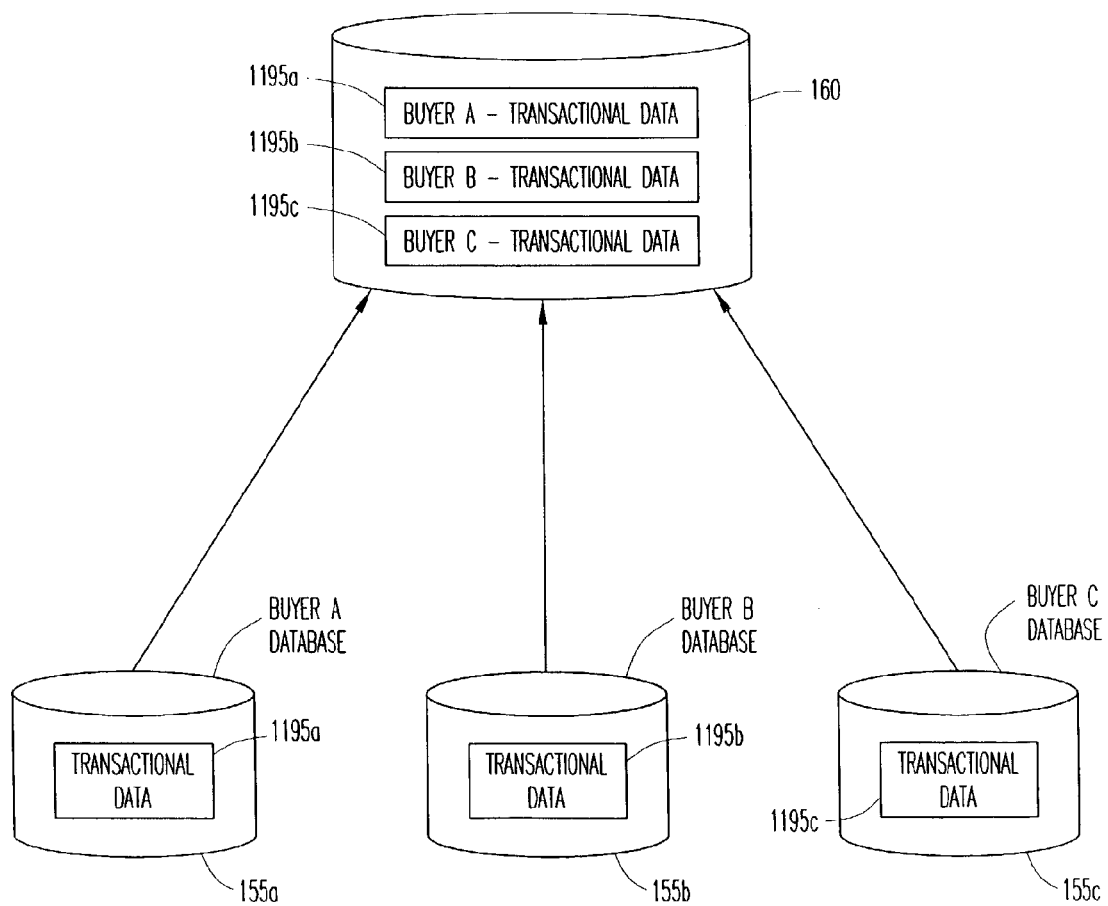
FIG. 59 illustrates an exemplary transfer of the transactional data from multiple buyer databases to a central database.

In other embodiments, as shown in FIG. 59, all or a portion of the transactional data 1195 can be transferred up to the top-level database 160 (hereinafter the "central database 160") for later use or retrieval for analytical purposes. The transactional data can be transferred from the lower-level database 155 to the central database 160 at any time or for any reason. As an example, the transactional data 1195*a*, 1195*b* and 1195*c* (collectively, 1195) stored in multiple buyer databases 155*a*, 155*b* and 115*c*, respectively, can be transferred up to the central database 160 for storage therein. The transfer can take place in a batch mode process, in which the transactional data 1195 having record creation dates within a specific time period are transferred in a batch up to the central database 160. For example, each week, all of the transactional data 1195 having record creation dates for that week can be transferred in a batch up to the central database 160.

The transferred transactional data 1195 can include all of the transactional data 1195 in the lower-level database 160 or only a portion as designated by the system or the buyer/administrator and/or vendor. For example, various portions of the transactional data 1195 may not be necessary for industry-wide analytical purposes, and therefore, the transactional data 1195 transferred to the central database 160 may exclude those portions that are unnecessary. As another example, the buyer/administrator and/or vendor may desire to limit the type of transactional data 1195 that is made available to the central database 160 for privacy or other reasons.

Figure 60:
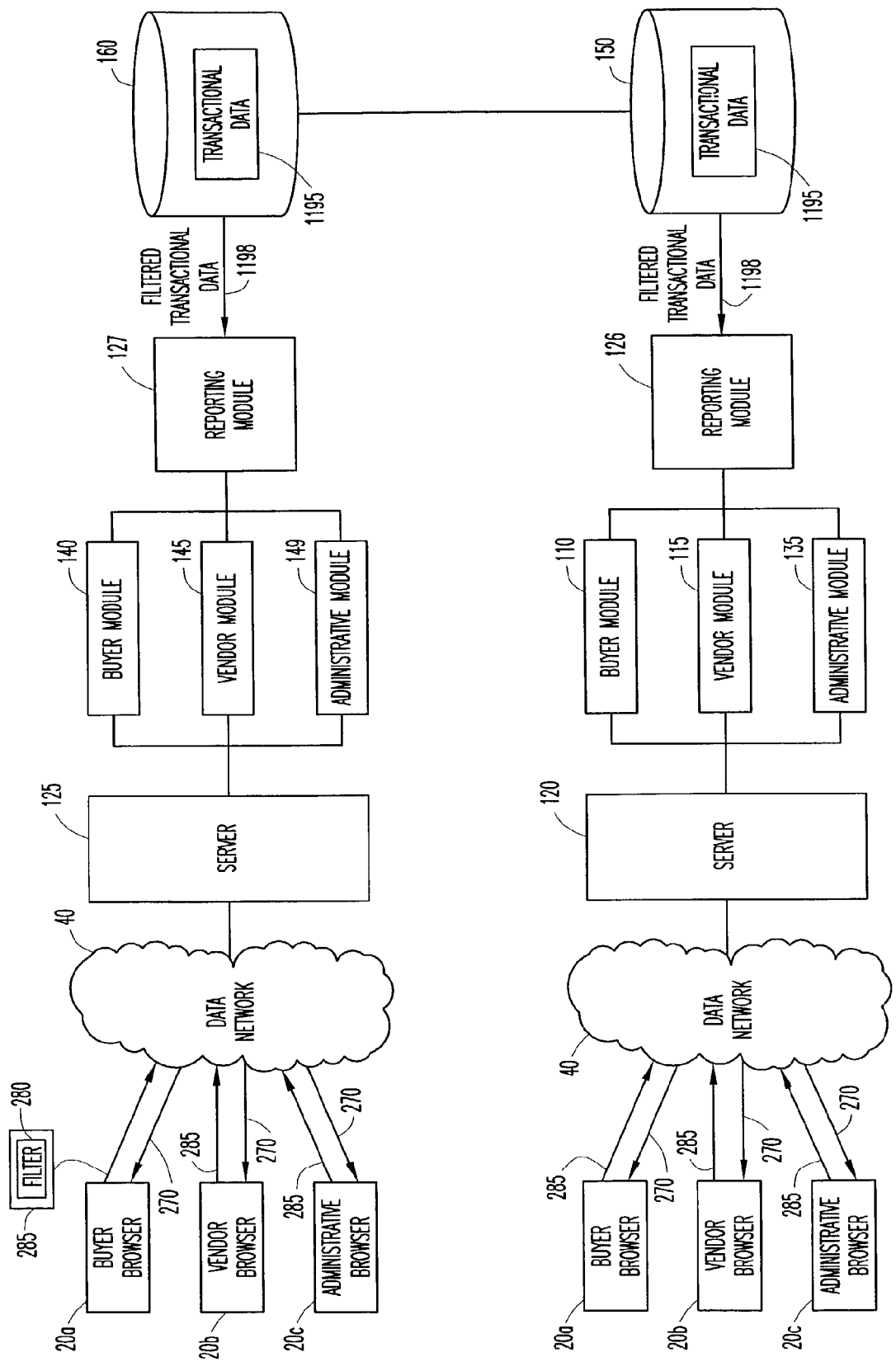
FIG. 60 illustrates the electronic facilitation of analysis and reporting of transactional data, in accordance with embodiments of the present invention.

Referring now to FIG. 60, there is illustrated exemplary functionality for generating the analytical data 270. A reporting module 126 or 127 is shown in FIG. 60 for the generation of the analytical data 270, in accordance with embodiments of the present invention. The reporting module 126 or 127 can include any hardware, software and/or firmware required to perform the functions of the module, and can be implemented within the server 120 or 125, respectively, or an additional server (not shown). For example, the reporting module 126 can be resident in software modules 128 within the server 120, as shown in FIG. 3B.

The analytical data 270 can be generated using transactional data 1195 from a lower-level database (not specifically shown) within the lower-level database system 150 or from the central database 160, depending on the type of analytical data 270 desired. For example, if a buyer user requires analytical data related to only those projects associated with the buyer, the buyer user would access the transactional data 1195 within the lower-level database of the buyer within the lower-level database system 150. However, if the buyer user requires industry analytical data related to projects associated with multiple buyers, the buyer user would access the transactional data 1195 within the central database 160.

To receive analytical data 270 using transactional data 1195 from either the lower-level database system 150 or the central database 160, a buyer user, vendor user or administrative user accesses the respective server 120 or 125 associated with the database 150 or 160 via the buyer browser 20*a*, vendor browser 20*b* or administrative browser 20*c*, respectively and the data network 40. The buyer module 110 or 140, vendor module 115 or 145 or administrative module 135 or 149 interfaces with the reporting module 126 or 127 to push web pages to the buyer browser 20*a*, vendor browser 20*b* or administrative browser 20*c*, respectively, to assist the buyer user, vendor user or administrative user in generating a request 285 for a specific type of analytical data 270. For example, the analytical data 270 requested can be related to various price and performance factors as a function of the transactional data 1195. The analytical data 270 can be related to a single project, multiple projects, multiple vendors or multiple buyers, the latter being possible with only the central database transactional data 1195. The different permutations and possibilities for the different types of analytical data 270 that can be generated are limited only by the type and amount of transactional data 1195 that is stored. In addition, it should be understood that, although not shown, in other embodiments, a contractor user may be allowed to access various analytical data 270 that the contractor is authorized to view, such as the number of hours worked by the contractor on a project to date, the number of hours worked on all projects within a certain time period, the pay rate for different projects, the average pay rate, etc.

In some embodiments, the request 285 submitted by the user may contain one or more filters 280 to focus the analytical data 270 on specific transactional data 1195. For example, the user may want to receive analytical data 270 related to only those projects completed in a specific geographical area or associated with a specific project type or industry segmentation. The reporting module 126 or 127 uses the filters 280 to access the database 150 or 160 to retrieve filtered transactional data 1198 that contains only that transactional data that meets the requirements of the filters 280. From the filtered transactional data 1198, the reporting module 126 or 127 generates the analytical data 270.

Using the transactional data 1195 or filtered transactional data 1198, the reporting module 126 or 127 generates the analytical data 270 based on the request 285. For example, if the request 285 is for a financial report indicating the projected spending in future months on current projects, the reporting module 126 or 127 can access the transactional data 1195 to retrieve various project tracking parameters related to future requisition amounts of current projects, and aggregate the requisition amounts by month to generate the analytical data 270. As another example, if the request 285 is for a statistical report on the percentage of expenditures on various components of projects (e.g., materials, expenses, deliverables, labor, etc.) with tier 1 vendors, the reporting module 126 or 127 can access the transactional data 1195 to retrieve various bid data (to determine the projects tied to tier 1 vendors), project tracking parameters, voucher information and project performance data and utilize various mathematical and statistical functions to produce the analytical data 270. The reporting module 126 or 127 pushes web pages including reporting views containing the analytical data to the buyer browser 20*a*, vendor browser 20*b* or administrative browser 20*c*.

Exemplary processes for generating various types of analytical data 270 using various types of transactional data are shown in FIGS. 61-67. However, it should be understood that the processes shown are merely examples of the numerous processes capable of being performed using the system of the present invention. FIG. 61 is an exemplary flow chart describing a process for generating analytical data as requested by a user of the system. In this process, a request for the analytical data as a function of transactional data including at least the bid data that was collected during the on-line bid process is received (step 4800). The request may be submitted as a search and/or sort request to select particular or general types of bid data as submitted in the bids. In addition, the request may include one or more filters to narrow the amount of bid data within the selected types of bid data that is used in the generation of the analytical data.

Once the requisite transactional data is identified and retrieved, the analytical data is generated from the transactional data (step 4810). In generating the analytical data, various mathematical and statistical functions may be utilized to produce a wide variety of information requested by the user. The analytical data can be generated from bid data related to a single project, multiple projects, multiple vendors or multiple buyers, and it can be presented to the user in a variety of reporting views. For example, exemplary reporting views include summary views, aggregate views, estimation views, statistical views, project performance views or any combination of thereof. The analytical data may be utilized by the user for a variety of purposes, including assessing individual bids, assessing vendor performance, assessing spending or income, assessing inflation within an industry, producing industry trend information, etc.

FIG. 62 is an exemplary flow chart describing a process for generating analytical data including aggregate project performance data across current, past and/or future projects within the system. The project performance data is stored by the system (step 4820), as described above in connection with FIGS. 53-56. In this process, a request for aggregate project performance data is received from an authorized user of the system (step 4830). The request may be submitted as a search and/or sort request to select particular or general types of project performance data as collected by the system. In addition, the request may include one or more filters to narrow the amount of project performance data within the selected types of project performance data that is used in the generation of the analytical data. It should be understood that the request is to collect project performance data from across multiple projects being performed by one or more vendors for one or more buyers so as to aggregate the project performance data.

Once the requisite project performance data is identified and retrieved, the aggregate project performance data is generated (step 4840). In generating the aggregate project performance data, various arithmetic and/or statistical analysis operations may be utilized. For example, the system can compute a variety of information related to projects, such as the percentage of projects that are on-time or under-budget, etc. The aggregate project performance data can be presented to the user in a variety of reporting views. For example, exemplary reporting views include summary views, estimation views or statistical views. The aggregate project performance data may be utilized by the user for a variety of purposes, including assessing the individual performance of a vendor relative to other vendors, assessing past, present or future spending or income, assessing inflation within an industry, producing industry trend information, etc.

FIG. 63 is an exemplary flow chart describing a process for generating analytical data including aggregate statistical project performance data related to individual projects. The project performance data is stored by the system (step 4850), as described above in connection with FIGS. 53-56. In this process, a request for aggregate statistical project performance data is received from an authorized user of the system (step 4860). The request may be submitted as a search and/or sort request to select particular or general types of project performance data as collected by the system. In addition, the request may include one or more filters to narrow the amount of project performance data within the selected types of project performance data that is used in the generation of the analytical data. It should be understood that the request is to collect project performance data from across multiple projects being performed by one or more vendors for one or more buyers so as to calculate statistical data related to the individual projects and aggregate the statistical data.

Once the requisite project performance data is identified and retrieved, statistical project performance data is calculated for individual projects (step 4870) using various arithmetic and/or statistical analysis operations. The statistical analysis can compute a variety of information about a project, such as average monthly cost, average expenditure, percentage of total cost for various components or aspects of the project, etc. Thereafter, the individual statistical data is aggregated to generate aggregate statistical project performance data (step 4880). The aggregate statistical project performance data can be presented to the user in a variety of reporting views. For example, exemplary reporting views include summary views, estimation views, etc. By aggregating the statistical data across multiple projects being performed by vendors, the buyer may get an overall view of the projects being performed to assist in assessing the projects as a whole.

FIG. 64 is an exemplary flow chart describing the generation of analytical data based on transactional data, where the transactional data includes at least bid data, project tracking parameters and project performance data. The transactional data is stored by the system (step 4900), as described above in connection with FIG. 52. In this process, a request for the analytical data is received from an authorized user of the system (step 4910). The request may be submitted as a search and/or sort request to select particular or general types of transactional data as collected by the system. In addition, the request may include one or more filters to narrow the amount of transactional data within the selected types of transactional data that is used in the generation of the analytical data.

Once the requisite transactional data is identified and retrieved, the analytical data is generated from one or more components of the transactional data (e.g., bid data, project tracking parameters and/or project performance data) (step 4920). In generating the analytical data, various mathematical and statistical functions may be utilized to produce a wide variety of information requested by the user. The analytical data can be generated from transactional data related to a single project, multiple projects, multiple vendors or multiple buyers, and it can be presented to the user in a variety of reporting views. For example, exemplary reporting views include summary views, aggregate views, estimation views, statistical views, project performance views or any combination of thereof. The analytical data may be graphically displayed to assist the user in analyzing projects or industry trends.

FIG. 65 is an exemplary flow chart describing a more detailed process of collecting the transactional data and generating analytical data from the transactional data. Initially, a bid is formed by the buyer, where the bid includes data fields to receive bid data from the buyer and vendor (step 4950). For example, the data fields can enable the buyer and vendor to enter bid data related to the price, quantity, and procurement time terms. It should be understood that the data fields included in the bid are associated with the selected bid items, as described above in the Bid Activity section. When the bid data is received by the system from the buyer and vendor (step 4955), the bid data is stored in the system as transactional data (step 4960).

Upon award of the project, the project tracking parameters for the project related to the bid are received (step 4965) and stored as further transactional data (step 4970). During the performance of the project, various project performance data related to the project are received (step 4975) and stored as further transactional data (step 4980). Once the transactional data has been received and stored, a subsequent request for analytical data as a function of the transactional data is received (step 4985). The request may be submitted as a search and/or sort request by the user to select particular or general types of transactional data as collected by the system. In addition, the request may include one or more filters to narrow the amount of transactional data within the selected types of transactional data that is used in the generation of the analytical data.

Once the requisite transactional data is identified and retrieved, the analytical data is generated from one or more components of the transactional data (e.g., bid data, project tracking parameters and/or project performance data) (step 4990). In generating the analytical data, various mathematical and statistical functions may be utilized to produce a wide variety of information requested by the user. The analytical data can be generated from transactional data related to a single project, multiple projects, multiple vendors or multiple buyers, and it can be presented to the user in a variety of reporting views. For example, exemplary reporting views include summary views, aggregate views, estimation views, statistical views, project performance views or any combination of thereof. The analytical data may be graphically displayed to assist the user in analyzing projects or industry trends.

FIG. 66 is an exemplary flow chart describing a process for generating industry analytical data as a function of transactional data produced by projects of one or more buyers. Because the system is capable of managing projects for multiple buyers, industry analytical data may be assessed from the projects being performed across an entire industry. As a matter of course in using the system, the various projects of the buyers who utilize the system can be tracked via the transactional information. By analyzing the transactional data across multiple buyers, industry trends may be developed. For example, in the telecommunications industry, where there may be multiple projects related to the installation of central switches, the average cost, development time, installation time, and failure rates of central switches may be generated utilizing the principles of the present invention.

Initially, the industry analysis process begins when a request for industry analytical data is received by the system (e.g., the administrative server 125 in FIG. 2A) (step 5000). The request may be from the vendors, buyers, or administrator of the system. Based on the request, the transactional data related to multiple projects across multiple buyers is accessed in the central database (step 5010). The request may be submitted as a search and/or sort request by the user to select particular or general types of transactional data as collected by the system. In addition, the request may include one or more filters to narrow the amount of transactional data within the selected types of transactional data that is used in the generation of the analytical data.

Once the requisite transactional data is identified and retrieved, industry analytical data can be generated as a function of the transactional data (step 5020). In generating the industry analytical data, mathematical and/or statistical functions may be utilized to produce a variety of industry analytical data that the user is interested in viewing. The industry analytical data can be presented to the user in a variety of reporting views. For example, exemplary reporting views include summary views, aggregate views, estimation views, statistical views, project performance views or any combination of thereof. The analytical data may be graphically displayed to assist the user in analyzing projects or industry trends.

FIG. 67 is an exemplary flow chart describing a more detailed process for collecting the transactional data via a batch mode process from multiple buyers and generating industry analytical data from the transactional data. Transactional data for individual projects is stored in the lower-level databases associated with the buyers, vendors and administrators related to projects (step 5050). To process requests for industry analytical data, the necessary and authorized transactional data from each of the lower-level databases is retrieved up into the central database as a batch mode process, as described above and as is understood in the art (step 5060). Once the batch transactional data has been received and stored, a subsequent request for industry analytical data as a function of the batch transactional data is received (step 5070). The request may be submitted as a search and/or sort request by the user to select particular or general types of transactional data as collected by the system. In addition, the request may include one or more filters to narrow the amount of transactional data within the selected types of transactional data that is used in the generation of the analytical data.

Based on the request and any filters, the system accesses the batch transactional data to identify and retrieve the particular batch transactional data needed to perform the requested industry analysis (step 5080). Thereafter, the industry analytical data is generated from the identified batch transactional data (step 5090). In generating the industry analytical data, various mathematical and statistical functions may be utilized to produce a wide variety of information requested by the user. The industry analytical data can be presented to the user in a variety of reporting views (step 5095). For example, exemplary reporting views include summary views, aggregate views, estimation views, statistical views, project performance views or any combination of thereof. The industry analytical data may be graphically displayed to assist the user in analyzing projects or industry trends.

Figure 68:
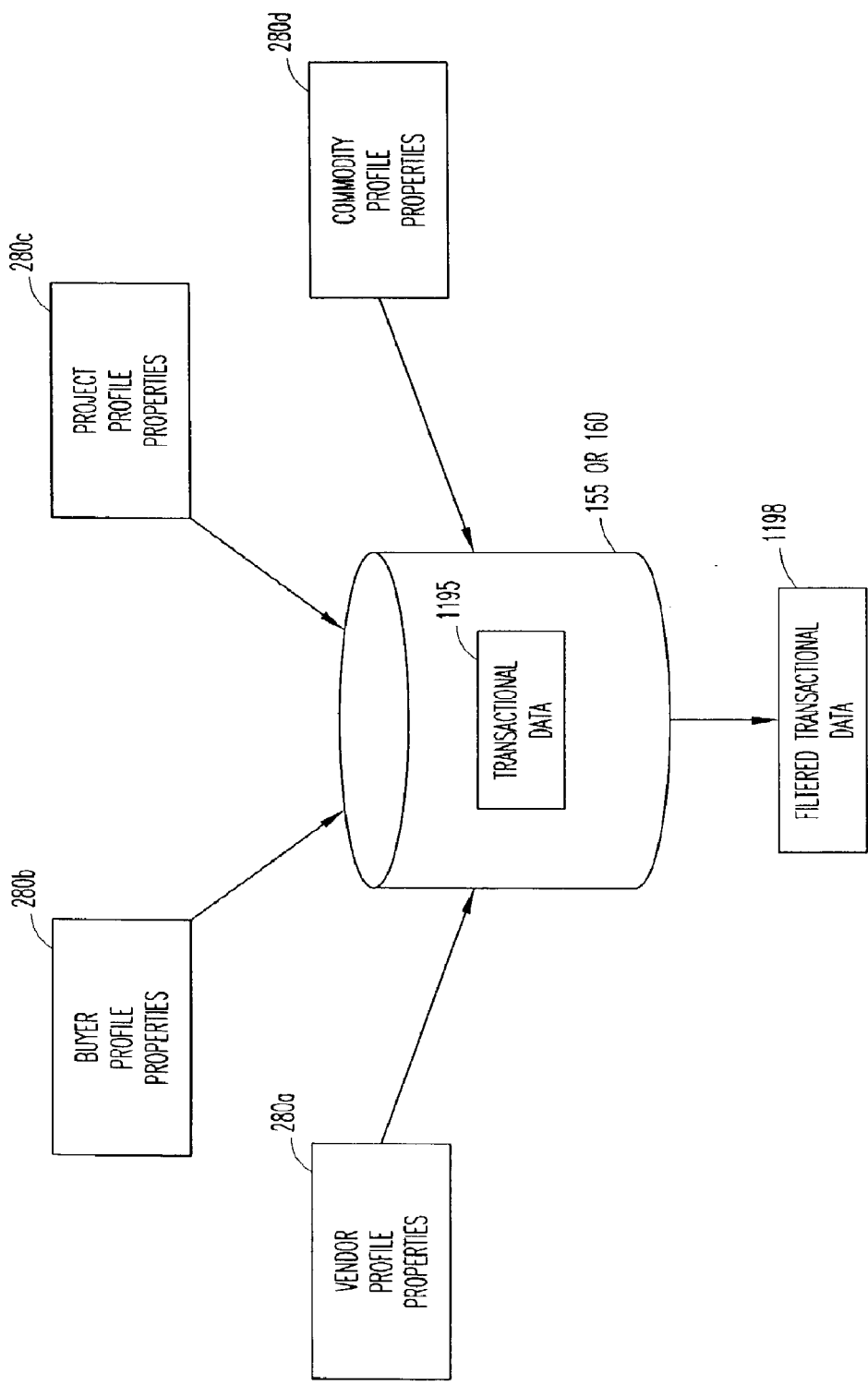
FIG. 68 illustrates the electronic facilitation of a filtering process for filtering the transactional data to provide analytical data related to the filtered transactional data, in accordance with embodiments of the present invention.

As discussed above, the analytical data request submitted by the user can include one or more filters to tailor the types of transactional data utilized in the analytical process. Referring now to FIG. 68, there is illustrated exemplary types of filters 280 than can be used to access the database 155 or 160 to retrieve filtered transactional data 1198 for analysis and reporting purposes. For example, the filters 280 can include vendor profile properties 280*a*, buyer profile properties 280*b*, project profile properties 280*c* and commodity profile properties 280*d*. The vendor profile properties 280*a* include any type of data related to the vendor, such as the vendor tier group, vendor business entity type, vendor qualification data, vendor geographical location, etc. Likewise, the buyer profile properties 280*b* similarly include any type of data related to the buyer, such as the buyer industry segmentation, buyer size or spend capacity, buyer geographical location, etc. The project profile properties 280*c* include any type of data related to a project, such as the project type, project management ownership type, business impact type, project geographical location, project sector/family, other project tracking parameters, etc. The commodity profile properties 280*d* include any type of data related to a commodity (e.g., human resource or materials resource), such as the project sector/family associated with the commodity, resource profiling, activity types, geographical location, etc.

Figure 69:
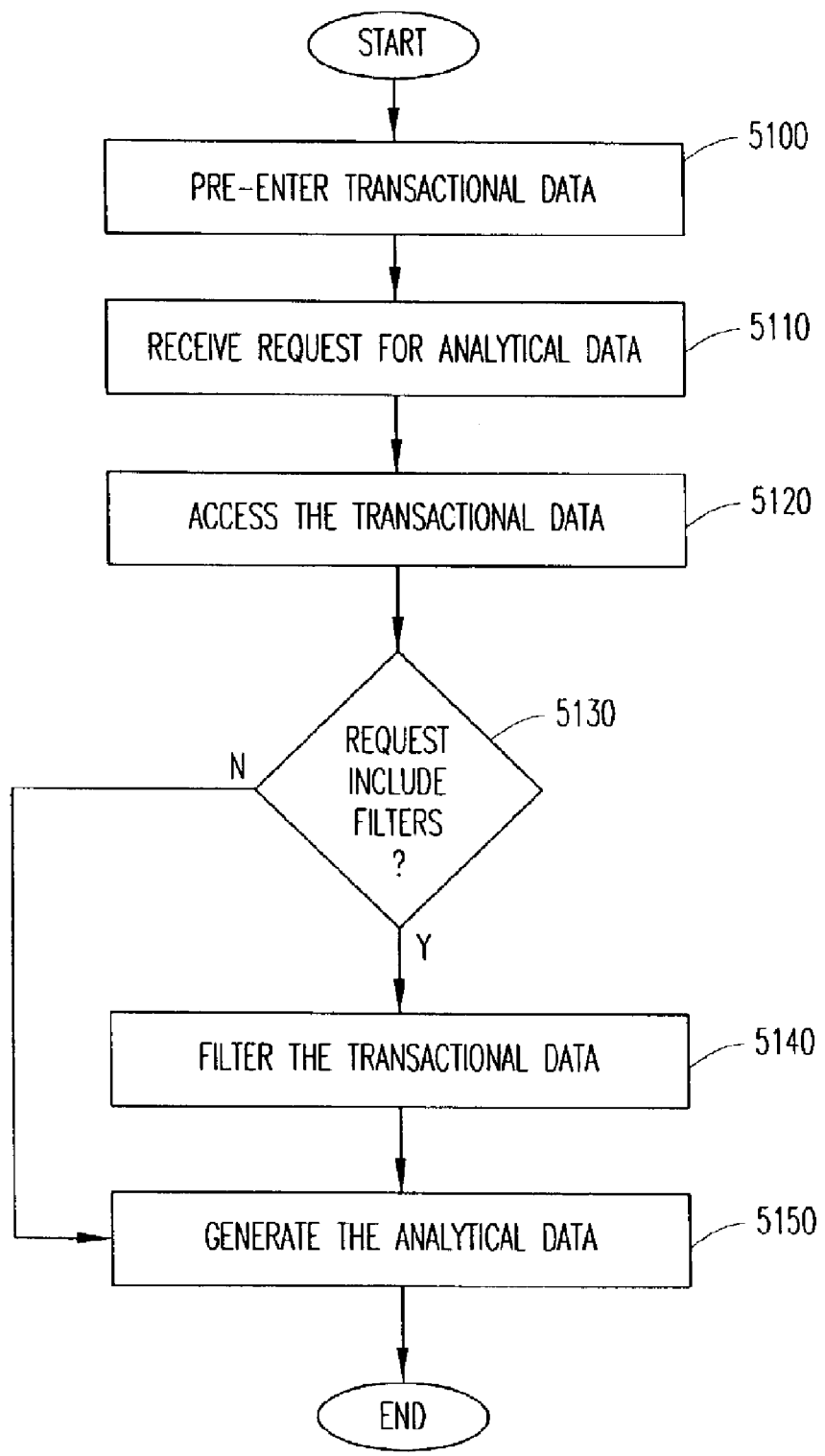
FIG. 69 is a flow chart illustrating exemplary steps for filtering the transactional data and generating analytical data from the filtered transactional data, in accordance with embodiments of the present invention.

Exemplary steps for retrieving filtered transactional data from the database are shown in FIG. 69. After the transactional data is stored in the database (step 5100), a subsequent request for analytical data as a function of the transactional data can be received (step 5110). Based upon the type of request (e.g., the type of analytical data requested), the system accesses the database to retrieve the types of transactional data necessary for responding to the request (step 5120). If the request included one or more filters (step 5130), the system filters the retrieved transactional data (step 5140) before generating the requested analytical data (5150). The filters serve the function of narrowing the amount of transactional data that is used in the analytical process. For example, if the request is for a financial report summarizing the monthly expenditures on projects for the buyer, the buyer can filter the report to include only the monthly expenditures on projects for a particular vendor or projects of a particular project type.

Figure 70:
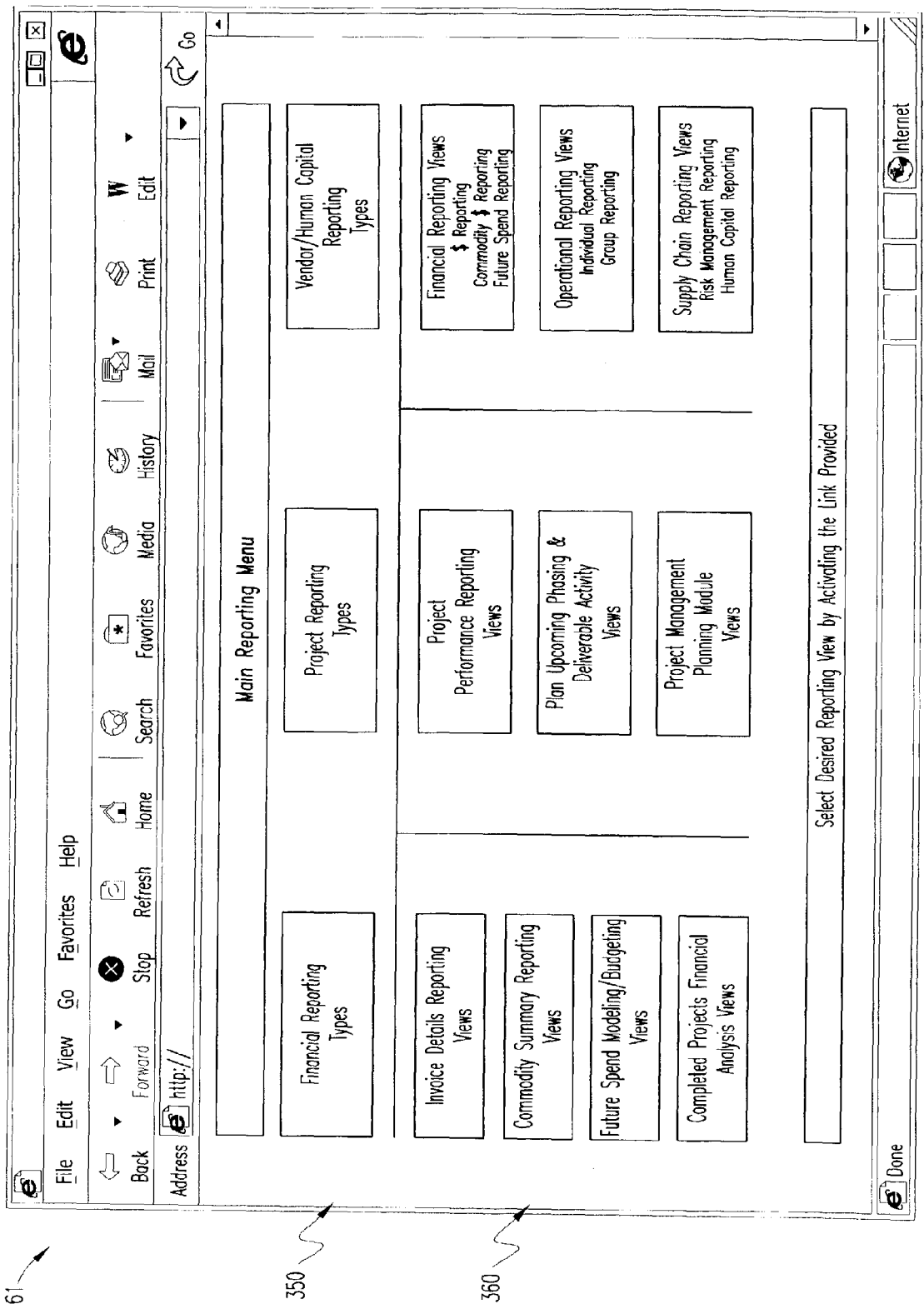
FIG. 70 is a screen shot illustrating exemplary project reporting types for generating and displaying the analytical data.

Screen shots of exemplary web pages presenting reporting views containing analytical data are shown in FIGS. 70-88. FIG. 70 is an exemplary depiction of a buyer user "Main Reporting Menu" web page 61. It should be understood that similar "Main Reporting Menus" can be provided to vendor users, administrative users and contractor users. The "Main Reporting Menu" is designed to enable users to manage projects from a variety of perspectives. Therefore, from the "Main Reporting Menu," a user can select a reporting type 350, from which a user can select a particular reporting view 360. For example, FIG. 70 illustrates three reporting types 350: financial, project and vendor/human capital. Within each of these reporting types are numerous reporting views 360.

Examples of reporting views 360 within the financial reporting type 350 are invoice details reporting views, commodity summary reporting views, future spend modeling/budgeting reporting views and completed projects financial analysis reporting views. Examples of reporting views 360 within the project reporting type 350 are project performance reporting views, plan upcoming phasing and deliverable activity reporting views and project management planning module reporting views. Examples of reporting views 360 within the vendor/human capital reporting type 350 are financial reporting views, operational reporting views and supply chain reporting views. However, it should be understood that the present invention is not limited to the specific reporting types 350 and reporting views 360 shown in FIG. 70, and the reporting types 350 and reporting views 360 are included in FIG. 70 merely for simplicity and exemplary purposes. The number of different reporting types 350 and reporting views 360 is limited only by the type and amount of transactional data maintained by the system and the requirements of the user.

Figure 71:
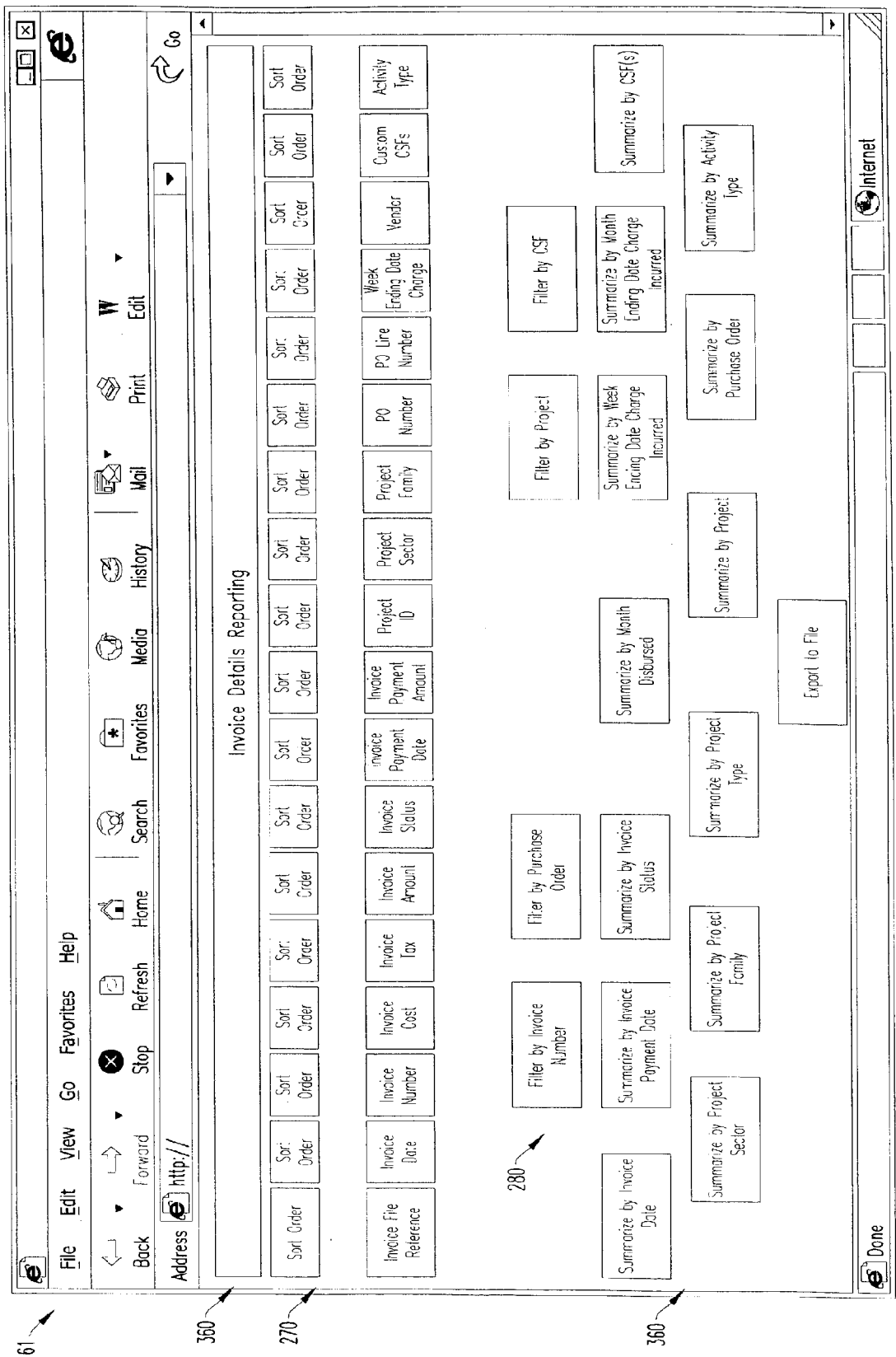

Examples of specific types of reporting views 360 are shown in FIGS. 71-88. For example, FIG. 71 is an exemplary screen shot of a web page 61 presenting an invoice details reporting view 360. Included within the reporting view 360 is analytical data 270 related to particular invoices (or vouchers). The invoice analytical data 270 can be sorted by a number of variables, filtered using a number of different filters 280 and summarized in a number of different reporting views 360. For example, from the invoice details reporting view, the transactional data used to generate the analytical data in the invoice details reporting view can be summarized by project type and displayed on a project type invoice summary reporting view as project type invoice analytical data. The filters 280 and additional reporting views 360 possible for the invoice details reporting view 360 are not limited to those illustrated in FIG. 71, and can be extended to include any customer-specific field (CSF).

Figure 72:
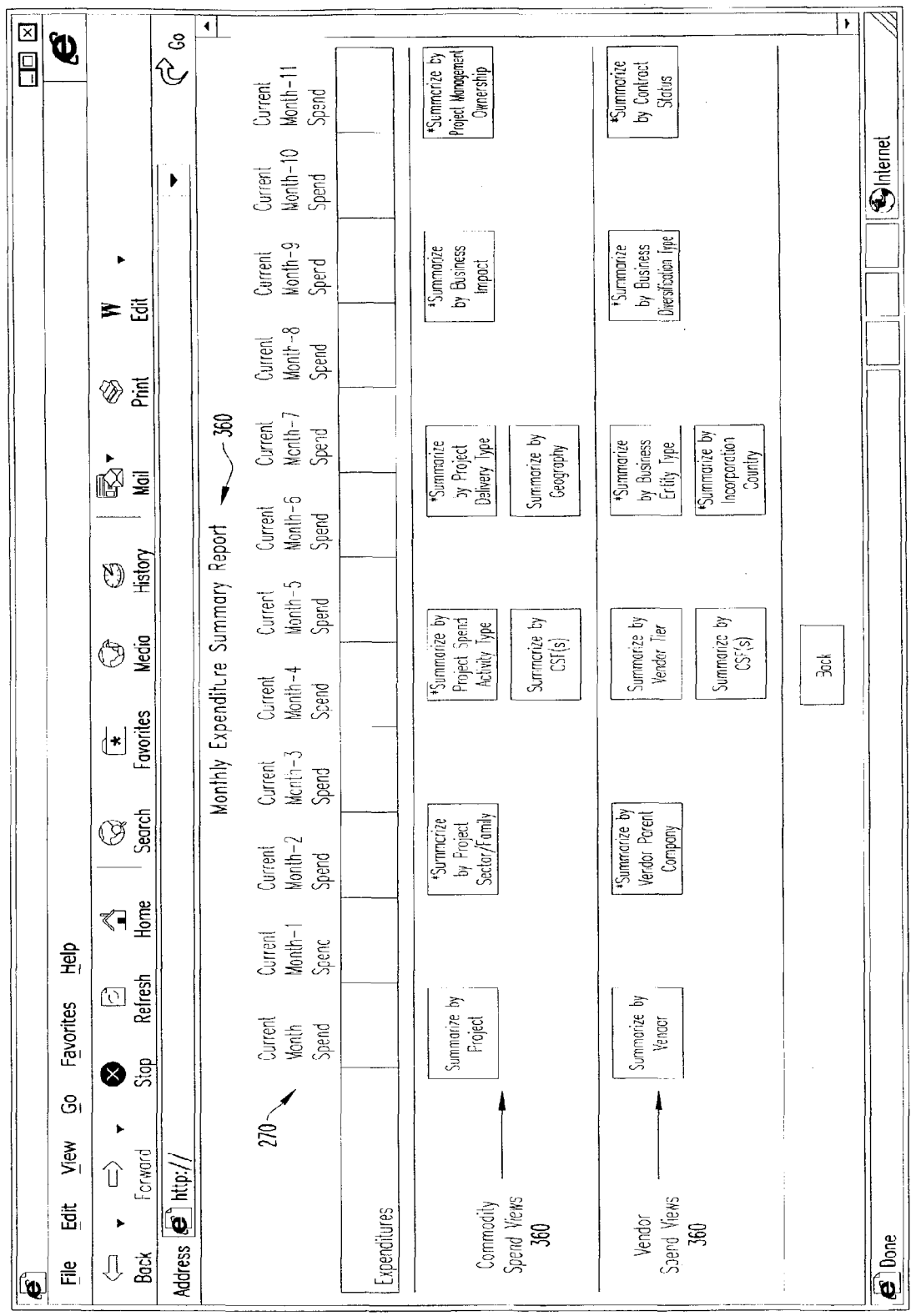

FIG. 72 is an exemplary screen shot of a web page 61 presenting a general monthly expenditure summary reporting view 360 containing analytical data 270 listing the total project expenditures for the current month and preceding months. Numerous additional summary reporting views 360 can be linked to from the general monthly summary reporting view 360. For example, the transactional data forming the analytical data 270 can be summarized by geography, and displayed as a geography expenditure summary reporting view to assist the user in determining the amount of expenditures on projects in different geographical areas.

Figure 73:
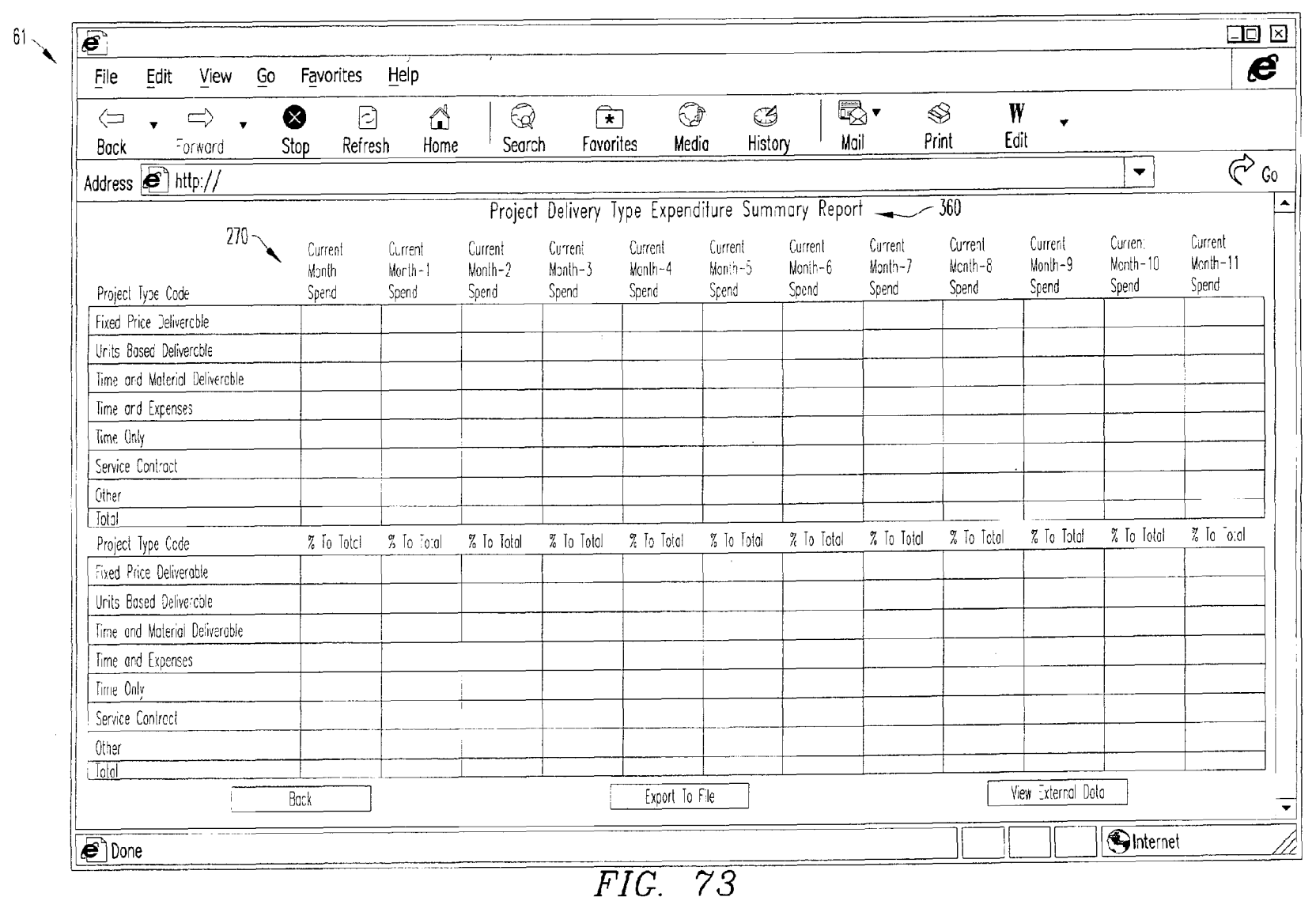

As another example, as shown in FIG. 73 the transactional data forming the analytical data 270 can be summarized by project type and displayed on a web page 61 as a project delivery type expenditure summary reporting view 360 containing analytical data 270 listing the monthly expenditures on different project delivery types. For example, the expenditures can be summarized by fixed price deliverables, unit based deliverables, time and material deliverables, time and expenses, time only, service contract or other project delivery types. In addition, statistical analytical data 270 related to the expenditure transactional data in each project delivery type can be generated to assist the user in identifying the percentage of total expenditures made on each project delivery type for each month. However, it should be understood that numerous other analytical/statistical data can be generated and displayed in numerous other reporting views using the same expenditure transactional data.

As can be seen on the bottom of the web page shown in FIG. 73, a link can be provided to view external (e.g., top-level database) data related to expenditure transactional data. Therefore, the user is not required to log-on to a different server to access the top-level transactional data. Although, it should be understood that in other embodiments, a separate log-on procedure may be required. If the user clicks on the link to the external data, a summary reporting view 360 of the type shown in FIG. 74 may be presented to the user.

Figure 74:
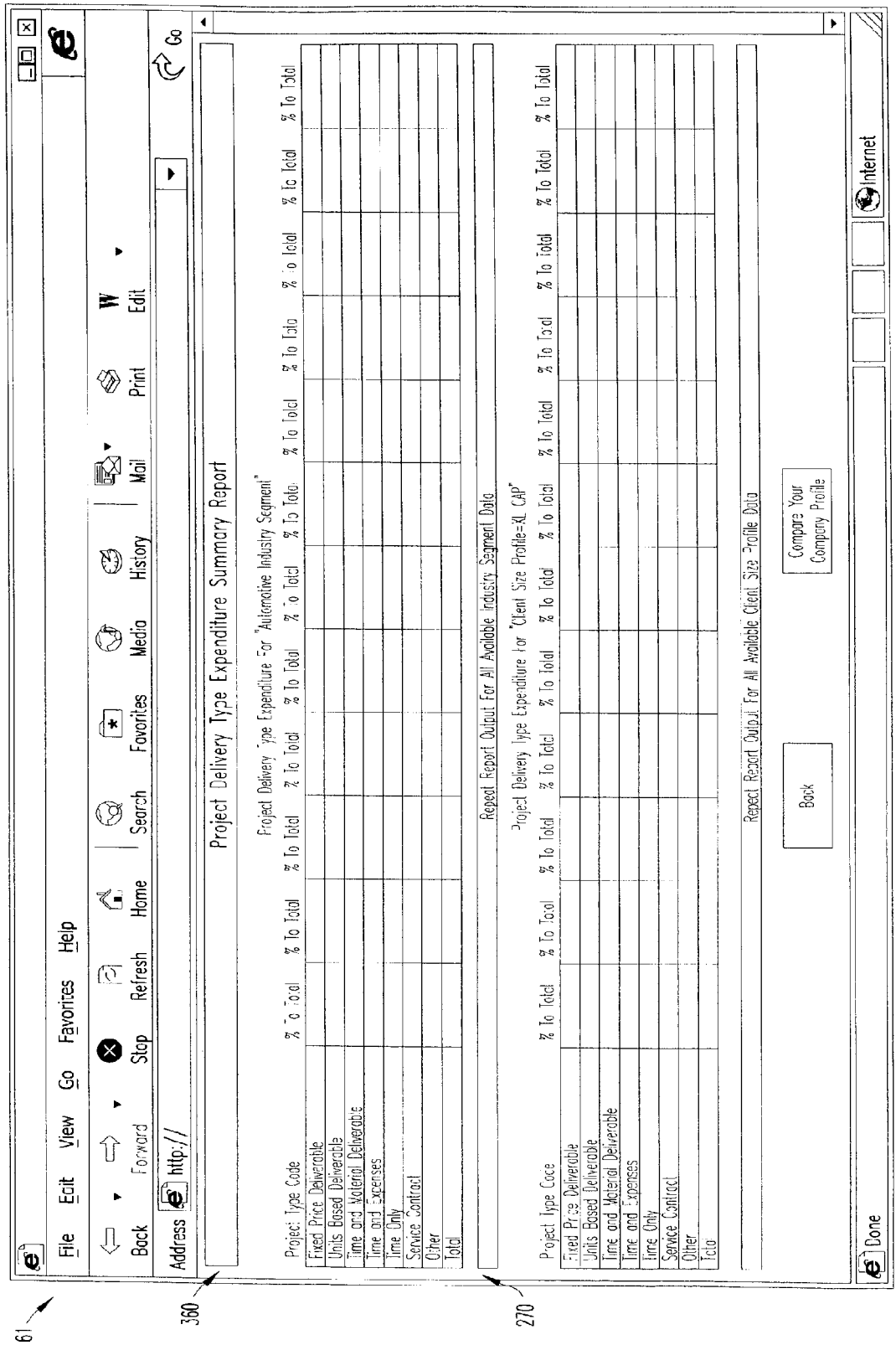

FIG. 74 is a screen shot of an exemplary web page 61 containing industry analytical data 270 presented in an external data project delivery type expenditure summary reporting view 360. Two different examples of industry analytical data 270 are shown in FIG. 74, although only one of which may be displayed at a time, depending on the request and filters entered by the user. At the top of the web page 61, statistical analytical data 270 identifying the percentage of total expenditures made on each project delivery type for each month in the automotive industry segment is shown. In the middle of the web page 61, statistical analytical data 270 identifying the percentage of total expenditures made by extra-large cap buyers on each project delivery type for each month is shown.

Figure 75:
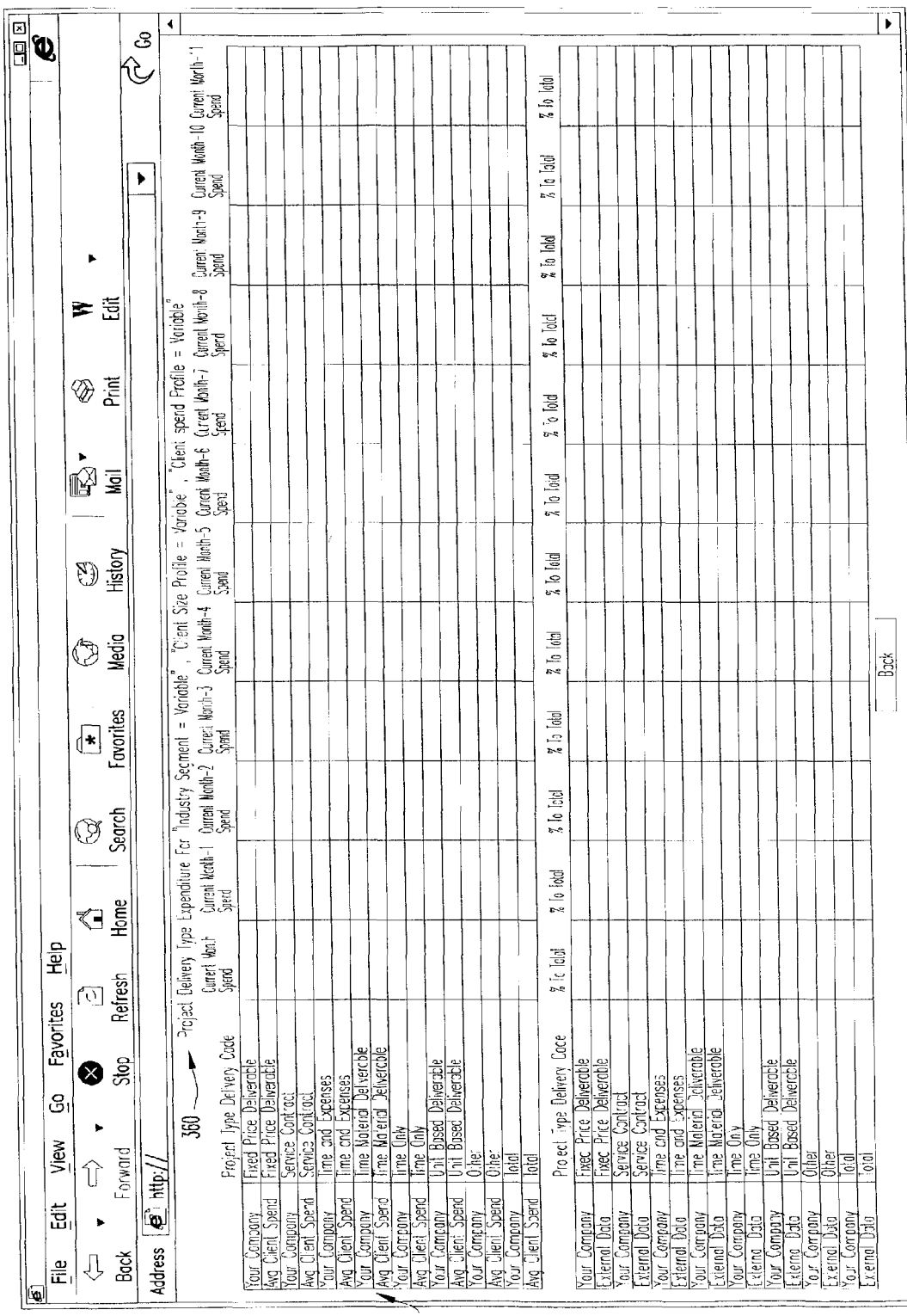

As can be seen in the web page 61 shown in FIG. 74, a link can be provided to a different reporting view that compares the industry analytical data to the user's individual company analytical data. If the user clicks on the link to the external data, a summary reporting view 360 of the type shown in FIG. 75 may be presented to the user. FIG. 75 illustrates a screen shot of an exemplary web page 61 containing a comparison of industry analytical data 270 and individual buyer analytical data 270 presented in a comparison project delivery type expenditure summary report 360. Two different examples of comparison analytical data 270 are shown in FIG. 75, although only one of which may be displayed at a time, depending on the request and filters entered by the user. At the top of the web page 61, analytical data 270 identifying the individual buyer expenditures on each project delivery type on a monthly basis is compared to the average industry expenditure on each project delivery type on a monthly basis. At the bottom of the web page 61, analytical data 270 identifying the percentage of total expenditures made on each project delivery type for each month by the buyer is compared to the percentage of total expenditures made on each project delivery type for each month by the industry.

Figure 76:
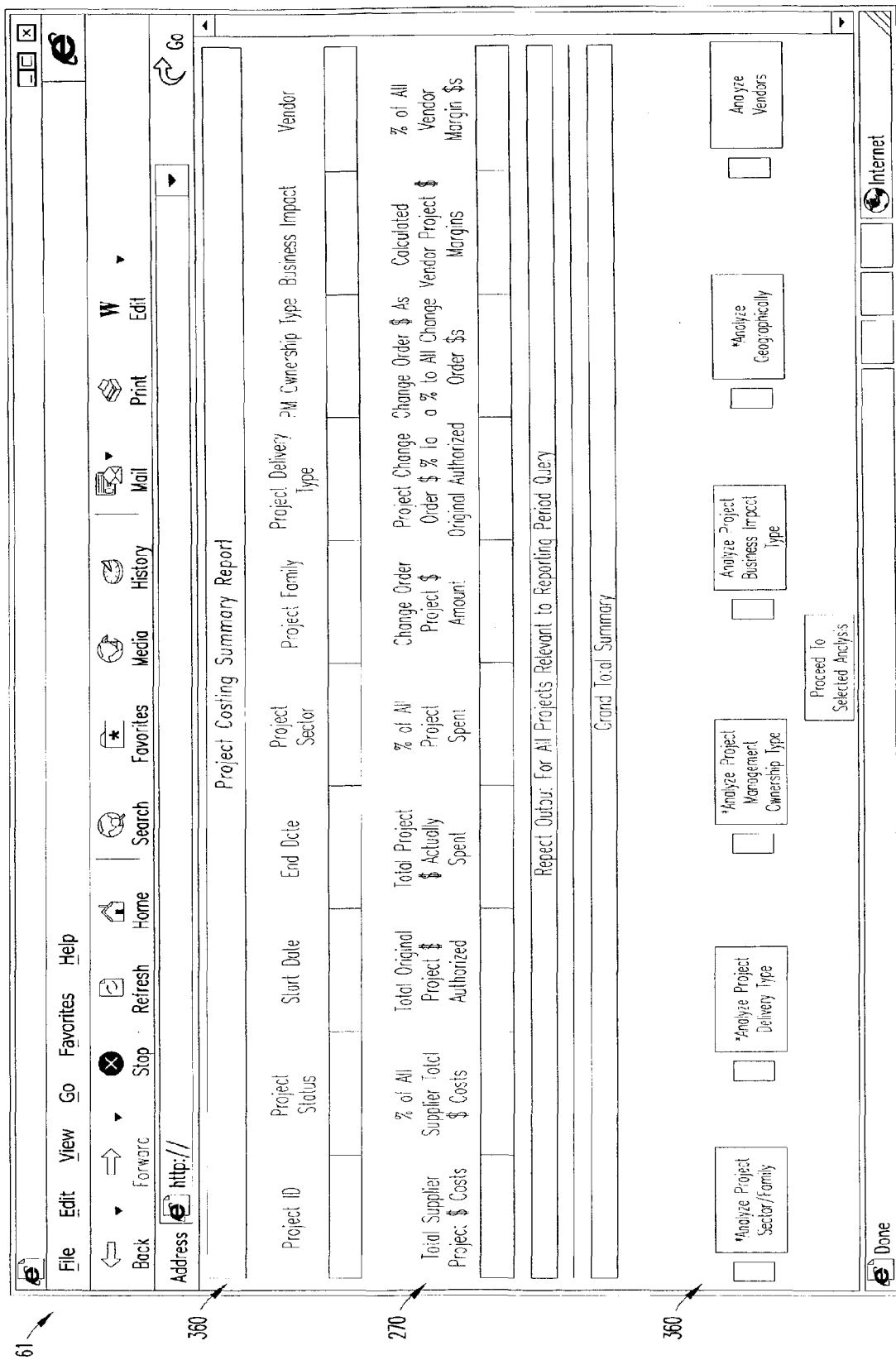

FIG. 76 is a screen shot of an exemplary web page 61 containing analytical data 270 related to a particular project that is presented in a project costing summary reporting view 360. The analytical data 270 can include the project status, the total project costs to date, the requisition amount (i.e., the amount authorized for the project), the percentage spent on this project in comparison to all projects currently being handled by the buyer, the project margins and other relevant project costing analytical data. At the bottom of the web page 61 are links to different project costing reporting views 360 summarized by different types of transactional data, such as business impact type, geography, vendors, etc.

Figure 77:
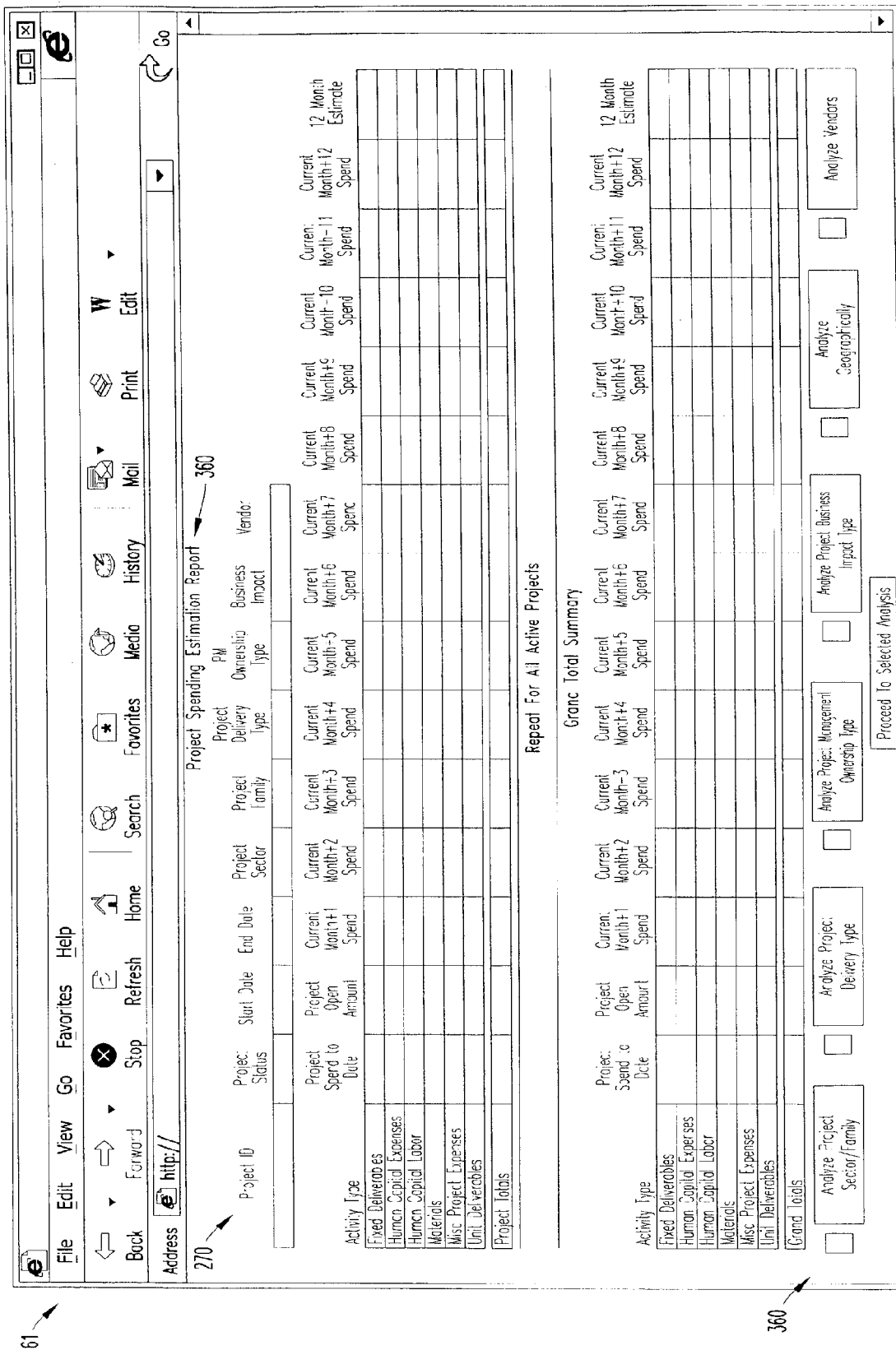

FIG. 77 is a screen shot of an exemplary web page 61 containing analytical data 270 related to estimated future spending for one or more projects that is presented in a project spending estimation reporting view 360. Two different examples of future spending analytical data 270 are shown in FIG. 77, although only one of which may be displayed at a time, depending on the request and filters entered by the user. At the top of the web page 61, analytical data 270 related to estimated future spending on a particular project is shown, while in the middle of the web page, estimate future spending on all projects is shown. At the bottom of the web page 61 are links to different project spending estimation reporting views 360 summarized by different types of transactional data, such as business impact type, geography, vendors, etc.

Figure 78:
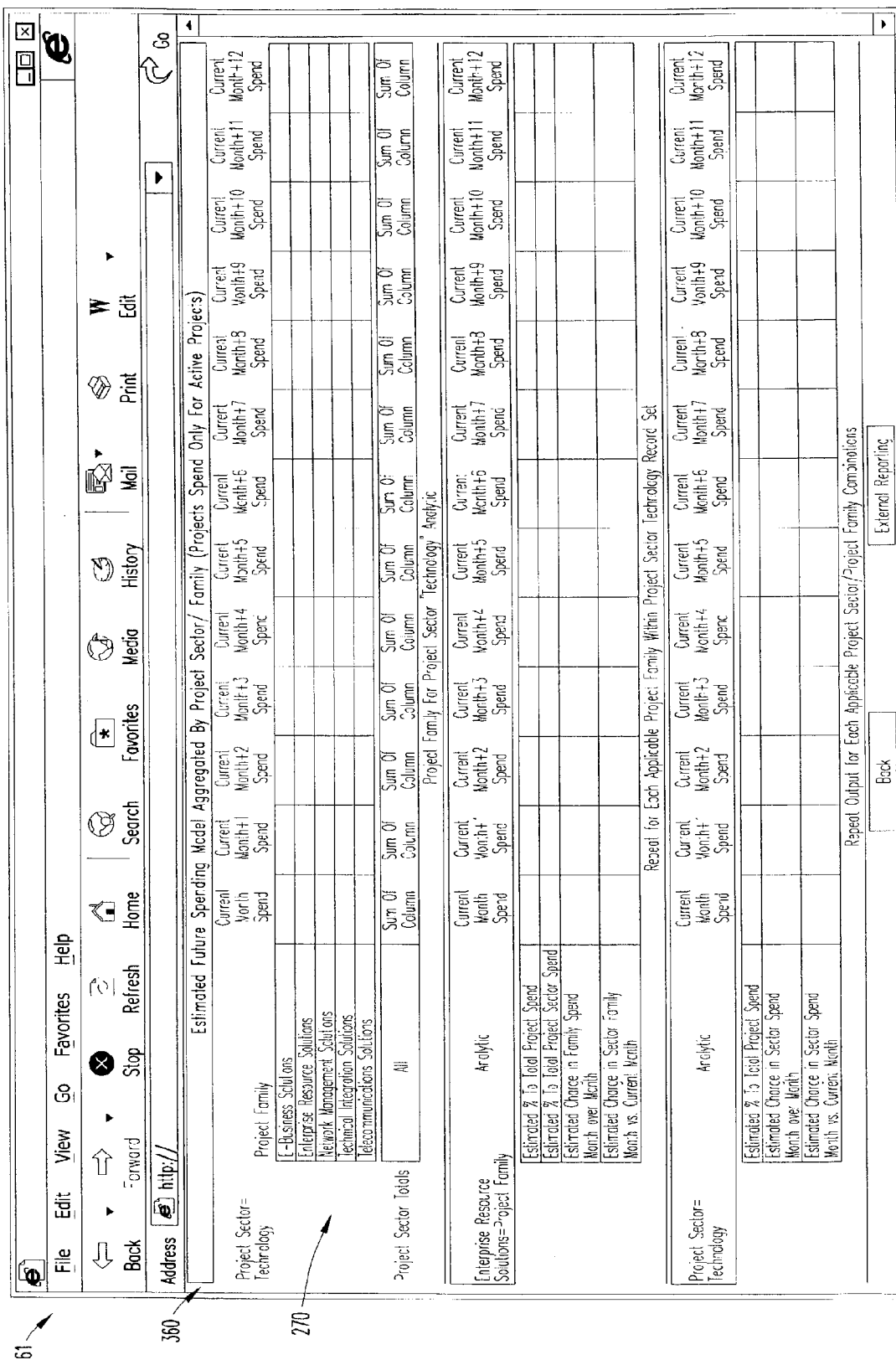

As an example, if a user clicked on the link to summarize the estimated future project spending by project sector and family, a reporting view 360 similar to the one shown in FIG. 78 may be presented on an exemplary web page 61 to the user. The reporting view 360 shown in FIG. 78 is an estimated future spending model aggregated by project sector/family reporting view 360 containing analytical data 270 related to the estimated future spending on projects in different project sector/families. This type of reporting view 360 may be useful to users to ensure that organizational investments are being made in accordance with business plans.

Three different examples of estimated future project sector/family spending are shown in FIG. 78, although only one of which may be displayed at a time, depending on the request and filters entered by the user. At the top of the web page 61, the analytical data 270 contains estimated future spending by month that is aggregated by project sector/family. In the middle of the web page, the analytical data 270 contains statistical data related to the estimated future spending for a particular project family, such as the estimated percentage of the total expenditures that will be made on the particular project family by month. At the bottom of the web page, the analytical data 270 contains statistical data related to the estimated future spending for a particular project sector, such as the estimated percentage of the total expenditures that will be made on the particular project sector by month. As can further be seen at the bottom of the web page 61, a link can be provided to external data to view reports containing external analytical data on projected future spending. Such external data may be useful to provide insight as to how the general market or specific market members are investing or planning to meet their business objectives.

Figure 79:
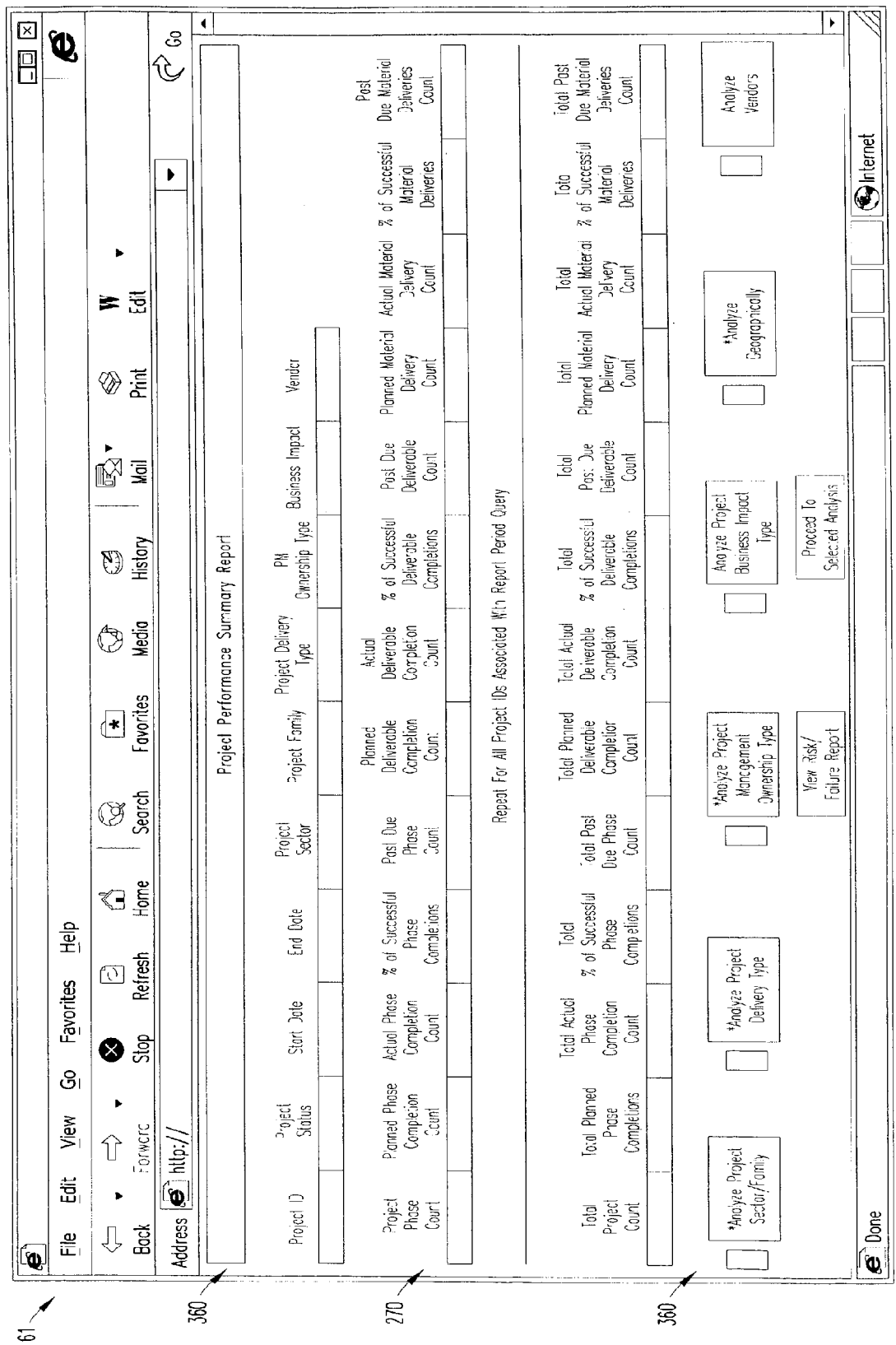

FIG. 79 is a screen shot of an exemplary web page 61 containing analytical data 270 related to project performance data for a particular project that is presented in a project performance summary reporting view 360. The analytical data 270 can include the project status, the project phase completion count, the past due phase count, the deliverable completion count, the past due deliverable completion count, the percentage of on-time deliverable completions, and other project performance analytical data. At the bottom of the web page 61 are links to different project performance reporting views 360 summarized by different types of transactional data, such as business impact type, geography, vendors, etc. Thus, from this web page 61, aggregate and other statistical analytical data summarized by transactional data type can be generated.

As an example, if a user clicked on the link to summarize the project performance analytical data by project management ownership type, a reporting view 360 similar to the one shown in FIG. 80 may be presented on an exemplary web page 61 to the user. The reporting view 360 shown in FIG. 80 is an operational performance summary for projects managed by different ownership types, such as buyer-owned, vendor-owned, joint ownership, etc., containing analytical data 270 related to the performance of projects having different ownerships. This type of reporting view 360 may be useful to users to understand the relationship between success/failure rates as a function of project management ownership. As can be seen at the bottom of the web page 61, a link can be provided to external data to view reports containing external analytical data on project performance as it relates to project management ownership.

Figure 81:
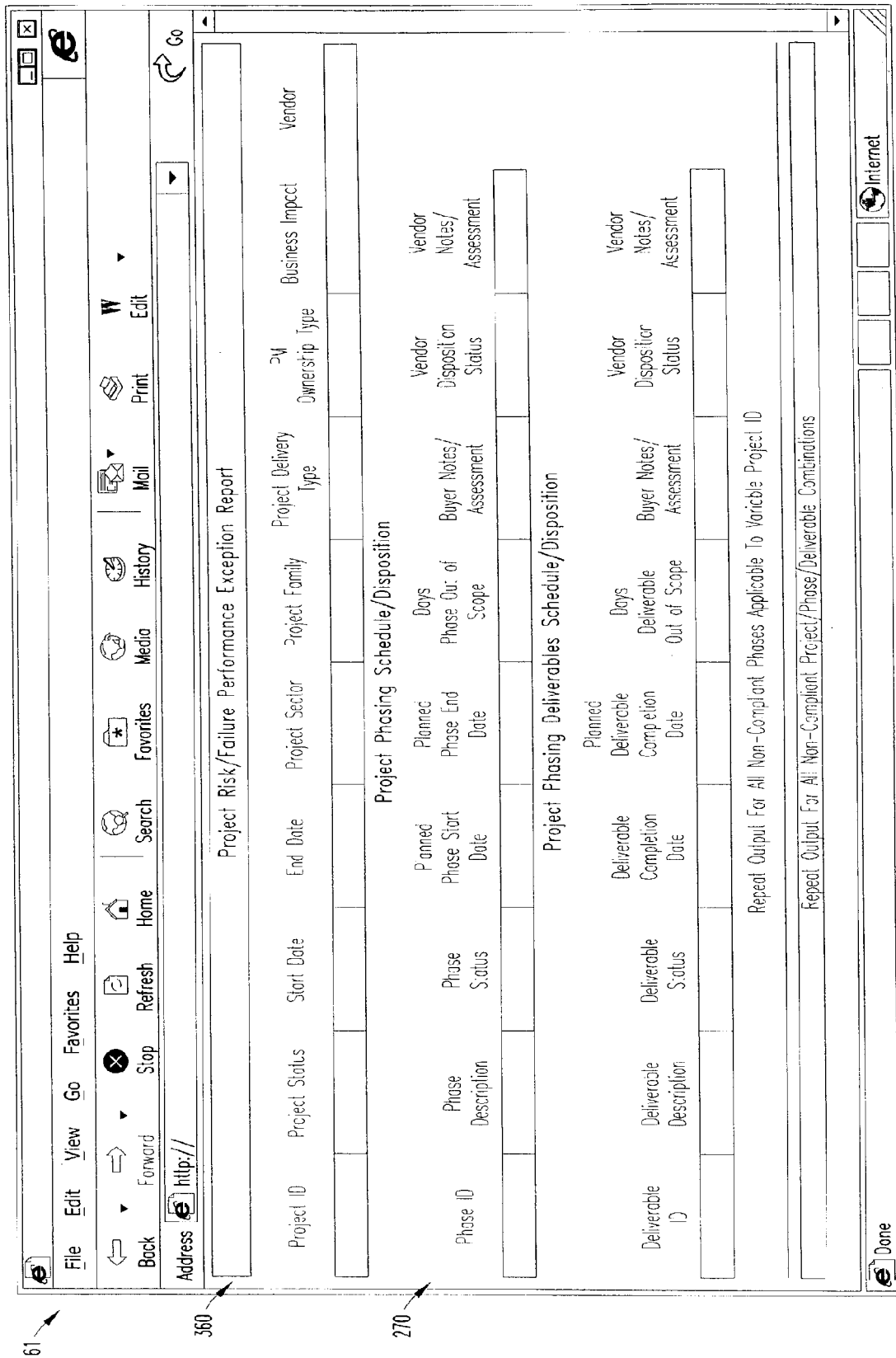

As another example, if a user clicked on the link on the bottom of the web page 61 in FIG. 79 to view a risk/failure report, a reporting view 360 similar to the one shown in FIG. 81 may be presented on an exemplary web page 61 to the user. The reporting view 360 shown in FIG. 81 is a project risk/failure performance exception report containing analytical data 270 related to the performance of at-risk or non-compliant projects having past due dates or other difficulties.

Figure 82:
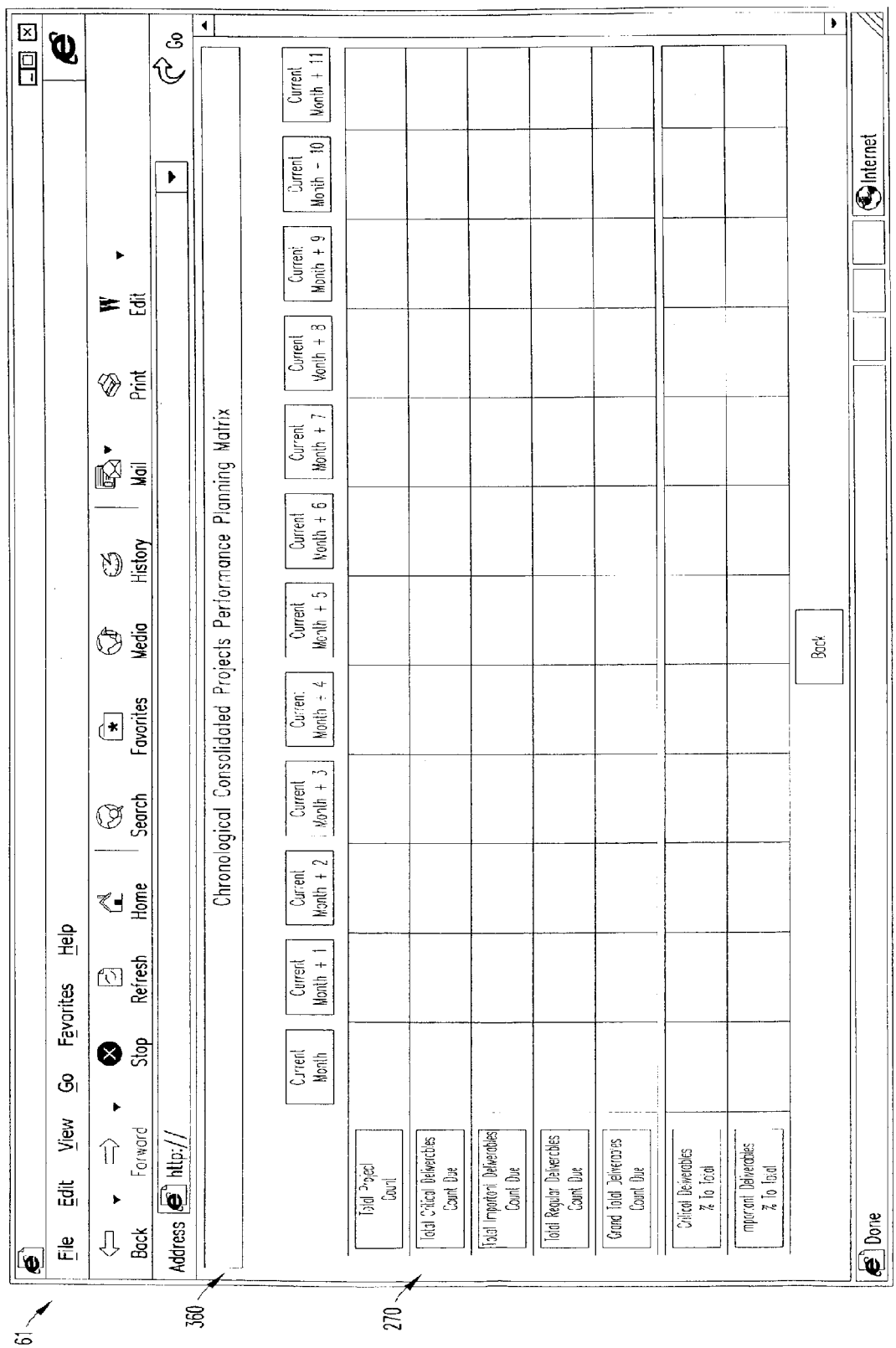
Figure 83:
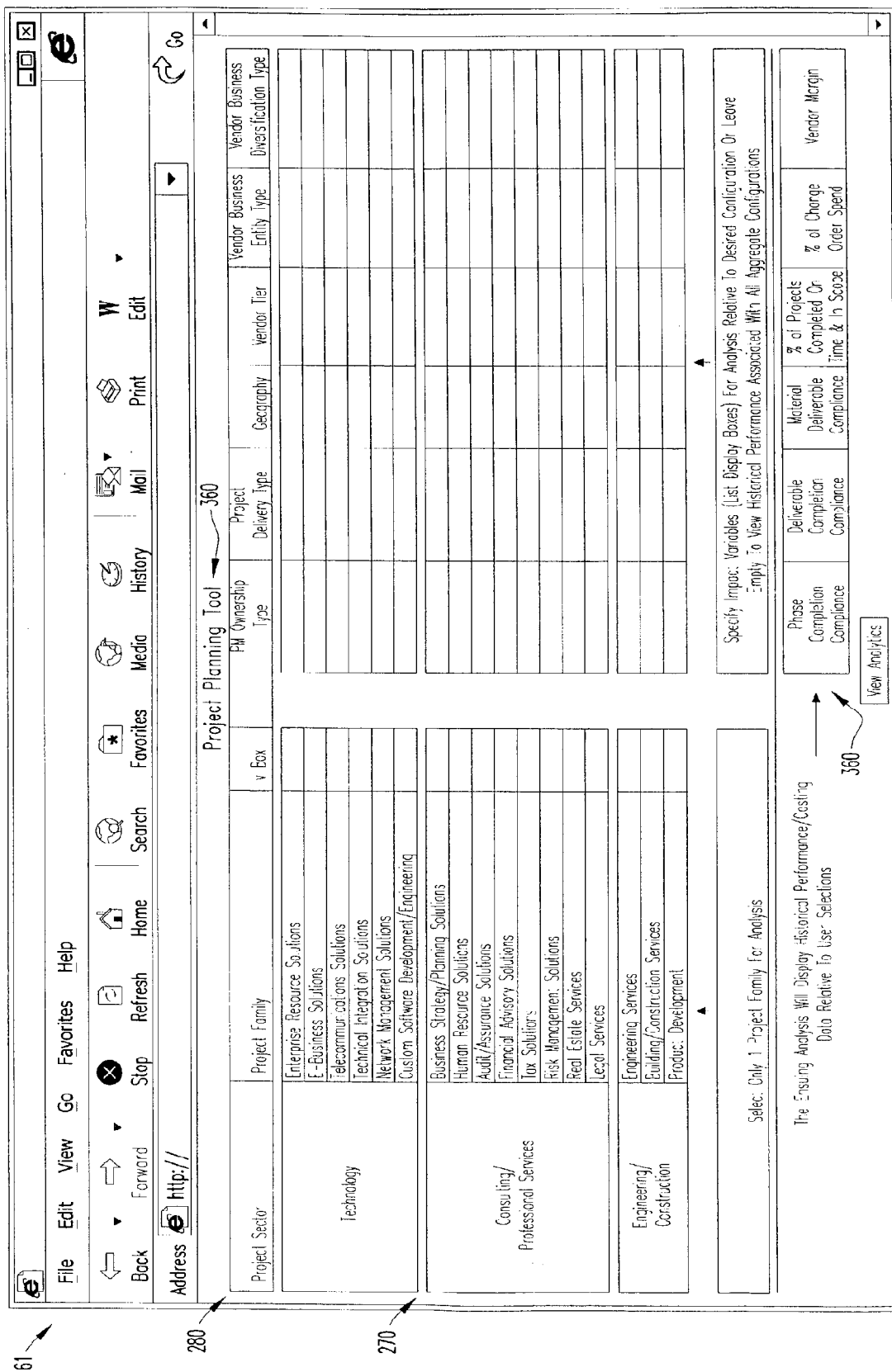

FIG. 82 is a screen shot of an exemplary web page 61 containing analytical data 270 related to project planning that is presented in a planning matrix reporting view 360. The analytical data 270 can include, for example, the total project count for the current month and future months, and other project planning analytical data 270. FIG. 83 is a screen shot of an exemplary web page 61 containing analytical data related to more specific project planning that is presented in a project planning tool reporting view 360. For example, a user can select a particular project sector/family and choose from various "impact variables" (e.g., filters 280), such as geography, vendor tier, etc., and various project performance reporting views 360 to present a reporting view 360 containing aggregate summary analytical data 270 associated with every combination of the listed impact variables associated with the specific historical project performance data. This type of reporting view 360 may be useful to a user to provide significant insight into which business configurations (variable aggregates) have been successful and which ones have not.

Figure 84:
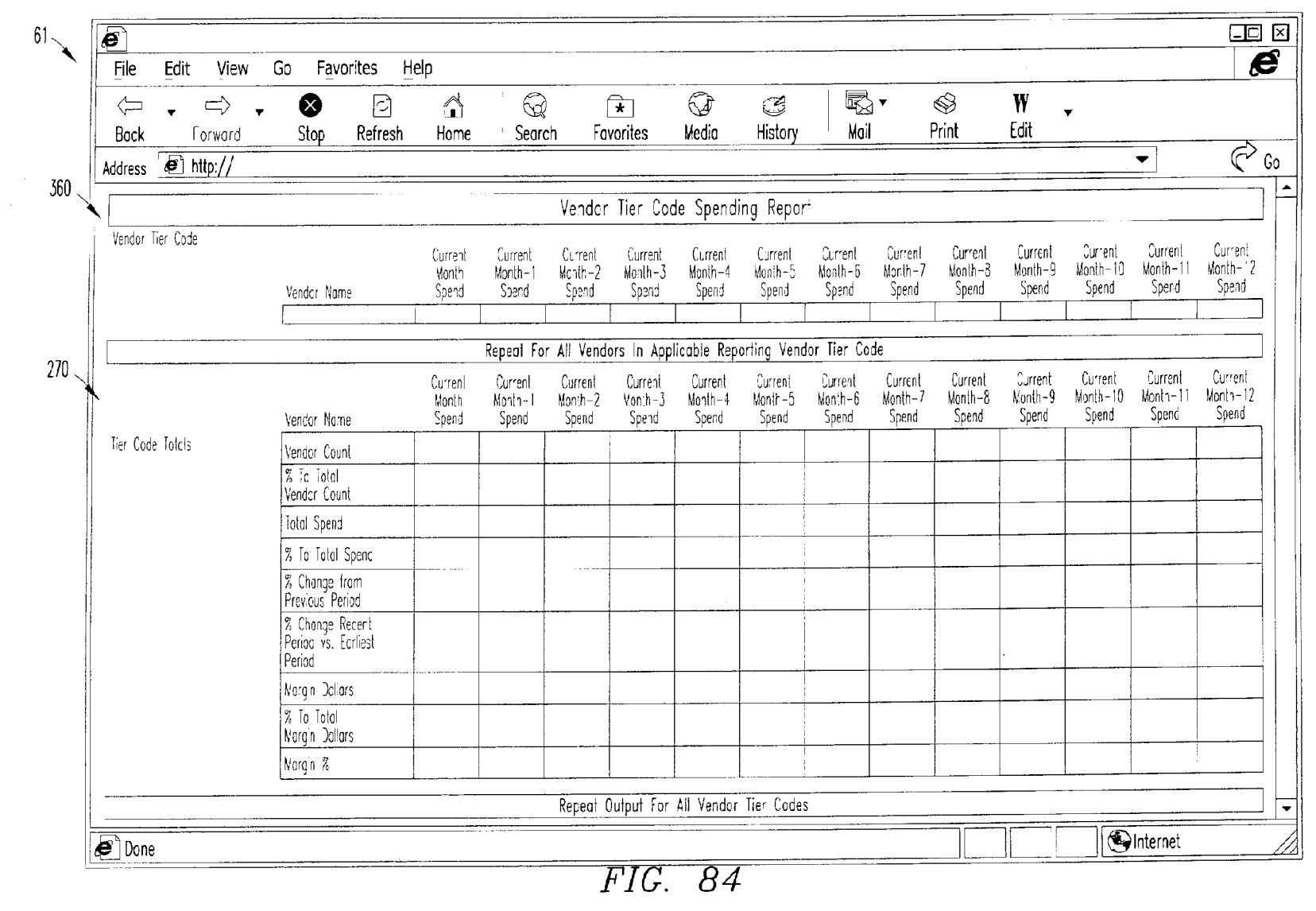

FIG. 84 is a screen shot of an exemplary web page 61 containing analytical data 270 related to spending trends as a function of vendor tiers that is presented in a vendor tier code spending reporting view 360. Two examples of vendor tier spending data are shown in FIG. 84, although only one of which may be displayed at a time, depending on the request and filters entered by the user. At the top of the web page 61, the analytical data 270 includes the amount spent on one or more vendors within a specific vendor tier on a month-bymonth basis. At the bottom of the web page 61, the analytical data 270 includes the number of vendors in the vendor tier, the total amount spent with the vendors in the vendor tier on a month-by-month basis and other aggregate or statistical vendor tier spending analytical data 270.

Figure 85:
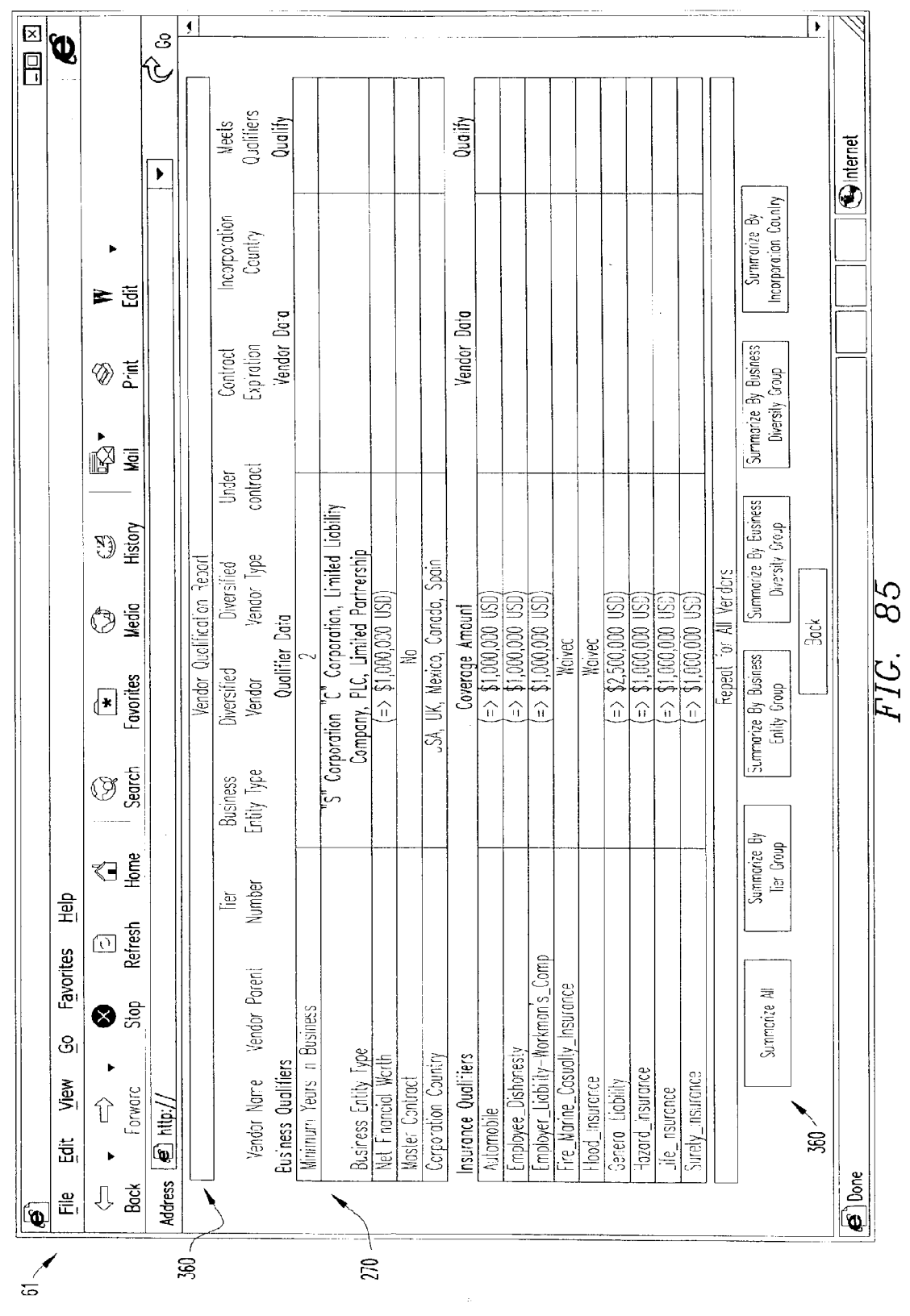

FIG. 85 is a screen shot of an exemplary web page 61 containing analytical data 270 related to vendor qualification information that is presented in a vendor qualification reporting view 360. The analytical data can include, for example, a listing of buyer-defined vendor criteria information, associated vendor qualification information for each vendor and an indication of whether or not the vendor meets each of the buyer-defined vendor qualifiers. At the bottom of the web page 61, there are further links to different summary reporting views 360 to aggregate and/or perform statistical analyses on various vendor qualification data.

Figure 86:
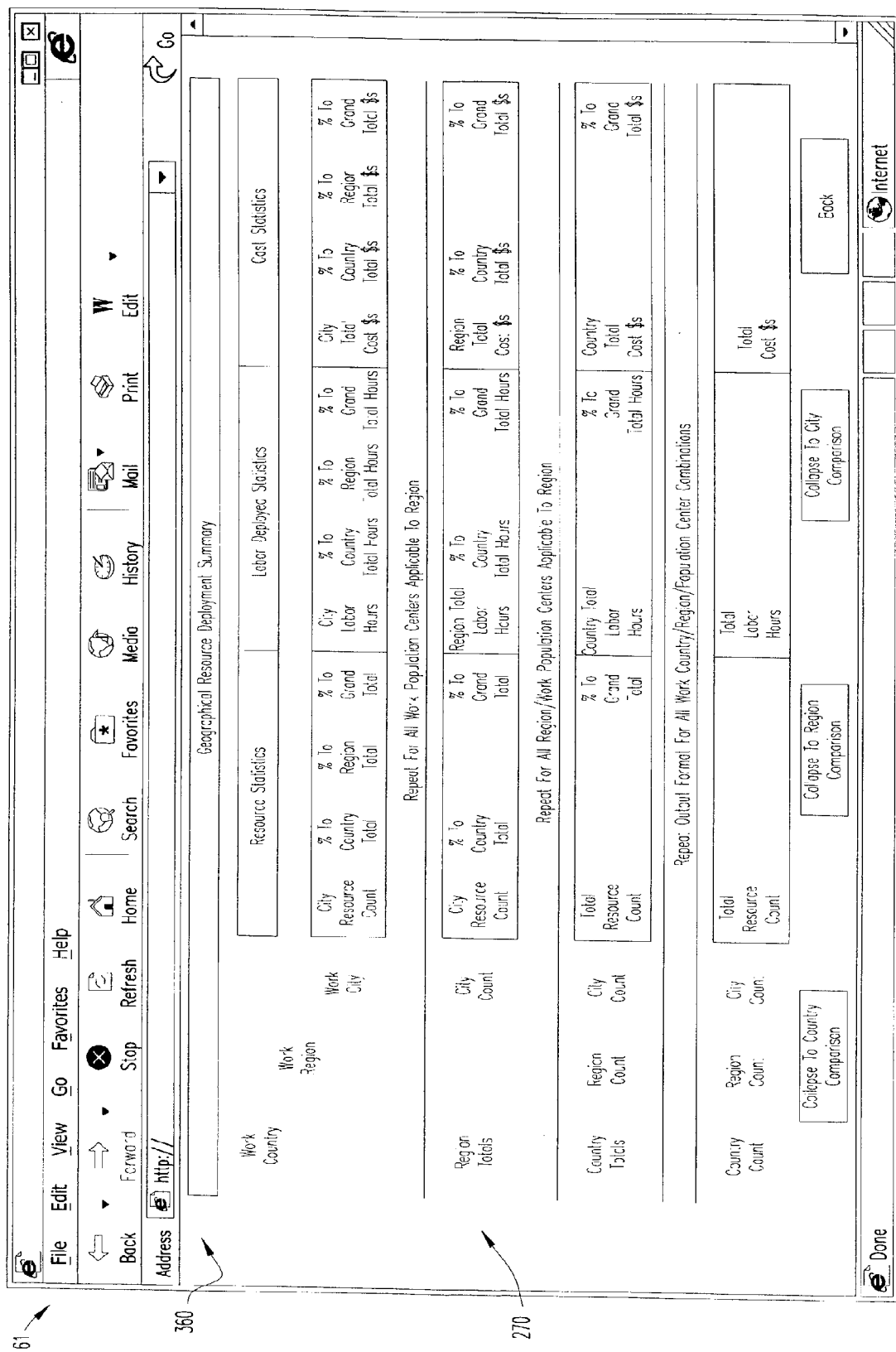

FIG. 86 is a screen shot of an exemplary web page 61 containing analytical data 270 related to deployment of human resources as a function of geography that is presented in a geographical resource deployment reporting view 360. The analytical data 270 can include statistical information, such as the percentage of resources deployed in a specific country, region or city, the percentage of time worked in a specific country, region or city and the percentage of money spent on human resources in a specific country, region or city. The analytical data 270 can further include various aggregate information, such as the total resource count, time and money spent in a specific country, region or city. This type of human resource reporting view 360 may be useful to a user when dealing with issues such as capacity management, pricing, co-employment, re-deployment, etc.

Figure 87:
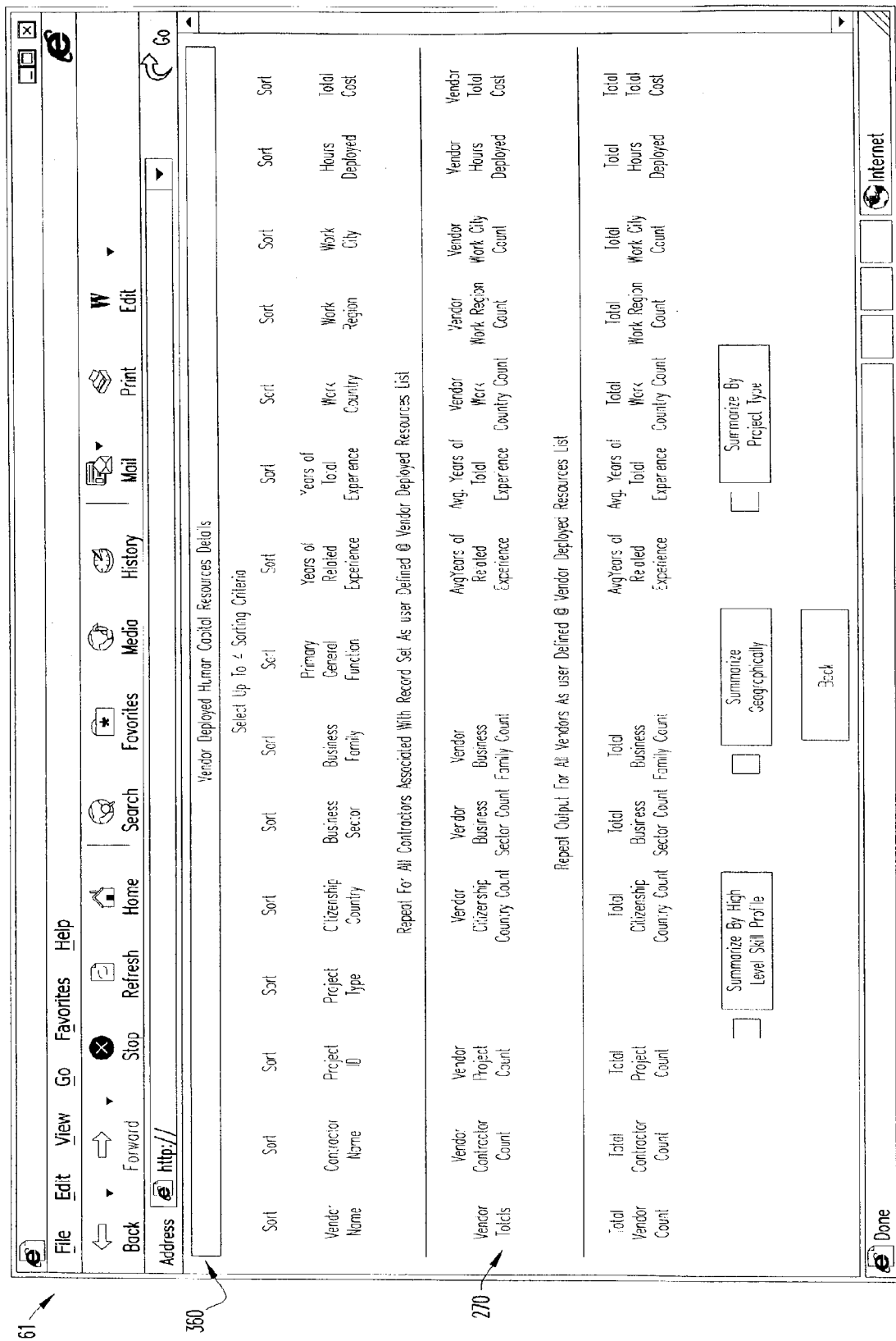

FIG. 87 is a screen shot of an exemplary web page 61 containing analytical data 270 related to human resources that is presented in a vendor deployed human capital resources reporting view 360. Three different examples of human resource data are shown in FIG. 84, although only one of which may be displayed at a time, depending on the request and filters entered by the user. At the top of the web page 61, the analytical data 270 includes individual contractor information as a function of project performance. In the middle of the web page 61, the analytical data 270 includes aggregate and statistical contractor information related to a particular vendor. At the bottom of the web page 61, the analytical data 270 includes aggregate and statistical contractor information related to multiple vendors. At the bottom of the web page 61, there are further links to different summary reporting views 360 to aggregate and/or perform statistical analyses on various contractor data.

Figure 88:
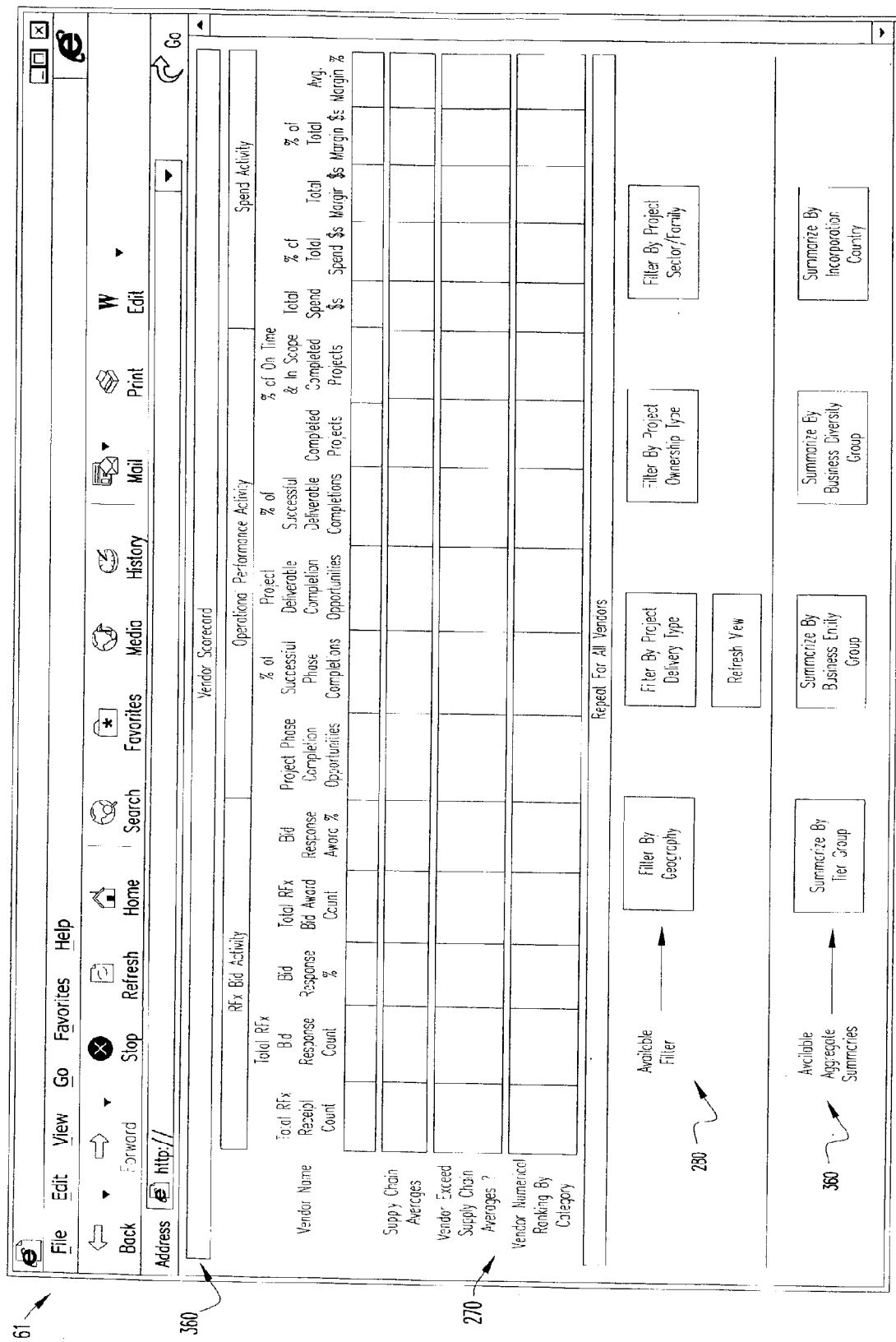

FIG. 88 is a screen shot of an exemplary web page 61 containing analytical data 270 related to vendor performance that is presented in a vendor scorecard reporting view 360. This reporting view 360 includes several filters 280 that can be utilized to focus the view 360 on specific types of transactional data. It should be understood, that although not shown in each reporting view 360 discussed above, various filters would be available to some or all of the reporting views 360. The analytical data 270 can include aggregate and statistical information related to the bid, project performance and spending activity of various vendors. At the bottom of the web page 61, there are further links to different summary reporting views 360 to aggregate and/or perform statistical analyses on various vendor performance data. The above-described reporting views 360 and types of analytical data 270 presented herein are meant to provide only an example of the robustness of the reporting module. It should be readily apparent to one skilled in the art the number and variations of reporting views that are possible with the present invention.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

We claim:

1. A method of producing analytical data, the method comprising:
    storing, via a computer system comprising at least one computer comprising a processor and memory, transactional data related to a plurality of project processes;
    associating, by the computer system, the transactional data with a plurality of profiles having a profile type according to a uniform data structure, the plurality of profiles comprising profiles each having at least one profile type selected from among a vendor-profile type, a buyer-profile type, a commodity-profile type, and a project-profile type;
    wherein each of the plurality of profiles comprises profile properties defined for the profile type;
    receiving, by the computer system, a request for analytical data as a function of the transactional data from a requestor, the request for analytical data comprising a request for aggregate analytical data related to at least one of: a plurality of projects, a plurality of vendors, a plurality of buyers, and a plurality of commodities;
    filtering, via the computer system, the transactional data via at least one of the profile properties;
    generating, via the computer system, the analytical data based on the transactional data in response to the request, the generating comprising aggregately analyzing the filtered transactional data responsive to the request; and
    providing, by the computer system, information indicative of the aggregate analytical data to the requestor.

2. The method of claim 1, wherein the generating comprises aggregating a portion of the transactional data that is associated with the at least one of: a plurality of projects, a plurality of vendors, a plurality of buyers, and a plurality of commodities.

3. The method of claim 1, wherein the generating comprises:
    computing statistical data; and
    aggregating the statistical data to generate the aggregate analytical data responsive to the request.

4. The method of claim 2, wherein:
    the plurality of profiles comprises one or more profiles of the project-profile type;
    the aggregate analytical data is related to the plurality of projects based on a property of the one or more profiles of the project-profile type; and
    the generating comprises aggregating a portion of the transactional data that is associated with the plurality of projects based on the property of the one or more profiles of the project-profile type to generate the aggregate analytical data.

5. The method of claim 2, wherein:
    the request specifies a particular vendor;
    the aggregate analytical data is related to the plurality of projects, the plurality of projects being projects involving the particular vendor; and
    the generating comprises aggregating a portion of the transactional data that is associated with the particular vendor across the plurality of projects to generate the aggregate analytical data.

6. The method of claim 2, wherein the generating comprises aggregating a portion of the transactional data that is associated with the plurality of buyers to generate the aggregate analytical data.

7. The method of claim 2, wherein the generating comprises aggregating a portion of the transactional data that is associated with the plurality of commodities to generate the aggregate analytical data.

8. The method of claim 2, wherein the generating comprises aggregating a portion of the transactional data that is associated with more than one selected from the group consisting of: the plurality of projects, the plurality of vendors, the plurality of buyers, and the plurality of commodities.

9. The method of claim 1, the method comprising:
collecting, using a computer processor, at least a portion of the transactional data from at least one of:
one or more buyers; and
one or more vendors; and
wherein the collecting is during the plurality of project processes, the plurality of project processes comprising pre-bid, bid, and post-bid activities.

10. The method of claim 1, wherein the transactional data comprises a plurality of components according to the uniform data structure, the plurality of components comprising at least two selected from the group consisting of: bid data, project tracking parameters, voucher information, and project-performance data.

11. The method of claim 1, the method comprising wherein the uniform data structure comprises a structured representation of a portion of the transactional data related to the plurality of buyers, the plurality of vendors, the plurality of commodities, and the plurality of projects.

12. The method of claim 9, wherein the transactional data comprises project-tracking parameters.

13. The method of claim 12, the collecting comprising receiving voucher information during a project payment process.

14. The method of claim 13, the collecting comprising systematically producing project-performance data, the systematically producing comprising comparing the voucher information to ones of the project-tracking parameters.

15. The method of claim 13, the method comprising:
wherein the transactional data comprises project-performance data; and
wherein the collecting comprises systematically modifying at least a portion of the project-performance data based on the voucher information, the systematically modifying comprising:
comparing the voucher information to ones of the project tracking parameters; and
modifying the at least a portion of the project-performance data responsive to the comparing.

16. The method of claim 14, wherein the project-performance data comprises project-cost information.

17. The method of claim 1, wherein the aggregate analytical data comprises industry analytical data related to multiple projects commissioned by multiple buyers within an industry.

18. The method of claim 1, the method comprising:
wherein the request includes one or more filters, the one or more filters comprising the at least one of the profile properties.

19. The method of claim 1, the method comprising, responsive to the requestor preventing a portion of the transactional data related to the requestor from being accessed by other requestors, limiting the requestor to analytical data based on the portion of the transactional data related to the requestor.

20. A computer-program product comprising a computer-usable medium having computer-readable program code embodied therein, the computer-readable program code adapted to be executed to implement a method comprising:
storing, via a computer system comprising at least one computer comprising a processor and memory, transactional data related to a plurality of project processes;
associating, by the computer system, the transactional data with a plurality of profiles having a profile type according to a uniform data structure, the plurality of profiles comprising profiles each having at least one profile type selected from among a vendor-profile type, a buyer-profile type, a commodity-profile type, and a project-profile type;
wherein each of the plurality of profiles comprises profile properties defined for the profile type;
receiving, by the computer system, a request for analytical data as a function of the transactional data from a requestor, the request for analytical data comprising a request for aggregate analytical data related to at least one of: a plurality of projects, a plurality of vendors, a plurality of buyers, and a plurality of commodities;
filtering, via the computer system, the transactional data via at least one of the profile properties;
generating, via the computer system, the analytical data based on the transactional data in response to the request, the generating comprising aggregately analyzing the filtered transactional data responsive to the request; and
providing, by the computer system, information indicative of the aggregate analytical data to the requestor.

21. The computer-program product of claim 20, wherein the generating comprises aggregating a portion of the transactional data that is associated with the at least one of: a plurality of projects, a plurality of vendors, a plurality of buyers, and a plurality of commodities.

22. The computer-program product of claim 20, wherein the generating comprises:
computing statistical data; and
aggregating the statistical data to generate the aggregate analytical data responsive to the request.

23. The computer-program product of claim 21, wherein:
the plurality of profiles comprises one or more profiles of the project-profile type;
the aggregate analytical data is related to the plurality of projects based on a property of the one or more profiles of the project-profile type; and
the generating comprises aggregating a portion of the transactional data that is associated with the plurality of projects based on the property of the one or more profiles of the project-profile type to generate the aggregate analytical data.

24. The computer-program product of claim 21, wherein:
the request specifies a particular vendor;
the aggregate analytical data is related to the plurality of projects, the plurality of projects being projects involving the particular vendor; and
the generating comprises aggregating a portion of the transactional data that is associated with the particular vendor across the plurality of projects to generate the aggregate analytical data.

25. The computer-program product of claim 21, wherein the generating comprises aggregating a portion of the transactional data that is associated with the plurality of buyers to generate the aggregate analytical data.

26. The computer-program product of claim 21, wherein the generating comprises aggregating a portion of the transactional data that is associated with the plurality of commodities to generate the aggregate analytical data.

27. The computer-program product of claim 21, wherein the generating comprises aggregating a portion of the transactional data that is associated with more than one selected from the group consisting of: the plurality of projects, the plurality of vendors, the plurality of buyers, and the plurality of commodities.

28. The computer-program product of claim 20, wherein the method comprises:
   collecting, using a computer processor, at least a portion of the transactional data from at least one of:
      one or more buyers; and
      one or more vendors; and
   wherein the collecting is during the plurality of project processes, the plurality of project processes comprising pre-bid, bid, and post-bid activities.

29. The computer-program product of claim 20, wherein the transactional data comprises a plurality of components according to the uniform data structure, the plurality of components comprising at least two selected from the group consisting of: bid data, project tracking parameters, voucher information, and project-performance data.

30. The computer-program product of claim 20, the method comprising wherein the uniform data structure comprises a structured representation of a portion of the transactional data that is related to the plurality of buyers, the plurality of vendors, the plurality of commodities, and the plurality of projects.

31. The computer-program product of claim 28, wherein the transactional data comprises project-tracking parameters.

32. The computer-program product of claim 31, the collecting comprising receiving voucher information during a project payment process.

33. The computer-program product of claim 32, the collecting comprising systematically producing project-performance data, the systematically producing comprising comparing the voucher information to ones of the project-tracking parameters.

34. The computer-program product of claim 32, the method comprising:
   wherein the transactional data comprises project-performance data; and
   wherein the collecting comprises systematically modifying at least a portion of the project-performance data based on the voucher information, the systematically modifying comprising:
      comparing the voucher information to ones of the project tracking parameters; and
      modifying the at least a portion of the project-performance data responsive to the comparing.

35. The computer-program product of claim 33, wherein the project-performance data comprises project-cost information.

36. The computer-program product of claim 20, wherein the aggregate analytical data comprises industry analytical data related to multiple projects commissioned by multiple buyers within an industry.

37. The computer-program product of claim 20, the method comprising:
   wherein the request includes one or more filters, the one or more filters comprising the at least one of the profile properties.

38. The computer-program product of claim 20, the method comprising, responsive to the requestor preventing a portion of the transactional data related to the requestor from being accessed by other requestors, limiting the requestor to analytical data based on the portion of the transactional data related to the requestor.

* * * * *

UNITED STATES PATENT AND TRADEMARK OFFICE
CERTIFICATE OF CORRECTION

| | | |
|---|---|---|
| PATENT NO. | : 8,204,820 B2 | Page 1 of 1 |
| APPLICATION NO. | : 13/017760 | |
| DATED | : June 19, 2012 | |
| INVENTOR(S) | : Andrew A. Cullen, III et al. | |

It is certified that error appears in the above-identified patent and that said Letters Patent is hereby corrected as shown below:

In the Specification

Column 40, Line 35

Replace "hid"
With -- bid --

Column 40, Line 19

Replace "hid"
With -- bid --

Column 42, Line 58

Replace "hid"
With -- bid --

Column 61, Line 60

Replace "hid"
With -- bid --

Signed and Sealed this
Nineteenth Day of November, 2013

Teresa Stanek Rea
*Deputy Director of the United States Patent and Trademark Office*